(12) United States Patent
Gruber et al.

(10) Patent No.: US 9,318,108 B2
(45) Date of Patent: Apr. 19, 2016

(54) INTELLIGENT AUTOMATED ASSISTANT

(75) Inventors: Thomas Robert Gruber, Emerald Hills, CA (US); Adam John Cheyer, Oakland, CA (US); Dag Kittlaus, San Jose, CA (US); Didier Rene Guzzoni, Mont-sur-Rolle (CH); Christopher Dean Brigham, San Jose, CA (US); Richard Donald Giuli, Arroyo Grande, CA (US); Marcello Bastea-Forte, New York, NY (US); Harry Joseph Saddler, Berkeley, CA (US)

(73) Assignee: Apple Inc., Cupertino, CA (US)

( * ) Notice: Subject to any disclaimer, the term of this patent is extended or adjusted under 35 U.S.C. 154(b) by 441 days.

(21) Appl. No.: 12/987,982

(22) Filed: Jan. 10, 2011

(65) Prior Publication Data

US 2012/0016678 A1 Jan. 19, 2012

Related U.S. Application Data

(60) Provisional application No. 61/295,774, filed on Jan. 18, 2010.

(51) Int. Cl.
*G10L 21/00* (2013.01)
*G10L 15/18* (2013.01)
(Continued)

(52) U.S. Cl.
CPC ............ *G10L 15/1815* (2013.01); *G06F 3/167* (2013.01); *G06F 9/54* (2013.01);
(Continued)

(58) Field of Classification Search
CPC ............. H04M 1/72561; H04M 2250/74; H04M 3/4938; G06F 17/30731; G06F 17/30241; G06F 17/30256; G06F 17/30265; G06F 17/30867; G06F 17/3087; G06F 17/30879; G06F 3/038; G10L 15/181; G10L 15/19; G10L 15/30; G10L 15/18; G10L 15/1822; G10L 15/20; G10L 15/24; G10L 15/26
USPC .................... 704/270.1, 275, 235, 9, 10, 270; 706/11; 707/909.01, 999.002; 705/28; 709/224, 217; 715/234, 727, 764, 728; 379/201.01, 230; 455/556.1
See application file for complete search history.

(56) References Cited

U.S. PATENT DOCUMENTS 1,559,320 A 10/1925 Hirsh
2,180,522 A 11/1939 Henne
(Continued)

FOREIGN PATENT DOCUMENTS

CA 2666438 C 6/2013
CH 681573 A5 4/1993
(Continued)

OTHER PUBLICATIONS

Australian Office Action dated Nov. 13, 2012 for Application No. 2011205426, 7 pages.
(Continued)

*Primary Examiner* — Vijay B Chawan
(74) *Attorney, Agent, or Firm* — Morrison & Foerster LLP

(57) ABSTRACT

An intelligent automated assistant system engages with the user in an integrated, conversational manner using natural language dialog, and invokes external services when appropriate to obtain information or perform various actions. The system can be implemented using any of a number of different platforms, such as the web, email, smartphone, and the like, or any combination thereof. In one embodiment, the system is based on sets of interrelated domains and tasks, and employs additional functionally powered by external services with which the system can interact.

48 Claims, 47 Drawing Sheets

(51) Int. Cl.
  *G06F 17/30*      (2006.01)
  *G10L 15/22*      (2006.01)
  *G06F 17/28*      (2006.01)
  *G06F 3/16*       (2006.01)
  *G06F 9/54*       (2006.01)
  *G10L 15/26*      (2006.01)
  *G10L 21/06*      (2013.01)

(52) U.S. Cl.
  CPC ........... *G06F 17/28* (2013.01); *G06F 17/3087* (2013.01); *G10L 15/22* (2013.01); *G10L 15/26* (2013.01); *G10L 21/06* (2013.01)

(56) References Cited

U.S. PATENT DOCUMENTS

| | | |
|---|---|---|
| 3,704,345 A | 11/1972 | Coker et al. |
| 3,710,321 A | 1/1973 | Rubenstein |
| 3,828,132 A | 8/1974 | Flanagan et al. |
| 3,979,557 A | 9/1976 | Schulman et al. |
| 4,013,085 A | 3/1977 | Wright |
| 4,081,631 A | 3/1978 | Feder |
| 4,090,216 A | 5/1978 | Constable |
| 4,107,784 A | 8/1978 | Van Bemmelen |
| 4,108,211 A | 8/1978 | Tanaka |
| 4,159,536 A | 6/1979 | Kehoe et al. |
| 4,181,821 A | 1/1980 | Pirz et al. |
| 4,204,089 A | 5/1980 | Key et al. |
| 4,241,286 A | 12/1980 | Gordon |
| 4,253,477 A | 3/1981 | Eichman |
| 4,278,838 A | 7/1981 | Antonov |
| 4,282,405 A | 8/1981 | Taguchi |
| 4,310,721 A | 1/1982 | Manley et al. |
| 4,332,464 A | 6/1982 | Bartulis et al. |
| 4,348,553 A | 9/1982 | Baker et al. |
| 4,384,169 A | 5/1983 | Mozer et al. |
| 4,386,345 A | 5/1983 | Narveson et al. |
| 4,433,377 A | 2/1984 | Eustis et al. |
| 4,451,849 A | 5/1984 | Fuhrer |
| 4,485,439 A | 11/1984 | Rothstein |
| 4,495,644 A | 1/1985 | Parks et al. |
| 4,513,379 A | 4/1985 | Wilson et al. |
| 4,513,435 A | 4/1985 | Sakoe et al. |
| 4,555,775 A | 11/1985 | Pike |
| 4,577,343 A | 3/1986 | Oura |
| 4,586,158 A | 4/1986 | Brandle |
| 4,587,670 A | 5/1986 | Levinson et al. |
| 4,589,022 A | 5/1986 | Prince et al. |
| 4,611,346 A | 9/1986 | Bednar et al. |
| 4,615,081 A | 10/1986 | Lindahl |
| 4,618,984 A | 10/1986 | Das et al. |
| 4,642,790 A | 2/1987 | Minshull et al. |
| 4,653,021 A | 3/1987 | Takagi |
| 4,654,875 A | 3/1987 | Srihari et al. |
| 4,655,233 A | 4/1987 | Laughlin |
| 4,658,425 A | 4/1987 | Julstrom |
| 4,670,848 A | 6/1987 | Schramm |
| 4,677,570 A | 6/1987 | Taki |
| 4,680,429 A | 7/1987 | Murdock et al. |
| 4,680,805 A | 7/1987 | Scott |
| 4,686,522 A | 8/1987 | Hernandez et al. |
| 4,688,195 A | 8/1987 | Thompson et al. |
| 4,692,941 A | 9/1987 | Jacks et al. |
| 4,698,625 A | 10/1987 | McCaskill et al. |
| 4,709,390 A | 11/1987 | Atal et al. |
| 4,713,775 A | 12/1987 | Scott et al. |
| 4,718,094 A | 1/1988 | Bahl et al. |
| 4,724,542 A | 2/1988 | Williford |
| 4,726,065 A | 2/1988 | Froessl |
| 4,727,354 A | 2/1988 | Lindsay |
| RE32,632 E | 3/1988 | William |
| 4,736,296 A | 4/1988 | Katayama et al. |
| 4,750,122 A | 6/1988 | Kaji et al. |
| 4,754,489 A | 6/1988 | Bokser |
| 4,755,811 A | 7/1988 | Slavin et al. |
| 4,776,016 A | 10/1988 | Hansen |
| 4,783,804 A | 11/1988 | Juang et al. |
| 4,783,807 A | 11/1988 | Marley |
| 4,785,413 A | 11/1988 | Atsumi |
| 4,790,028 A | 12/1988 | Ramage |
| 4,797,930 A | 1/1989 | Goudie |
| 4,802,223 A | 1/1989 | Lin et al. |
| 4,803,729 A | 2/1989 | Baker |
| 4,807,752 A | 2/1989 | Chodorow |
| 4,811,243 A | 3/1989 | Racine |
| 4,813,074 A | 3/1989 | Marcus |
| 4,819,271 A | 4/1989 | Bahl et al. |
| 4,827,518 A | 5/1989 | Feustel et al. |
| 4,827,520 A | 5/1989 | Zeinstra |
| 4,829,576 A | 5/1989 | Porter |
| 4,829,583 A | 5/1989 | Monroe et al. |
| 4,831,551 A | 5/1989 | Schalk et al. |
| 4,833,712 A | 5/1989 | Bahl et al. |
| 4,833,718 A | 5/1989 | Sprague |
| 4,837,798 A | 6/1989 | Cohen et al. |
| 4,837,831 A | 6/1989 | Gillick et al. |
| 4,839,853 A | 6/1989 | Deerwester et al. |
| 4,852,168 A | 7/1989 | Sprague |
| 4,862,504 A | 8/1989 | Nomura |
| 4,875,187 A | 10/1989 | Smith |
| 4,878,230 A | 10/1989 | Murakami et al. |
| 4,887,212 A | 12/1989 | Zamora et al. |
| 4,896,359 A | 1/1990 | Yamamoto et al. |
| 4,903,305 A | 2/1990 | Gillick et al. |
| 4,905,163 A | 2/1990 | Garber et al. |
| 4,908,867 A | 3/1990 | Silverman |
| 4,914,586 A | 4/1990 | Swinehart et al. |
| 4,914,590 A | 4/1990 | Loatman et al. |
| 4,918,723 A | 4/1990 | Iggulden et al. |
| 4,926,491 A | 5/1990 | Maeda et al. |
| 4,928,307 A | 5/1990 | Lynn |
| 4,931,783 A | 6/1990 | Atkinson |
| 4,935,954 A | 6/1990 | Thompson et al. |
| 4,939,639 A | 7/1990 | Lee et al. |
| 4,941,488 A | 7/1990 | Marxer et al. |
| 4,944,013 A | 7/1990 | Gouvianakis et al. |
| 4,945,504 A | 7/1990 | Nakama et al. |
| 4,953,106 A | 8/1990 | Gansner et al. |
| 4,955,047 A | 9/1990 | Morganstein et al. |
| 4,965,763 A | 10/1990 | Zamora |
| 4,972,462 A | 11/1990 | Shibata |
| 4,974,191 A | 11/1990 | Amirghodsi et al. |
| 4,975,975 A | 12/1990 | Filipski |
| 4,977,598 A | 12/1990 | Doddington et al. |
| 4,980,916 A | 12/1990 | Zinser |
| 4,985,924 A | 1/1991 | Matsuura |
| 4,992,972 A | 2/1991 | Brooks et al. |
| 4,994,966 A | 2/1991 | Hutchins |
| 4,994,983 A | 2/1991 | Landell et al. |
| 5,001,774 A | 3/1991 | Lee |
| 5,003,577 A | 3/1991 | Ertz et al. |
| 5,007,095 A | 4/1991 | Nara et al. |
| 5,007,098 A | 4/1991 | Kumagai |
| 5,010,574 A | 4/1991 | Wang |
| 5,016,002 A | 5/1991 | Levanto |
| 5,020,112 A | 5/1991 | Chou |
| 5,021,971 A | 6/1991 | Lindsay |
| 5,022,081 A | 6/1991 | Hirose et al. |
| 5,027,110 A | 6/1991 | Chang et al. |
| 5,027,406 A | 6/1991 | Roberts et al. |
| 5,027,408 A | 6/1991 | Kroeker et al. |
| 5,029,211 A | 7/1991 | Ozawa |
| 5,031,217 A | 7/1991 | Nishimura |
| 5,032,989 A | 7/1991 | Tornetta |
| 5,033,087 A | 7/1991 | Bahl et al. |
| 5,040,218 A | 8/1991 | Vitale et al. |
| 5,046,099 A | 9/1991 | Nishimura |
| 5,047,614 A | 9/1991 | Bianco |
| 5,047,617 A | 9/1991 | Shepard et al. |
| 5,050,215 A | 9/1991 | Nishimura |
| 5,053,758 A | 10/1991 | Cornett et al. |
| 5,054,084 A | 10/1991 | Tanaka et al. |
| 5,057,915 A | 10/1991 | Kohorn et al. |
| 5,067,158 A | 11/1991 | Arjmand |

(56) References Cited

U.S. PATENT DOCUMENTS

| | | |
|---|---|---|
| 5,067,503 A | 11/1991 | Stile |
| 5,072,452 A | 12/1991 | Brown et al. |
| 5,075,896 A | 12/1991 | Wilcox et al. |
| 5,079,723 A | 1/1992 | Herceg et al. |
| 5,083,119 A | 1/1992 | Trevett et al. |
| 5,083,268 A | 1/1992 | Hemphill et al. |
| 5,086,792 A | 2/1992 | Chodorow |
| 5,090,012 A | 2/1992 | Kajiyama et al. |
| 5,091,790 A | 2/1992 | Silverberg |
| 5,091,945 A | 2/1992 | Kleijn |
| 5,103,498 A | 4/1992 | Lanier et al. |
| 5,109,509 A | 4/1992 | Katayama et al. |
| 5,111,423 A | 5/1992 | Kopec, Jr. et al. |
| 5,119,079 A | 6/1992 | Hube et al. |
| 5,122,951 A | 6/1992 | Kamiya |
| 5,123,103 A | 6/1992 | Ohtaki et al. |
| 5,125,022 A | 6/1992 | Hunt et al. |
| 5,125,030 A | 6/1992 | Nomura et al. |
| 5,127,043 A | 6/1992 | Hunt et al. |
| 5,127,053 A | 6/1992 | Koch |
| 5,127,055 A | 6/1992 | Larkey |
| 5,128,672 A | 7/1992 | Kaehler |
| 5,133,011 A | 7/1992 | McKiel, Jr. |
| 5,133,023 A | 7/1992 | Bokser |
| 5,142,584 A | 8/1992 | Ozawa |
| 5,144,875 A | 9/1992 | Nakada |
| 5,148,541 A | 9/1992 | Lee et al. |
| 5,153,913 A | 10/1992 | Kandefer et al. |
| 5,157,610 A | 10/1992 | Asano et al. |
| 5,157,779 A | 10/1992 | Washburn et al. |
| 5,161,102 A | 11/1992 | Griffin et al. |
| 5,164,900 A | 11/1992 | Bernath |
| 5,164,982 A | 11/1992 | Davis |
| 5,165,007 A | 11/1992 | Bahl et al. |
| 5,167,004 A | 11/1992 | Netsch et al. |
| 5,175,536 A | 12/1992 | Aschliman et al. |
| 5,175,803 A | 12/1992 | Yeh |
| 5,175,814 A | 12/1992 | Anick et al. |
| 5,179,627 A | 1/1993 | Sweet et al. |
| 5,179,652 A | 1/1993 | Rozmanith et al. |
| 5,194,950 A | 3/1993 | Murakami et al. |
| 5,195,034 A | 3/1993 | Garneau et al. |
| 5,195,167 A | 3/1993 | Bahl et al. |
| 5,197,005 A | 3/1993 | Shwartz et al. |
| 5,199,077 A | 3/1993 | Wilcox et al. |
| 5,201,034 A | 4/1993 | Matsuura et al. |
| 5,202,952 A | 4/1993 | Gillick et al. |
| 5,208,862 A | 5/1993 | Ozawa |
| 5,210,689 A | 5/1993 | Baker et al. |
| 5,212,638 A | 5/1993 | Bernath |
| 5,212,821 A | 5/1993 | Gorin et al. |
| 5,216,747 A | 6/1993 | Hardwick et al. |
| 5,218,700 A | 6/1993 | Beechick |
| 5,220,629 A | 6/1993 | Kosaka et al. |
| 5,220,639 A | 6/1993 | Lee |
| 5,220,657 A | 6/1993 | Bly et al. |
| 5,222,146 A | 6/1993 | Bahl et al. |
| 5,230,036 A | 7/1993 | Akamine et al. |
| 5,231,670 A | 7/1993 | Goldhor et al. |
| 5,235,680 A | 8/1993 | Bijnagte |
| 5,237,502 A | 8/1993 | White et al. |
| 5,241,619 A | 8/1993 | Schwartz et al. |
| 5,252,951 A | 10/1993 | Tannenbaum et al. |
| 5,253,325 A | 10/1993 | Clark |
| 5,257,387 A | 10/1993 | Richek et al. |
| 5,260,697 A | 11/1993 | Barrett et al. |
| 5,266,931 A | 11/1993 | Tanaka |
| 5,266,949 A | 11/1993 | Rossi |
| 5,267,345 A | 11/1993 | Brown et al. |
| 5,268,990 A | 12/1993 | Cohen et al. |
| 5,274,771 A | 12/1993 | Hamilton et al. |
| 5,274,818 A | 12/1993 | Vasilevsky et al. |
| 5,276,616 A | 1/1994 | Kuga et al. |
| 5,276,794 A | 1/1994 | Lamb, Jr. |
| 5,278,980 A | 1/1994 | Pedersen et al. |
| 5,282,265 A | 1/1994 | Rohra Suda et al. |
| 5,283,818 A | 2/1994 | Klausner et al. |
| 5,287,448 A | 2/1994 | Nicol et al. |
| 5,289,562 A | 2/1994 | Mizuta et al. |
| RE34,562 E | 3/1994 | Murakami et al. |
| 5,291,286 A | 3/1994 | Murakami et al. |
| 5,293,254 A | 3/1994 | Eschbach |
| 5,293,448 A | 3/1994 | Honda |
| 5,293,452 A | 3/1994 | Picone et al. |
| 5,296,642 A | 3/1994 | Konishi |
| 5,297,170 A | 3/1994 | Eyuboglu et al. |
| 5,297,194 A | 3/1994 | Hunt et al. |
| 5,299,125 A | 3/1994 | Baker et al. |
| 5,299,284 A | 3/1994 | Roy |
| 5,301,109 A | 4/1994 | Landauer et al. |
| 5,303,406 A | 4/1994 | Hansen et al. |
| 5,305,205 A | 4/1994 | Weber et al. |
| 5,305,768 A | 4/1994 | Gross et al. |
| 5,309,359 A | 5/1994 | Katz et al. |
| 5,315,689 A | 5/1994 | Kanazawa et al. |
| 5,317,507 A | 5/1994 | Gallant |
| 5,317,647 A | 5/1994 | Pagallo |
| 5,325,297 A | 6/1994 | Bird et al. |
| 5,325,298 A | 6/1994 | Gallant |
| 5,325,462 A | 6/1994 | Farrett |
| 5,326,270 A | 7/1994 | Ostby et al. |
| 5,327,342 A | 7/1994 | Roy |
| 5,327,498 A | 7/1994 | Hamon |
| 5,329,608 A | 7/1994 | Bocchieri et al. |
| 5,333,236 A | 7/1994 | Bahl et al. |
| 5,333,266 A | 7/1994 | Boaz et al. |
| 5,333,275 A | 7/1994 | Wheatley et al. |
| 5,335,011 A | 8/1994 | Addeo et al. |
| 5,335,276 A | 8/1994 | Thompson et al. |
| 5,341,293 A | 8/1994 | Vertelney et al. |
| 5,341,466 A | 8/1994 | Perlin et al. |
| 5,345,536 A | 9/1994 | Hoshimi et al. |
| 5,349,645 A | 9/1994 | Zhao |
| 5,353,374 A | 10/1994 | Wilson et al. |
| 5,353,376 A | 10/1994 | Oh et al. |
| 5,353,377 A | 10/1994 | Kuroda et al. |
| 5,353,408 A | 10/1994 | Kato et al. |
| 5,353,432 A | 10/1994 | Richek et al. |
| 5,357,431 A | 10/1994 | Nakada et al. |
| 5,367,640 A | 11/1994 | Hamilton et al. |
| 5,369,575 A | 11/1994 | Lamberti et al. |
| 5,369,577 A | 11/1994 | Kadashevich et al. |
| 5,371,853 A | 12/1994 | Kao et al. |
| 5,371,901 A | 12/1994 | Reed et al. |
| 5,373,566 A | 12/1994 | Murdock |
| 5,377,103 A | 12/1994 | Lamberti et al. |
| 5,377,301 A | 12/1994 | Rosenberg et al. |
| 5,377,303 A | 12/1994 | Firman |
| 5,384,671 A | 1/1995 | Fisher |
| 5,384,892 A | 1/1995 | Strong |
| 5,384,893 A | 1/1995 | Hutchins |
| 5,386,494 A | 1/1995 | White |
| 5,386,556 A | 1/1995 | Hedin et al. |
| 5,390,236 A | 2/1995 | Klausner et al. |
| 5,390,279 A | 2/1995 | Strong |
| 5,390,281 A | 2/1995 | Luciw et al. |
| 5,392,419 A | 2/1995 | Walton |
| 5,396,625 A | 3/1995 | Parkes |
| 5,400,434 A | 3/1995 | Pearson |
| 5,404,295 A | 4/1995 | Katz et al. |
| 5,406,305 A | 4/1995 | Shimomura et al. |
| 5,408,060 A | 4/1995 | Muurinen |
| 5,412,756 A | 5/1995 | Bauman et al. |
| 5,412,804 A | 5/1995 | Krishna |
| 5,412,806 A | 5/1995 | Du et al. |
| 5,418,951 A | 5/1995 | Damashek |
| 5,422,656 A | 6/1995 | Allard et al. |
| 5,424,947 A | 6/1995 | Nagao et al. |
| 5,425,108 A | 6/1995 | Hwang et al. |
| 5,428,731 A | 6/1995 | Powers, III |
| 5,434,777 A | 7/1995 | Luciw |
| 5,440,615 A | 8/1995 | Caccuro et al. |
| 5,442,598 A | 8/1995 | Haikawa et al. |
| 5,442,780 A | 8/1995 | Takanashi et al. |

(56) References Cited

U.S. PATENT DOCUMENTS

| | | |
|---|---|---|
| 5,444,823 A | 8/1995 | Nguyen |
| 5,449,368 A | 9/1995 | Kuzmak |
| 5,450,523 A | 9/1995 | Zhao |
| 5,455,888 A | 10/1995 | Iyengar et al. |
| 5,457,768 A | 10/1995 | Tsuboi et al. |
| 5,459,488 A | 10/1995 | Geiser |
| 5,463,696 A | 10/1995 | Beernink et al. |
| 5,463,725 A | 10/1995 | Henckel et al. |
| 5,465,401 A | 11/1995 | Thompson |
| 5,469,529 A | 11/1995 | Bimbot et al. |
| 5,471,611 A | 11/1995 | McGregor |
| 5,473,728 A | 12/1995 | Luginbuhl et al. |
| 5,475,587 A | 12/1995 | Anick et al. |
| 5,475,796 A | 12/1995 | Iwata |
| 5,477,447 A | 12/1995 | Luciw et al. |
| 5,477,448 A | 12/1995 | Golding et al. |
| 5,477,451 A | 12/1995 | Brown et al. |
| 5,479,488 A | 12/1995 | Lennig et al. |
| 5,481,739 A | 1/1996 | Staats |
| 5,483,261 A | 1/1996 | Yasutake |
| 5,485,372 A | 1/1996 | Golding et al. |
| 5,485,543 A | 1/1996 | Aso |
| 5,488,204 A | 1/1996 | Mead et al. |
| 5,488,727 A | 1/1996 | Agrawal et al. |
| 5,490,234 A | 2/1996 | Narayan |
| 5,491,758 A | 2/1996 | Bellegarda et al. |
| 5,491,772 A | 2/1996 | Hardwick et al. |
| 5,493,677 A | 2/1996 | Balogh |
| 5,495,604 A | 2/1996 | Harding et al. |
| 5,497,319 A | 3/1996 | Chong et al. |
| 5,500,903 A | 3/1996 | Gulli |
| 5,500,905 A | 3/1996 | Martin et al. |
| 5,500,937 A | 3/1996 | Thompson-Rohrlich |
| 5,502,774 A | 3/1996 | Bellegarda et al. |
| 5,502,790 A | 3/1996 | Yi |
| 5,502,791 A | 3/1996 | Nishimura et al. |
| 5,515,475 A | 5/1996 | Gupta et al. |
| 5,521,816 A | 5/1996 | Roche et al. |
| 5,524,140 A | 6/1996 | Klausner et al. |
| 5,533,182 A | 7/1996 | Bates et al. |
| 5,535,121 A | 7/1996 | Roche et al. |
| 5,536,902 A | 7/1996 | Serra et al. |
| 5,537,317 A | 7/1996 | Schabes et al. |
| 5,537,618 A | 7/1996 | Boulton et al. |
| 5,537,647 A | 7/1996 | Hermansky et al. |
| 5,543,588 A | 8/1996 | Bisset et al. |
| 5,543,897 A | 8/1996 | Altrieth, III |
| 5,544,264 A | 8/1996 | Bellegarda et al. |
| 5,548,507 A | 8/1996 | Martino et al. |
| 5,555,343 A | 9/1996 | Luther |
| 5,555,344 A | 9/1996 | Zunkler |
| 5,559,301 A | 9/1996 | Bryan, Jr. et al. |
| 5,559,945 A | 9/1996 | Beaudet et al. |
| 5,564,446 A | 10/1996 | Wiltshire |
| 5,565,888 A | 10/1996 | Selker |
| 5,568,536 A | 10/1996 | Tiller et al. |
| 5,568,540 A | 10/1996 | Greco et al. |
| 5,570,324 A | 10/1996 | Geil |
| 5,572,576 A | 11/1996 | Klausner et al. |
| 5,574,823 A | 11/1996 | Hassanein et al. |
| 5,574,824 A | 11/1996 | Slyh et al. |
| 5,577,135 A | 11/1996 | Grajski et al. |
| 5,577,164 A | 11/1996 | Kaneko et al. |
| 5,577,241 A | 11/1996 | Spencer |
| 5,578,808 A | 11/1996 | Taylor |
| 5,579,037 A | 11/1996 | Tahara et al. |
| 5,579,436 A | 11/1996 | Chou et al. |
| 5,581,484 A | 12/1996 | Prince |
| 5,581,652 A | 12/1996 | Abe et al. |
| 5,581,655 A | 12/1996 | Cohen et al. |
| 5,583,993 A | 12/1996 | Foster et al. |
| 5,584,024 A | 12/1996 | Shwartz |
| 5,594,641 A | 1/1997 | Kaplan et al. |
| 5,596,260 A | 1/1997 | Moravec et al. |
| 5,596,676 A | 1/1997 | Swaminathan et al. |
| 5,596,994 A | 1/1997 | Bro |
| 5,608,624 A | 3/1997 | Luciw |
| 5,608,698 A | 3/1997 | Yamanoi et al. |
| 5,608,841 A | 3/1997 | Tsuboka |
| 5,610,812 A | 3/1997 | Schabes et al. |
| 5,613,036 A | 3/1997 | Strong |
| 5,613,122 A | 3/1997 | Burnard et al. |
| 5,615,378 A | 3/1997 | Nishino et al. |
| 5,615,384 A | 3/1997 | Allard et al. |
| 5,616,876 A | 4/1997 | Cluts |
| 5,617,386 A | 4/1997 | Choi |
| 5,617,507 A | 4/1997 | Lee et al. |
| 5,617,539 A | 4/1997 | Ludwig et al. |
| 5,619,583 A | 4/1997 | Page et al. |
| 5,619,694 A | 4/1997 | Shimazu |
| 5,621,859 A | 4/1997 | Schwartz et al. |
| 5,621,903 A | 4/1997 | Luciw et al. |
| 5,627,939 A | 5/1997 | Huang et al. |
| 5,634,084 A | 5/1997 | Malsheen et al. |
| 5,636,325 A | 6/1997 | Farrett |
| 5,638,425 A | 6/1997 | Meador, III et al. |
| 5,638,489 A | 6/1997 | Tsuboka |
| 5,638,523 A | 6/1997 | Mullet et al. |
| 5,640,487 A | 6/1997 | Lau et al. |
| 5,642,464 A | 6/1997 | Yue et al. |
| 5,642,466 A | 6/1997 | Narayan |
| 5,642,519 A | 6/1997 | Martin |
| 5,644,656 A | 7/1997 | Akra et al. |
| 5,644,727 A | 7/1997 | Atkins |
| 5,644,735 A | 7/1997 | Luciw et al. |
| 5,649,060 A | 7/1997 | Ellozy et al. |
| 5,652,828 A | 7/1997 | Silverman |
| 5,652,884 A | 7/1997 | Palevich |
| 5,652,897 A | 7/1997 | Linebarger et al. |
| 5,661,787 A | 8/1997 | Pocock |
| 5,664,055 A | 9/1997 | Kroon |
| 5,670,985 A | 9/1997 | Cappels, Sr. et al. |
| 5,675,819 A | 10/1997 | Schuetze |
| 5,682,475 A | 10/1997 | Johnson et al. |
| 5,682,539 A | 10/1997 | Conrad et al. |
| 5,684,513 A | 11/1997 | Decker |
| 5,687,077 A | 11/1997 | Gough, Jr. |
| 5,689,287 A | 11/1997 | Mackinlay et al. |
| 5,689,616 A | 11/1997 | Li |
| 5,689,618 A | 11/1997 | Gasper et al. |
| 5,692,205 A | 11/1997 | Berry et al. |
| 5,696,962 A | 12/1997 | Kupiec |
| 5,699,082 A | 12/1997 | Marks et al. |
| 5,701,400 A | 12/1997 | Amado |
| 5,706,442 A | 1/1998 | Anderson et al. |
| 5,708,659 A | 1/1998 | Rostoker et al. |
| 5,708,822 A | 1/1998 | Wical |
| 5,710,886 A | 1/1998 | Christensen et al. |
| 5,710,922 A | 1/1998 | Alley et al. |
| 5,712,949 A | 1/1998 | Kato et al. |
| 5,712,957 A | 1/1998 | Waibel et al. |
| 5,715,468 A | 2/1998 | Budzinski |
| 5,717,877 A | 2/1998 | Orton et al. |
| 5,721,827 A | 2/1998 | Logan et al. |
| 5,721,949 A | 2/1998 | Smith et al. |
| 5,724,406 A | 3/1998 | Juster |
| 5,724,985 A | 3/1998 | Snell et al. |
| 5,726,672 A | 3/1998 | Hernandez et al. |
| 5,727,950 A | 3/1998 | Cook et al. |
| 5,729,694 A | 3/1998 | Holzrichter et al. |
| 5,729,704 A * | 3/1998 | Stone et al. .................. 715/804 |
| 5,732,216 A | 3/1998 | Logan et al. |
| 5,732,390 A | 3/1998 | Katayanagi et al. |
| 5,732,395 A | 3/1998 | Silverman |
| 5,734,750 A | 3/1998 | Arai et al. |
| 5,734,791 A | 3/1998 | Acero et al. |
| 5,736,974 A | 4/1998 | Selker |
| 5,737,487 A | 4/1998 | Bellegarda et al. |
| 5,737,609 A | 4/1998 | Reed et al. |
| 5,737,734 A | 4/1998 | Schultz |
| 5,739,451 A | 4/1998 | Winksy et al. |
| 5,740,143 A | 4/1998 | Suetomi |
| 5,742,705 A | 4/1998 | Parthasarathy |
| 5,742,736 A | 4/1998 | Haddock |

(56) References Cited

U.S. PATENT DOCUMENTS

| | | |
|---|---|---|
| 5,745,116 A | 4/1998 | Pisutha-Arnond |
| 5,745,873 A | 4/1998 | Braida et al. |
| 5,748,512 A | 5/1998 | Vargas |
| 5,748,974 A | 5/1998 | Johnson |
| 5,749,071 A | 5/1998 | Silverman |
| 5,749,081 A | 5/1998 | Whiteis |
| 5,751,906 A | 5/1998 | Silverman |
| 5,757,358 A | 5/1998 | Osga |
| 5,757,979 A | 5/1998 | Hongo et al. |
| 5,758,079 A | 5/1998 | Ludwig et al. |
| 5,758,083 A | 5/1998 | Singh et al. |
| 5,758,314 A | 5/1998 | McKenna |
| 5,759,101 A | 6/1998 | Von Kohorn |
| 5,761,640 A | 6/1998 | Kalyanswamy et al. |
| 5,765,131 A | 6/1998 | Stentiford et al. |
| 5,765,168 A | 6/1998 | Burrows |
| 5,771,276 A | 6/1998 | Wolf |
| 5,774,834 A | 6/1998 | Visser |
| 5,774,855 A | 6/1998 | Foti et al. |
| 5,774,859 A | 6/1998 | Houser et al. |
| 5,777,614 A | 7/1998 | Ando et al. |
| 5,778,405 A | 7/1998 | Ogawa |
| 5,790,978 A | 8/1998 | Olive et al. |
| 5,794,050 A | 8/1998 | Dahlgren et al. |
| 5,794,182 A | 8/1998 | Manduchi et al. |
| 5,794,207 A | 8/1998 | Walker et al. |
| 5,794,237 A | 8/1998 | Gore, Jr. |
| 5,797,008 A | 8/1998 | Burrows |
| 5,799,268 A | 8/1998 | Boguraev |
| 5,799,269 A | 8/1998 | Schabes et al. |
| 5,799,276 A | 8/1998 | Komissarchik et al. |
| 5,801,692 A | 9/1998 | Muzio et al. |
| 5,802,466 A | 9/1998 | Gallant et al. |
| 5,802,526 A | 9/1998 | Fawcett et al. |
| 5,812,697 A | 9/1998 | Sakai et al. |
| 5,812,698 A | 9/1998 | Platt et al. |
| 5,815,142 A | 9/1998 | Allard et al. |
| 5,815,225 A | 9/1998 | Nelson |
| 5,818,142 A | 10/1998 | Edleblute et al. |
| 5,818,451 A | 10/1998 | Bertram et al. |
| 5,818,924 A | 10/1998 | King et al. |
| 5,822,288 A | 10/1998 | Shinada |
| 5,822,720 A | 10/1998 | Bookman et al. |
| 5,822,730 A | 10/1998 | Roth et al. |
| 5,822,743 A | 10/1998 | Gupta et al. |
| 5,825,349 A | 10/1998 | Meier et al. |
| 5,825,352 A | 10/1998 | Bisset et al. |
| 5,825,881 A | 10/1998 | Colvin, Sr. |
| 5,826,261 A | 10/1998 | Spencer |
| 5,828,768 A | 10/1998 | Eatwell et al. |
| 5,828,999 A | 10/1998 | Bellegarda et al. |
| 5,832,433 A | 11/1998 | Yashchin et al. |
| 5,832,435 A | 11/1998 | Silverman |
| 5,833,134 A | 11/1998 | Ho et al. |
| 5,835,077 A | 11/1998 | Dao et al. |
| 5,835,079 A | 11/1998 | Shieh |
| 5,835,721 A | 11/1998 | Donahue et al. |
| 5,835,732 A | 11/1998 | Kikinis et al. |
| 5,835,893 A | 11/1998 | Ushioda |
| 5,839,106 A | 11/1998 | Bellegarda |
| 5,841,902 A | 11/1998 | Tu |
| 5,842,165 A | 11/1998 | Raman et al. |
| 5,845,255 A | 12/1998 | Mayaud |
| 5,848,410 A | 12/1998 | Walls et al. |
| 5,850,480 A | 12/1998 | Scanlon |
| 5,850,629 A | 12/1998 | Holm et al. |
| 5,854,893 A | 12/1998 | Ludwig et al. |
| 5,855,000 A | 12/1998 | Waibel et al. |
| 5,857,184 A | 1/1999 | Lynch |
| 5,859,636 A | 1/1999 | Pandit |
| 5,860,063 A | 1/1999 | Gorin et al. |
| 5,860,064 A | 1/1999 | Henton |
| 5,860,075 A | 1/1999 | Hashizume et al. |
| 5,862,223 A | 1/1999 | Walker et al. |
| 5,862,233 A | 1/1999 | Poletti |
| 5,864,806 A | 1/1999 | Mokbel et al. |
| 5,864,815 A | 1/1999 | Rozak et al. |
| 5,864,844 A | 1/1999 | James et al. |
| 5,864,855 A | 1/1999 | Ruocco et al. |
| 5,864,868 A | 1/1999 | Contois |
| 5,867,799 A | 2/1999 | Lang et al. |
| 5,870,710 A | 2/1999 | Ozawa et al. |
| 5,873,056 A | 2/1999 | Liddy et al. |
| 5,875,427 A | 2/1999 | Yamazaki |
| 5,875,429 A | 2/1999 | Douglas |
| 5,875,437 A | 2/1999 | Atkins |
| 5,876,396 A | 3/1999 | Lo et al. |
| 5,877,751 A | 3/1999 | Kanemitsu et al. |
| 5,877,757 A | 3/1999 | Baldwin et al. |
| 5,878,393 A | 3/1999 | Hata et al. |
| 5,878,394 A | 3/1999 | Muhling |
| 5,878,396 A | 3/1999 | Henton |
| 5,880,411 A | 3/1999 | Gillespie et al. |
| 5,880,731 A | 3/1999 | Liles et al. |
| 5,884,039 A | 3/1999 | Ludwig et al. |
| 5,884,323 A | 3/1999 | Hawkins et al. |
| 5,890,117 A | 3/1999 | Silverman |
| 5,890,122 A | 3/1999 | Van Kleeck et al. |
| 5,891,180 A | 4/1999 | Greeninger et al. |
| 5,893,126 A | 4/1999 | Drews et al. |
| 5,893,132 A | 4/1999 | Huffman et al. |
| 5,895,448 A | 4/1999 | Vysotsky et al. |
| 5,895,464 A | 4/1999 | Bhandari et al. |
| 5,895,466 A | 4/1999 | Goldberg et al. |
| 5,896,321 A | 4/1999 | Miller et al. |
| 5,896,500 A | 4/1999 | Ludwig et al. |
| 5,899,972 A | 5/1999 | Miyazawa et al. |
| 5,905,498 A | 5/1999 | Diament et al. |
| 5,909,666 A | 6/1999 | Gould et al. |
| 5,912,951 A | 6/1999 | Checchio et al. |
| 5,912,952 A | 6/1999 | Brendzel |
| 5,913,193 A | 6/1999 | Huang et al. |
| 5,915,001 A | 6/1999 | Uppaluru et al. |
| 5,915,236 A | 6/1999 | Gould et al. |
| 5,915,238 A | 6/1999 | Tjaden |
| 5,915,249 A | 6/1999 | Spencer |
| 5,917,487 A | 6/1999 | Ulrich |
| 5,918,303 A | 6/1999 | Yamaura et al. |
| 5,920,327 A | 7/1999 | Seidensticker, Jr. |
| 5,920,836 A | 7/1999 | Gould et al. |
| 5,920,837 A | 7/1999 | Gould et al. |
| 5,923,757 A | 7/1999 | Hocker et al. |
| 5,924,068 A | 7/1999 | Richard et al. |
| 5,926,769 A | 7/1999 | Valimaa et al. |
| 5,926,789 A | 7/1999 | Barbara et al. |
| 5,930,408 A | 7/1999 | Seto |
| 5,930,751 A | 7/1999 | Cohrs et al. |
| 5,930,754 A | 7/1999 | Karaali et al. |
| 5,930,769 A | 7/1999 | Rose |
| 5,930,783 A | 7/1999 | Li et al. |
| 5,933,477 A | 8/1999 | Wu |
| 5,933,806 A | 8/1999 | Beyerlein et al. |
| 5,933,822 A | 8/1999 | Braden-Harder et al. |
| 5,936,926 A | 8/1999 | Yokouchi et al. |
| 5,937,163 A | 8/1999 | Lee et al. |
| 5,940,811 A | 8/1999 | Norris |
| 5,940,841 A | 8/1999 | Schmuck et al. |
| 5,941,944 A | 8/1999 | Messerly |
| 5,943,043 A | 8/1999 | Furuhata et al. |
| 5,943,049 A | 8/1999 | Matsubara et al. |
| 5,943,052 A | 8/1999 | Allen et al. |
| 5,943,429 A | 8/1999 | Haendel et al. |
| 5,943,443 A | 8/1999 | Itonori et al. |
| 5,943,670 A | 8/1999 | Prager |
| 5,946,647 A | 8/1999 | Miller et al. |
| 5,948,040 A | 9/1999 | DeLorme et al. |
| 5,949,961 A | 9/1999 | Sharman |
| 5,950,123 A | 9/1999 | Schwelb et al. |
| 5,952,992 A | 9/1999 | Helms |
| 5,953,541 A | 9/1999 | King et al. |
| 5,956,021 A | 9/1999 | Kubota et al. |
| 5,956,699 A | 9/1999 | Wong et al. |
| 5,960,394 A | 9/1999 | Gould et al. |
| 5,960,422 A | 9/1999 | Prasad |

(56) References Cited

U.S. PATENT DOCUMENTS

| | | |
|---|---|---|
| 5,963,208 A | 10/1999 | Dolan et al. |
| 5,963,924 A | 10/1999 | Williams et al. |
| 5,963,964 A | 10/1999 | Nielsen |
| 5,966,126 A | 10/1999 | Szabo |
| 5,970,446 A | 10/1999 | Goldberg et al. |
| 5,970,474 A | 10/1999 | LeRoy et al. |
| 5,973,612 A | 10/1999 | Deo et al. |
| 5,973,676 A | 10/1999 | Kawakura |
| 5,974,146 A | 10/1999 | Randle et al. |
| 5,977,950 A | 11/1999 | Rhyne |
| 5,982,352 A | 11/1999 | Pryor |
| 5,982,891 A | 11/1999 | Ginter et al. |
| 5,982,902 A | 11/1999 | Terano |
| 5,983,179 A | 11/1999 | Gould |
| 5,983,216 A | 11/1999 | Kirsch et al. |
| 5,987,132 A | 11/1999 | Rowney |
| 5,987,140 A | 11/1999 | Rowney et al. |
| 5,987,401 A | 11/1999 | Trudeau |
| 5,987,404 A | 11/1999 | Della Pietra et al. |
| 5,987,440 A | 11/1999 | O'Neil et al. |
| 5,990,887 A | 11/1999 | Redpath et al. |
| 5,991,441 A | 11/1999 | Jourjine |
| 5,995,460 A | 11/1999 | Takagi et al. |
| 5,995,590 A | 11/1999 | Brunet et al. |
| 5,998,972 A | 12/1999 | Gong |
| 5,999,169 A | 12/1999 | Lee |
| 5,999,895 A | 12/1999 | Forest |
| 5,999,908 A | 12/1999 | Abelow |
| 5,999,927 A | 12/1999 | Tukey et al. |
| 6,006,274 A | 12/1999 | Hawkins et al. |
| 6,009,237 A | 12/1999 | Hirabayashi et al. |
| 6,011,585 A | 1/2000 | Anderson |
| 6,014,428 A | 1/2000 | Wolf |
| 6,016,471 A | 1/2000 | Kuhn et al. |
| 6,018,705 A | 1/2000 | Gaudet |
| 6,018,711 A | 1/2000 | French-St. George et al. |
| 6,020,881 A | 2/2000 | Naughton et al. |
| 6,023,536 A | 2/2000 | Visser |
| 6,023,676 A | 2/2000 | Erell |
| 6,023,684 A | 2/2000 | Pearson |
| 6,024,288 A | 2/2000 | Gottlich et al. |
| 6,026,345 A | 2/2000 | Shah et al. |
| 6,026,375 A | 2/2000 | Hall et al. |
| 6,026,388 A | 2/2000 | Liddy et al. |
| 6,026,393 A | 2/2000 | Gupta et al. |
| 6,029,132 A | 2/2000 | Kuhn et al. |
| 6,029,135 A | 2/2000 | Krasle |
| 6,035,267 A | 3/2000 | Watanabe et al. |
| 6,035,303 A | 3/2000 | Baer et al. |
| 6,035,336 A | 3/2000 | Lu et al. |
| 6,038,533 A | 3/2000 | Buchsbaum et al. |
| 6,040,824 A | 3/2000 | Maekawa et al. |
| 6,041,023 A | 3/2000 | Lakhansingh |
| 6,047,255 A | 4/2000 | Williamson |
| 6,047,300 A | 4/2000 | Walfish et al. |
| 6,052,654 A | 4/2000 | Gaudet et al. |
| 6,052,656 A | 4/2000 | Suda et al. |
| 6,054,990 A | 4/2000 | Tran |
| 6,055,514 A | 4/2000 | Wren |
| 6,055,531 A | 4/2000 | Bennett et al. |
| 6,064,767 A | 5/2000 | Muir et al. |
| 6,064,959 A | 5/2000 | Young et al. |
| 6,064,960 A | 5/2000 | Bellegarda et al. |
| 6,064,963 A | 5/2000 | Gainsboro |
| 6,067,519 A | 5/2000 | Lowry |
| 6,069,648 A | 5/2000 | Suso et al. |
| 6,070,138 A | 5/2000 | Iwata |
| 6,070,139 A | 5/2000 | Miyazawa et al. |
| 6,070,140 A | 5/2000 | Tran |
| 6,070,147 A | 5/2000 | Harms et al. |
| 6,073,033 A | 6/2000 | Campo |
| 6,073,036 A | 6/2000 | Heikkinen et al. |
| 6,073,097 A | 6/2000 | Gould et al. |
| 6,076,051 A | 6/2000 | Messerly et al. |
| 6,076,060 A | 6/2000 | Lin et al. |
| 6,076,088 A | 6/2000 | Paik et al. |
| 6,078,914 A | 6/2000 | Redfern |
| 6,081,750 A | 6/2000 | Hoffberg et al. |
| 6,081,774 A | 6/2000 | de Hita et al. |
| 6,081,780 A | 6/2000 | Lumelsky |
| 6,085,204 A | 7/2000 | Chijiwa et al. |
| 6,088,671 A | 7/2000 | Gould et al. |
| 6,088,731 A | 7/2000 | Kiraly |
| 6,092,043 A | 7/2000 | Squires et al. |
| 6,094,649 A | 7/2000 | Bowen et al. |
| 6,097,391 A | 8/2000 | Wilcox |
| 6,101,468 A | 8/2000 | Gould et al. |
| 6,101,470 A | 8/2000 | Eide et al. |
| 6,105,865 A | 8/2000 | Hardesty |
| 6,108,627 A | 8/2000 | Sabourin |
| 6,108,640 A | 8/2000 | Slotznick |
| 6,111,562 A | 8/2000 | Downs et al. |
| 6,111,572 A | 8/2000 | Blair et al. |
| 6,115,686 A | 9/2000 | Chung et al. |
| 6,116,907 A | 9/2000 | Baker et al. |
| 6,119,101 A | 9/2000 | Peckover |
| 6,121,960 A | 9/2000 | Carroll et al. |
| 6,122,340 A | 9/2000 | Darley et al. |
| 6,122,614 A | 9/2000 | Kahn et al. |
| 6,122,616 A | 9/2000 | Henton |
| 6,122,647 A | 9/2000 | Horowitz et al. |
| 6,125,284 A | 9/2000 | Moore et al. |
| 6,125,346 A | 9/2000 | Nishimura et al. |
| 6,125,356 A | 9/2000 | Brockman et al. |
| 6,129,582 A | 10/2000 | Wilhite et al. |
| 6,138,098 A | 10/2000 | Shieber et al. |
| 6,138,158 A | 10/2000 | Boyle et al. |
| 6,141,642 A | 10/2000 | Oh |
| 6,141,644 A | 10/2000 | Kuhn et al. |
| 6,144,377 A | 11/2000 | Oppermann et al. |
| 6,144,380 A | 11/2000 | Shwarts et al. |
| 6,144,938 A | 11/2000 | Surace et al. |
| 6,144,939 A | 11/2000 | Pearson et al. |
| 6,151,401 A | 11/2000 | Annaratone |
| 6,154,551 A | 11/2000 | Frenkel |
| 6,154,720 A | 11/2000 | Onishi et al. |
| 6,157,935 A | 12/2000 | Tran et al. |
| 6,161,084 A | 12/2000 | Messerly et al. |
| 6,161,087 A | 12/2000 | Wightman et al. |
| 6,161,944 A | 12/2000 | Leman |
| 6,163,769 A | 12/2000 | Acero et al. |
| 6,163,809 A | 12/2000 | Buckley |
| 6,167,369 A | 12/2000 | Schulze |
| 6,169,538 B1 | 1/2001 | Nowlan et al. |
| 6,172,948 B1 | 1/2001 | Keller et al. |
| 6,173,194 B1 | 1/2001 | Vanttila |
| 6,173,251 B1 | 1/2001 | Ito et al. |
| 6,173,261 B1 | 1/2001 | Arai et al. |
| 6,173,263 B1 | 1/2001 | Conkie |
| 6,173,279 B1 | 1/2001 | Levin et al. |
| 6,177,905 B1 | 1/2001 | Welch |
| 6,177,931 B1 | 1/2001 | Alexander et al. |
| 6,179,432 B1 | 1/2001 | Zhang et al. |
| 6,182,028 B1 | 1/2001 | Karaali et al. |
| 6,185,533 B1 | 2/2001 | Holm et al. |
| 6,188,391 B1 | 2/2001 | Seely et al. |
| 6,188,967 B1 | 2/2001 | Kurtzberg et al. |
| 6,188,999 B1 | 2/2001 | Moody |
| 6,191,939 B1 | 2/2001 | Burnett |
| 6,192,253 B1 | 2/2001 | Charlier et al. |
| 6,192,340 B1 | 2/2001 | Abecassis |
| 6,195,641 B1 | 2/2001 | Loring et al. |
| 6,205,456 B1 | 3/2001 | Nakao |
| 6,208,044 B1 | 3/2001 | Viswanadham et al. |
| 6,208,932 B1 | 3/2001 | Ohmura et al. |
| 6,208,956 B1 | 3/2001 | Motoyama |
| 6,208,964 B1 | 3/2001 | Sabourin |
| 6,208,967 B1 | 3/2001 | Pauws et al. |
| 6,208,971 B1 | 3/2001 | Bellegarda et al. |
| 6,212,564 B1 | 4/2001 | Harter et al. |
| 6,216,102 B1 | 4/2001 | Martino et al. |
| 6,216,131 B1 | 4/2001 | Liu et al. |
| 6,217,183 B1 | 4/2001 | Shipman |
| 6,222,347 B1 | 4/2001 | Gong |

(56) References Cited

U.S. PATENT DOCUMENTS

| | | | |
|---|---|---|---|
| 6,226,403 B1 | 5/2001 | Parthasarathy |
| 6,226,533 B1 | 5/2001 | Akahane |
| 6,226,614 B1 | 5/2001 | Mizuno et al. |
| 6,226,655 B1 | 5/2001 | Borman et al. |
| 6,230,322 B1 | 5/2001 | Saib et al. |
| 6,232,539 B1 | 5/2001 | Looney et al. |
| 6,232,966 B1 | 5/2001 | Kurlander |
| 6,233,545 B1 | 5/2001 | Datig |
| 6,233,547 B1 | 5/2001 | Denber et al. |
| 6,233,559 B1 | 5/2001 | Balakrishnan |
| 6,233,578 B1 | 5/2001 | Machihara et al. |
| 6,237,025 B1 | 5/2001 | Ludwig et al. |
| 6,240,303 B1 | 5/2001 | Katzur |
| 6,243,681 B1 | 6/2001 | Guji et al. |
| 6,246,981 B1 | 6/2001 | Papineni |
| 6,248,946 B1 | 6/2001 | Dwek |
| 6,249,606 B1 | 6/2001 | Kiraly et al. |
| 6,259,436 B1 | 7/2001 | Moon et al. |
| 6,259,826 B1 | 7/2001 | Pollard et al. |
| 6,260,011 B1 | 7/2001 | Heckerman et al. |
| 6,260,013 B1 | 7/2001 | Sejnoha |
| 6,260,016 B1 | 7/2001 | Holm et al. |
| 6,260,024 B1 | 7/2001 | Shkedy |
| 6,266,637 B1 | 7/2001 | Donovan et al. |
| 6,268,859 B1 | 7/2001 | Andresen et al. |
| 6,269,712 B1 | 8/2001 | Zentmyer |
| 6,271,835 B1 | 8/2001 | Hoeksma |
| 6,272,456 B1 | 8/2001 | De Campos |
| 6,272,464 B1 | 8/2001 | Kiraz et al. |
| 6,275,795 B1 | 8/2001 | Tzirkel-Hancock |
| 6,275,824 B1 | 8/2001 | O'Flaherty et al. |
| 6,278,443 B1 | 8/2001 | Amro et al. |
| 6,278,970 B1 | 8/2001 | Milner |
| 6,282,507 B1 | 8/2001 | Horiguchi et al. |
| 6,285,785 B1 | 9/2001 | Bellegarda et al. |
| 6,285,786 B1 | 9/2001 | Seni et al. |
| 6,289,085 B1 | 9/2001 | Miyashita et al. |
| 6,289,124 B1 | 9/2001 | Okamoto |
| 6,289,301 B1 | 9/2001 | Higginbotham et al. |
| 6,289,353 B1 | 9/2001 | Hazlehurst et al. |
| 6,292,772 B1 | 9/2001 | Kantrowitz |
| 6,292,778 B1 | 9/2001 | Sukkar |
| 6,295,390 B1 | 9/2001 | Kobayashi et al. |
| 6,295,541 B1 | 9/2001 | Bodnar et al. |
| 6,297,818 B1 | 10/2001 | Ulrich et al. |
| 6,298,314 B1 | 10/2001 | Blackadar et al. |
| 6,298,321 B1 | 10/2001 | Karlov et al. |
| 6,300,947 B1 | 10/2001 | Kanevsky |
| 6,304,844 B1 | 10/2001 | Pan et al. |
| 6,304,846 B1 | 10/2001 | George et al. |
| 6,307,548 B1 | 10/2001 | Flinchem et al. |
| 6,308,149 B1 | 10/2001 | Gaussier et al. |
| 6,310,610 B1 | 10/2001 | Beaton et al. |
| 6,311,157 B1 | 10/2001 | Strong |
| 6,311,189 B1 | 10/2001 | deVries et al. |
| 6,317,237 B1 | 11/2001 | Nakao et al. |
| 6,317,594 B1 | 11/2001 | Gossman et al. |
| 6,317,707 B1 | 11/2001 | Bangalore et al. |
| 6,317,831 B1 | 11/2001 | King |
| 6,321,092 B1 | 11/2001 | Fitch et al. |
| 6,321,179 B1 | 11/2001 | Glance et al. |
| 6,323,846 B1 | 11/2001 | Westerman et al. |
| 6,324,502 B1 | 11/2001 | Handel et al. |
| 6,324,512 B1 | 11/2001 | Junqua et al. |
| 6,330,538 B1 | 12/2001 | Breen |
| 6,331,867 B1 | 12/2001 | Eberhard et al. |
| 6,332,175 B1 | 12/2001 | Birrell et al. |
| 6,334,103 B1 | 12/2001 | Surace et al. |
| 6,335,722 B1 | 1/2002 | Tani et al. |
| 6,336,365 B1 | 1/2002 | Blackadar et al. |
| 6,336,727 B1 | 1/2002 | Kim |
| 6,340,937 B1 | 1/2002 | Stepita-Klauco |
| 6,341,316 B1 | 1/2002 | Kloba et al. |
| 6,343,267 B1 | 1/2002 | Kuhn et al. |
| 6,345,250 B1 | 2/2002 | Martin |
| 6,351,522 B1 | 2/2002 | Vitikainen |
| 6,351,762 B1 | 2/2002 | Ludwig et al. |
| 6,353,442 B1 | 3/2002 | Masui |
| 6,353,794 B1 | 3/2002 | Davis et al. |
| 6,356,287 B1 | 3/2002 | Ruberry et al. |
| 6,356,854 B1 | 3/2002 | Schubert et al. |
| 6,356,864 B1 | 3/2002 | Foltz et al. |
| 6,356,905 B1 | 3/2002 | Gershman et al. |
| 6,357,147 B1 | 3/2002 | Darley et al. |
| 6,359,572 B1 | 3/2002 | Vale |
| 6,359,970 B1 | 3/2002 | Burgess |
| 6,360,227 B1 | 3/2002 | Aggarwal et al. |
| 6,360,237 B1 | 3/2002 | Schulz et al. |
| 6,363,348 B1 | 3/2002 | Besling et al. |
| 6,366,883 B1 | 4/2002 | Campbell et al. |
| 6,366,884 B1 | 4/2002 | Bellegarda et al. |
| 6,374,217 B1 | 4/2002 | Bellegarda |
| 6,377,530 B1 | 4/2002 | Burrows |
| 6,377,925 B1 | 4/2002 | Greene, Jr. et al. |
| 6,377,928 B1 | 4/2002 | Saxena et al. |
| 6,381,593 B1 | 4/2002 | Yano et al. |
| 6,385,586 B1 | 5/2002 | Dietz |
| 6,385,662 B1 | 5/2002 | Moon et al. |
| 6,389,114 B1 | 5/2002 | Dowens et al. |
| 6,397,183 B1 | 5/2002 | Baba et al. |
| 6,397,186 B1 | 5/2002 | Bush et al. |
| 6,400,806 B1 | 6/2002 | Uppaluru |
| 6,401,065 B1 | 6/2002 | Kanevsky et al. |
| 6,405,169 B1 | 6/2002 | Kondo et al. |
| 6,405,238 B1 | 6/2002 | Votipka |
| 6,408,272 B1 | 6/2002 | White et al. |
| 6,411,924 B1 | 6/2002 | De Hita et al. |
| 6,411,932 B1 | 6/2002 | Molnar et al. |
| 6,415,250 B1 | 7/2002 | Van Den Akker |
| 6,417,873 B1 | 7/2002 | Fletcher et al. |
| 6,421,305 B1 | 7/2002 | Gioscia et al. |
| 6,421,672 B1 | 7/2002 | McAllister et al. |
| 6,421,707 B1 | 7/2002 | Miller et al. |
| 6,424,944 B1 | 7/2002 | Hikawa |
| 6,430,551 B1 | 8/2002 | Thelen et al. |
| 6,434,522 B1 | 8/2002 | Tsuboka |
| 6,434,524 B1 | 8/2002 | Weber |
| 6,434,604 B1 | 8/2002 | Harada et al. |
| 6,437,818 B1 | 8/2002 | Ludwig et al. |
| 6,438,523 B1 | 8/2002 | Oberteuffer et al. |
| 6,442,518 B1 | 8/2002 | Van Thong et al. |
| 6,442,523 B1 | 8/2002 | Siegel |
| 6,446,076 B1 | 9/2002 | Burkey et al. |
| 6,448,485 B1 | 9/2002 | Barile |
| 6,448,986 B1 | 9/2002 | Smith |
| 6,449,620 B1 | 9/2002 | Draper et al. |
| 6,453,281 B1 | 9/2002 | Walters et al. |
| 6,453,292 B2 | 9/2002 | Ramaswamy et al. |
| 6,453,315 B1 | 9/2002 | Weissman et al. |
| 6,456,616 B1 | 9/2002 | Rantanen |
| 6,456,972 B1 | 9/2002 | Gladstein et al. |
| 6,460,015 B1 | 10/2002 | Hetherington et al. |
| 6,460,029 B1 | 10/2002 | Fries et al. |
| 6,462,778 B1 | 10/2002 | Abram et al. |
| 6,463,128 B1 | 10/2002 | Elwin |
| 6,466,654 B1 | 10/2002 | Cooper |
| 6,467,924 B2 | 10/2002 | Shipman |
| 6,469,712 B1 | 10/2002 | Hilpert, Jr. et al. |
| 6,469,722 B1 | 10/2002 | Kinoe et al. |
| 6,469,732 B1 | 10/2002 | Chang et al. |
| 6,470,347 B1 | 10/2002 | Gillam |
| 6,473,630 B1 | 10/2002 | Baranowski et al. |
| 6,477,488 B1 | 11/2002 | Bellegarda |
| 6,477,494 B2 | 11/2002 | Hyde-Thomson et al. |
| 6,487,533 B2 | 11/2002 | Hyde-Thomson et al. |
| 6,487,534 B1 | 11/2002 | Thelen et al. |
| 6,487,663 B1 | 11/2002 | Jaisimha et al. |
| 6,489,951 B1 | 12/2002 | Wong et al. |
| 6,490,560 B1 | 12/2002 | Ramaswamy et al. |
| 6,493,006 B1 | 12/2002 | Gourdol et al. |
| 6,493,428 B1 | 12/2002 | Hillier |
| 6,493,652 B1 | 12/2002 | Ohlenbusch et al. |
| 6,493,667 B1 | 12/2002 | De Souza et al. |
| 6,499,013 B1 | 12/2002 | Weber |

(56) References Cited

U.S. PATENT DOCUMENTS

| | | |
|---|---|---|
| 6,499,014 B1 | 12/2002 | Chihara |
| 6,499,016 B1 | 12/2002 | Anderson et al. |
| 6,501,937 B1 | 12/2002 | Ho et al. |
| 6,502,194 B1 | 12/2002 | Berman et al. |
| 6,505,158 B1 | 1/2003 | Conkie |
| 6,505,175 B1 | 1/2003 | Silverman et al. |
| 6,505,183 B1 | 1/2003 | Loofbourrow et al. |
| 6,507,829 B1 | 1/2003 | Richards et al. |
| 6,510,406 B1 | 1/2003 | Marchisio |
| 6,510,417 B1 | 1/2003 | Woods et al. |
| 6,513,008 B2 | 1/2003 | Pearson et al. |
| 6,513,063 B1 | 1/2003 | Julia et al. |
| 6,519,565 B1 | 2/2003 | Clements et al. |
| 6,519,566 B1 | 2/2003 | Boyer et al. |
| 6,523,026 B1 | 2/2003 | Gillis |
| 6,523,061 B1 | 2/2003 | Halverson et al. |
| 6,523,172 B1 | 2/2003 | Martinez-Guerra et al. |
| 6,526,351 B2 | 2/2003 | Whitham |
| 6,526,382 B1 | 2/2003 | Yuschik |
| 6,526,395 B1 | 2/2003 | Morris |
| 6,529,592 B1 | 3/2003 | Khan |
| 6,529,608 B2 | 3/2003 | Gersabeck et al. |
| 6,532,444 B1 | 3/2003 | Weber |
| 6,532,446 B1 | 3/2003 | King |
| 6,535,610 B1 | 3/2003 | Stewart |
| 6,535,852 B2 | 3/2003 | Eide |
| 6,535,983 B1 | 3/2003 | McCormack et al. |
| 6,536,139 B2 | 3/2003 | Darley et al. |
| 6,538,665 B2 | 3/2003 | Crow et al. |
| 6,542,171 B1 | 4/2003 | Satou et al. |
| 6,542,584 B1 | 4/2003 | Sherwood et al. |
| 6,546,262 B1 | 4/2003 | Freadman |
| 6,546,367 B2 | 4/2003 | Otsuka |
| 6,546,388 B1 | 4/2003 | Edlund et al. |
| 6,549,497 B2 | 4/2003 | Miyamoto et al. |
| 6,553,343 B1 | 4/2003 | Kagoshima et al. |
| 6,553,344 B2 | 4/2003 | Bellegarda et al. |
| 6,556,971 B1 | 4/2003 | Rigsby et al. |
| 6,556,983 B1 | 4/2003 | Altschuler et al. |
| 6,560,903 B1 | 5/2003 | Darley |
| 6,563,769 B1 | 5/2003 | Van Der Meulen |
| 6,564,186 B1 | 5/2003 | Kiraly et al. |
| 6,567,549 B1 | 5/2003 | Marianetti et al. |
| 6,570,557 B1 | 5/2003 | Westerman et al. |
| 6,570,596 B2 | 5/2003 | Frederiksen |
| 6,582,342 B2 | 6/2003 | Kaufman |
| 6,583,806 B2 | 6/2003 | Ludwig et al. |
| 6,584,464 B1 | 6/2003 | Warthen |
| 6,587,403 B1 | 7/2003 | Keller et al. |
| 6,587,404 B1 | 7/2003 | Keller et al. |
| 6,590,303 B1 | 7/2003 | Austin et al. |
| 6,591,379 B1 | 7/2003 | LeVine et al. |
| 6,594,673 B1 | 7/2003 | Smith et al. |
| 6,594,688 B2 | 7/2003 | Ludwig et al. |
| 6,597,345 B2 | 7/2003 | Hirshberg |
| 6,598,021 B1 | 7/2003 | Shambaugh et al. |
| 6,598,022 B2 | 7/2003 | Yuschik |
| 6,598,039 B1 | 7/2003 | Livowsky |
| 6,598,054 B2 | 7/2003 | Schuetze et al. |
| 6,601,026 B2 | 7/2003 | Appelt et al. |
| 6,601,234 B1 | 7/2003 | Bowman-Amuah |
| 6,603,837 B1 | 8/2003 | Kesanupalli et al. |
| 6,604,059 B2 | 8/2003 | Strubbe et al. |
| 6,606,101 B1 | 8/2003 | Malamud et al. |
| 6,606,388 B1 | 8/2003 | Townsend et al. |
| 6,606,632 B1 | 8/2003 | Saulpaugh et al. |
| 6,611,789 B1 | 8/2003 | Darley |
| 6,615,172 B1 | 9/2003 | Bennett et al. |
| 6,615,175 B1 | 9/2003 | Gazdzinski |
| 6,615,176 B2 | 9/2003 | Lewis et al. |
| 6,615,220 B1 | 9/2003 | Austin et al. |
| 6,621,768 B1 | 9/2003 | Keller et al. |
| 6,621,892 B1 | 9/2003 | Banister et al. |
| 6,622,121 B1 | 9/2003 | Crepy et al. |
| 6,622,136 B2 | 9/2003 | Russell |
| 6,623,529 B1 | 9/2003 | Lakritz |
| 6,625,583 B1 | 9/2003 | Silverman et al. |
| 6,628,808 B1 | 9/2003 | Bach et al. |
| 6,631,186 B1 | 10/2003 | Adams et al. |
| 6,631,346 B1 | 10/2003 | Karaorman et al. |
| 6,633,741 B1 | 10/2003 | Posa et al. |
| 6,633,846 B1 | 10/2003 | Bennett et al. |
| 6,633,932 B1 | 10/2003 | Bork et al. |
| 6,642,940 B1 | 11/2003 | Dakss et al. |
| 6,643,401 B1 | 11/2003 | Kashioka et al. |
| 6,643,824 B1 | 11/2003 | Bates et al. |
| 6,647,260 B2 | 11/2003 | Dusse et al. |
| 6,650,735 B2 | 11/2003 | Burton et al. |
| 6,651,042 B1 | 11/2003 | Field et al. |
| 6,651,218 B1 | 11/2003 | Adler et al. |
| 6,654,740 B2 | 11/2003 | Tokuda et al. |
| 6,658,389 B1 | 12/2003 | Alpdemir |
| 6,658,408 B2 | 12/2003 | Yano et al. |
| 6,658,577 B2 | 12/2003 | Huppi et al. |
| 6,662,023 B1 | 12/2003 | Helle |
| 6,665,639 B2 | 12/2003 | Mozer et al. |
| 6,665,640 B1 | 12/2003 | Bennett et al. |
| 6,665,641 B1 | 12/2003 | Coorman et al. |
| 6,671,672 B1 | 12/2003 | Heck |
| 6,671,683 B2 | 12/2003 | Kanno |
| 6,671,856 B1 | 12/2003 | Gillam |
| 6,675,169 B1 | 1/2004 | Bennett et al. |
| 6,675,233 B1 | 1/2004 | Du et al. |
| 6,677,932 B1 | 1/2004 | Westerman |
| 6,680,675 B1 | 1/2004 | Suzuki |
| 6,684,187 B1 | 1/2004 | Conkie |
| 6,684,376 B1 | 1/2004 | Kerzman et al. |
| 6,690,387 B2 | 2/2004 | Zimmerman et al. |
| 6,690,800 B2 | 2/2004 | Resnick |
| 6,690,828 B2 | 2/2004 | Meyers |
| 6,691,064 B2 | 2/2004 | Vroman |
| 6,691,090 B1 | 2/2004 | Laurila et al. |
| 6,691,111 B2 | 2/2004 | Lazaridis et al. |
| 6,691,151 B1 | 2/2004 | Cheyer et al. |
| 6,694,295 B2 | 2/2004 | Lindholm et al. |
| 6,694,297 B2 | 2/2004 | Sato |
| 6,697,780 B1 | 2/2004 | Beutnagel et al. |
| 6,697,824 B1 | 2/2004 | Bowman-Amuah |
| 6,701,294 B1 | 3/2004 | Ball et al. |
| 6,701,305 B1 | 3/2004 | Holt et al. |
| 6,701,318 B2 | 3/2004 | Fox et al. |
| 6,704,015 B1 | 3/2004 | Bovarnick et al. |
| 6,704,034 B1 | 3/2004 | Rodriguez et al. |
| 6,704,698 B1 | 3/2004 | Paulsen, Jr. et al. |
| 6,704,710 B2 | 3/2004 | Strong |
| 6,708,153 B2 | 3/2004 | Brittan et al. |
| 6,711,585 B1 | 3/2004 | Copperman et al. |
| 6,714,221 B1 | 3/2004 | Christie et al. |
| 6,716,139 B1 | 4/2004 | Hosseinzadeh-Dolkhani et al. |
| 6,718,324 B2 | 4/2004 | Edlund et al. |
| 6,718,331 B2 | 4/2004 | Davis et al. |
| 6,720,980 B1 | 4/2004 | Lui et al. |
| 6,721,728 B2 | 4/2004 | McGreevy |
| 6,721,734 B1 | 4/2004 | Subasic et al. |
| 6,724,370 B2 | 4/2004 | Dutta et al. |
| 6,725,197 B1 | 4/2004 | Wuppermann et al. |
| 6,728,675 B1 | 4/2004 | Maddalozzo, Jr. et al. |
| 6,728,681 B2 | 4/2004 | Whitham |
| 6,728,729 B1 | 4/2004 | Jawa et al. |
| 6,731,312 B2 | 5/2004 | Robbin |
| 6,732,142 B1 | 5/2004 | Bates et al. |
| 6,735,632 B1 | 5/2004 | Kiraly et al. |
| 6,738,738 B2 | 5/2004 | Henton |
| 6,741,264 B1 | 5/2004 | Lesser |
| 6,742,021 B1 | 5/2004 | Halverson et al. |
| 6,751,592 B1 | 6/2004 | Shiga |
| 6,751,595 B2 | 6/2004 | Busayapongchai et al. |
| 6,751,621 B1 | 6/2004 | Calistri-Yeh et al. |
| 6,754,504 B1 | 6/2004 | Reed |
| 6,757,362 B1 | 6/2004 | Cooper et al. |
| 6,757,365 B1 | 6/2004 | Bogard |
| 6,757,646 B2 | 6/2004 | Marchisio |
| 6,757,653 B2 | 6/2004 | Buth et al. |
| 6,757,718 B1 | 6/2004 | Halverson et al. |

(56) References Cited

U.S. PATENT DOCUMENTS

| | | |
|---|---|---|
| 6,760,412 B1 | 7/2004 | Loucks |
| 6,760,700 B2 | 7/2004 | Lewis et al. |
| 6,760,754 B1 | 7/2004 | Isaacs et al. |
| 6,762,741 B2 | 7/2004 | Weindorf |
| 6,762,777 B2 | 7/2004 | Carroll |
| 6,763,089 B2 | 7/2004 | Feigenbaum |
| 6,766,294 B2 | 7/2004 | MacGinite et al. |
| 6,766,320 B1 | 7/2004 | Wang et al. |
| 6,766,324 B2 | 7/2004 | Carlson et al. |
| 6,768,979 B1 | 7/2004 | Menendez-Pidal et al. |
| 6,772,123 B2 | 8/2004 | Cooklev et al. |
| 6,772,195 B1 | 8/2004 | Hatlelid et al. |
| 6,772,394 B1 | 8/2004 | Kamada |
| 6,775,358 B1 | 8/2004 | Breitenbach et al. |
| 6,778,951 B1 | 8/2004 | Contractor |
| 6,778,952 B2 | 8/2004 | Bellegarda |
| 6,778,962 B1 | 8/2004 | Kasai et al. |
| 6,778,970 B2 | 8/2004 | Au |
| 6,778,979 B2 | 8/2004 | Grefenstette et al. |
| 6,782,510 B1 | 8/2004 | Gross et al. |
| 6,784,901 B1 | 8/2004 | Harvey et al. |
| 6,789,094 B2 | 9/2004 | Rudoff et al. |
| 6,789,231 B1 | 9/2004 | Reynar et al. |
| 6,790,704 B2 | 9/2004 | Doyle et al. |
| 6,792,082 B1 | 9/2004 | Levine |
| 6,792,086 B1 | 9/2004 | Saylor et al. |
| 6,792,407 B2 | 9/2004 | Kibre et al. |
| 6,794,566 B2 | 9/2004 | Pachet |
| 6,795,059 B2 | 9/2004 | Endo |
| 6,799,226 B1 | 9/2004 | Robbin et al. |
| 6,801,604 B2 | 10/2004 | Maes et al. |
| 6,801,964 B1 | 10/2004 | Mahdavi |
| 6,803,905 B1 | 10/2004 | Capps et al. |
| 6,804,649 B2 | 10/2004 | Miranda |
| 6,804,677 B2 | 10/2004 | Shadmon et al. |
| 6,807,536 B2 | 10/2004 | Achlioptas et al. |
| 6,807,574 B1 | 10/2004 | Partovi et al. |
| 6,810,379 B1 | 10/2004 | Vermeulen et al. |
| 6,813,218 B1 | 11/2004 | Antonelli et al. |
| 6,813,491 B1 | 11/2004 | McKinney |
| 6,813,607 B1 | 11/2004 | Faruquie et al. |
| 6,816,578 B1 | 11/2004 | Kredo et al. |
| 6,820,055 B2 | 11/2004 | Saindon et al. |
| 6,829,018 B2 | 12/2004 | Lin et al. |
| 6,829,603 B1 | 12/2004 | Cahi et al. |
| 6,832,194 B1 | 12/2004 | Mozer et al. |
| 6,832,381 B1 | 12/2004 | Mathur et al. |
| 6,836,651 B2 | 12/2004 | Segal et al. |
| 6,836,760 B1 | 12/2004 | Bellegarda et al. |
| 6,839,464 B2 | 1/2005 | Hawkins et al. |
| 6,839,669 B1 | 1/2005 | Gould et al. |
| 6,839,670 B1 | 1/2005 | Stammler et al. |
| 6,839,742 B1 | 1/2005 | Dyer et al. |
| 6,842,767 B1 | 1/2005 | Partovi et al. |
| 6,847,966 B1 | 1/2005 | Sommer et al. |
| 6,847,979 B2 | 1/2005 | Allemang et al. |
| 6,850,775 B1 | 2/2005 | Berg |
| 6,850,887 B2 | 2/2005 | Epstein et al. |
| 6,851,115 B1 | 2/2005 | Cheyer et al. |
| 6,856,259 B1 | 2/2005 | Sharp |
| 6,857,800 B2 | 2/2005 | Zhang et al. |
| 6,859,931 B1 | 2/2005 | Cheyer et al. |
| 6,862,568 B2 | 3/2005 | Case |
| 6,862,710 B1 | 3/2005 | Marchisio |
| 6,865,533 B2 | 3/2005 | Addison et al. |
| 6,868,045 B1 | 3/2005 | Schroder |
| 6,868,385 B1 | 3/2005 | Gerson |
| 6,870,529 B1 | 3/2005 | Davis |
| 6,871,346 B1 | 3/2005 | Kumbalimutt et al. |
| 6,873,986 B2 | 3/2005 | McConnell et al. |
| 6,876,947 B1 | 4/2005 | Darley et al. |
| 6,877,003 B2 | 4/2005 | Ho et al. |
| 6,879,957 B1 | 4/2005 | Pechter et al. |
| 6,882,335 B2 | 4/2005 | Saarinen |
| 6,882,337 B2 | 4/2005 | Shetter |
| 6,882,747 B2 | 4/2005 | Thawonmas et al. |
| 6,882,955 B1 | 4/2005 | Ohlenbusch et al. |
| 6,882,971 B2 | 4/2005 | Craner |
| 6,885,734 B1 | 4/2005 | Eberle et al. |
| 6,889,361 B1 | 5/2005 | Bates et al. |
| 6,895,084 B1 | 5/2005 | Saylor et al. |
| 6,895,257 B2 | 5/2005 | Boman et al. |
| 6,895,380 B2 | 5/2005 | Sepe, Jr. |
| 6,895,558 B1 | 5/2005 | Loveland |
| 6,898,550 B1 | 5/2005 | Blackadar et al. |
| 6,901,364 B2 | 5/2005 | Nguyen et al. |
| 6,901,399 B1 | 5/2005 | Corston et al. |
| 6,904,405 B2 | 6/2005 | Suominen |
| 6,907,112 B1 | 6/2005 | Guedalia et al. |
| 6,907,140 B2 | 6/2005 | Matsugu et al. |
| 6,910,004 B2 | 6/2005 | Tarbouriech et al. |
| 6,910,007 B2 | 6/2005 | Stylianou et al. |
| 6,910,186 B2 | 6/2005 | Kim |
| 6,911,971 B2 | 6/2005 | Suzuki et al. |
| 6,912,407 B1 | 6/2005 | Clarke et al. |
| 6,912,498 B2 | 6/2005 | Stevens et al. |
| 6,912,499 B1 | 6/2005 | Sabourin et al. |
| 6,915,138 B2 | 7/2005 | Kraft |
| 6,915,246 B2 | 7/2005 | Gusler et al. |
| 6,917,373 B2 | 7/2005 | Vong et al. |
| 6,918,677 B2 | 7/2005 | Shipman |
| 6,924,828 B1 | 8/2005 | Hirsch |
| 6,925,438 B2 | 8/2005 | Mohamed et al. |
| 6,928,149 B1 | 8/2005 | Panjwani et al. |
| 6,928,614 B1 | 8/2005 | Everhart |
| 6,931,255 B2 | 8/2005 | Mekuria |
| 6,931,384 B1 | 8/2005 | Horvitz et al. |
| 6,932,708 B2 | 8/2005 | Yamashita et al. |
| 6,934,394 B1 | 8/2005 | Anderson |
| 6,934,684 B2 | 8/2005 | Alpdemir et al. |
| 6,934,756 B2 | 8/2005 | Maes |
| 6,934,812 B1 | 8/2005 | Robbin et al. |
| 6,937,975 B1 | 8/2005 | Elworthy |
| 6,937,986 B2 | 8/2005 | Denenberg et al. |
| 6,944,593 B2 | 9/2005 | Kuzunuki et al. |
| 6,948,094 B2 | 9/2005 | Schultz et al. |
| 6,950,087 B2 | 9/2005 | Knox et al. |
| 6,950,502 B1 | 9/2005 | Jenkins |
| 6,952,799 B2 | 10/2005 | Edwards et al. |
| 6,954,755 B2 | 10/2005 | Reisman |
| 6,954,899 B1 | 10/2005 | Anderson |
| 6,956,845 B2 | 10/2005 | Baker et al. |
| 6,957,076 B2 | 10/2005 | Hunzinger |
| 6,957,183 B2 | 10/2005 | Malayath et al. |
| 6,960,734 B1 | 11/2005 | Park |
| 6,961,699 B1 | 11/2005 | Kahn et al. |
| 6,961,912 B2 | 11/2005 | Aoki et al. |
| 6,963,841 B2 | 11/2005 | Handal et al. |
| 6,964,023 B2 | 11/2005 | Maes et al. |
| 6,965,376 B2 | 11/2005 | Tani et al. |
| 6,965,863 B1 * | 11/2005 | Zuberec ............... G10L 15/22 704/231 |
| 6,968,311 B2 | 11/2005 | Knockeart et al. |
| 6,970,820 B2 | 11/2005 | Junqua et al. |
| 6,970,881 B1 | 11/2005 | Mohan et al. |
| 6,970,915 B1 | 11/2005 | Partovi et al. |
| 6,970,935 B1 | 11/2005 | Maes |
| 6,976,090 B2 | 12/2005 | Ben-Shaul et al. |
| 6,978,127 B1 | 12/2005 | Bulthuis et al. |
| 6,978,239 B2 | 12/2005 | Chu et al. |
| 6,980,949 B2 | 12/2005 | Ford |
| 6,980,955 B2 | 12/2005 | Okutani et al. |
| 6,983,251 B1 | 1/2006 | Umemoto et al. |
| 6,985,858 B2 | 1/2006 | Frey et al. |
| 6,985,865 B1 | 1/2006 | Packingham et al. |
| 6,988,071 B1 | 1/2006 | Gazdzinski |
| 6,990,450 B2 | 1/2006 | Case et al. |
| 6,996,520 B2 | 2/2006 | Levin |
| 6,996,531 B2 | 2/2006 | Korall et al. |
| 6,996,575 B2 | 2/2006 | Cox et al. |
| 6,999,066 B2 | 2/2006 | Litwiller |
| 6,999,914 B1 | 2/2006 | Boerner et al. |
| 6,999,925 B2 | 2/2006 | Fischer et al. |
| 6,999,927 B2 | 2/2006 | Mozer et al. |

(56) References Cited

U.S. PATENT DOCUMENTS

| | | |
|---|---|---|
| 7,000,189 B2 | 2/2006 | Dutta et al. |
| 7,002,556 B2 | 2/2006 | Tsukada et al. |
| 7,003,099 B1 | 2/2006 | Zhang et al. |
| 7,003,463 B1 | 2/2006 | Maes et al. |
| 7,003,522 B1 | 2/2006 | Reynar et al. |
| 7,006,969 B2 | 2/2006 | Atal |
| 7,007,239 B1 | 2/2006 | Hawkins et al. |
| 7,010,581 B2 | 3/2006 | Brown et al. |
| 7,013,289 B2 | 3/2006 | Horn et al. |
| 7,013,308 B1 | 3/2006 | Tunstall-Pedoe |
| 7,013,429 B2 | 3/2006 | Fujimoto et al. |
| 7,015,894 B2 | 3/2006 | Morohoshi |
| 7,020,685 B2 | 3/2006 | Chen et al. |
| 7,024,363 B1 | 4/2006 | Comerford et al. |
| 7,024,364 B2 | 4/2006 | Guerra et al. |
| 7,024,366 B1 | 4/2006 | Deyoe et al. |
| 7,024,460 B2 | 4/2006 | Koopmas et al. |
| 7,027,568 B1 | 4/2006 | Simpson et al. |
| 7,027,974 B1 | 4/2006 | Busch et al. |
| 7,027,990 B2 | 4/2006 | Sussman |
| 7,028,252 B1 | 4/2006 | Baru et al. |
| 7,030,861 B1 | 4/2006 | Westerman et al. |
| 7,031,530 B2 | 4/2006 | Driggs et al. |
| 7,031,909 B2 | 4/2006 | Mao et al. |
| 7,035,794 B2 | 4/2006 | Sirivara |
| 7,035,801 B2 | 4/2006 | Jimenez-Feltstrom |
| 7,035,807 B1 | 4/2006 | Brittain et al. |
| 7,036,128 B1 | 4/2006 | Julia et al. |
| 7,038,659 B2 | 5/2006 | Rajkowski |
| 7,039,588 B2 | 5/2006 | Okutani et al. |
| 7,043,420 B2 | 5/2006 | Ratnaparkhi |
| 7,043,422 B2 | 5/2006 | Gao et al. |
| 7,046,230 B2 | 5/2006 | Zadesky et al. |
| 7,046,850 B2 | 5/2006 | Braspenning et al. |
| 7,047,193 B1 | 5/2006 | Bellegarda |
| 7,050,550 B2 | 5/2006 | Steinbiss et al. |
| 7,050,976 B1 | 5/2006 | Packingham |
| 7,050,977 B1 | 5/2006 | Bennett |
| 7,051,096 B1 | 5/2006 | Krawiec et al. |
| 7,054,419 B2 | 5/2006 | Culliss |
| 7,054,888 B2 | 5/2006 | Lachapelle et al. |
| 7,057,607 B2 | 6/2006 | Mayoraz et al. |
| 7,058,569 B2 | 6/2006 | Coorman et al. |
| 7,058,888 B1 | 6/2006 | Gjerstad et al. |
| 7,058,889 B2 | 6/2006 | Trovato et al. |
| 7,062,223 B2 | 6/2006 | Gerber et al. |
| 7,062,225 B2 | 6/2006 | White |
| 7,062,428 B2 | 6/2006 | Hogenhout et al. |
| 7,062,438 B2 | 6/2006 | Kobayashi et al. |
| 7,065,185 B1 | 6/2006 | Koch |
| 7,065,485 B1 | 6/2006 | Chong-White et al. |
| 7,069,213 B2 | 6/2006 | Thompson |
| 7,069,220 B2 | 6/2006 | Coffman et al. |
| 7,069,560 B1 | 6/2006 | Cheyer et al. |
| 7,072,686 B1 | 7/2006 | Schrager |
| 7,072,941 B2 | 7/2006 | Griffin et al. |
| 7,076,527 B2 | 7/2006 | Bellegarda et al. |
| 7,079,713 B2 | 7/2006 | Simmons |
| 7,082,322 B2 | 7/2006 | Harano |
| 7,084,758 B1 | 8/2006 | Cole |
| 7,084,856 B2 | 8/2006 | Huppi |
| 7,085,723 B2 | 8/2006 | Ross et al. |
| 7,085,960 B2 | 8/2006 | Bouat et al. |
| 7,088,345 B2 | 8/2006 | Robinson et al. |
| 7,089,292 B1 | 8/2006 | Roderick et al. |
| 7,092,370 B2 | 8/2006 | Jiang et al. |
| 7,092,887 B2 | 8/2006 | Mozer et al. |
| 7,092,928 B2 | 8/2006 | Elad et al. |
| 7,092,950 B2 | 8/2006 | Wong et al. |
| 7,093,693 B1 | 8/2006 | Gazdzinski |
| 7,095,733 B1 | 8/2006 | Yarlagadda et al. |
| 7,096,183 B2 | 8/2006 | Junqua |
| 7,100,117 B1 | 8/2006 | Chwa et al. |
| 7,103,548 B2 | 9/2006 | Squibbs et al. |
| 7,107,204 B1 | 9/2006 | Liu et al. |
| 7,111,248 B2 | 9/2006 | Mulvey et al. |
| 7,111,774 B2 | 9/2006 | Song |
| 7,113,803 B2 | 9/2006 | Dehlin |
| 7,113,943 B2 | 9/2006 | Bradford et al. |
| 7,115,035 B2 | 10/2006 | Tanaka |
| 7,117,231 B2 | 10/2006 | Fischer et al. |
| 7,123,696 B2 | 10/2006 | Lowe |
| 7,124,081 B1 | 10/2006 | Bellegarda |
| 7,124,082 B2 | 10/2006 | Freedman |
| 7,124,164 B1 | 10/2006 | Chemtob |
| 7,127,046 B1 | 10/2006 | Smith et al. |
| 7,127,396 B2 | 10/2006 | Chu et al. |
| 7,127,403 B1 | 10/2006 | Saylor et al. |
| 7,133,900 B1 | 11/2006 | Szeto |
| 7,136,710 B1 | 11/2006 | Hoffberg et al. |
| 7,136,818 B1 | 11/2006 | Cosatto et al. |
| 7,137,126 B1 * | 11/2006 | Coffman ............ G06F 17/30899 704/200 |
| 7,139,697 B2 | 11/2006 | Häkkinen et al. |
| 7,139,714 B2 | 11/2006 | Bennett et al. |
| 7,139,722 B2 | 11/2006 | Perrella et al. |
| 7,143,028 B2 | 11/2006 | Hillis et al. |
| 7,143,038 B2 | 11/2006 | Katae |
| 7,143,040 B2 | 11/2006 | Durston et al. |
| 7,146,319 B2 | 12/2006 | Hunt |
| 7,146,437 B2 | 12/2006 | Robbin et al. |
| 7,149,319 B2 | 12/2006 | Roeck |
| 7,149,695 B1 | 12/2006 | Bellegarda |
| 7,149,964 B1 | 12/2006 | Cottrille et al. |
| 7,152,070 B1 | 12/2006 | Musick et al. |
| 7,152,093 B2 | 12/2006 | Ludwig et al. |
| 7,154,526 B2 | 12/2006 | Foote et al. |
| 7,155,668 B2 | 12/2006 | Holland et al. |
| 7,158,647 B2 | 1/2007 | Azima et al. |
| 7,159,174 B2 | 1/2007 | Johnson et al. |
| 7,162,412 B2 | 1/2007 | Yamada et al. |
| 7,162,482 B1 | 1/2007 | Dunning |
| 7,165,073 B2 | 1/2007 | Vandersluis |
| 7,166,791 B2 | 1/2007 | Robbin et al. |
| 7,171,360 B2 | 1/2007 | Huang et al. |
| 7,174,042 B1 | 2/2007 | Simmons et al. |
| 7,174,295 B1 | 2/2007 | Kivimaki |
| 7,174,297 B2 | 2/2007 | Guerra et al. |
| 7,174,298 B2 | 2/2007 | Sharma |
| 7,177,794 B2 | 2/2007 | Mani et al. |
| 7,177,798 B2 | 2/2007 | Hsu et al. |
| 7,177,817 B1 | 2/2007 | Khosla et al. |
| 7,181,386 B2 | 2/2007 | Mohri et al. |
| 7,181,388 B2 | 2/2007 | Tian |
| 7,184,064 B2 | 2/2007 | Zimmerman et al. |
| 7,185,276 B2 | 2/2007 | Keswa |
| 7,188,085 B2 | 3/2007 | Pelletier |
| 7,190,351 B1 | 3/2007 | Goren |
| 7,190,794 B2 | 3/2007 | Hinde |
| 7,191,118 B2 | 3/2007 | Bellegarda |
| 7,191,131 B1 | 3/2007 | Nagao |
| 7,193,615 B2 | 3/2007 | Kim et al. |
| 7,194,186 B1 | 3/2007 | Strub et al. |
| 7,194,413 B2 | 3/2007 | Mahoney et al. |
| 7,194,471 B1 | 3/2007 | Nagatsuka et al. |
| 7,194,611 B2 | 3/2007 | Bear et al. |
| 7,194,699 B2 | 3/2007 | Thomson et al. |
| 7,197,120 B2 | 3/2007 | Luehrig et al. |
| 7,197,460 B1 | 3/2007 | Gupta |
| 7,200,550 B2 | 4/2007 | Menezes et al. |
| 7,200,558 B2 | 4/2007 | Kato et al. |
| 7,200,559 B2 | 4/2007 | Wang |
| 7,203,297 B2 * | 4/2007 | Vitikainen ............ H04M 3/533 379/207.02 |
| 7,203,646 B2 | 4/2007 | Bennett |
| 7,206,809 B2 | 4/2007 | Ludwig et al. |
| 7,216,008 B2 | 5/2007 | Sakata |
| 7,216,073 B2 | 5/2007 | Lavi et al. |
| 7,216,080 B2 | 5/2007 | Tsiao |
| 7,218,920 B2 | 5/2007 | Hyon |
| 7,218,943 B2 | 5/2007 | Klassen et al. |
| 7,219,063 B2 | 5/2007 | Schalk et al. |
| 7,219,123 B1 | 5/2007 | Fiechter et al. |
| 7,225,125 B2 | 5/2007 | Bennett et al. |

(56) References Cited

U.S. PATENT DOCUMENTS

| | | | |
|---|---|---|---|
| 7,228,278 B2 | 6/2007 | Nguyen et al. |
| 7,231,343 B1 | 6/2007 | Treadgold et al. |
| 7,231,597 B1 | 6/2007 | Braun et al. |
| 7,233,790 B2 | 6/2007 | Kjellberg et al. |
| 7,233,904 B2 | 6/2007 | Luisi |
| 7,234,026 B2 | 6/2007 | Robbin et al. |
| 7,236,932 B1 | 6/2007 | Grajski |
| 7,240,002 B2 | 7/2007 | Minamino et al. |
| 7,243,130 B2 | 7/2007 | Horvitz et al. |
| 7,243,305 B2 | 7/2007 | Schabes et al. |
| 7,246,118 B2 | 7/2007 | Chastain et al. |
| 7,246,151 B2 | 7/2007 | Isaacs et al. |
| 7,248,900 B2 | 7/2007 | Deeds et al. |
| 7,251,454 B2 | 7/2007 | White |
| 7,254,773 B2 | 8/2007 | Bates et al. |
| 7,257,537 B2 | 8/2007 | Ross et al. |
| 7,259,752 B1 | 8/2007 | Simmons |
| 7,260,529 B1 | 8/2007 | Lengen |
| 7,263,373 B2 | 8/2007 | Mattisson |
| 7,266,189 B1 | 9/2007 | Day |
| 7,266,495 B1 | 9/2007 | Beaufays et al. |
| 7,266,496 B2 | 9/2007 | Wang et al. |
| 7,266,499 B2 | 9/2007 | Surace et al. |
| 7,269,544 B2 | 9/2007 | Simske |
| 7,269,556 B2 | 9/2007 | Kiss et al. |
| 7,272,224 B1 | 9/2007 | Normile et al. |
| 7,275,063 B2 | 9/2007 | Horn |
| 7,277,088 B2 | 10/2007 | Robinson et al. |
| 7,277,854 B2 | 10/2007 | Bennett et al. |
| 7,277,855 B1 | 10/2007 | Acker et al. |
| 7,280,958 B2 | 10/2007 | Pavlov et al. |
| 7,283,072 B1 | 10/2007 | Plachta et al. |
| 7,289,102 B2 | 10/2007 | Hinckley et al. |
| 7,290,039 B1 | 10/2007 | Lisitsa et al. |
| 7,292,579 B2 | 11/2007 | Morris |
| 7,292,979 B2 | 11/2007 | Karas et al. |
| 7,296,230 B2 | 11/2007 | Fukatsu et al. |
| 7,299,033 B2 | 11/2007 | Kjellberg et al. |
| 7,302,392 B1 | 11/2007 | Thenthiruperai et al. |
| 7,302,394 B1 * | 11/2007 | Baray et al. ............ 704/257 |
| 7,302,686 B2 | 11/2007 | Togawa |
| 7,308,404 B2 | 12/2007 | Venkataraman et al. |
| 7,308,408 B1 | 12/2007 | Stifelman et al. |
| 7,310,329 B2 | 12/2007 | Vieri et al. |
| 7,310,600 B1 | 12/2007 | Garner et al. |
| 7,310,605 B2 | 12/2007 | Janakiraman et al. |
| 7,313,523 B1 | 12/2007 | Bellegarda et al. |
| 7,315,809 B2 | 1/2008 | Xun |
| 7,315,818 B2 | 1/2008 | Stevens et al. |
| 7,319,957 B2 | 1/2008 | Robinson et al. |
| 7,321,783 B2 | 1/2008 | Kim |
| 7,322,023 B2 | 1/2008 | Shulman et al. |
| 7,324,833 B2 | 1/2008 | White et al. |
| 7,324,947 B2 * | 1/2008 | Jordan ............ H04N 21/4782 704/257 |
| 7,328,155 B2 | 2/2008 | Endo et al. |
| 7,345,670 B2 | 3/2008 | Armstrong |
| 7,345,671 B2 | 3/2008 | Robbin et al. |
| 7,349,953 B2 | 3/2008 | Lisitsa et al. |
| 7,353,139 B1 | 4/2008 | Burrell et al. |
| 7,359,493 B1 | 4/2008 | Wang et al. |
| 7,359,671 B2 | 4/2008 | Richenstein et al. |
| 7,359,851 B2 | 4/2008 | Tong et al. |
| 7,360,158 B1 | 4/2008 | Beeman |
| 7,362,738 B2 | 4/2008 | Taube et al. |
| 7,363,227 B2 | 4/2008 | Mapes-Riordan et al. |
| 7,365,260 B2 | 4/2008 | Kawashima |
| 7,366,461 B1 | 4/2008 | Brown |
| 7,373,612 B2 | 5/2008 | Risch et al. |
| 7,376,556 B2 | 5/2008 | Bennett |
| 7,376,632 B1 | 5/2008 | Sadek et al. |
| 7,376,645 B2 | 5/2008 | Bernard |
| 7,378,963 B1 | 5/2008 | Begault et al. |
| 7,379,874 B2 | 5/2008 | Schmid et al. |
| 7,380,203 B2 | 5/2008 | Keely et al. |
| 7,383,170 B2 | 6/2008 | Mills et al. |
| 7,386,438 B1 | 6/2008 | Franz et al. |
| 7,386,449 B2 | 6/2008 | Sun et al. |
| 7,386,799 B1 | 6/2008 | Clanton et al. |
| 7,389,224 B1 | 6/2008 | Elworthy |
| 7,389,225 B1 | 6/2008 | Jensen et al. |
| 7,392,185 B2 | 6/2008 | Bennett |
| 7,394,947 B2 | 7/2008 | Li et al. |
| 7,398,209 B2 | 7/2008 | Kennewick |
| 7,401,300 B2 | 7/2008 | Nurmi |
| 7,403,938 B2 | 7/2008 | Harrison et al. |
| 7,403,941 B2 | 7/2008 | Bedworth et al. |
| 7,404,143 B2 | 7/2008 | Freelander et al. |
| 7,409,337 B1 | 8/2008 | Potter et al. |
| 7,409,347 B1 | 8/2008 | Bellegarda |
| 7,412,389 B2 | 8/2008 | Yang |
| 7,412,470 B2 | 8/2008 | Masuno et al. |
| 7,415,100 B2 | 8/2008 | Cooper et al. |
| 7,418,389 B2 | 8/2008 | Chu et al. |
| 7,418,392 B1 | 8/2008 | Mozer et al. |
| 7,426,467 B2 | 9/2008 | Nashida et al. |
| 7,426,468 B2 | 9/2008 | Coifman et al. |
| 7,427,024 B1 | 9/2008 | Gazdzinski et al. |
| 7,428,541 B2 | 9/2008 | Houle |
| 7,433,869 B2 | 10/2008 | Gollapudi |
| 7,433,921 B2 | 10/2008 | Ludwig et al. |
| 7,441,184 B2 | 10/2008 | Frerebeau et al. |
| 7,443,316 B2 | 10/2008 | Lim |
| 7,444,589 B2 | 10/2008 | Zellner |
| 7,447,360 B2 | 11/2008 | Li et al. |
| 7,447,635 B1 | 11/2008 | Konopka et al. |
| 7,447,637 B1 * | 11/2008 | Grant ............ G10L 15/193 704/231 |
| 7,451,081 B1 | 11/2008 | Gajic et al. |
| 7,454,351 B2 | 11/2008 | Jeschke et al. |
| 7,460,652 B2 | 12/2008 | Chang |
| 7,461,043 B2 | 12/2008 | Hess |
| 7,467,087 B1 | 12/2008 | Gillick et al. |
| 7,467,164 B2 | 12/2008 | Marsh |
| 7,472,061 B1 | 12/2008 | Alewine et al. |
| 7,472,065 B2 | 12/2008 | Aaron et al. |
| 7,475,010 B2 | 1/2009 | Chao |
| 7,475,063 B2 | 1/2009 | Datta et al. |
| 7,477,238 B2 | 1/2009 | Fux et al. |
| 7,477,240 B2 | 1/2009 | Yanagisawa |
| 7,478,037 B2 | 1/2009 | Strong |
| 7,478,091 B2 | 1/2009 | Mojsilovic et al. |
| 7,478,129 B1 | 1/2009 | Chemtob |
| 7,479,948 B2 | 1/2009 | Kim et al. |
| 7,479,949 B2 | 1/2009 | Jobs et al. |
| 7,483,832 B2 | 1/2009 | Tischer |
| 7,483,894 B2 | 1/2009 | Cao |
| 7,487,089 B2 | 2/2009 | Mozer |
| 7,487,093 B2 | 2/2009 | Mutsuno et al. |
| 7,490,034 B2 | 2/2009 | Finnigan et al. |
| 7,490,039 B1 | 2/2009 | Shaffer et al. |
| 7,493,560 B1 | 2/2009 | Kipnes et al. |
| 7,496,498 B2 | 2/2009 | Chu et al. |
| 7,496,512 B2 | 2/2009 | Zhao et al. |
| 7,499,923 B2 | 3/2009 | Kawatani |
| 7,502,738 B2 | 3/2009 | Kennewick et al. |
| 7,505,795 B1 | 3/2009 | Lim et al. |
| 7,508,324 B2 | 3/2009 | Suraqui |
| 7,508,373 B2 | 3/2009 | Lin et al. |
| 7,516,123 B2 | 4/2009 | Betz et al. |
| 7,519,327 B2 | 4/2009 | White |
| 7,522,927 B2 | 4/2009 | Fitch et al. |
| 7,523,036 B2 | 4/2009 | Akabane et al. |
| 7,523,108 B2 | 4/2009 | Cao |
| 7,526,466 B2 | 4/2009 | Au |
| 7,526,738 B2 | 4/2009 | Ording et al. |
| 7,528,713 B2 | 5/2009 | Singh et al. |
| 7,529,671 B2 | 5/2009 | Rockenbeck et al. |
| 7,529,676 B2 | 5/2009 | Koyama |
| 7,535,997 B1 | 5/2009 | McQuaide, Jr. et al. |
| 7,536,029 B2 | 5/2009 | Choi et al. |
| 7,536,565 B2 | 5/2009 | Girish et al. |
| 7,538,685 B1 | 5/2009 | Cooper et al. |
| 7,539,619 B1 | 5/2009 | Seligman et al. |

(56) References Cited

U.S. PATENT DOCUMENTS

| | | |
|---|---|---|
| 7,539,656 B2 | 5/2009 | Fratkina et al. |
| 7,541,940 B2 | 6/2009 | Upton |
| 7,542,967 B2 | 6/2009 | Hurst-Hiller et al. |
| 7,543,232 B2 | 6/2009 | Easton et al. |
| 7,546,382 B2 | 6/2009 | Healey et al. |
| 7,546,529 B2 | 6/2009 | Reynar et al. |
| 7,548,895 B2 | 6/2009 | Pulsipher |
| 7,552,045 B2 | 6/2009 | Barliga et al. |
| 7,552,055 B2 * | 6/2009 | Lecoeuche ............... 704/270.1 |
| 7,555,431 B2 | 6/2009 | Bennett |
| 7,555,496 B1 | 6/2009 | Lantrip et al. |
| 7,558,381 B1 | 7/2009 | Ali et al. |
| 7,558,730 B2 | 7/2009 | Davis et al. |
| 7,559,026 B2 | 7/2009 | Girish et al. |
| 7,561,069 B2 | 7/2009 | Horstemeyer |
| 7,562,007 B2 | 7/2009 | Hwang |
| 7,562,032 B2 | 7/2009 | Abbosh et al. |
| 7,565,104 B1 | 7/2009 | Brown et al. |
| 7,565,380 B1 | 7/2009 | Venkatachary |
| 7,571,106 B2 | 8/2009 | Cao et al. |
| 7,577,522 B2 | 8/2009 | Rosenberg |
| 7,580,551 B1 | 8/2009 | Srihari et al. |
| 7,580,576 B2 | 8/2009 | Wang et al. |
| 7,580,839 B2 | 8/2009 | Tamura et al. |
| 7,584,093 B2 | 9/2009 | Potter et al. |
| 7,584,278 B2 | 9/2009 | Rajarajan et al. |
| 7,584,429 B2 | 9/2009 | Fabritius |
| 7,593,868 B2 | 9/2009 | Margiloff et al. |
| 7,596,269 B2 | 9/2009 | King et al. |
| 7,596,499 B2 | 9/2009 | Anguera et al. |
| 7,596,606 B2 | 9/2009 | Codignotto |
| 7,596,765 B2 | 9/2009 | Almås |
| 7,599,918 B2 | 10/2009 | Shen et al. |
| 7,603,381 B2 | 10/2009 | Burke et al. |
| 7,609,179 B2 | 10/2009 | Diaz-Gutierrez et al. |
| 7,610,258 B2 | 10/2009 | Yuknewicz et al. |
| 7,613,264 B2 | 11/2009 | Wells et al. |
| 7,614,008 B2 | 11/2009 | Ording |
| 7,617,094 B2 | 11/2009 | Aoki et al. |
| 7,620,407 B1 | 11/2009 | Donald et al. |
| 7,620,549 B2 | 11/2009 | Di Cristo et al. |
| 7,623,119 B2 | 11/2009 | Autio et al. |
| 7,624,007 B2 | 11/2009 | Bennett |
| 7,627,481 B1 | 12/2009 | Kuo et al. |
| 7,630,901 B2 | 12/2009 | Omi |
| 7,633,076 B2 | 12/2009 | Huppi et al. |
| 7,634,409 B2 | 12/2009 | Kennewick et al. |
| 7,634,413 B1 | 12/2009 | Kuo et al. |
| 7,634,718 B2 | 12/2009 | Nakajima |
| 7,634,732 B1 | 12/2009 | Blagsvedt et al. |
| 7,636,657 B2 | 12/2009 | Ju et al. |
| 7,640,158 B2 | 12/2009 | Detlef et al. |
| 7,640,160 B2 | 12/2009 | Cristo |
| 7,643,990 B1 | 1/2010 | Bellegarda |
| 7,647,225 B2 | 1/2010 | Bennett et al. |
| 7,649,454 B2 | 1/2010 | Singh et al. |
| 7,649,877 B2 | 1/2010 | Vieri et al. |
| 7,653,883 B2 | 1/2010 | Hotelling et al. |
| 7,656,393 B2 | 2/2010 | King et al. |
| 7,657,424 B2 | 2/2010 | Bennett |
| 7,657,844 B2 | 2/2010 | Gibson et al. |
| 7,657,849 B2 | 2/2010 | Chaudhri et al. |
| 7,663,607 B2 | 2/2010 | Hotelling et al. |
| 7,664,558 B2 | 2/2010 | Lindahl et al. |
| 7,664,638 B2 | 2/2010 | Cooper et al. |
| 7,669,134 B1 | 2/2010 | Christie et al. |
| 7,672,841 B2 | 3/2010 | Bennett |
| 7,672,952 B2 | 3/2010 | Isaacson et al. |
| 7,673,238 B2 | 3/2010 | Girish et al. |
| 7,673,340 B1 | 3/2010 | Cohen et al. |
| 7,676,026 B1 | 3/2010 | Baxter, Jr. |
| 7,676,365 B2 | 3/2010 | Hwang et al. |
| 7,676,463 B2 | 3/2010 | Thompson et al. |
| 7,679,534 B2 | 3/2010 | Kay et al. |
| 7,680,649 B2 | 3/2010 | Park |
| 7,681,126 B2 | 3/2010 | Roose |
| 7,683,886 B2 | 3/2010 | Willey |
| 7,683,893 B2 | 3/2010 | Kim |
| 7,684,985 B2 | 3/2010 | Dominach et al. |
| 7,684,990 B2 | 3/2010 | Caskey et al. |
| 7,684,991 B2 | 3/2010 | Stohr et al. |
| 7,689,245 B2 | 3/2010 | Cox et al. |
| 7,689,408 B2 | 3/2010 | Chen et al. |
| 7,689,409 B2 | 3/2010 | Heinecke |
| 7,689,421 B2 | 3/2010 | Li et al. |
| 7,693,715 B2 | 4/2010 | Hwang et al. |
| 7,693,717 B2 | 4/2010 | Kahn et al. |
| 7,693,719 B2 | 4/2010 | Chu et al. |
| 7,693,720 B2 | 4/2010 | Kennewick |
| 7,698,131 B2 | 4/2010 | Bennett |
| 7,702,500 B2 | 4/2010 | Blaedow |
| 7,702,508 B2 | 4/2010 | Bennett |
| 7,706,510 B2 | 4/2010 | Ng |
| 7,707,026 B2 | 4/2010 | Liu |
| 7,707,027 B2 | 4/2010 | Balchandran et al. |
| 7,707,032 B2 | 4/2010 | Wang et al. |
| 7,707,221 B1 | 4/2010 | Dunning et al. |
| 7,707,267 B2 | 4/2010 | Lisitsa et al. |
| 7,710,262 B2 | 5/2010 | Ruha |
| 7,711,129 B2 | 5/2010 | Lindahl et al. |
| 7,711,550 B1 | 5/2010 | Feinberg et al. |
| 7,711,565 B1 | 5/2010 | Gazdzinski |
| 7,711,672 B2 | 5/2010 | Au |
| 7,712,053 B2 | 5/2010 | Bradford et al. |
| 7,716,056 B2 | 5/2010 | Weng |
| 7,716,216 B1 | 5/2010 | Harik et al. |
| 7,720,674 B2 | 5/2010 | Kaiser et al. |
| 7,720,683 B1 | 5/2010 | Vermeulen et al. |
| 7,721,226 B2 | 5/2010 | Barabe et al. |
| 7,721,301 B2 | 5/2010 | Wong et al. |
| 7,724,242 B2 | 5/2010 | Hillis et al. |
| 7,725,307 B2 | 5/2010 | Bennett |
| 7,725,318 B2 | 5/2010 | Gavalda et al. |
| 7,725,320 B2 | 5/2010 | Bennett |
| 7,725,321 B2 | 5/2010 | Bennett |
| 7,725,838 B2 | 5/2010 | Williams |
| 7,729,904 B2 | 6/2010 | Bennett |
| 7,729,916 B2 | 6/2010 | Coffman et al. |
| 7,734,461 B2 | 6/2010 | Kwak et al. |
| 7,735,012 B2 | 6/2010 | Naik |
| 7,739,588 B2 | 6/2010 | Reynar et al. |
| 7,742,953 B2 | 6/2010 | King et al. |
| 7,743,188 B2 | 6/2010 | Haitani et al. |
| 7,747,616 B2 | 6/2010 | Yamada et al. |
| 7,752,152 B2 | 7/2010 | Paek et al. |
| 7,756,868 B2 | 7/2010 | Lee |
| 7,757,173 B2 | 7/2010 | Beaman |
| 7,757,182 B2 | 7/2010 | Elliott et al. |
| 7,761,296 B1 | 7/2010 | Bakis et al. |
| 7,763,842 B2 | 7/2010 | Hsu et al. |
| 7,774,204 B2 | 8/2010 | Mozer et al. |
| 7,774,388 B1 | 8/2010 | Runchey |
| 7,777,717 B2 | 8/2010 | Fux et al. |
| 7,778,432 B2 | 8/2010 | Larsen |
| 7,778,595 B2 | 8/2010 | White et al. |
| 7,778,632 B2 | 8/2010 | Kurlander et al. |
| 7,779,353 B2 | 8/2010 | Grigoriu et al. |
| 7,779,356 B2 | 8/2010 | Griesmer |
| 7,779,357 B2 | 8/2010 | Naik |
| 7,783,283 B2 | 8/2010 | Kuusinen et al. |
| 7,783,486 B2 | 8/2010 | Rosser et al. |
| 7,788,590 B2 | 8/2010 | Taboada et al. |
| 7,797,265 B2 | 9/2010 | Brinker et al. |
| 7,797,269 B2 | 9/2010 | Rieman et al. |
| 7,797,331 B2 | 9/2010 | Theimer et al. |
| 7,797,629 B2 | 9/2010 | Fux et al. |
| 7,801,721 B2 | 9/2010 | Rosart et al. |
| 7,801,728 B2 | 9/2010 | Ben-David et al. |
| 7,801,729 B2 | 9/2010 | Mozer |
| 7,805,299 B2 | 9/2010 | Coifman |
| 7,809,565 B2 | 10/2010 | Coifman |
| 7,809,569 B2 | 10/2010 | Attwater et al. |
| 7,809,570 B2 | 10/2010 | Kennewick et al. |
| 7,809,610 B2 | 10/2010 | Cao |

(56) References Cited

U.S. PATENT DOCUMENTS

| | | | |
|---|---|---|---|
| 7,809,744 B2 | 10/2010 | Nevidomski et al. |
| 7,818,165 B2 | 10/2010 | Carlgren et al. |
| 7,818,176 B2 | 10/2010 | Freeman et al. |
| 7,818,215 B2 | 10/2010 | King et al. |
| 7,818,291 B2 | 10/2010 | Ferguson et al. |
| 7,818,672 B2 | 10/2010 | Mccormack et al. |
| 7,822,608 B2 | 10/2010 | Cross, Jr. et al. |
| 7,823,123 B2 | 10/2010 | Sabbouh |
| 7,826,945 B2 | 11/2010 | Zhang et al. |
| 7,827,047 B2 | 11/2010 | Anderson et al. |
| 7,831,423 B2 | 11/2010 | Schubert |
| 7,831,426 B2 | 11/2010 | Bennett |
| 7,831,432 B2 | 11/2010 | Bodin et al. |
| 7,836,437 B2 | 11/2010 | Kacmarcik et al. |
| 7,840,400 B2 | 11/2010 | Lavi et al. |
| 7,840,447 B2 | 11/2010 | Kleinrock et al. |
| 7,840,581 B2 | 11/2010 | Ross et al. |
| 7,840,912 B2 | 11/2010 | Elias et al. |
| 7,848,924 B2 | 12/2010 | Nurminen et al. |
| 7,848,926 B2 | 12/2010 | Goto et al. |
| 7,853,444 B2 | 12/2010 | Wang et al. |
| 7,853,445 B2 | 12/2010 | Bachenko et al. |
| 7,853,574 B2 | 12/2010 | Kraenzel et al. |
| 7,853,577 B2 | 12/2010 | Sundaresan et al. |
| 7,853,664 B1 | 12/2010 | Wang et al. |
| 7,853,900 B2 | 12/2010 | Nguyen et al. |
| 7,865,817 B2 | 1/2011 | Ryan et al. |
| 7,869,999 B2 | 1/2011 | Amato et al. |
| 7,870,118 B2 | 1/2011 | Jiang et al. |
| 7,873,519 B2 | 1/2011 | Bennett |
| 7,873,654 B2 | 1/2011 | Bernard |
| 7,877,705 B2 | 1/2011 | Chambers et al. |
| 7,880,730 B2 | 2/2011 | Robinson et al. |
| 7,881,283 B2 | 2/2011 | Cormier et al. |
| 7,881,936 B2 | 2/2011 | Longé et al. |
| 7,885,844 B1 | 2/2011 | Cohen et al. |
| 7,886,233 B2 | 2/2011 | Rainisto et al. |
| 7,889,184 B2 | 2/2011 | Blumenberg et al. |
| 7,889,185 B2 | 2/2011 | Blumenberg et al. |
| 7,890,330 B2 | 2/2011 | Ozkaragoz et al. |
| 7,890,652 B2 | 2/2011 | Bull et al. |
| 7,895,531 B2 | 2/2011 | Radtke et al. |
| 7,899,666 B2 | 3/2011 | Varone |
| 7,908,287 B1 | 3/2011 | Katragadda |
| 7,912,289 B2 | 3/2011 | Kansal et al. |
| 7,912,699 B1 | 3/2011 | Saraclar et al. |
| 7,912,702 B2 | 3/2011 | Bennett |
| 7,912,720 B1 | 3/2011 | Hakkani-Tur et al. |
| 7,912,828 B2 | 3/2011 | Bonnet et al. |
| 7,913,185 B1 | 3/2011 | Benson et al. |
| 7,916,979 B2 | 3/2011 | Simmons |
| 7,917,367 B2 | 3/2011 | Di Cristo et al. |
| 7,917,497 B2 | 3/2011 | Harrison et al. |
| 7,920,678 B2 | 4/2011 | Cooper et al. |
| 7,920,682 B2 | 4/2011 | Byrne et al. |
| 7,920,857 B2 | 4/2011 | Lau et al. |
| 7,925,525 B2 | 4/2011 | Chin |
| 7,925,610 B2 | 4/2011 | Elbaz et al. |
| 7,929,805 B2 | 4/2011 | Wang et al. |
| 7,930,168 B2 | 4/2011 | Weng et al. |
| 7,930,183 B2 | 4/2011 | Odell et al. |
| 7,930,197 B2 | 4/2011 | Ozzie et al. |
| 7,936,339 B2 | 5/2011 | Marggraff et al. |
| 7,941,009 B2 | 5/2011 | Li et al. |
| 7,945,470 B1 | 5/2011 | Cohen et al. |
| 7,949,529 B2 | 5/2011 | Weider et al. |
| 7,949,534 B2 | 5/2011 | Davis et al. |
| 7,953,679 B2 | 5/2011 | Chidlovskii et al. |
| 7,957,975 B2 | 6/2011 | Burns et al. |
| 7,962,179 B2 | 6/2011 | Huang |
| 7,974,844 B2 | 7/2011 | Sumita |
| 7,974,972 B2 | 7/2011 | Cao |
| 7,975,216 B2 | 7/2011 | Woolf et al. |
| 7,983,478 B2 | 7/2011 | Liu et al. |
| 7,983,915 B2 | 7/2011 | Knight et al. |
| 7,983,917 B2 | 7/2011 | Kennewick et al. |
| 7,983,919 B2 | 7/2011 | Conkie |
| 7,983,997 B2 * | 7/2011 | Allen et al. ............... 706/12 |
| 7,984,062 B2 | 7/2011 | Dunning et al. |
| 7,986,431 B2 | 7/2011 | Emori et al. |
| 7,987,151 B2 | 7/2011 | Schott et al. |
| 7,987,244 B1 | 7/2011 | Lewis et al. |
| 7,991,614 B2 | 8/2011 | Washio et al. |
| 7,992,085 B2 | 8/2011 | Wang-Aryattanwanich et al. |
| 7,996,228 B2 | 8/2011 | Miller et al. |
| 7,996,589 B2 | 8/2011 | Schultz et al. |
| 7,996,769 B2 | 8/2011 | Fux et al. |
| 7,996,792 B2 | 8/2011 | Anzures et al. |
| 7,999,669 B2 | 8/2011 | Singh et al. |
| 8,000,453 B2 | 8/2011 | Cooper et al. |
| 8,005,664 B2 | 8/2011 | Hanumanthappa |
| 8,005,679 B2 | 8/2011 | Jordan et al. |
| 8,006,180 B2 | 8/2011 | Tunning et al. |
| 8,015,006 B2 | 9/2011 | Kennewick et al. |
| 8,015,011 B2 | 9/2011 | Nagano et al. |
| 8,015,144 B2 | 9/2011 | Zheng et al. |
| 8,018,431 B1 | 9/2011 | Zehr et al. |
| 8,019,271 B1 | 9/2011 | Izdepski |
| 8,024,195 B2 | 9/2011 | Mozer et al. |
| 8,027,836 B2 | 9/2011 | Baker et al. |
| 8,031,943 B2 | 10/2011 | Chen et al. |
| 8,032,383 B1 | 10/2011 | Bhardwaj et al. |
| 8,036,901 B2 | 10/2011 | Mozer |
| 8,037,034 B2 | 10/2011 | Plachta et al. |
| 8,041,557 B2 | 10/2011 | Liu |
| 8,041,570 B2 | 10/2011 | Mirkovic et al. |
| 8,041,611 B2 | 10/2011 | Kleinrock et al. |
| 8,042,053 B2 | 10/2011 | Darwish et al. |
| 8,046,363 B2 | 10/2011 | Cha et al. |
| 8,050,500 B1 | 11/2011 | Batty et al. |
| 8,055,502 B2 | 11/2011 | Clark et al. |
| 8,055,708 B2 | 11/2011 | Chitsaz et al. |
| 8,060,824 B2 | 11/2011 | Brownrigg et al. |
| 8,064,753 B2 | 11/2011 | Freeman |
| 8,065,143 B2 | 11/2011 | Yanagihara |
| 8,065,155 B1 | 11/2011 | Gazdzinski |
| 8,065,156 B2 | 11/2011 | Gazdzinski |
| 8,068,604 B2 | 11/2011 | Leeds et al. |
| 8,069,046 B2 | 11/2011 | Kennewick et al. |
| 8,069,422 B2 | 11/2011 | Sheshagiri et al. |
| 8,073,681 B2 | 12/2011 | Baldwin et al. |
| 8,077,153 B2 | 12/2011 | Benko et al. |
| 8,078,473 B1 | 12/2011 | Gazdzinski |
| 8,082,153 B2 | 12/2011 | Coffman et al. |
| 8,082,498 B2 | 12/2011 | Salamon et al. |
| 8,090,571 B2 | 1/2012 | Elshishiny et al. |
| 8,095,364 B2 | 1/2012 | Longé et al. |
| 8,099,289 B2 | 1/2012 | Mozer et al. |
| 8,099,395 B2 | 1/2012 | Pabla et al. |
| 8,099,418 B2 | 1/2012 | Inoue et al. |
| 8,103,510 B2 | 1/2012 | Sato |
| 8,107,401 B2 | 1/2012 | John et al. |
| 8,112,275 B2 | 2/2012 | Kennewick et al. |
| 8,112,280 B2 | 2/2012 | Lu |
| 8,117,037 B2 | 2/2012 | Gazdzinski |
| 8,117,542 B2 | 2/2012 | Radtke et al. |
| 8,121,413 B2 | 2/2012 | Hwang et al. |
| 8,121,837 B2 | 2/2012 | Agapi et al. |
| 8,122,094 B1 | 2/2012 | Kotab |
| 8,122,353 B2 | 2/2012 | Bouta |
| 8,131,557 B2 | 3/2012 | Davis et al. |
| 8,135,115 B1 | 3/2012 | Hogg, Jr. et al. |
| 8,138,912 B2 | 3/2012 | Singh et al. |
| 8,140,335 B2 | 3/2012 | Kennewick et al. |
| 8,140,567 B2 | 3/2012 | Padovitz et al. |
| 8,150,694 B2 | 4/2012 | Kennewick et al. |
| 8,150,700 B2 | 4/2012 | Shin et al. |
| 8,155,956 B2 | 4/2012 | Cho et al. |
| 8,156,005 B2 | 4/2012 | Vieri |
| 8,160,883 B2 * | 4/2012 | Lecoeuche ............... 704/270.1 |
| 8,165,321 B2 | 4/2012 | Paquier et al. |
| 8,165,886 B1 * | 4/2012 | Gagnon ............... G10L 15/26 704/275 |
| 8,166,019 B1 | 4/2012 | Lee et al. |

(56) References Cited

U.S. PATENT DOCUMENTS

| | | |
|---|---|---|
| 8,170,790 B2 | 5/2012 | Lee et al. |
| 8,179,370 B1 | 5/2012 | Yamasani et al. |
| 8,188,856 B2 | 5/2012 | Singh et al. |
| 8,190,359 B2 | 5/2012 | Bourne |
| 8,195,467 B2 | 6/2012 | Mozer et al. |
| 8,200,495 B2 | 6/2012 | Braho et al. |
| 8,201,109 B2 | 6/2012 | Van Os et al. |
| 8,204,238 B2 | 6/2012 | Mozer |
| 8,205,788 B1 | 6/2012 | Gazdzinski et al. |
| 8,209,183 B1 | 6/2012 | Patel et al. |
| 8,219,115 B1 | 7/2012 | Nelissen |
| 8,219,406 B2 | 7/2012 | Yu et al. |
| 8,219,407 B1 | 7/2012 | Roy et al. |
| 8,219,608 B2 | 7/2012 | Alsafadi et al. |
| 8,224,649 B2 | 7/2012 | Chaudhari et al. |
| 8,239,207 B2 | 8/2012 | Seligman et al. |
| 8,255,217 B2 | 8/2012 | Stent et al. |
| 8,275,621 B2 | 9/2012 | Alewine et al. |
| 8,285,546 B2 | 10/2012 | Reich |
| 8,285,551 B2 | 10/2012 | Gazdzinski |
| 8,285,553 B2 | 10/2012 | Gazdzinski |
| 8,290,777 B1 | 10/2012 | Nguyen et al. |
| 8,290,778 B2 | 10/2012 | Gazdzinski |
| 8,290,781 B2 | 10/2012 | Gazdzinski |
| 8,296,146 B2 | 10/2012 | Gazdzinski |
| 8,296,153 B2 | 10/2012 | Gazdzinski |
| 8,296,380 B1 | 10/2012 | Kelly et al. |
| 8,296,383 B2 | 10/2012 | Lindahl |
| 8,300,801 B2 | 10/2012 | Sweeney et al. |
| 8,301,456 B2 | 10/2012 | Gazdzinski |
| 8,311,834 B1 | 11/2012 | Gazdzinski |
| 8,321,786 B2 | 11/2012 | Lunati et al. |
| 8,332,224 B2 | 12/2012 | Di Cristo et al. |
| 8,332,748 B1 | 12/2012 | Karam |
| 8,345,665 B2 | 1/2013 | Vieri et al. |
| 8,352,183 B2 | 1/2013 | Thota et al. |
| 8,352,268 B2 | 1/2013 | Naik et al. |
| 8,352,272 B2 | 1/2013 | Rogers et al. |
| 8,355,919 B2 | 1/2013 | Silverman et al. |
| 8,359,234 B2 | 1/2013 | Vieri |
| 8,370,158 B2 | 2/2013 | Gazdzinski |
| 8,371,503 B2 | 2/2013 | Gazdzinski |
| 8,374,871 B2 | 2/2013 | Ehsani et al. |
| 8,375,320 B2 | 2/2013 | Kotler et al. |
| 8,380,504 B1 | 2/2013 | Peden et al. |
| 8,381,107 B2 | 2/2013 | Rottler et al. |
| 8,381,135 B2 | 2/2013 | Hotelling et al. |
| 8,396,714 B2 | 3/2013 | Rogers et al. |
| 8,423,288 B2 | 4/2013 | Stahl et al. |
| 8,428,758 B2 | 4/2013 | Naik et al. |
| 8,447,612 B2 | 5/2013 | Gazdzinski |
| 8,479,122 B2 | 7/2013 | Hotelling et al. |
| 8,489,599 B2 | 7/2013 | Bellotti |
| 8,498,857 B2 | 7/2013 | Kopparapu et al. |
| 8,521,513 B2 | 8/2013 | Millett et al. |
| 8,583,416 B2 | 11/2013 | Huang et al. |
| 8,589,869 B2 | 11/2013 | Wolfram |
| 8,595,004 B2 | 11/2013 | Koshinaka |
| 8,620,659 B2 | 12/2013 | Di Cristo et al. |
| 8,645,137 B2 | 2/2014 | Bellegarda et al. |
| 8,655,901 B1 | 2/2014 | Li et al. |
| 8,660,849 B2 | 2/2014 | Gruber et al. |
| 8,660,970 B1 | 2/2014 | Fiedorowicz |
| 8,688,446 B2 | 4/2014 | Yanagihara et al. |
| 8,706,472 B2 | 4/2014 | Ramerth et al. |
| 8,719,006 B2 | 5/2014 | Bellegarda et al. |
| 8,731,610 B2 | 5/2014 | Appaji |
| 8,760,537 B2 | 6/2014 | Johnson et al. |
| 8,768,693 B2 | 7/2014 | Bellegarda et al. |
| 8,775,931 B2 | 7/2014 | Fux et al. |
| 8,838,457 B2 * | 9/2014 | Cerra et al. .............. 704/275 |
| 8,880,405 B2 * | 11/2014 | Cerra et al. .............. 704/275 |
| 8,886,540 B2 * | 11/2014 | Cerra et al. .............. 704/270 |
| 8,943,423 B2 * | 1/2015 | Merrill et al. ............. 715/762 |
| 8,972,878 B2 | 3/2015 | Mohler et al. |
| 2001/0005859 A1 | 6/2001 | Okuyama et al. |
| 2001/0020259 A1 | 9/2001 | Sekiguchi et al. |
| 2001/0027396 A1 | 10/2001 | Sato |
| 2001/0029455 A1 | 10/2001 | Chin et al. |
| 2001/0030660 A1 | 10/2001 | Zainoulline |
| 2001/0032080 A1 | 10/2001 | Fukada |
| 2001/0041021 A1 | 11/2001 | Boyle et al. |
| 2001/0042107 A1 | 11/2001 | Palm |
| 2001/0044724 A1 | 11/2001 | Hon et al. |
| 2001/0047264 A1 | 11/2001 | Roundtree |
| 2001/0056342 A1 | 12/2001 | Piehn et al. |
| 2001/0056347 A1 | 12/2001 | Chazan et al. |
| 2002/0001395 A1 | 1/2002 | Davis et al. |
| 2002/0002039 A1 | 1/2002 | Qureshey et al. |
| 2002/0002413 A1 | 1/2002 | Tokue |
| 2002/0002461 A1 | 1/2002 | Tetsumoto |
| 2002/0004703 A1 | 1/2002 | Gaspard, II |
| 2002/0010581 A1 | 1/2002 | Euler et al. |
| 2002/0010584 A1 | 1/2002 | Schultz et al. |
| 2002/0010726 A1 | 1/2002 | Rogson |
| 2002/0010798 A1 | 1/2002 | Ben-Shaul et al. |
| 2002/0013707 A1 | 1/2002 | Shaw et al. |
| 2002/0013784 A1 | 1/2002 | Swanson |
| 2002/0013852 A1 | 1/2002 | Janik |
| 2002/0015024 A1 | 2/2002 | Westerman et al. |
| 2002/0015064 A1 | 2/2002 | Robotham et al. |
| 2002/0021278 A1 | 2/2002 | Hinckley et al. |
| 2002/0026315 A1 | 2/2002 | Miranda |
| 2002/0026456 A1 | 2/2002 | Bradford |
| 2002/0031254 A1 | 3/2002 | Lantrip et al. |
| 2002/0031262 A1 | 3/2002 | Imagawa et al. |
| 2002/0032048 A1 | 3/2002 | Kitao et al. |
| 2002/0032564 A1 | 3/2002 | Ehsani et al. |
| 2002/0032591 A1 | 3/2002 | Mahaffy et al. |
| 2002/0032751 A1 | 3/2002 | Bharadwaj |
| 2002/0035467 A1 | 3/2002 | Morimoto et al. |
| 2002/0035469 A1 | 3/2002 | Holzapfel |
| 2002/0035474 A1 | 3/2002 | Alpdemir |
| 2002/0040359 A1 | 4/2002 | Green et al. |
| 2002/0042707 A1 | 4/2002 | Zhao et al. |
| 2002/0045438 A1 | 4/2002 | Tagawa et al. |
| 2002/0045961 A1 | 4/2002 | Gibbs et al. |
| 2002/0046025 A1 | 4/2002 | Hain |
| 2002/0046315 A1 | 4/2002 | Miller et al. |
| 2002/0052730 A1 | 5/2002 | Nakao |
| 2002/0052740 A1 | 5/2002 | Charlesworth et al. |
| 2002/0052747 A1 | 5/2002 | Sarukkai |
| 2002/0054094 A1 | 5/2002 | Matsuda |
| 2002/0055844 A1 | 5/2002 | L'Esperance et al. |
| 2002/0055934 A1 | 5/2002 | Lipscomb et al. |
| 2002/0059066 A1 | 5/2002 | O'hagan |
| 2002/0059068 A1 | 5/2002 | Rose et al. |
| 2002/0065659 A1 | 5/2002 | Isono et al. |
| 2002/0065797 A1 | 5/2002 | Meidan et al. |
| 2002/0067308 A1 | 6/2002 | Robertson |
| 2002/0069063 A1 | 6/2002 | Buchner et al. |
| 2002/0069220 A1 | 6/2002 | Tran |
| 2002/0072816 A1 | 6/2002 | Shdema et al. |
| 2002/0072908 A1 | 6/2002 | Case et al. |
| 2002/0072914 A1 | 6/2002 | Alshawi et al. |
| 2002/0077082 A1 | 6/2002 | Cruickshank |
| 2002/0077817 A1 | 6/2002 | Atal |
| 2002/0078041 A1 | 6/2002 | Wu |
| 2002/0080163 A1 | 6/2002 | Morey |
| 2002/0085037 A1 | 7/2002 | Leavitt et al. |
| 2002/0087508 A1 | 7/2002 | Hull et al. |
| 2002/0091511 A1 | 7/2002 | Hellwig et al. |
| 2002/0095286 A1 | 7/2002 | Ross et al. |
| 2002/0095290 A1 | 7/2002 | Kahn et al. |
| 2002/0099547 A1 | 7/2002 | Chu et al. |
| 2002/0099552 A1 | 7/2002 | Rubin et al. |
| 2002/0101447 A1 | 8/2002 | Carro |
| 2002/0103641 A1 | 8/2002 | Kuo et al. |
| 2002/0103644 A1 | 8/2002 | Brocious et al. |
| 2002/0103646 A1 | 8/2002 | Kochanski et al. |
| 2002/0107684 A1 | 8/2002 | Gao |
| 2002/0109709 A1 | 8/2002 | Sagar |
| 2002/0110248 A1 | 8/2002 | Kovales et al. |
| 2002/0111810 A1 | 8/2002 | Khan et al. |

(56) References Cited

U.S. PATENT DOCUMENTS

| | | |
|---|---|---|
| 2002/0116082 A1 | 8/2002 | Gudorf |
| 2002/0116171 A1 | 8/2002 | Russell |
| 2002/0116185 A1 | 8/2002 | Cooper et al. |
| 2002/0116189 A1 | 8/2002 | Yeh et al. |
| 2002/0116420 A1 | 8/2002 | Allam et al. |
| 2002/0120697 A1 | 8/2002 | Generous et al. |
| 2002/0120925 A1 | 8/2002 | Logan |
| 2002/0122053 A1 | 9/2002 | Dutta et al. |
| 2002/0123894 A1 | 9/2002 | Woodward |
| 2002/0126097 A1 | 9/2002 | Savolainen |
| 2002/0128827 A1 | 9/2002 | Bu et al. |
| 2002/0128840 A1 | 9/2002 | Hinde et al. |
| 2002/0129057 A1 | 9/2002 | Spielberg |
| 2002/0133347 A1 | 9/2002 | Schoneburg et al. |
| 2002/0133348 A1 | 9/2002 | Pearson et al. |
| 2002/0135565 A1 | 9/2002 | Gordon et al. |
| 2002/0135618 A1 | 9/2002 | Maes et al. |
| 2002/0138254 A1 | 9/2002 | Isaka et al. |
| 2002/0138265 A1 | 9/2002 | Stevens et al. |
| 2002/0138270 A1 | 9/2002 | Bellegarda et al. |
| 2002/0138616 A1 | 9/2002 | Basson et al. |
| 2002/0140679 A1 | 10/2002 | Wen |
| 2002/0143533 A1 | 10/2002 | Lucas et al. |
| 2002/0143542 A1 | 10/2002 | Eide |
| 2002/0143551 A1 | 10/2002 | Sharma et al. |
| 2002/0143826 A1 | 10/2002 | Day et al. |
| 2002/0151297 A1 | 10/2002 | Remboski et al. |
| 2002/0152045 A1 | 10/2002 | Dowling et al. |
| 2002/0152255 A1 | 10/2002 | Smith et al. |
| 2002/0154160 A1 | 10/2002 | Hosokawa |
| 2002/0161865 A1 | 10/2002 | Nguyen |
| 2002/0163544 A1 | 11/2002 | Baker et al. |
| 2002/0164000 A1 | 11/2002 | Cohen et al. |
| 2002/0165918 A1 | 11/2002 | Bettis |
| 2002/0167534 A1 | 11/2002 | Burke |
| 2002/0169592 A1 | 11/2002 | Aityan |
| 2002/0169605 A1 | 11/2002 | Damiba et al. |
| 2002/0173273 A1 | 11/2002 | Spurgat et al. |
| 2002/0173889 A1 | 11/2002 | Odinak et al. |
| 2002/0173961 A1 | 11/2002 | Guerra |
| 2002/0173962 A1 | 11/2002 | Tang et al. |
| 2002/0173966 A1 | 11/2002 | Henton |
| 2002/0177993 A1 | 11/2002 | Veditz et al. |
| 2002/0184027 A1 | 12/2002 | Brittan et al. |
| 2002/0184189 A1 | 12/2002 | Hay et al. |
| 2002/0189426 A1 | 12/2002 | Hirade et al. |
| 2002/0191029 A1 | 12/2002 | Gillespie et al. |
| 2002/0193996 A1 | 12/2002 | Squibbs et al. |
| 2002/0198714 A1 | 12/2002 | Zhou |
| 2002/0198715 A1 | 12/2002 | Belrose |
| 2003/0001881 A1 | 1/2003 | Mannheimer et al. |
| 2003/0002632 A1 | 1/2003 | Bhogal et al. |
| 2003/0013483 A1 | 1/2003 | Ausems et al. |
| 2003/0016770 A1 | 1/2003 | Trans et al. |
| 2003/0020760 A1 | 1/2003 | Takatsu et al. |
| 2003/0026402 A1 | 2/2003 | Clapper |
| 2003/0028380 A1 | 2/2003 | Freeland et al. |
| 2003/0033153 A1 | 2/2003 | Olson et al. |
| 2003/0033214 A1 | 2/2003 | Mikkelsen et al. |
| 2003/0037073 A1 | 2/2003 | Tokuda et al. |
| 2003/0037254 A1 | 2/2003 | Fischer et al. |
| 2003/0040908 A1 | 2/2003 | Yang et al. |
| 2003/0046075 A1 | 3/2003 | Stone |
| 2003/0046401 A1 | 3/2003 | Abbott et al. |
| 2003/0046434 A1 | 3/2003 | Flanagin et al. |
| 2003/0050781 A1 | 3/2003 | Tamura et al. |
| 2003/0051136 A1 | 3/2003 | Curtis et al. |
| 2003/0055537 A1 | 3/2003 | Odinak et al. |
| 2003/0061317 A1 | 3/2003 | Brown et al. |
| 2003/0061570 A1 | 3/2003 | Hatori et al. |
| 2003/0063073 A1 | 4/2003 | Geaghan et al. |
| 2003/0074195 A1 | 4/2003 | Bartosik et al. |
| 2003/0074198 A1 | 4/2003 | Sussman |
| 2003/0074457 A1 | 4/2003 | Kluth |
| 2003/0076301 A1 | 4/2003 | Tsuk et al. |
| 2003/0078766 A1 | 4/2003 | Appelt et al. |
| 2003/0078780 A1 | 4/2003 | Kochanski et al. |
| 2003/0078969 A1 | 4/2003 | Sprague et al. |
| 2003/0079024 A1 | 4/2003 | Hough et al. |
| 2003/0079038 A1 | 4/2003 | Robbin et al. |
| 2003/0080991 A1 | 5/2003 | Crow et al. |
| 2003/0083113 A1 | 5/2003 | Chua et al. |
| 2003/0083878 A1 | 5/2003 | Lee et al. |
| 2003/0083884 A1 | 5/2003 | Odinak et al. |
| 2003/0084350 A1 | 5/2003 | Eibach et al. |
| 2003/0085870 A1 | 5/2003 | Hinckley |
| 2003/0086699 A1 | 5/2003 | Benyamin et al. |
| 2003/0088414 A1 | 5/2003 | Huang et al. |
| 2003/0088421 A1 | 5/2003 | Maes et al. |
| 2003/0090467 A1 | 5/2003 | Hohl et al. |
| 2003/0090474 A1 | 5/2003 | Schaefer |
| 2003/0095096 A1 | 5/2003 | Robbin et al. |
| 2003/0097210 A1 | 5/2003 | Horst et al. |
| 2003/0097379 A1 | 5/2003 | Ireton |
| 2003/0097408 A1 | 5/2003 | Kageyama et al. |
| 2003/0098892 A1 | 5/2003 | Hiipakka |
| 2003/0099335 A1 | 5/2003 | Tanaka et al. |
| 2003/0101045 A1 | 5/2003 | Moffatt et al. |
| 2003/0115060 A1 | 6/2003 | Junqua et al. |
| 2003/0115064 A1 | 6/2003 | Gusler et al. |
| 2003/0115186 A1 | 6/2003 | Wilkinson et al. |
| 2003/0115552 A1 | 6/2003 | Jahnke et al. |
| 2003/0117365 A1 | 6/2003 | Shteyn |
| 2003/0120494 A1 | 6/2003 | Jost et al. |
| 2003/0122787 A1 | 7/2003 | Zimmerman et al. |
| 2003/0125927 A1 | 7/2003 | Seme |
| 2003/0125955 A1 | 7/2003 | Arnold et al. |
| 2003/0126559 A1 | 7/2003 | Fuhrmann |
| 2003/0128819 A1 | 7/2003 | Lee et al. |
| 2003/0133694 A1 | 7/2003 | Yeo |
| 2003/0134678 A1 | 7/2003 | Tanaka |
| 2003/0135740 A1 | 7/2003 | Talmor et al. |
| 2003/0140088 A1 | 7/2003 | Robinson et al. |
| 2003/0144846 A1 | 7/2003 | Denenberg et al. |
| 2003/0145285 A1 | 7/2003 | Miyahira et al. |
| 2003/0147512 A1 | 8/2003 | Abburi |
| 2003/0149557 A1 | 8/2003 | Cox et al. |
| 2003/0149567 A1 | 8/2003 | Schmitz et al. |
| 2003/0149978 A1 | 8/2003 | Plotnick |
| 2003/0152203 A1 | 8/2003 | Berger et al. |
| 2003/0152894 A1 | 8/2003 | Townshend |
| 2003/0154081 A1 | 8/2003 | Chu et al. |
| 2003/0157968 A1 | 8/2003 | Boman et al. |
| 2003/0158735 A1 | 8/2003 | Yamada et al. |
| 2003/0158737 A1 | 8/2003 | Csicsatka |
| 2003/0160702 A1 | 8/2003 | Tanaka |
| 2003/0160830 A1 | 8/2003 | Degross |
| 2003/0163316 A1 | 8/2003 | Addison et al. |
| 2003/0164848 A1 | 9/2003 | Dutta et al. |
| 2003/0167167 A1 | 9/2003 | Gong |
| 2003/0167318 A1 | 9/2003 | Robbin et al. |
| 2003/0167335 A1 | 9/2003 | Alexander |
| 2003/0171928 A1 | 9/2003 | Falcon et al. |
| 2003/0171936 A1 | 9/2003 | Sall et al. |
| 2003/0174830 A1 | 9/2003 | Boyer et al. |
| 2003/0177046 A1 | 9/2003 | Socha-Leialoha et al. |
| 2003/0179222 A1 | 9/2003 | Noma et al. |
| 2003/0182115 A1 | 9/2003 | Malayath et al. |
| 2003/0182131 A1 | 9/2003 | Arnold et al. |
| 2003/0187655 A1 | 10/2003 | Dunsmuir |
| 2003/0187844 A1 | 10/2003 | Li et al. |
| 2003/0187925 A1 | 10/2003 | Inala et al. |
| 2003/0188005 A1 | 10/2003 | Yoneda et al. |
| 2003/0188192 A1 | 10/2003 | Tang et al. |
| 2003/0190074 A1 | 10/2003 | Loudon et al. |
| 2003/0191645 A1 | 10/2003 | Zhou |
| 2003/0193481 A1 | 10/2003 | Sokolsky |
| 2003/0194080 A1 | 10/2003 | Michaelis et al. |
| 2003/0195741 A1 | 10/2003 | Mani et al. |
| 2003/0197736 A1 | 10/2003 | Murphy |
| 2003/0197744 A1 | 10/2003 | Irvine |
| 2003/0200858 A1 | 10/2003 | Xie |
| 2003/0204392 A1 | 10/2003 | Finnigan et al. |
| 2003/0204492 A1 | 10/2003 | Wolf et al. |

(56) References Cited

U.S. PATENT DOCUMENTS

| | | |
|---|---|---|
| 2003/0208756 A1 | 11/2003 | Macrae et al. |
| 2003/0210266 A1 | 11/2003 | Cragun et al. |
| 2003/0212961 A1 | 11/2003 | Soin et al. |
| 2003/0214519 A1 | 11/2003 | Smith et al. |
| 2003/0224760 A1 | 12/2003 | Day |
| 2003/0228863 A1 | 12/2003 | Vander Veen et al. |
| 2003/0228909 A1 | 12/2003 | Tanaka et al. |
| 2003/0229490 A1 | 12/2003 | Etter |
| 2003/0229616 A1 | 12/2003 | Wong |
| 2003/0233230 A1 | 12/2003 | Ammicht et al. |
| 2003/0233237 A1 | 12/2003 | Garside et al. |
| 2003/0233240 A1 | 12/2003 | Kaatrasalo |
| 2003/0234824 A1 | 12/2003 | Litwiller |
| 2003/0236663 A1 | 12/2003 | Dimitrova et al. |
| 2004/0001396 A1 | 1/2004 | Keller et al. |
| 2004/0006467 A1 | 1/2004 | Anisimovich et al. |
| 2004/0012556 A1 | 1/2004 | Yong et al. |
| 2004/0013252 A1 | 1/2004 | Craner |
| 2004/0021676 A1 | 2/2004 | Chen et al. |
| 2004/0022369 A1* | 2/2004 | Vitikainen ............ H04M 3/533 379/67.1 |
| 2004/0022373 A1 | 2/2004 | Suder et al. |
| 2004/0023643 A1 | 2/2004 | Vander Veen et al. |
| 2004/0030556 A1 | 2/2004 | Bennett |
| 2004/0030559 A1 | 2/2004 | Payne et al. |
| 2004/0030996 A1 | 2/2004 | Van Liempd et al. |
| 2004/0036715 A1 | 2/2004 | Warren |
| 2004/0048627 A1 | 3/2004 | Olvera-Hernandez |
| 2004/0049391 A1 | 3/2004 | Polanyi et al. |
| 2004/0051729 A1 | 3/2004 | Borden, IV |
| 2004/0052338 A1 | 3/2004 | Celi, Jr. et al. |
| 2004/0054530 A1 | 3/2004 | Davis et al. |
| 2004/0054533 A1 | 3/2004 | Bellegarda |
| 2004/0054534 A1 | 3/2004 | Junqua |
| 2004/0054535 A1 | 3/2004 | Mackie et al. |
| 2004/0054541 A1 | 3/2004 | Kryze et al. |
| 2004/0054690 A1 | 3/2004 | Hillerbrand et al. |
| 2004/0055446 A1 | 3/2004 | Robbin et al. |
| 2004/0056899 A1 | 3/2004 | Sinclair, II et al. |
| 2004/0059577 A1 | 3/2004 | Pickering |
| 2004/0059790 A1 | 3/2004 | Austin-Lane et al. |
| 2004/0061717 A1 | 4/2004 | Menon et al. |
| 2004/0062367 A1 | 4/2004 | Fellenstein et al. |
| 2004/0064593 A1 | 4/2004 | Sinclair et al. |
| 2004/0069122 A1 | 4/2004 | Wilson |
| 2004/0070567 A1 | 4/2004 | Longe et al. |
| 2004/0070612 A1 | 4/2004 | Sinclair et al. |
| 2004/0073427 A1 | 4/2004 | Moore |
| 2004/0073428 A1 | 4/2004 | Zlokarnik et al. |
| 2004/0076086 A1 | 4/2004 | Keller et al. |
| 2004/0078382 A1 | 4/2004 | Mercer et al. |
| 2004/0085162 A1 | 5/2004 | Agarwal et al. |
| 2004/0085368 A1 | 5/2004 | Johnson, Jr. et al. |
| 2004/0086120 A1 | 5/2004 | Akins, III et al. |
| 2004/0093213 A1 | 5/2004 | Conkie |
| 2004/0093215 A1 | 5/2004 | Gupta et al. |
| 2004/0094018 A1 | 5/2004 | Ueshima et al. |
| 2004/0096105 A1 | 5/2004 | Holtsberg |
| 2004/0098250 A1 | 5/2004 | Kimchi et al. |
| 2004/0100479 A1 | 5/2004 | Nakano et al. |
| 2004/0106432 A1 | 6/2004 | Kanamori et al. |
| 2004/0107169 A1 | 6/2004 | Lowe |
| 2004/0111266 A1 | 6/2004 | Coorman et al. |
| 2004/0111332 A1 | 6/2004 | Baar et al. |
| 2004/0114731 A1 | 6/2004 | Gillett et al. |
| 2004/0122656 A1 | 6/2004 | Abir |
| 2004/0122664 A1 | 6/2004 | Lorenzo et al. |
| 2004/0124583 A1 | 7/2004 | Landis |
| 2004/0125088 A1 | 7/2004 | Zimmerman et al. |
| 2004/0125922 A1 | 7/2004 | Specht |
| 2004/0127198 A1 | 7/2004 | Roskind et al. |
| 2004/0127241 A1 | 7/2004 | Shostak |
| 2004/0128137 A1 | 7/2004 | Bush et al. |
| 2004/0133817 A1 | 7/2004 | Choi |
| 2004/0135701 A1 | 7/2004 | Yasuda et al. |
| 2004/0135774 A1 | 7/2004 | La Monica |
| 2004/0136510 A1 | 7/2004 | Vander Veen |
| 2004/0138869 A1 | 7/2004 | Heinecke |
| 2004/0145607 A1 | 7/2004 | Alderson |
| 2004/0153306 A1 | 8/2004 | Tanner et al. |
| 2004/0160419 A1 | 8/2004 | Padgitt |
| 2004/0162741 A1 | 8/2004 | Flaxer et al. |
| 2004/0174399 A1 | 9/2004 | Wu et al. |
| 2004/0174434 A1 | 9/2004 | Walker et al. |
| 2004/0176958 A1 | 9/2004 | Salmenkaita et al. |
| 2004/0177319 A1 | 9/2004 | Horn |
| 2004/0178994 A1 | 9/2004 | Kairls, Jr. |
| 2004/0183833 A1 | 9/2004 | Chua |
| 2004/0186713 A1 | 9/2004 | Gomas et al. |
| 2004/0186714 A1 | 9/2004 | Baker |
| 2004/0186777 A1 | 9/2004 | Margiloff et al. |
| 2004/0193398 A1 | 9/2004 | Chu et al. |
| 2004/0193420 A1 | 9/2004 | Kennewick et al. |
| 2004/0193421 A1 | 9/2004 | Blass |
| 2004/0193426 A1 | 9/2004 | Maddux et al. |
| 2004/0196256 A1 | 10/2004 | Wobbrock et al. |
| 2004/0198436 A1 | 10/2004 | Alden |
| 2004/0199375 A1 | 10/2004 | Ehsani et al. |
| 2004/0199387 A1 | 10/2004 | Wang et al. |
| 2004/0199663 A1 | 10/2004 | Horvitz et al. |
| 2004/0203520 A1 | 10/2004 | Schirtzinger et al. |
| 2004/0205151 A1 | 10/2004 | Sprigg et al. |
| 2004/0205671 A1 | 10/2004 | Sukehiro et al. |
| 2004/0208302 A1 | 10/2004 | Urban et al. |
| 2004/0210634 A1 | 10/2004 | Ferrer et al. |
| 2004/0213419 A1 | 10/2004 | Varma et al. |
| 2004/0215731 A1 | 10/2004 | Tzann-en Szeto |
| 2004/0216049 A1 | 10/2004 | Lewis et al. |
| 2004/0218451 A1 | 11/2004 | Said et al. |
| 2004/0220798 A1 | 11/2004 | Chi et al. |
| 2004/0223485 A1 | 11/2004 | Arellano et al. |
| 2004/0223599 A1 | 11/2004 | Bear et al. |
| 2004/0224638 A1 | 11/2004 | Fadell et al. |
| 2004/0225501 A1 | 11/2004 | Cutaia et al. |
| 2004/0225650 A1 | 11/2004 | Cooper et al. |
| 2004/0225746 A1 | 11/2004 | Niell et al. |
| 2004/0230637 A1* | 11/2004 | Lecoueche et al. ............ 709/200 |
| 2004/0236778 A1 | 11/2004 | Junqua et al. |
| 2004/0242286 A1 | 12/2004 | Benco et al. |
| 2004/0243412 A1 | 12/2004 | Gupta et al. |
| 2004/0243419 A1 | 12/2004 | Wang |
| 2004/0249629 A1 | 12/2004 | Webster |
| 2004/0249667 A1 | 12/2004 | Oon |
| 2004/0252119 A1 | 12/2004 | Hunleth et al. |
| 2004/0252604 A1 | 12/2004 | Johnson et al. |
| 2004/0252966 A1 | 12/2004 | Holloway et al. |
| 2004/0254791 A1 | 12/2004 | Coifman et al. |
| 2004/0254792 A1 | 12/2004 | Busayapongchai et al. |
| 2004/0257432 A1 | 12/2004 | Girish et al. |
| 2004/0259536 A1 | 12/2004 | Keskar et al. |
| 2004/0260438 A1 | 12/2004 | Chernetsky et al. |
| 2004/0261023 A1 | 12/2004 | Bier |
| 2004/0262051 A1 | 12/2004 | Carro |
| 2004/0263636 A1 | 12/2004 | Cutler et al. |
| 2004/0267825 A1 | 12/2004 | Novak et al. |
| 2004/0268253 A1 | 12/2004 | Demello et al. |
| 2004/0268262 A1 | 12/2004 | Gupta et al. |
| 2005/0002507 A1 | 1/2005 | Timmins et al. |
| 2005/0010409 A1 | 1/2005 | Hull et al. |
| 2005/0012723 A1 | 1/2005 | Pallakoff |
| 2005/0015254 A1 | 1/2005 | Beaman |
| 2005/0015772 A1 | 1/2005 | Saare et al. |
| 2005/0022114 A1 | 1/2005 | Shanahan et al. |
| 2005/0024341 A1 | 2/2005 | Gillespie et al. |
| 2005/0024345 A1 | 2/2005 | Eastty et al. |
| 2005/0027385 A1 | 2/2005 | Yueh |
| 2005/0030175 A1 | 2/2005 | Wolfe |
| 2005/0031106 A1 | 2/2005 | Henderson |
| 2005/0033582 A1 | 2/2005 | Gadd et al. |
| 2005/0033771 A1 | 2/2005 | Schmitter et al. |
| 2005/0034164 A1 | 2/2005 | Sano et al. |
| 2005/0038657 A1 | 2/2005 | Roth et al. |
| 2005/0039141 A1 | 2/2005 | Burke et al. |
| 2005/0043946 A1 | 2/2005 | Ueyama et al. |

(56) References Cited

U.S. PATENT DOCUMENTS

| | | |
|---|---|---|
| 2005/0043949 A1 | 2/2005 | Roth et al. |
| 2005/0044569 A1 | 2/2005 | Marcus |
| 2005/0045373 A1 | 3/2005 | Born |
| 2005/0049880 A1 | 3/2005 | Roth et al. |
| 2005/0055212 A1 | 3/2005 | Nagao |
| 2005/0055403 A1* | 3/2005 | Brittan .................. 709/206 |
| 2005/0058438 A1 | 3/2005 | Hayashi |
| 2005/0060155 A1 | 3/2005 | Chu et al. |
| 2005/0071165 A1 | 3/2005 | Hofstader et al. |
| 2005/0071332 A1 | 3/2005 | Ortega et al. |
| 2005/0071437 A1 | 3/2005 | Bear et al. |
| 2005/0074113 A1 | 4/2005 | Mathew et al. |
| 2005/0080613 A1 | 4/2005 | Colledge et al. |
| 2005/0080620 A1 | 4/2005 | Rao et al. |
| 2005/0080625 A1 | 4/2005 | Bennett et al. |
| 2005/0080632 A1 | 4/2005 | Endo et al. |
| 2005/0080780 A1 | 4/2005 | Colledge et al. |
| 2005/0086059 A1 | 4/2005 | Bennett |
| 2005/0086255 A1 | 4/2005 | Schran et al. |
| 2005/0086605 A1 | 4/2005 | Ferrer et al. |
| 2005/0091118 A1 | 4/2005 | Fano |
| 2005/0094475 A1 | 5/2005 | Naoi |
| 2005/0099398 A1 | 5/2005 | Garside et al. |
| 2005/0100214 A1 | 5/2005 | Zhang et al. |
| 2005/0102144 A1 | 5/2005 | Rapoport |
| 2005/0102614 A1 | 5/2005 | Brockett et al. |
| 2005/0102625 A1 | 5/2005 | Lee et al. |
| 2005/0105712 A1 | 5/2005 | Williams et al. |
| 2005/0108001 A1 | 5/2005 | Aarskog |
| 2005/0108017 A1 | 5/2005 | Esser et al. |
| 2005/0108074 A1 | 5/2005 | Bloechl et al. |
| 2005/0108338 A1 | 5/2005 | Simske et al. |
| 2005/0108344 A1 | 5/2005 | Tafoya et al. |
| 2005/0114124 A1 | 5/2005 | Liu et al. |
| 2005/0114140 A1 | 5/2005 | Brackett et al. |
| 2005/0119890 A1 | 6/2005 | Hirose |
| 2005/0119897 A1 | 6/2005 | Bennett et al. |
| 2005/0125216 A1 | 6/2005 | Chitrapura et al. |
| 2005/0125235 A1 | 6/2005 | Lazay et al. |
| 2005/0131951 A1 | 6/2005 | Zhang et al. |
| 2005/0132301 A1 | 6/2005 | Ikeda |
| 2005/0136949 A1 | 6/2005 | Barnes, Jr. |
| 2005/0138305 A1 | 6/2005 | Zellner |
| 2005/0140504 A1 | 6/2005 | Marshall et al. |
| 2005/0143972 A1 | 6/2005 | Gopalakrishnan et al. |
| 2005/0144003 A1 | 6/2005 | Iso-Sipila |
| 2005/0144070 A1 | 6/2005 | Cheshire |
| 2005/0144568 A1 | 6/2005 | Gruen et al. |
| 2005/0148356 A1 | 7/2005 | Ferguson et al. |
| 2005/0149214 A1 | 7/2005 | Yoo et al. |
| 2005/0149330 A1 | 7/2005 | Katae |
| 2005/0149332 A1 | 7/2005 | Kuzunuki et al. |
| 2005/0149510 A1 | 7/2005 | Shafrir |
| 2005/0152558 A1 | 7/2005 | Van Tassel |
| 2005/0152602 A1 | 7/2005 | Chen et al. |
| 2005/0154578 A1 | 7/2005 | Tong et al. |
| 2005/0154591 A1* | 7/2005 | Lecoeuche .................. 704/270.1 |
| 2005/0159939 A1 | 7/2005 | Mohler et al. |
| 2005/0162395 A1 | 7/2005 | Unruh |
| 2005/0165607 A1 | 7/2005 | DiFabbrizio et al. |
| 2005/0166153 A1 | 7/2005 | Eytchison et al. |
| 2005/0177445 A1 | 8/2005 | Church |
| 2005/0181770 A1 | 8/2005 | Helferich |
| 2005/0182616 A1 | 8/2005 | Kotipalli |
| 2005/0182627 A1 | 8/2005 | Tanaka et al. |
| 2005/0182628 A1 | 8/2005 | Choi |
| 2005/0182629 A1 | 8/2005 | Coorman et al. |
| 2005/0182630 A1 | 8/2005 | Miro et al. |
| 2005/0182765 A1 | 8/2005 | Liddy |
| 2005/0187773 A1 | 8/2005 | Filoche et al. |
| 2005/0190970 A1 | 9/2005 | Griffin |
| 2005/0192801 A1 | 9/2005 | Lewis et al. |
| 2005/0195077 A1 | 9/2005 | Mcculloch et al. |
| 2005/0195429 A1 | 9/2005 | Archbold |
| 2005/0196733 A1 | 9/2005 | Budra et al. |
| 2005/0201572 A1 | 9/2005 | Lindahl et al. |
| 2005/0202854 A1 | 9/2005 | Kortum et al. |
| 2005/0203747 A1* | 9/2005 | Lecoeuche .................. 704/270.1 |
| 2005/0203991 A1 | 9/2005 | Kawamura et al. |
| 2005/0209848 A1 | 9/2005 | Ishii |
| 2005/0210394 A1 | 9/2005 | Crandall et al. |
| 2005/0216331 A1 | 9/2005 | Ahrens et al. |
| 2005/0222843 A1 | 10/2005 | Kahn et al. |
| 2005/0222973 A1 | 10/2005 | Kaiser |
| 2005/0228665 A1 | 10/2005 | Kobayashi et al. |
| 2005/0245243 A1 | 11/2005 | Zuniga |
| 2005/0246350 A1 | 11/2005 | Canaran |
| 2005/0246365 A1 | 11/2005 | Lowles et al. |
| 2005/0246726 A1 | 11/2005 | Labrou et al. |
| 2005/0267738 A1 | 12/2005 | Wilkinson et al. |
| 2005/0267757 A1 | 12/2005 | Iso-Sipila et al. |
| 2005/0271216 A1 | 12/2005 | Lashkari |
| 2005/0273337 A1 | 12/2005 | Erell et al. |
| 2005/0273626 A1 | 12/2005 | Pearson et al. |
| 2005/0278297 A1 | 12/2005 | Nelson |
| 2005/0278643 A1 | 12/2005 | Ukai et al. |
| 2005/0278647 A1 | 12/2005 | Leavitt et al. |
| 2005/0283364 A1 | 12/2005 | Longe et al. |
| 2005/0283726 A1 | 12/2005 | Lunati |
| 2005/0283729 A1 | 12/2005 | Morris et al. |
| 2005/0288934 A1 | 12/2005 | Omi |
| 2005/0288936 A1 | 12/2005 | Busayapongchai et al. |
| 2005/0289463 A1 | 12/2005 | Wu et al. |
| 2006/0001652 A1 | 1/2006 | Chiu et al. |
| 2006/0004570 A1 | 1/2006 | Ju et al. |
| 2006/0004744 A1 | 1/2006 | Nevidomski et al. |
| 2006/0007174 A1 | 1/2006 | Shen |
| 2006/0009973 A1 | 1/2006 | Nguyen et al. |
| 2006/0013414 A1 | 1/2006 | Shih |
| 2006/0015341 A1 | 1/2006 | Baker |
| 2006/0015819 A1 | 1/2006 | Hawkins et al. |
| 2006/0018446 A1 | 1/2006 | Schmandt et al. |
| 2006/0018492 A1 | 1/2006 | Chiu et al. |
| 2006/0020890 A1 | 1/2006 | Kroll et al. |
| 2006/0025999 A1 | 2/2006 | Feng et al. |
| 2006/0026233 A1 | 2/2006 | Tenembaum et al. |
| 2006/0026521 A1 | 2/2006 | Hotelling et al. |
| 2006/0026535 A1 | 2/2006 | Hotelling et al. |
| 2006/0026536 A1 | 2/2006 | Hotelling et al. |
| 2006/0033724 A1 | 2/2006 | Chaudhri et al. |
| 2006/0035632 A1 | 2/2006 | Sorvari et al. |
| 2006/0036946 A1 | 2/2006 | Radtke et al. |
| 2006/0041424 A1 | 2/2006 | Todhunter et al. |
| 2006/0041431 A1 | 2/2006 | Maes |
| 2006/0047632 A1 | 3/2006 | Zhang |
| 2006/0050865 A1 | 3/2006 | Kortum et al. |
| 2006/0052141 A1 | 3/2006 | Suzuki |
| 2006/0053365 A1 | 3/2006 | Hollander et al. |
| 2006/0053379 A1 | 3/2006 | Henderson et al. |
| 2006/0053387 A1 | 3/2006 | Ording |
| 2006/0058999 A1 | 3/2006 | Barker et al. |
| 2006/0059437 A1 | 3/2006 | Conklin |
| 2006/0060762 A1 | 3/2006 | Chan et al. |
| 2006/0061488 A1 | 3/2006 | Dunton |
| 2006/0067535 A1 | 3/2006 | Culbert et al. |
| 2006/0067536 A1 | 3/2006 | Culbert et al. |
| 2006/0069567 A1 | 3/2006 | Tischer et al. |
| 2006/0069664 A1 | 3/2006 | Ling et al. |
| 2006/0072248 A1 | 4/2006 | Watanabe et al. |
| 2006/0072716 A1 | 4/2006 | Pham |
| 2006/0074628 A1 | 4/2006 | Elbaz et al. |
| 2006/0074660 A1 | 4/2006 | Waters et al. |
| 2006/0074674 A1 | 4/2006 | Zhang et al. |
| 2006/0074750 A1 | 4/2006 | Clark et al. |
| 2006/0074898 A1 | 4/2006 | Gavalda et al. |
| 2006/0077055 A1 | 4/2006 | Basir |
| 2006/0080098 A1 | 4/2006 | Campbell |
| 2006/0085187 A1 | 4/2006 | Barquilla |
| 2006/0085465 A1 | 4/2006 | Nori et al. |
| 2006/0085757 A1 | 4/2006 | Andre et al. |
| 2006/0095265 A1 | 5/2006 | Chu et al. |
| 2006/0095790 A1 | 5/2006 | Nguyen et al. |
| 2006/0095846 A1 | 5/2006 | Nurmi |
| 2006/0095848 A1 | 5/2006 | Naik |

(56) References Cited

U.S. PATENT DOCUMENTS

| | | |
|---|---|---|
| 2006/0097991 A1 | 5/2006 | Hotelling et al. |
| 2006/0100848 A1 | 5/2006 | Cozzi et al. |
| 2006/0100849 A1 | 5/2006 | Chan |
| 2006/0101354 A1 | 5/2006 | Hashimoto et al. |
| 2006/0103633 A1 | 5/2006 | Gioeli |
| 2006/0106592 A1 | 5/2006 | Brockett et al. |
| 2006/0106594 A1 | 5/2006 | Brockett et al. |
| 2006/0106595 A1 | 5/2006 | Brockett et al. |
| 2006/0111906 A1 | 5/2006 | Cross et al. |
| 2006/0111909 A1 | 5/2006 | Maes et al. |
| 2006/0116874 A1 | 6/2006 | Samuelsson et al. |
| 2006/0116877 A1 | 6/2006 | Pickering et al. |
| 2006/0117002 A1 | 6/2006 | Swen |
| 2006/0119582 A1 | 6/2006 | Ng et al. |
| 2006/0122834 A1 | 6/2006 | Bennett |
| 2006/0122836 A1 | 6/2006 | Cross et al. |
| 2006/0129929 A1 | 6/2006 | Weber et al. |
| 2006/0132812 A1 | 6/2006 | Barnes et al. |
| 2006/0136213 A1 | 6/2006 | Hirose et al. |
| 2006/0141990 A1 | 6/2006 | Zak et al. |
| 2006/0143007 A1 | 6/2006 | Koh et al. |
| 2006/0143576 A1 | 6/2006 | Gupta et al. |
| 2006/0148520 A1 | 7/2006 | Baker et al. |
| 2006/0150087 A1 | 7/2006 | Cronenberger et al. |
| 2006/0152496 A1 | 7/2006 | Knaven |
| 2006/0153040 A1 | 7/2006 | Girish et al. |
| 2006/0156252 A1 | 7/2006 | Sheshagiri et al. |
| 2006/0156307 A1 | 7/2006 | Kunjithapatham et al. |
| 2006/0161870 A1 | 7/2006 | Hotelling et al. |
| 2006/0161871 A1 | 7/2006 | Hotelling et al. |
| 2006/0161872 A1 | 7/2006 | Rytivaara et al. |
| 2006/0165105 A1 | 7/2006 | Shenfield et al. |
| 2006/0167676 A1 | 7/2006 | Plumb |
| 2006/0168150 A1 | 7/2006 | Naik et al. |
| 2006/0168507 A1 | 7/2006 | Hansen |
| 2006/0168539 A1 | 7/2006 | Hawkins et al. |
| 2006/0172720 A1 | 8/2006 | Islam et al. |
| 2006/0174207 A1 | 8/2006 | Deshpande |
| 2006/0178868 A1 | 8/2006 | Billerey-Mosier |
| 2006/0181519 A1 | 8/2006 | Vernier et al. |
| 2006/0183466 A1 | 8/2006 | Lee et al. |
| 2006/0184886 A1 | 8/2006 | Chung et al. |
| 2006/0187073 A1 | 8/2006 | Lin et al. |
| 2006/0190269 A1 | 8/2006 | Tessel et al. |
| 2006/0190577 A1 | 8/2006 | Yamada |
| 2006/0193518 A1 | 8/2006 | Dong |
| 2006/0195206 A1 | 8/2006 | Moon et al. |
| 2006/0195323 A1 | 8/2006 | Monne et al. |
| 2006/0197753 A1 | 9/2006 | Hotelling |
| 2006/0197755 A1 | 9/2006 | Bawany |
| 2006/0200253 A1 | 9/2006 | Hoffberg et al. |
| 2006/0200342 A1 | 9/2006 | Corston-Oliver et al. |
| 2006/0200347 A1 | 9/2006 | Kim et al. |
| 2006/0205432 A1 | 9/2006 | Hawkins et al. |
| 2006/0206454 A1 | 9/2006 | Forstall et al. |
| 2006/0212415 A1 | 9/2006 | Backer et al. |
| 2006/0217967 A1 | 9/2006 | Goertzen et al. |
| 2006/0221738 A1 | 10/2006 | Park et al. |
| 2006/0221788 A1 | 10/2006 | Lindahl et al. |
| 2006/0224570 A1 | 10/2006 | Quiroga et al. |
| 2006/0229802 A1 | 10/2006 | Vertelney et al. |
| 2006/0229870 A1 | 10/2006 | Kobal |
| 2006/0229876 A1 | 10/2006 | Aaron et al. |
| 2006/0230410 A1 | 10/2006 | Kurganov et al. |
| 2006/0234680 A1 | 10/2006 | Doulton |
| 2006/0235550 A1 | 10/2006 | Csicsatka et al. |
| 2006/0235700 A1 | 10/2006 | Wong et al. |
| 2006/0235841 A1 | 10/2006 | Betz et al. |
| 2006/0236262 A1 | 10/2006 | Bathiche et al. |
| 2006/0239419 A1 | 10/2006 | Joseph et al. |
| 2006/0239471 A1 | 10/2006 | Mao et al. |
| 2006/0240866 A1 | 10/2006 | Eilts et al. |
| 2006/0242190 A1 | 10/2006 | Wnek |
| 2006/0246955 A1 | 11/2006 | Nirhamo et al. |
| 2006/0247931 A1 | 11/2006 | Caskey et al. |
| 2006/0252457 A1 | 11/2006 | Schrager |
| 2006/0253210 A1 | 11/2006 | Rosenberg |
| 2006/0253787 A1 | 11/2006 | Fogg |
| 2006/0256934 A1 | 11/2006 | Mazor |
| 2006/0262876 A1 | 11/2006 | LaDue |
| 2006/0265208 A1 | 11/2006 | Assadollahi |
| 2006/0265503 A1 | 11/2006 | Jones et al. |
| 2006/0265648 A1 | 11/2006 | Rainisto et al. |
| 2006/0271627 A1 | 11/2006 | Szczepanek |
| 2006/0274051 A1 | 12/2006 | Longe et al. |
| 2006/0274905 A1 | 12/2006 | Lindahl et al. |
| 2006/0277058 A1 | 12/2006 | J'maev et al. |
| 2006/0282264 A1 | 12/2006 | Denny et al. |
| 2006/0282415 A1 | 12/2006 | Shibata et al. |
| 2006/0286527 A1 | 12/2006 | Morel |
| 2006/0288024 A1 | 12/2006 | Braica |
| 2006/0291666 A1 | 12/2006 | Ball et al. |
| 2006/0293876 A1 | 12/2006 | Kamatani et al. |
| 2006/0293880 A1 | 12/2006 | Elshishiny et al. |
| 2006/0293886 A1 | 12/2006 | Odell et al. |
| 2007/0003026 A1 | 1/2007 | Hodge et al. |
| 2007/0004451 A1 | 1/2007 | Anderson |
| 2007/0005849 A1 | 1/2007 | Oliver |
| 2007/0006098 A1 | 1/2007 | Krumm et al. |
| 2007/0011154 A1 | 1/2007 | Musgrove et al. |
| 2007/0016563 A1 | 1/2007 | Omoigui |
| 2007/0016865 A1 | 1/2007 | Johnson et al. |
| 2007/0021956 A1 | 1/2007 | Qu et al. |
| 2007/0022380 A1 | 1/2007 | Swartz et al. |
| 2007/0025704 A1 | 2/2007 | Tsukazaki et al. |
| 2007/0026852 A1 | 2/2007 | Logan et al. |
| 2007/0027732 A1 | 2/2007 | Hudgens |
| 2007/0028009 A1 | 2/2007 | Robbin et al. |
| 2007/0032247 A1 | 2/2007 | Shaffer et al. |
| 2007/0033003 A1 | 2/2007 | Morris |
| 2007/0033026 A1 | 2/2007 | Bartosik et al. |
| 2007/0036117 A1 | 2/2007 | Taube et al. |
| 2007/0036286 A1 | 2/2007 | Champlin et al. |
| 2007/0038436 A1 | 2/2007 | Cristo et al. |
| 2007/0038609 A1 | 2/2007 | Wu |
| 2007/0040813 A1 | 2/2007 | Kushler et al. |
| 2007/0041361 A1 | 2/2007 | Iso-Sipila |
| 2007/0043568 A1 | 2/2007 | Dhanakshirur et al. |
| 2007/0044038 A1 | 2/2007 | Horentrup et al. |
| 2007/0046641 A1 | 3/2007 | Lim |
| 2007/0047719 A1 | 3/2007 | Dhawan et al. |
| 2007/0050184 A1 | 3/2007 | Drucker et al. |
| 2007/0050191 A1 | 3/2007 | Weider et al. |
| 2007/0050393 A1 | 3/2007 | Vogel et al. |
| 2007/0050712 A1 | 3/2007 | Hull et al. |
| 2007/0052586 A1 | 3/2007 | Horstemeyer |
| 2007/0055493 A1 | 3/2007 | Lee |
| 2007/0055508 A1 | 3/2007 | Zhao et al. |
| 2007/0055514 A1 | 3/2007 | Beattie et al. |
| 2007/0055525 A1 | 3/2007 | Kennewick et al. |
| 2007/0055529 A1 | 3/2007 | Kanevsky et al. |
| 2007/0058832 A1 | 3/2007 | Hug et al. |
| 2007/0060107 A1 | 3/2007 | Day |
| 2007/0061487 A1 | 3/2007 | Moore et al. |
| 2007/0061712 A1 | 3/2007 | Bodin et al. |
| 2007/0061754 A1 | 3/2007 | Ardhanari et al. |
| 2007/0067173 A1 | 3/2007 | Bellegarda |
| 2007/0067272 A1 | 3/2007 | Flynt et al. |
| 2007/0073540 A1 | 3/2007 | Hirakawa et al. |
| 2007/0073541 A1 | 3/2007 | Tian |
| 2007/0073745 A1 | 3/2007 | Scott et al. |
| 2007/0075965 A1 | 4/2007 | Huppi et al. |
| 2007/0079027 A1 | 4/2007 | Marriott et al. |
| 2007/0080936 A1 | 4/2007 | Tsuk et al. |
| 2007/0083467 A1 | 4/2007 | Lindahl et al. |
| 2007/0083623 A1 | 4/2007 | Nishimura et al. |
| 2007/0088556 A1 | 4/2007 | Andrew |
| 2007/0089132 A1 | 4/2007 | Qureshey et al. |
| 2007/0089135 A1 | 4/2007 | Qureshey et al. |
| 2007/0093277 A1 | 4/2007 | Cavacuiti et al. |
| 2007/0094026 A1 | 4/2007 | Ativanichayaphong et al. |
| 2007/0098195 A1 | 5/2007 | Holmes |
| 2007/0100206 A1 | 5/2007 | Lin et al. |
| 2007/0100602 A1 | 5/2007 | Kim |

(56) References Cited

U.S. PATENT DOCUMENTS

| | | |
|---|---|---|
| 2007/0100619 A1 | 5/2007 | Purho et al. |
| 2007/0100635 A1 | 5/2007 | Mahajan et al. |
| 2007/0100709 A1 | 5/2007 | Lee et al. |
| 2007/0100790 A1 | 5/2007 | Cheyer et al. |
| 2007/0100883 A1 | 5/2007 | Rose et al. |
| 2007/0106512 A1 | 5/2007 | Acero et al. |
| 2007/0106513 A1 | 5/2007 | Boillot et al. |
| 2007/0106674 A1 | 5/2007 | Agrawal et al. |
| 2007/0116195 A1 | 5/2007 | Thompson et al. |
| 2007/0118377 A1 | 5/2007 | Badino et al. |
| 2007/0118378 A1 | 5/2007 | Skuratovsky |
| 2007/0121846 A1 | 5/2007 | Altberg et al. |
| 2007/0124149 A1 | 5/2007 | Shen et al. |
| 2007/0124676 A1 | 5/2007 | Amundsen et al. |
| 2007/0127888 A1 | 6/2007 | Hayashi et al. |
| 2007/0128777 A1 | 6/2007 | Yin et al. |
| 2007/0129059 A1 | 6/2007 | Nadarajah et al. |
| 2007/0130014 A1 | 6/2007 | Altberg et al. |
| 2007/0130128 A1 | 6/2007 | Garg et al. |
| 2007/0132738 A1 | 6/2007 | Lowles et al. |
| 2007/0135949 A1 | 6/2007 | Snover et al. |
| 2007/0136064 A1 | 6/2007 | Carroll |
| 2007/0136778 A1 | 6/2007 | Birger et al. |
| 2007/0143163 A1 | 6/2007 | Weiss et al. |
| 2007/0149252 A1 | 6/2007 | Jobs et al. |
| 2007/0150842 A1 | 6/2007 | Chaudhri et al. |
| 2007/0152978 A1 | 7/2007 | Kocienda et al. |
| 2007/0152980 A1 | 7/2007 | Kocienda et al. |
| 2007/0155346 A1 | 7/2007 | Mijatovic et al. |
| 2007/0156410 A1 | 7/2007 | Stohr et al. |
| 2007/0156627 A1 | 7/2007 | D'Alicandro |
| 2007/0157089 A1 | 7/2007 | Van Os et al. |
| 2007/0157268 A1 | 7/2007 | Girish et al. |
| 2007/0162296 A1 | 7/2007 | Altberg et al. |
| 2007/0162414 A1 | 7/2007 | Horowitz et al. |
| 2007/0168922 A1 | 7/2007 | Kaiser et al. |
| 2007/0173233 A1 | 7/2007 | Vander Veen et al. |
| 2007/0173267 A1 | 7/2007 | Klassen et al. |
| 2007/0174188 A1 | 7/2007 | Fish |
| 2007/0174396 A1 | 7/2007 | Kumar et al. |
| 2007/0179776 A1 | 8/2007 | Segond et al. |
| 2007/0179778 A1 | 8/2007 | Gong et al. |
| 2007/0180383 A1 | 8/2007 | Naik |
| 2007/0182595 A1 | 8/2007 | Ghasabian |
| 2007/0185551 A1 | 8/2007 | Meadows et al. |
| 2007/0185754 A1 | 8/2007 | Schmidt |
| 2007/0185831 A1 | 8/2007 | Churcher |
| 2007/0185917 A1 | 8/2007 | Prahlad et al. |
| 2007/0188901 A1 | 8/2007 | Heckerman et al. |
| 2007/0192027 A1 | 8/2007 | Lee et al. |
| 2007/0192105 A1 | 8/2007 | Neeracher et al. |
| 2007/0192293 A1 | 8/2007 | Swen |
| 2007/0192403 A1 | 8/2007 | Heine et al. |
| 2007/0192744 A1 | 8/2007 | Reponen |
| 2007/0198269 A1 | 8/2007 | Braho et al. |
| 2007/0198273 A1 | 8/2007 | Hennecke |
| 2007/0198566 A1 | 8/2007 | Sustik |
| 2007/0203955 A1 | 8/2007 | Pomerantz |
| 2007/0207785 A1 | 9/2007 | Chatterjee et al. |
| 2007/0208555 A1* | 9/2007 | Blass ............................... 704/9 |
| 2007/0208569 A1 | 9/2007 | Subramanian et al. |
| 2007/0208579 A1 | 9/2007 | Peterson |
| 2007/0208726 A1 | 9/2007 | Krishnaprasad et al. |
| 2007/0211071 A1 | 9/2007 | Slotznick et al. |
| 2007/0213099 A1 | 9/2007 | Bast |
| 2007/0213857 A1 | 9/2007 | Bodin et al. |
| 2007/0213984 A1* | 9/2007 | Ativanichayaphong G06F 3/167 704/257 |
| 2007/0219777 A1 | 9/2007 | Chu et al. |
| 2007/0219803 A1 | 9/2007 | Chiu et al. |
| 2007/0219983 A1 | 9/2007 | Fish |
| 2007/0225980 A1 | 9/2007 | Sumita |
| 2007/0225984 A1 | 9/2007 | Milstein et al. |
| 2007/0226652 A1 | 9/2007 | Kikuchi et al. |
| 2007/0229323 A1 | 10/2007 | Plachta et al. |
| 2007/0230729 A1 | 10/2007 | Naylor et al. |
| 2007/0233490 A1 | 10/2007 | Yao |
| 2007/0233497 A1 | 10/2007 | Paek et al. |
| 2007/0233692 A1 | 10/2007 | Lisa et al. |
| 2007/0233725 A1 | 10/2007 | Michmerhuizen et al. |
| 2007/0238488 A1 | 10/2007 | Scott |
| 2007/0238489 A1 | 10/2007 | Scott |
| 2007/0238520 A1 | 10/2007 | Kacmarcik |
| 2007/0239429 A1 | 10/2007 | Johnson et al. |
| 2007/0240043 A1 | 10/2007 | Fux et al. |
| 2007/0240044 A1 | 10/2007 | Fux et al. |
| 2007/0240045 A1 | 10/2007 | Fux et al. |
| 2007/0244702 A1 | 10/2007 | Kahn et al. |
| 2007/0247441 A1 | 10/2007 | Kim et al. |
| 2007/0255435 A1 | 11/2007 | Cohen et al. |
| 2007/0255979 A1 | 11/2007 | Deily et al. |
| 2007/0257890 A1 | 11/2007 | Hotelling et al. |
| 2007/0258642 A1 | 11/2007 | Thota |
| 2007/0260460 A1 | 11/2007 | Hyatt |
| 2007/0260595 A1 | 11/2007 | Beatty et al. |
| 2007/0260822 A1 | 11/2007 | Adams |
| 2007/0261080 A1 | 11/2007 | Saetti |
| 2007/0265831 A1 | 11/2007 | Dinur et al. |
| 2007/0271104 A1 | 11/2007 | Mckay |
| 2007/0271510 A1 | 11/2007 | Grigoriu et al. |
| 2007/0274468 A1 | 11/2007 | Cai |
| 2007/0276651 A1 | 11/2007 | Bliss et al. |
| 2007/0276714 A1 | 11/2007 | Beringer |
| 2007/0276810 A1 | 11/2007 | Rosen |
| 2007/0277088 A1 | 11/2007 | Bodin et al. |
| 2007/0282595 A1 | 12/2007 | Tunning et al. |
| 2007/0285958 A1 | 12/2007 | Platchta et al. |
| 2007/0286363 A1 | 12/2007 | Burg et al. |
| 2007/0288241 A1 | 12/2007 | Cross et al. |
| 2007/0288449 A1 | 12/2007 | Datta et al. |
| 2007/0291108 A1 | 12/2007 | Huber et al. |
| 2007/0294077 A1 | 12/2007 | Narayanan et al. |
| 2007/0294263 A1 | 12/2007 | Punj et al. |
| 2007/0299664 A1 | 12/2007 | Peters et al. |
| 2007/0299831 A1 | 12/2007 | Williams et al. |
| 2007/0300140 A1 | 12/2007 | Makela et al. |
| 2008/0010355 A1 | 1/2008 | Vieri et al. |
| 2008/0012950 A1 | 1/2008 | Lee et al. |
| 2008/0013751 A1 | 1/2008 | Hiselius |
| 2008/0015864 A1* | 1/2008 | Ross et al. .................... 704/275 |
| 2008/0016575 A1 | 1/2008 | Vincent et al. |
| 2008/0021708 A1 | 1/2008 | Bennett et al. |
| 2008/0022208 A1 | 1/2008 | Morse |
| 2008/0031475 A1 | 2/2008 | Goldstein |
| 2008/0034032 A1 | 2/2008 | Healey et al. |
| 2008/0034044 A1 | 2/2008 | Bhakta et al. |
| 2008/0036743 A1 | 2/2008 | Westerman et al. |
| 2008/0040339 A1 | 2/2008 | Zhou et al. |
| 2008/0042970 A1 | 2/2008 | Liang et al. |
| 2008/0043936 A1 | 2/2008 | Liebermann |
| 2008/0043943 A1 | 2/2008 | Sipher et al. |
| 2008/0046239 A1 | 2/2008 | Boo |
| 2008/0046422 A1 | 2/2008 | Lee et al. |
| 2008/0046820 A1 | 2/2008 | Lee et al. |
| 2008/0046948 A1 | 2/2008 | Verosub |
| 2008/0048908 A1 | 2/2008 | Sato |
| 2008/0052063 A1 | 2/2008 | Bennett et al. |
| 2008/0052073 A1 | 2/2008 | Goto et al. |
| 2008/0052077 A1 | 2/2008 | Bennett et al. |
| 2008/0056459 A1 | 3/2008 | Vallier et al. |
| 2008/0056579 A1 | 3/2008 | Guha |
| 2008/0057922 A1 | 3/2008 | Kokes et al. |
| 2008/0059190 A1 | 3/2008 | Chu et al. |
| 2008/0059200 A1 | 3/2008 | Puli |
| 2008/0059876 A1 | 3/2008 | Hantler et al. |
| 2008/0062141 A1 | 3/2008 | Chandhri |
| 2008/0065382 A1 | 3/2008 | Gerl et al. |
| 2008/0065387 A1 | 3/2008 | Cross et al. |
| 2008/0071529 A1 | 3/2008 | Silverman et al. |
| 2008/0071544 A1 | 3/2008 | Beaufays et al. |
| 2008/0075296 A1 | 3/2008 | Lindahl et al. |
| 2008/0076972 A1 | 3/2008 | Dorogusker et al. |
| 2008/0077310 A1 | 3/2008 | Murlidar et al. |

(56) References Cited

U.S. PATENT DOCUMENTS

| | | |
|---|---|---|
| 2008/0077384 A1 | 3/2008 | Agapi et al. |
| 2008/0077386 A1 | 3/2008 | Gao et al. |
| 2008/0077391 A1 | 3/2008 | Chino et al. |
| 2008/0077393 A1 | 3/2008 | Gao et al. |
| 2008/0077406 A1 | 3/2008 | Ganong, III |
| 2008/0077859 A1 | 3/2008 | Schabes et al. |
| 2008/0079566 A1 | 4/2008 | Singh et al. |
| 2008/0082332 A1 | 4/2008 | Mallett et al. |
| 2008/0082338 A1 | 4/2008 | O'Neil et al. |
| 2008/0082390 A1 | 4/2008 | Hawkins et al. |
| 2008/0082576 A1 | 4/2008 | Bodin et al. |
| 2008/0082651 A1 | 4/2008 | Singh et al. |
| 2008/0084974 A1 | 4/2008 | Dhanakshirur |
| 2008/0091406 A1 | 4/2008 | Baldwin et al. |
| 2008/0091426 A1 | 4/2008 | Rempel et al. |
| 2008/0091443 A1 | 4/2008 | Strope et al. |
| 2008/0096531 A1 | 4/2008 | Mcquaide et al. |
| 2008/0096726 A1 | 4/2008 | Riley et al. |
| 2008/0097937 A1 | 4/2008 | Hadjarian |
| 2008/0098302 A1 | 4/2008 | Roose |
| 2008/0098480 A1 | 4/2008 | Henry et al. |
| 2008/0100579 A1 | 5/2008 | Robinson et al. |
| 2008/0101584 A1 | 5/2008 | Gray et al. |
| 2008/0109222 A1 | 5/2008 | Liu |
| 2008/0109402 A1 | 5/2008 | Wang et al. |
| 2008/0114480 A1 | 5/2008 | Harb |
| 2008/0114598 A1 | 5/2008 | Prieto et al. |
| 2008/0114841 A1 | 5/2008 | Lambert |
| 2008/0118143 A1 | 5/2008 | Gordon et al. |
| 2008/0120102 A1 | 5/2008 | Rao |
| 2008/0120112 A1 | 5/2008 | Jordan et al. |
| 2008/0120342 A1 | 5/2008 | Reed et al. |
| 2008/0122796 A1 | 5/2008 | Jobs et al. |
| 2008/0126077 A1 | 5/2008 | Thorn |
| 2008/0126091 A1 | 5/2008 | Clark et al. |
| 2008/0126093 A1 | 5/2008 | Sivadas |
| 2008/0126100 A1 | 5/2008 | Grost et al. |
| 2008/0129520 A1 | 6/2008 | Lee |
| 2008/0130867 A1 | 6/2008 | Bowen |
| 2008/0131006 A1 | 6/2008 | Oliver |
| 2008/0132221 A1 | 6/2008 | Willey et al. |
| 2008/0133215 A1 | 6/2008 | Sarukkai |
| 2008/0133228 A1 | 6/2008 | Rao |
| 2008/0133241 A1 | 6/2008 | Baker et al. |
| 2008/0133956 A1 | 6/2008 | Fadell |
| 2008/0140413 A1 | 6/2008 | Millman et al. |
| 2008/0140416 A1 | 6/2008 | Shostak |
| 2008/0140652 A1 | 6/2008 | Millman et al. |
| 2008/0140657 A1 | 6/2008 | Azvine et al. |
| 2008/0141125 A1 | 6/2008 | Ghassabian et al. |
| 2008/0141180 A1 | 6/2008 | Reed et al. |
| 2008/0141182 A1 | 6/2008 | Barsness et al. |
| 2008/0146245 A1 | 6/2008 | Appaji |
| 2008/0146290 A1 | 6/2008 | Sreeram et al. |
| 2008/0147408 A1 | 6/2008 | Da Palma et al. |
| 2008/0147411 A1 | 6/2008 | Dames et al. |
| 2008/0147874 A1 | 6/2008 | Yoneda et al. |
| 2008/0150900 A1 | 6/2008 | Han |
| 2008/0154600 A1 | 6/2008 | Tian et al. |
| 2008/0154612 A1 | 6/2008 | Evermann et al. |
| 2008/0154828 A1 | 6/2008 | Antebi et al. |
| 2008/0157867 A1 | 7/2008 | Krah |
| 2008/0163119 A1 | 7/2008 | Kim et al. |
| 2008/0163131 A1 | 7/2008 | Hirai et al. |
| 2008/0165144 A1 | 7/2008 | Forstall et al. |
| 2008/0165980 A1 | 7/2008 | Pavlovic et al. |
| 2008/0165994 A1 | 7/2008 | Caren et al. |
| 2008/0167013 A1 | 7/2008 | Novick et al. |
| 2008/0167858 A1 | 7/2008 | Christie et al. |
| 2008/0168366 A1 | 7/2008 | Kocienda et al. |
| 2008/0183473 A1 | 7/2008 | Nagano et al. |
| 2008/0189099 A1 | 8/2008 | Friedman et al. |
| 2008/0189106 A1 | 8/2008 | Low et al. |
| 2008/0189110 A1 | 8/2008 | Freeman et al. |
| 2008/0189114 A1 | 8/2008 | Fail et al. |
| 2008/0189606 A1 | 8/2008 | Rybak |
| 2008/0195312 A1 | 8/2008 | Aaron et al. |
| 2008/0195601 A1 | 8/2008 | Ntoulas et al. |
| 2008/0195940 A1 | 8/2008 | Gail et al. |
| 2008/0200142 A1 | 8/2008 | Abdel-Kader et al. |
| 2008/0201306 A1 | 8/2008 | Cooper et al. |
| 2008/0201375 A1 | 8/2008 | Khedouri et al. |
| 2008/0204379 A1 | 8/2008 | Perez-Noguera |
| 2008/0207176 A1 | 8/2008 | Brackbill et al. |
| 2008/0208585 A1 | 8/2008 | Ativanichayaphong et al. |
| 2008/0208587 A1 | 8/2008 | Ben-david et al. |
| 2008/0212796 A1 | 9/2008 | Denda |
| 2008/0219641 A1 | 9/2008 | Sandrew et al. |
| 2008/0221866 A1 | 9/2008 | Katragadda et al. |
| 2008/0221879 A1 | 9/2008 | Cerra et al. |
| 2008/0221880 A1 | 9/2008 | Cerra et al. |
| 2008/0221889 A1 | 9/2008 | Cerra et al. |
| 2008/0221903 A1 | 9/2008 | Kanevsky et al. |
| 2008/0222118 A1 | 9/2008 | Scian et al. |
| 2008/0228463 A1 | 9/2008 | Mori et al. |
| 2008/0228485 A1 | 9/2008 | Owen |
| 2008/0228490 A1 | 9/2008 | Fischer et al. |
| 2008/0228495 A1 | 9/2008 | Cross et al. |
| 2008/0228496 A1 | 9/2008 | Yu et al. |
| 2008/0228928 A1 | 9/2008 | Donelli et al. |
| 2008/0229185 A1 | 9/2008 | Lynch |
| 2008/0229218 A1 | 9/2008 | Maeng |
| 2008/0235024 A1 | 9/2008 | Goldberg et al. |
| 2008/0235027 A1 | 9/2008 | Cross |
| 2008/0240569 A1 | 10/2008 | Tonouchi |
| 2008/0242280 A1 | 10/2008 | Shapiro et al. |
| 2008/0244390 A1 | 10/2008 | Fux et al. |
| 2008/0244446 A1 | 10/2008 | Lefevre et al. |
| 2008/0247519 A1 | 10/2008 | Abella et al. |
| 2008/0248797 A1 | 10/2008 | Freeman et al. |
| 2008/0249770 A1 | 10/2008 | Kim et al. |
| 2008/0253577 A1 | 10/2008 | Eppolito |
| 2008/0255837 A1 | 10/2008 | Kahn et al. |
| 2008/0255845 A1 | 10/2008 | Bennett |
| 2008/0256613 A1 | 10/2008 | Grover |
| 2008/0259022 A1 | 10/2008 | Mansfield et al. |
| 2008/0262838 A1 | 10/2008 | Nurminen et al. |
| 2008/0262846 A1 | 10/2008 | Burns et al. |
| 2008/0270118 A1 | 10/2008 | Kuo et al. |
| 2008/0270138 A1 | 10/2008 | Knight et al. |
| 2008/0270139 A1 | 10/2008 | Shi et al. |
| 2008/0270140 A1 | 10/2008 | Hertz et al. |
| 2008/0277473 A1 | 11/2008 | Kotlarsky et al. |
| 2008/0281510 A1 | 11/2008 | Shahine |
| 2008/0292112 A1 | 11/2008 | Valenzuela et al. |
| 2008/0294418 A1 | 11/2008 | Cleary et al. |
| 2008/0294651 A1 | 11/2008 | Masuyama et al. |
| 2008/0294981 A1 | 11/2008 | Balzano et al. |
| 2008/0298766 A1 | 12/2008 | Wen et al. |
| 2008/0299523 A1 | 12/2008 | Chai et al. |
| 2008/0300871 A1 | 12/2008 | Gilbert |
| 2008/0300878 A1 | 12/2008 | Bennett |
| 2008/0306727 A1 | 12/2008 | Thurmair et al. |
| 2008/0312909 A1 | 12/2008 | Hermansen et al. |
| 2008/0313335 A1 | 12/2008 | Jung et al. |
| 2008/0316183 A1 | 12/2008 | Westerman et al. |
| 2008/0319753 A1 | 12/2008 | Hancock |
| 2008/0319763 A1 | 12/2008 | Di Fabbrizio et al. |
| 2009/0003115 A1 | 1/2009 | Lindahl et al. |
| 2009/0005012 A1 | 1/2009 | Van Heugten |
| 2009/0005891 A1 | 1/2009 | Batson et al. |
| 2009/0006097 A1 | 1/2009 | Etezadi et al. |
| 2009/0006099 A1 | 1/2009 | Sharpe et al. |
| 2009/0006100 A1* | 1/2009 | Badger ............... 704/275 |
| 2009/0006343 A1 | 1/2009 | Platt et al. |
| 2009/0006345 A1 | 1/2009 | Platt et al. |
| 2009/0006488 A1 | 1/2009 | Lindahl et al. |
| 2009/0006671 A1 | 1/2009 | Batson et al. |
| 2009/0007001 A1 | 1/2009 | Morin et al. |
| 2009/0011709 A1 | 1/2009 | Akasaka et al. |
| 2009/0012748 A1 | 1/2009 | Beish et al. |
| 2009/0012775 A1 | 1/2009 | El Hady et al. |
| 2009/0018828 A1 | 1/2009 | Nakadai et al. |
| 2009/0018834 A1 | 1/2009 | Cooper et al. |

(56) References Cited

U.S. PATENT DOCUMENTS

| | | |
|---|---|---|
| 2009/0018835 A1 | 1/2009 | Cooper et al. |
| 2009/0018839 A1 | 1/2009 | Cooper et al. |
| 2009/0018840 A1 | 1/2009 | Lutz et al. |
| 2009/0022329 A1 | 1/2009 | Mahowald |
| 2009/0028435 A1 | 1/2009 | Wu et al. |
| 2009/0030800 A1 | 1/2009 | Grois |
| 2009/0030978 A1 | 1/2009 | Johnson et al. |
| 2009/0043583 A1 | 2/2009 | Agapi et al. |
| 2009/0048821 A1 | 2/2009 | Yam et al. |
| 2009/0048845 A1 | 2/2009 | Burckart et al. |
| 2009/0049067 A1 | 2/2009 | Murray |
| 2009/0055179 A1 | 2/2009 | Cho et al. |
| 2009/0055186 A1 | 2/2009 | Lance et al. |
| 2009/0058823 A1 | 3/2009 | Kocienda |
| 2009/0058860 A1 | 3/2009 | Fong et al. |
| 2009/0060472 A1 | 3/2009 | Bull et al. |
| 2009/0063974 A1 | 3/2009 | Bull et al. |
| 2009/0064031 A1 | 3/2009 | Bull et al. |
| 2009/0070097 A1 | 3/2009 | Wu et al. |
| 2009/0070102 A1 | 3/2009 | Maegawa |
| 2009/0070114 A1 | 3/2009 | Staszak |
| 2009/0074214 A1 | 3/2009 | Bradford et al. |
| 2009/0076792 A1 | 3/2009 | Lawson-Tancred |
| 2009/0076796 A1 | 3/2009 | Daraselia |
| 2009/0076819 A1 | 3/2009 | Wouters et al. |
| 2009/0076821 A1 | 3/2009 | Brenner et al. |
| 2009/0076825 A1 | 3/2009 | Bradford et al. |
| 2009/0077165 A1 | 3/2009 | Rhodes et al. |
| 2009/0083034 A1 | 3/2009 | Hernandez et al. |
| 2009/0083035 A1 | 3/2009 | Huang et al. |
| 2009/0083036 A1 | 3/2009 | Zhao et al. |
| 2009/0083037 A1 | 3/2009 | Gleason et al. |
| 2009/0083047 A1 | 3/2009 | Lindahl et al. |
| 2009/0089058 A1 | 4/2009 | Bellegarda |
| 2009/0092260 A1 | 4/2009 | Powers |
| 2009/0092261 A1 | 4/2009 | Bard |
| 2009/0092262 A1 | 4/2009 | Costa et al. |
| 2009/0094029 A1 | 4/2009 | Koch et al. |
| 2009/0094033 A1 | 4/2009 | Mozer et al. |
| 2009/0097634 A1 | 4/2009 | Nambiar et al. |
| 2009/0097637 A1 | 4/2009 | Boscher et al. |
| 2009/0100049 A1 | 4/2009 | Cao |
| 2009/0100454 A1 | 4/2009 | Weber |
| 2009/0104898 A1 | 4/2009 | Harris |
| 2009/0106026 A1 | 4/2009 | Ferrieux |
| 2009/0106376 A1 | 4/2009 | Tom et al. |
| 2009/0106397 A1 | 4/2009 | O'Keefe |
| 2009/0112572 A1 | 4/2009 | Thorn |
| 2009/0112677 A1 | 4/2009 | Rhett |
| 2009/0112892 A1 | 4/2009 | Cardie et al. |
| 2009/0119587 A1 | 5/2009 | Allen et al. |
| 2009/0123021 A1 | 5/2009 | Jung et al. |
| 2009/0123071 A1 | 5/2009 | Iwasaki |
| 2009/0125477 A1 | 5/2009 | Lu et al. |
| 2009/0128505 A1 | 5/2009 | Partridge et al. |
| 2009/0137286 A1 | 5/2009 | Luke et al. |
| 2009/0138736 A1 | 5/2009 | Chin |
| 2009/0138828 A1 | 5/2009 | Schultz et al. |
| 2009/0144049 A1 | 6/2009 | Haddad et al. |
| 2009/0144428 A1 | 6/2009 | Bowater et al. |
| 2009/0144609 A1 | 6/2009 | Liang et al. |
| 2009/0146848 A1 | 6/2009 | Ghassabian |
| 2009/0150147 A1 | 6/2009 | Jacoby et al. |
| 2009/0150156 A1 | 6/2009 | Kennewick et al. |
| 2009/0153288 A1 | 6/2009 | Hope et al. |
| 2009/0154669 A1 | 6/2009 | Wood et al. |
| 2009/0157382 A1 | 6/2009 | Bar |
| 2009/0157384 A1 | 6/2009 | Toutanova et al. |
| 2009/0157401 A1 | 6/2009 | Bennett |
| 2009/0158423 A1 | 6/2009 | Orlassino et al. |
| 2009/0160803 A1 | 6/2009 | Hashimoto |
| 2009/0164441 A1 | 6/2009 | Cheyer |
| 2009/0164655 A1 | 6/2009 | Pettersson et al. |
| 2009/0164937 A1 | 6/2009 | Alviar et al. |
| 2009/0167508 A1 | 7/2009 | Fadell et al. |
| 2009/0167509 A1 | 7/2009 | Fadell et al. |
| 2009/0171578 A1 | 7/2009 | Kim et al. |
| 2009/0171664 A1 | 7/2009 | Kennewick et al. |
| 2009/0172108 A1 | 7/2009 | Singh |
| 2009/0172542 A1 | 7/2009 | Girish et al. |
| 2009/0174667 A1 | 7/2009 | Kocienda et al. |
| 2009/0174677 A1 | 7/2009 | Gehani et al. |
| 2009/0177300 A1 | 7/2009 | Lee |
| 2009/0177461 A1 | 7/2009 | Ehsani et al. |
| 2009/0182445 A1 | 7/2009 | Girish et al. |
| 2009/0187402 A1 | 7/2009 | Scholl |
| 2009/0187577 A1 | 7/2009 | Reznik et al. |
| 2009/0191895 A1 | 7/2009 | Singh et al. |
| 2009/0192782 A1 | 7/2009 | Drewes |
| 2009/0198497 A1 | 8/2009 | Kwon |
| 2009/0204409 A1 | 8/2009 | Mozer et al. |
| 2009/0210232 A1 | 8/2009 | Sanchez et al. |
| 2009/0213134 A1 | 8/2009 | Stephanick et al. |
| 2009/0215503 A1 | 8/2009 | Zhang et al. |
| 2009/0216704 A1 | 8/2009 | Zheng et al. |
| 2009/0222270 A2 | 9/2009 | Likens et al. |
| 2009/0222488 A1 | 9/2009 | Boerries et al. |
| 2009/0228126 A1 | 9/2009 | Spielberg et al. |
| 2009/0228273 A1 | 9/2009 | Wang et al. |
| 2009/0228281 A1 | 9/2009 | Singleton et al. |
| 2009/0228792 A1 | 9/2009 | Van Os et al. |
| 2009/0228842 A1 | 9/2009 | Westerman et al. |
| 2009/0234655 A1 | 9/2009 | Kwon |
| 2009/0239202 A1 | 9/2009 | Stone |
| 2009/0239552 A1 | 9/2009 | Churchill et al. |
| 2009/0240485 A1 | 9/2009 | Dalal et al. |
| 2009/0241054 A1 | 9/2009 | Hendricks |
| 2009/0241760 A1 | 10/2009 | Georges |
| 2009/0247237 A1 | 10/2009 | Mittleman et al. |
| 2009/0248182 A1 | 10/2009 | Logan et al. |
| 2009/0248420 A1 | 10/2009 | Basir et al. |
| 2009/0249198 A1 | 10/2009 | Davis et al. |
| 2009/0252350 A1 | 10/2009 | Seguin |
| 2009/0253457 A1 | 10/2009 | Seguin |
| 2009/0253463 A1 | 10/2009 | Shin et al. |
| 2009/0254339 A1 | 10/2009 | Seguin |
| 2009/0254345 A1 | 10/2009 | Fleizach et al. |
| 2009/0259969 A1 | 10/2009 | Pallakoff |
| 2009/0265368 A1* | 10/2009 | Crider et al. .................. 707/102 |
| 2009/0271109 A1 | 10/2009 | Lee et al. |
| 2009/0271175 A1 | 10/2009 | Bodin et al. |
| 2009/0271176 A1 | 10/2009 | Bodin et al. |
| 2009/0271178 A1 | 10/2009 | Bodin et al. |
| 2009/0274315 A1 | 11/2009 | Carnes et al. |
| 2009/0281789 A1 | 11/2009 | Waibel et al. |
| 2009/0284482 A1 | 11/2009 | Chin |
| 2009/0286514 A1 | 11/2009 | Lichorowic et al. |
| 2009/0287583 A1 | 11/2009 | Holmes |
| 2009/0290718 A1 | 11/2009 | Kahn et al. |
| 2009/0292987 A1 | 11/2009 | Sorenson |
| 2009/0296552 A1 | 12/2009 | Hicks et al. |
| 2009/0298474 A1 | 12/2009 | George |
| 2009/0299745 A1 | 12/2009 | Kennewick et al. |
| 2009/0299849 A1 | 12/2009 | Cao et al. |
| 2009/0300391 A1 | 12/2009 | Jessup et al. |
| 2009/0300488 A1 | 12/2009 | Salamon et al. |
| 2009/0304198 A1 | 12/2009 | Herre et al. |
| 2009/0306967 A1 | 12/2009 | Nicolov et al. |
| 2009/0306969 A1 | 12/2009 | Goud et al. |
| 2009/0306979 A1 | 12/2009 | Jaiswal et al. |
| 2009/0306980 A1 | 12/2009 | Shin |
| 2009/0306981 A1 | 12/2009 | Cromack et al. |
| 2009/0306985 A1 | 12/2009 | Roberts et al. |
| 2009/0306988 A1 | 12/2009 | Chen et al. |
| 2009/0306989 A1 | 12/2009 | Kaji |
| 2009/0307162 A1 | 12/2009 | Bui et al. |
| 2009/0307201 A1 | 12/2009 | Dunning et al. |
| 2009/0307584 A1 | 12/2009 | Davidson et al. |
| 2009/0313023 A1 | 12/2009 | Jones |
| 2009/0313026 A1 | 12/2009 | Coffman et al. |
| 2009/0313544 A1 | 12/2009 | Wood et al. |
| 2009/0313564 A1 | 12/2009 | Rottler et al. |
| 2009/0316943 A1 | 12/2009 | Frigola Munoz et al. |
| 2009/0318119 A1 | 12/2009 | Basir et al. |

(56) References Cited

U.S. PATENT DOCUMENTS

| | | |
|---|---|---|
| 2009/0318198 A1 | 12/2009 | Carroll |
| 2009/0319266 A1 | 12/2009 | Brown et al. |
| 2009/0326936 A1 | 12/2009 | Nagashima |
| 2009/0326938 A1 | 12/2009 | Marila et al. |
| 2009/0326949 A1 | 12/2009 | Douthitt et al. |
| 2009/0327977 A1 | 12/2009 | Bachfischer et al. |
| 2010/0004931 A1 | 1/2010 | Ma et al. |
| 2010/0005081 A1 | 1/2010 | Bennett |
| 2010/0013796 A1 | 1/2010 | Abileah et al. |
| 2010/0019834 A1 | 1/2010 | Zerbe et al. |
| 2010/0023318 A1 | 1/2010 | Lemoine |
| 2010/0023320 A1 | 1/2010 | Di Cristo et al. |
| 2010/0030928 A1 | 2/2010 | Conroy et al. |
| 2010/0031143 A1 | 2/2010 | Rao et al. |
| 2010/0036655 A1 | 2/2010 | Cecil et al. |
| 2010/0036660 A1 | 2/2010 | Bennett |
| 2010/0037183 A1 | 2/2010 | Miyashita et al. |
| 2010/0042400 A1 | 2/2010 | Block et al. |
| 2010/0049514 A1 | 2/2010 | Kennewick et al. |
| 2010/0050064 A1 | 2/2010 | Liu et al. |
| 2010/0054512 A1 | 3/2010 | Solum |
| 2010/0057457 A1 | 3/2010 | Ogata et al. |
| 2010/0057643 A1 | 3/2010 | Yang |
| 2010/0060646 A1 | 3/2010 | Unsal et al. |
| 2010/0063804 A1 | 3/2010 | Sato et al. |
| 2010/0063825 A1 | 3/2010 | Williams et al. |
| 2010/0063961 A1 | 3/2010 | Guiheneuf et al. |
| 2010/0064113 A1 | 3/2010 | Lindahl et al. |
| 2010/0067723 A1 | 3/2010 | Bergmann et al. |
| 2010/0067867 A1 | 3/2010 | Lin et al. |
| 2010/0070281 A1 | 3/2010 | Conkie et al. |
| 2010/0070899 A1 | 3/2010 | Hunt et al. |
| 2010/0076760 A1 | 3/2010 | Kraenzel et al. |
| 2010/0079501 A1 | 4/2010 | Ikeda et al. |
| 2010/0080398 A1 | 4/2010 | Waldmann |
| 2010/0080470 A1 | 4/2010 | Deluca et al. |
| 2010/0081456 A1 | 4/2010 | Singh et al. |
| 2010/0081487 A1 | 4/2010 | Chen et al. |
| 2010/0082327 A1 | 4/2010 | Rogers et al. |
| 2010/0082328 A1 | 4/2010 | Rogers et al. |
| 2010/0082329 A1 | 4/2010 | Silverman et al. |
| 2010/0082346 A1 | 4/2010 | Rogers et al. |
| 2010/0082347 A1 | 4/2010 | Rogers et al. |
| 2010/0082348 A1 | 4/2010 | Silverman et al. |
| 2010/0082349 A1 | 4/2010 | Bellegarda et al. |
| 2010/0082970 A1 | 4/2010 | Lindahl et al. |
| 2010/0086152 A1 | 4/2010 | Rank et al. |
| 2010/0086153 A1 | 4/2010 | Hagen et al. |
| 2010/0086156 A1 | 4/2010 | Rank et al. |
| 2010/0088020 A1 | 4/2010 | Sano et al. |
| 2010/0088093 A1 | 4/2010 | Lee et al. |
| 2010/0088100 A1 | 4/2010 | Lindahl |
| 2010/0100212 A1 | 4/2010 | Lindahl et al. |
| 2010/0100384 A1 | 4/2010 | Ju et al. |
| 2010/0103776 A1 | 4/2010 | Chan |
| 2010/0106500 A1 | 4/2010 | Mckee et al. |
| 2010/0114856 A1 | 5/2010 | Kuboyama |
| 2010/0125460 A1 | 5/2010 | Mellott et al. |
| 2010/0125811 A1 | 5/2010 | Moore et al. |
| 2010/0131273 A1 | 5/2010 | Aley-Raz et al. |
| 2010/0131498 A1 | 5/2010 | Linthicum et al. |
| 2010/0131899 A1 | 5/2010 | Hubert |
| 2010/0138215 A1 | 6/2010 | Williams |
| 2010/0138224 A1 | 6/2010 | Bedingfield, Sr. |
| 2010/0138416 A1 | 6/2010 | Bellotti |
| 2010/0138759 A1* | 6/2010 | Roy ............... G06F 9/4443 715/764 |
| 2010/0142740 A1 | 6/2010 | Roerup |
| 2010/0145694 A1 | 6/2010 | Ju et al. |
| 2010/0145700 A1 | 6/2010 | Kennewick et al. |
| 2010/0146442 A1 | 6/2010 | Nagasaka et al. |
| 2010/0153115 A1 | 6/2010 | Klee et al. |
| 2010/0161313 A1 | 6/2010 | Karttunen |
| 2010/0161554 A1 | 6/2010 | Datuashvili et al. |
| 2010/0164897 A1 | 7/2010 | Morin et al. |
| 2010/0169075 A1 | 7/2010 | Raffa et al. |
| 2010/0169097 A1 | 7/2010 | Nachman et al. |
| 2010/0171713 A1 | 7/2010 | Kwok et al. |
| 2010/0174544 A1 | 7/2010 | Heifets |
| 2010/0179932 A1 | 7/2010 | Yoon et al. |
| 2010/0179991 A1 | 7/2010 | Lorch et al. |
| 2010/0185448 A1 | 7/2010 | Meisel |
| 2010/0185949 A1 | 7/2010 | Jaeger |
| 2010/0197359 A1 | 8/2010 | Harris |
| 2010/0199215 A1 | 8/2010 | Seymour et al. |
| 2010/0204986 A1 | 8/2010 | Kennewick et al. |
| 2010/0211199 A1 | 8/2010 | Naik et al. |
| 2010/0217604 A1 | 8/2010 | Baldwin et al. |
| 2010/0222033 A1 | 9/2010 | Scott et al. |
| 2010/0222098 A1 | 9/2010 | Garg |
| 2010/0223055 A1 | 9/2010 | Mclean |
| 2010/0223131 A1 | 9/2010 | Scott et al. |
| 2010/0228540 A1 | 9/2010 | Bennett |
| 2010/0228691 A1 | 9/2010 | Yang et al. |
| 2010/0231474 A1 | 9/2010 | Yamagajo et al. |
| 2010/0235167 A1 | 9/2010 | Bourdon |
| 2010/0235341 A1 | 9/2010 | Bennett |
| 2010/0235729 A1 | 9/2010 | Kocienda et al. |
| 2010/0235770 A1 | 9/2010 | Ording et al. |
| 2010/0250542 A1 | 9/2010 | Fujimaki |
| 2010/0250599 A1 | 9/2010 | Schmidt et al. |
| 2010/0257160 A1 | 10/2010 | Cao |
| 2010/0257478 A1 | 10/2010 | Longe et al. |
| 2010/0262599 A1 | 10/2010 | Nitz |
| 2010/0268539 A1 | 10/2010 | Xu et al. |
| 2010/0274753 A1 | 10/2010 | Liberty et al. |
| 2010/0277579 A1 | 11/2010 | Cho et al. |
| 2010/0278320 A1 | 11/2010 | Arsenault et al. |
| 2010/0278453 A1 | 11/2010 | King |
| 2010/0280983 A1 | 11/2010 | Cho et al. |
| 2010/0281034 A1 | 11/2010 | Petrou et al. |
| 2010/0286985 A1 | 11/2010 | Kennewick et al. |
| 2010/0287514 A1 | 11/2010 | Cragun et al. |
| 2010/0293460 A1 | 11/2010 | Budelli |
| 2010/0299133 A1 | 11/2010 | Kopparapu et al. |
| 2010/0299138 A1 | 11/2010 | Kim |
| 2010/0299142 A1 | 11/2010 | Freeman et al. |
| 2010/0302056 A1 | 12/2010 | Dutton et al. |
| 2010/0305807 A1 | 12/2010 | Basir et al. |
| 2010/0305947 A1 | 12/2010 | Schwarz et al. |
| 2010/0312547 A1* | 12/2010 | Van Os ............... G06F 3/167 704/9 |
| 2010/0312566 A1 | 12/2010 | Odinak et al. |
| 2010/0318576 A1 | 12/2010 | Kim |
| 2010/0322438 A1 | 12/2010 | Siotis |
| 2010/0324895 A1 | 12/2010 | Kurzweil et al. |
| 2010/0324905 A1 | 12/2010 | Kurzweil et al. |
| 2010/0325573 A1 | 12/2010 | Estrada et al. |
| 2010/0325588 A1 | 12/2010 | Reddy et al. |
| 2010/0332224 A1 | 12/2010 | Mäkelä et al. |
| 2010/0332235 A1 | 12/2010 | David |
| 2010/0332280 A1 | 12/2010 | Bradley et al. |
| 2010/0332348 A1 | 12/2010 | Cao |
| 2010/0332428 A1 | 12/2010 | Mchenry et al. |
| 2010/0332976 A1 | 12/2010 | Fux et al. |
| 2010/0333030 A1 | 12/2010 | Johns |
| 2011/0002487 A1 | 1/2011 | Panther et al. |
| 2011/0010178 A1 | 1/2011 | Lee et al. |
| 2011/0010644 A1* | 1/2011 | Merrill et al. ............... 715/762 |
| 2011/0016150 A1 | 1/2011 | Engstrom et al. |
| 2011/0018695 A1 | 1/2011 | Bells et al. |
| 2011/0021213 A1 | 1/2011 | Carr |
| 2011/0022292 A1 | 1/2011 | Shen et al. |
| 2011/0022394 A1 | 1/2011 | Wide et al. |
| 2011/0022952 A1 | 1/2011 | Wu et al. |
| 2011/0029616 A1 | 2/2011 | Wang et al. |
| 2011/0033064 A1 | 2/2011 | Johnson et al. |
| 2011/0038489 A1 | 2/2011 | Visser et al. |
| 2011/0047072 A1 | 2/2011 | Ciurea |
| 2011/0047161 A1 | 2/2011 | Myaeng et al. |
| 2011/0050591 A1 | 3/2011 | Kim et al. |
| 2011/0054901 A1 | 3/2011 | Qin et al. |
| 2011/0055256 A1 | 3/2011 | Phillips et al. |
| 2011/0060584 A1 | 3/2011 | Ferrucci et al. |

(56) References Cited

U.S. PATENT DOCUMENTS

| | | |
|---|---|---|
| 2011/0060587 A1 | 3/2011 | Phillips et al. |
| 2011/0060807 A1 | 3/2011 | Martin et al. |
| 2011/0066468 A1 | 3/2011 | Huang et al. |
| 2011/0072492 A1 | 3/2011 | Mohler et al. |
| 2011/0076994 A1 | 3/2011 | Kim et al. |
| 2011/0082688 A1 | 4/2011 | Kim et al. |
| 2011/0083079 A1 | 4/2011 | Farrell et al. |
| 2011/0087491 A1 | 4/2011 | Wittenstein et al. |
| 2011/0090078 A1 | 4/2011 | Kim et al. |
| 2011/0093261 A1 | 4/2011 | Angott |
| 2011/0093265 A1 | 4/2011 | Stent et al. |
| 2011/0093271 A1 | 4/2011 | Bernard et al. |
| 2011/0099000 A1 | 4/2011 | Rai et al. |
| 2011/0103682 A1 | 5/2011 | Chidlovskii et al. |
| 2011/0106736 A1 | 5/2011 | Aharonson et al. |
| 2011/0110502 A1 | 5/2011 | Daye et al. |
| 2011/0112827 A1 | 5/2011 | Kennewick et al. |
| 2011/0112837 A1 | 5/2011 | Kurki-Suonio et al. |
| 2011/0112921 A1 | 5/2011 | Kennewick et al. |
| 2011/0116610 A1 | 5/2011 | Shaw et al. |
| 2011/0119049 A1 | 5/2011 | Ylonen |
| 2011/0119051 A1 | 5/2011 | Li et al. |
| 2011/0125540 A1 | 5/2011 | Jang et al. |
| 2011/0130958 A1 | 6/2011 | Stahl et al. |
| 2011/0131036 A1 | 6/2011 | Di Cristo et al. |
| 2011/0131038 A1 | 6/2011 | Oyaizu et al. |
| 2011/0131045 A1 | 6/2011 | Cristo et al. |
| 2011/0143811 A1 | 6/2011 | Rodriguez |
| 2011/0144973 A1 | 6/2011 | Bocchieri et al. |
| 2011/0144999 A1 | 6/2011 | Jang et al. |
| 2011/0145718 A1 | 6/2011 | Ketola et al. |
| 2011/0151830 A1 | 6/2011 | Blanda et al. |
| 2011/0153209 A1 | 6/2011 | Geelen |
| 2011/0153330 A1 | 6/2011 | Yazdani et al. |
| 2011/0153373 A1 | 6/2011 | Dantzig et al. |
| 2011/0157029 A1 | 6/2011 | Tseng |
| 2011/0161076 A1 | 6/2011 | Davis et al. |
| 2011/0161079 A1 | 6/2011 | Gruhn et al. |
| 2011/0161309 A1 | 6/2011 | Lung et al. |
| 2011/0161852 A1 | 6/2011 | Vainio et al. |
| 2011/0167350 A1 | 7/2011 | Hoellwarth |
| 2011/0175810 A1 | 7/2011 | Markovic et al. |
| 2011/0179002 A1 | 7/2011 | Dumitru et al. |
| 2011/0179372 A1 | 7/2011 | Moore et al. |
| 2011/0184721 A1 | 7/2011 | Subramanian et al. |
| 2011/0184730 A1 | 7/2011 | LeBeau et al. |
| 2011/0191271 A1 | 8/2011 | Baker et al. |
| 2011/0191344 A1 | 8/2011 | Jin et al. |
| 2011/0195758 A1 | 8/2011 | Damale et al. |
| 2011/0201387 A1 | 8/2011 | Paek et al. |
| 2011/0209088 A1 | 8/2011 | Hinckley et al. |
| 2011/0212717 A1 | 9/2011 | Rhoads et al. |
| 2011/0218855 A1 | 9/2011 | Cao et al. |
| 2011/0219018 A1 | 9/2011 | Bailey et al. |
| 2011/0224972 A1 | 9/2011 | Millett et al. |
| 2011/0231182 A1 | 9/2011 | Weider et al. |
| 2011/0231188 A1 | 9/2011 | Kennewick et al. |
| 2011/0231474 A1 | 9/2011 | Locker et al. |
| 2011/0238407 A1 | 9/2011 | Kent |
| 2011/0238408 A1 | 9/2011 | Larcheveque et al. |
| 2011/0238676 A1 | 9/2011 | Liu et al. |
| 2011/0242007 A1 | 10/2011 | Gray et al. |
| 2011/0249144 A1 | 10/2011 | Chang |
| 2011/0260861 A1 | 10/2011 | Singh et al. |
| 2011/0264643 A1 | 10/2011 | Cao |
| 2011/0274303 A1 | 11/2011 | Filson et al. |
| 2011/0276598 A1 | 11/2011 | Kozempel |
| 2011/0279368 A1 | 11/2011 | Klein et al. |
| 2011/0282888 A1 | 11/2011 | Koperski et al. |
| 2011/0288861 A1 | 11/2011 | Kurzweil et al. |
| 2011/0298585 A1 | 12/2011 | Barry |
| 2011/0306426 A1 | 12/2011 | Novak et al. |
| 2011/0307491 A1 | 12/2011 | Fisk et al. |
| 2011/0307810 A1 | 12/2011 | Hilerio et al. |
| 2011/0314032 A1 | 12/2011 | Bennett et al. |
| 2011/0314404 A1 | 12/2011 | Kotler et al. |
| 2012/0002820 A1 | 1/2012 | Leichter |
| 2012/0011138 A1 | 1/2012 | Dunning et al. |
| 2012/0013609 A1 | 1/2012 | Reponen et al. |
| 2012/0016678 A1 | 1/2012 | Gruber et al. |
| 2012/0020490 A1 | 1/2012 | Leichter |
| 2012/0022787 A1 | 1/2012 | LeBeau et al. |
| 2012/0022857 A1 | 1/2012 | Baldwin et al. |
| 2012/0022860 A1 | 1/2012 | Lloyd et al. |
| 2012/0022868 A1 | 1/2012 | LeBeau et al. |
| 2012/0022869 A1 | 1/2012 | Lloyd et al. |
| 2012/0022870 A1 | 1/2012 | Kristjansson et al. |
| 2012/0022872 A1 | 1/2012 | Gruber et al. |
| 2012/0022874 A1 | 1/2012 | Lloyd et al. |
| 2012/0022876 A1 | 1/2012 | LeBeau et al. |
| 2012/0023088 A1 | 1/2012 | Cheng et al. |
| 2012/0034904 A1 | 2/2012 | LeBeau et al. |
| 2012/0035907 A1 | 2/2012 | Lebeau et al. |
| 2012/0035908 A1 | 2/2012 | LeBeau et al. |
| 2012/0035924 A1 | 2/2012 | Jitkoff et al. |
| 2012/0035925 A1 | 2/2012 | Friend et al. |
| 2012/0035931 A1 | 2/2012 | LeBeau et al. |
| 2012/0035932 A1 | 2/2012 | Jitkoff et al. |
| 2012/0036556 A1 | 2/2012 | LeBeau et al. |
| 2012/0042343 A1 | 2/2012 | Laligand et al. |
| 2012/0053815 A1 | 3/2012 | Montanari et al. |
| 2012/0053945 A1 | 3/2012 | Gupta et al. |
| 2012/0056815 A1 | 3/2012 | Mehra |
| 2012/0078627 A1 | 3/2012 | Wagner |
| 2012/0082317 A1 | 4/2012 | Pance et al. |
| 2012/0084086 A1 | 4/2012 | Gilbert et al. |
| 2012/0108221 A1 | 5/2012 | Thomas et al. |
| 2012/0116770 A1 | 5/2012 | Chen et al. |
| 2012/0124126 A1 | 5/2012 | Alcazar et al. |
| 2012/0136572 A1 | 5/2012 | Norton |
| 2012/0137367 A1 | 5/2012 | Dupont et al. |
| 2012/0149394 A1 | 6/2012 | Singh et al. |
| 2012/0150580 A1 | 6/2012 | Norton |
| 2012/0158293 A1 | 6/2012 | Burnham |
| 2012/0158422 A1 | 6/2012 | Burnham et al. |
| 2012/0163710 A1 | 6/2012 | Skaff et al. |
| 2012/0173464 A1 | 7/2012 | Tur et al. |
| 2012/0174121 A1 | 7/2012 | Treat et al. |
| 2012/0185237 A1 | 7/2012 | Gajic et al. |
| 2012/0197995 A1 | 8/2012 | Caruso |
| 2012/0197998 A1 | 8/2012 | Kessel et al. |
| 2012/0201362 A1 | 8/2012 | Crossan et al. |
| 2012/0214141 A1 | 8/2012 | Raya et al. |
| 2012/0214517 A1 | 8/2012 | Singh et al. |
| 2012/0221339 A1 | 8/2012 | Wang et al. |
| 2012/0221552 A1 | 8/2012 | Reponen et al. |
| 2012/0232906 A1 | 9/2012 | Lindahl et al. |
| 2012/0245719 A1 | 9/2012 | Story, Jr. et al. |
| 2012/0245941 A1 | 9/2012 | Cheyer |
| 2012/0245944 A1 | 9/2012 | Gruber et al. |
| 2012/0252367 A1 | 10/2012 | Gaglio et al. |
| 2012/0254152 A1 | 10/2012 | Park et al. |
| 2012/0265528 A1 | 10/2012 | Gruber et al. |
| 2012/0265535 A1 | 10/2012 | Bryant-Rich et al. |
| 2012/0271625 A1 | 10/2012 | Bernard |
| 2012/0271635 A1 | 10/2012 | Ljolje |
| 2012/0271676 A1 | 10/2012 | Aravamudan et al. |
| 2012/0284027 A1 | 11/2012 | Mallett et al. |
| 2012/0290300 A1 | 11/2012 | Lee et al. |
| 2012/0296649 A1 | 11/2012 | Bansal et al. |
| 2012/0304124 A1 | 11/2012 | Chen et al. |
| 2012/0309363 A1 | 12/2012 | Gruber et al. |
| 2012/0310642 A1 | 12/2012 | Cao et al. |
| 2012/0310649 A1 | 12/2012 | Cannistraro et al. |
| 2012/0310652 A1 | 12/2012 | O'Sullivan |
| 2012/0311478 A1 | 12/2012 | Van Os et al. |
| 2012/0311583 A1 | 12/2012 | Gruber et al. |
| 2012/0311584 A1 | 12/2012 | Gruber et al. |
| 2012/0311585 A1 | 12/2012 | Gruber et al. |
| 2012/0317498 A1 | 12/2012 | Logan et al. |
| 2012/0330660 A1 | 12/2012 | Jaiswal |
| 2012/0330661 A1 | 12/2012 | Lindahl |
| 2013/0005405 A1 | 1/2013 | Prociw |
| 2013/0006633 A1 | 1/2013 | Grokop et al. |

(56) References Cited

U.S. PATENT DOCUMENTS

| | | |
|---|---|---|
| 2013/0006638 A1 | 1/2013 | Lindahl |
| 2013/0055099 A1 | 2/2013 | Yao et al. |
| 2013/0073286 A1 | 3/2013 | Bastea-Forte et al. |
| 2013/0080167 A1 | 3/2013 | Mozer |
| 2013/0080177 A1 | 3/2013 | Chen |
| 2013/0085761 A1 | 4/2013 | Bringert et al. |
| 2013/0110505 A1 | 5/2013 | Gruber et al. |
| 2013/0110515 A1 | 5/2013 | Guzzoni et al. |
| 2013/0110518 A1 | 5/2013 | Gruber et al. |
| 2013/0110519 A1 | 5/2013 | Cheyer et al. |
| 2013/0110520 A1 | 5/2013 | Cheyer et al. |
| 2013/0111348 A1 | 5/2013 | Gruber et al. |
| 2013/0111487 A1 | 5/2013 | Cheyer et al. |
| 2013/0115927 A1 | 5/2013 | Gruber et al. |
| 2013/0117022 A1 | 5/2013 | Chen et al. |
| 2013/0170738 A1 | 7/2013 | Capuozzo et al. |
| 2013/0185074 A1 | 7/2013 | Gruber et al. |
| 2013/0185081 A1 | 7/2013 | Cheyer et al. |
| 2013/0225128 A1 | 8/2013 | Gomar |
| 2013/0238647 A1 | 9/2013 | Thompson |
| 2013/0275117 A1 | 10/2013 | Winer |
| 2013/0289991 A1 | 10/2013 | Eshwar et al. |
| 2013/0304758 A1 | 11/2013 | Gruber et al. |
| 2013/0325443 A1 | 12/2013 | Begeja et al. |
| 2013/0346068 A1 | 12/2013 | Solem et al. |
| 2014/0080428 A1* | 3/2014 | Rhoads et al. .................. 455/88 |
| 2014/0086458 A1 | 3/2014 | Rogers et al. |
| 2014/0152577 A1 | 6/2014 | Yuen et al. |

FOREIGN PATENT DOCUMENTS

| | | |
|---|---|---|
| CN | 1263385 A | 8/2000 |
| CN | 1494695 A | 5/2004 |
| CN | 1673939 A | 9/2005 |
| CN | 1864204 A | 11/2006 |
| CN | 1959628 A | 5/2007 |
| CN | 101162153 A | 4/2008 |
| CN | 101183525 A | 5/2008 |
| CN | 101297541 A | 10/2008 |
| CN | 101535983 A | 9/2009 |
| CN | 101939740 A | 1/2011 |
| DE | 3837590 A1 | 5/1990 |
| DE | 4126902 A1 | 2/1992 |
| DE | 4334773 A1 | 4/1994 |
| DE | 4445023 A1 | 6/1996 |
| DE | 102004029203 A1 | 12/2005 |
| DE | 198 41 541 B4 | 12/2007 |
| EP | 0030390 A1 | 6/1981 |
| EP | 0057514 A1 | 8/1982 |
| EP | 0138061 B1 | 9/1984 |
| EP | 0138061 A1 | 4/1985 |
| EP | 0218859 A2 | 4/1987 |
| EP | 0262938 A1 | 4/1988 |
| EP | 0283995 A2 | 9/1988 |
| EP | 0293259 A2 | 11/1988 |
| EP | 0299572 A2 | 1/1989 |
| EP | 0313975 A2 | 5/1989 |
| EP | 0314908 A2 | 5/1989 |
| EP | 0327408 A2 | 8/1989 |
| EP | 0389271 A2 | 9/1990 |
| EP | 0411675 A2 | 2/1991 |
| EP | 0441089 A2 | 8/1991 |
| EP | 0464712 A2 | 1/1992 |
| EP | 0476972 A2 | 3/1992 |
| EP | 0558312 A1 | 9/1993 |
| EP | 0559349 A1 | 9/1993 |
| EP | 0559349 B1 | 9/1993 |
| EP | 0570660 A1 | 11/1993 |
| EP | 0575146 A2 | 12/1993 |
| EP | 0578604 A1 | 1/1994 |
| EP | 0586996 A2 | 3/1994 |
| EP | 0609030 A1 | 8/1994 |
| EP | 0651543 A2 | 5/1995 |
| EP | 0679005 A1 | 10/1995 |
| EP | 0795811 A1 | 9/1997 |
| EP | 0476972 B1 | 5/1998 |
| EP | 0845894 A2 | 6/1998 |
| EP | 0863453 A1 | 9/1998 |
| EP | 0863469 A2 | 9/1998 |
| EP | 0867860 A2 | 9/1998 |
| EP | 0869697 A2 | 10/1998 |
| EP | 0889626 A1 | 1/1999 |
| EP | 0917077 A2 | 5/1999 |
| EP | 0691023 B1 | 9/1999 |
| EP | 0946032 A2 | 9/1999 |
| EP | 0981236 A1 | 2/2000 |
| EP | 0982732 A1 | 3/2000 |
| EP | 984430 A2 | 3/2000 |
| EP | 1001588 A2 | 5/2000 |
| EP | 1014277 A1 | 6/2000 |
| EP | 1028425 A2 | 8/2000 |
| EP | 1028426 A2 | 8/2000 |
| EP | 1047251 A2 | 10/2000 |
| EP | 1076302 A1 | 2/2001 |
| EP | 1091615 A1 | 4/2001 |
| EP | 1107229 A2 | 6/2001 |
| EP | 1229496 A2 | 8/2002 |
| EP | 1233600 A2 | 8/2002 |
| EP | 1245023 (A1) | 10/2002 |
| EP | 1246075 A2 | 10/2002 |
| EP | 1280326 A1 | 1/2003 |
| EP | 1311102 A1 | 5/2003 |
| EP | 1315084 A1 | 5/2003 |
| EP | 1315086 A1 | 5/2003 |
| EP | 1347361 A1 | 9/2003 |
| EP | 1379061 A2 | 1/2004 |
| EP | 1432219 A1 | 6/2004 |
| EP | 1435620 A1 | 7/2004 |
| EP | 1480421 A1 | 11/2004 |
| EP | 1517228 A2 | 3/2005 |
| EP | 1536612 A1 | 6/2005 |
| EP | 1566948 A1 | 8/2005 |
| EP | 1650938 A1 | 4/2006 |
| EP | 1693829 A1 | 8/2006 |
| EP | 1181802 B1 | 2/2007 |
| EP | 1818786 A1 | 8/2007 |
| EP | 1892700 A1 | 2/2008 |
| EP | 1912205 A2 | 4/2008 |
| EP | 1939860 A1 | 7/2008 |
| EP | 0651543 B1 | 9/2008 |
| EP | 1909263 B1 | 1/2009 |
| EP | 1335620 B1 | 3/2009 |
| EP | 2069895 A1 | 6/2009 |
| EP | 2094032 A1 | 8/2009 |
| EP | 2 109 295 A1 | 10/2009 |
| EP | 2109295 | 10/2009 |
| EP | 1720375 B1 | 7/2010 |
| EP | 2205010 A1 | 7/2010 |
| EP | 2400373 A1 | 12/2011 |
| EP | 2431842 A2 | 3/2012 |
| GB | 2293667 A | 4/1996 |
| GB | 2310559 A | 8/1997 |
| GB | 2342802 A | 4/2000 |
| GB | 2346500 A | 8/2000 |
| GB | 2352377 A | 1/2001 |
| GB | 2384399 A | 7/2003 |
| GB | 2402855 A | 12/2004 |
| GB | 2445436 A | 7/2008 |
| IT | FI20010199 A1 | 4/2003 |
| JP | 57-41731 U | 3/1982 |
| JP | 59-57336 U | 4/1984 |
| JP | 2-86397 A | 3/1990 |
| JP | 2-153415 A | 6/1990 |
| JP | 3-113578 A | 5/1991 |
| JP | 4-236624 A | 8/1992 |
| JP | 5-79951 A | 3/1993 |
| JP | 5-165459 A | 7/1993 |
| JP | 5-293126 A | 11/1993 |
| JP | 06 019965 | 1/1994 |
| JP | 6-69954 A | 3/1994 |
| JP | 6-274586 A | 9/1994 |
| JP | 6-332617 A | 12/1994 |
| JP | 2007-199379 A | 8/1995 |

(56) References Cited

FOREIGN PATENT DOCUMENTS

| | | |
|---|---|---|
| JP | 7-320051 A | 12/1995 |
| JP | 7-320079 A | 12/1995 |
| JP | 8-63330 A | 3/1996 |
| JP | 8-185265 A | 7/1996 |
| JP | 8-223281 A | 8/1996 |
| JP | 8-227341 A | 9/1996 |
| JP | 9-18585 A | 1/1997 |
| JP | 9-55792 A | 2/1997 |
| JP | 9-259063 A | 10/1997 |
| JP | 9-265457 A | 10/1997 |
| JP | 10-31497 A | 2/1998 |
| JP | 10-105324 A | 4/1998 |
| JP | 11-6743 A | 1/1999 |
| JP | 11-45241 A | 2/1999 |
| JP | 2000-090119 A | 3/2000 |
| JP | 2000-099225 A | 4/2000 |
| JP | 2000-134407 A | 5/2000 |
| JP | 2000-163031 A | 6/2000 |
| JP | 2000-207167 A | 7/2000 |
| JP | 2000-224663 A | 8/2000 |
| JP | 2000-339137 A | 12/2000 |
| JP | 2001-56233 A | 2/2001 |
| JP | 2001 125896 | 5/2001 |
| JP | 2001-148899 A | 5/2001 |
| JP | 2002-014954 A | 1/2002 |
| JP | 2002 024212 | 1/2002 |
| JP | 2002-041624 A | 2/2002 |
| JP | 2002-082893 A | 3/2002 |
| JP | 2002-342033 A | 11/2002 |
| JP | 2002-344880 A | 11/2002 |
| JP | 2002-542501 A | 12/2002 |
| JP | 2003-044091 A | 2/2003 |
| JP | 2003-84877 A | 3/2003 |
| JP | 2003517158 (A) | 5/2003 |
| JP | 2003-233568 A | 8/2003 |
| JP | 2004-48804 A | 2/2004 |
| JP | 2004-505525 A | 2/2004 |
| JP | 2004-086356 A | 3/2004 |
| JP | 2004-152063 A | 5/2004 |
| JP | 2005-070645 A | 3/2005 |
| JP | 2005-86624 A | 3/2005 |
| JP | 2005-506602 A | 3/2005 |
| JP | 2005-92441 A | 4/2005 |
| JP | 2005-181386 A | 7/2005 |
| JP | 2005-189454 A | 7/2005 |
| JP | 2005-221678 A | 8/2005 |
| JP | 2005-283843 A | 10/2005 |
| JP | 2005-311864 A | 11/2005 |
| JP | 2006-023860 A | 1/2006 |
| JP | 2006-107438 A | 4/2006 |
| JP | 2006-146008 A | 6/2006 |
| JP | 2006-195637 A | 7/2006 |
| JP | 2007-004633 A | 1/2007 |
| JP | 2007-193794 A | 8/2007 |
| JP | 2007-206317 A | 8/2007 |
| JP | 2008-26381 A | 2/2008 |
| JP | 2008-039928 A | 2/2008 |
| JP | 2008-090545 A | 4/2008 |
| JP | 2008-97003 A | 4/2008 |
| JP | 2008-134949 A | 6/2008 |
| JP | 2008-526101 A | 7/2008 |
| JP | 2008-217468 A | 9/2008 |
| JP | 2008-233678 A | 10/2008 |
| JP | 2008-236448 A | 10/2008 |
| JP | 2008-271481 A | 11/2008 |
| JP | 2009 036999 | 2/2009 |
| JP | 2009-047920 A | 3/2009 |
| JP | 2009-098490 A | 5/2009 |
| JP | 2009-186989 A | 8/2009 |
| JP | 2009-205367 A | 9/2009 |
| JP | 2009-294913 A | 12/2009 |
| JP | 2009-294946 A | 12/2009 |
| JP | 2010-078979 A | 4/2010 |
| JP | 2010-157207 A | 7/2010 |
| JP | 2010-535377 A | 11/2010 |
| JP | 2010-287063 A | 12/2010 |
| JP | 2013-511214 A | 3/2013 |
| KR | 10-1999-0073234 A | 10/1999 |
| KR | 11-2002-0013984 A | 2/2002 |
| KR | 10-2002-0057262 A | 7/2002 |
| KR | 10-2002-0069952 A | 9/2002 |
| KR | 10-2003-0016993 A | 3/2003 |
| KR | 10-2004-0044632 A | 5/2004 |
| KR | 10-2005-0083561 A | 8/2005 |
| KR | 10-2005-0090568 A | 9/2005 |
| KR | 10-2006-0011603 A | 2/2006 |
| KR | 10-2006-0012730 A | 2/2006 |
| KR | 10-2006-0073574 A | 6/2006 |
| KR | 10-2007-0024262 A | 3/2007 |
| KR | 10-2007-0057496 | 6/2007 |
| KR | 10-2007-0071675 A | 7/2007 |
| KR | 10-2007-0100837 A | 10/2007 |
| KR | 10-0776800 B1 | 11/2007 |
| KR | 10-2008-001227 | 2/2008 |
| KR | 10-0810500 B1 | 3/2008 |
| KR | 10-2008-0049647 A | 6/2008 |
| KR | 10 2008 109322 A | 12/2008 |
| KR | 10-2009-0001716 A | 1/2009 |
| KR | 10 2009 086805 A | 8/2009 |
| KR | 10-0920267 B1 | 10/2009 |
| KR | 10-2010-0032792 | 4/2010 |
| KR | 10-2010-0119519 A | 11/2010 |
| KR | 10 2011 0113414 A | 10/2011 |
| KR | 10-1193668 B1 | 12/2012 |
| NL | 1014847 C1 | 10/2001 |
| RU | 2273106 C2 | 3/2006 |
| RU | 2349970 C2 | 3/2009 |
| RU | 2353068 C2 | 4/2009 |
| TW | 200643744 A | 12/2006 |
| TW | 200801988 A | 1/2008 |
| WO | 93/20640 A1 | 10/1993 |
| WO | 94/16434 A1 | 7/1994 |
| WO | 94/29788 A1 | 12/1994 |
| WO | WO 95/02221 | 1/1995 |
| WO | 95/16950 A1 | 6/1995 |
| WO | 95/17746 A1 | 6/1995 |
| WO | 97/10586 A1 | 3/1997 |
| WO | WO 97/26612 | 7/1997 |
| WO | 97/29614 A1 | 8/1997 |
| WO | 97/38488 A1 | 10/1997 |
| WO | 97/49044 A1 | 12/1997 |
| WO | 98/09270 A1 | 3/1998 |
| WO | 98/33111 A1 | 7/1998 |
| WO | WO 98/41956 | 9/1998 |
| WO | WO 99/01834 | 1/1999 |
| WO | WO 99/08238 | 2/1999 |
| WO | 99/16181 A1 | 4/1999 |
| WO | WO 99/56227 | 11/1999 |
| WO | 00/19697 A1 | 4/2000 |
| WO | 00/22820 A1 | 4/2000 |
| WO | 00/29964 A1 | 5/2000 |
| WO | 00/30070 A2 | 5/2000 |
| WO | 00/38041 A1 | 6/2000 |
| WO | 00/44173 A1 | 7/2000 |
| WO | 00/63766 A1 | 10/2000 |
| WO | WO 00/60435 | 10/2000 |
| WO | WO 00/60435 A3 | 10/2000 |
| WO | 00/68936 A1 | 11/2000 |
| WO | 01/06489 A1 | 1/2001 |
| WO | 01/30046 A2 | 4/2001 |
| WO | 01/30047 A2 | 4/2001 |
| WO | 01/33569 A1 | 5/2001 |
| WO | 01/35391 A1 | 5/2001 |
| WO | 01/46946 A1 | 6/2001 |
| WO | 01/65413 A1 | 9/2001 |
| WO | 01/67753 A1 | 9/2001 |
| WO | 02/25610 A1 | 3/2002 |
| WO | 02/31814 A1 | 4/2002 |
| WO | 02/37469 A2 | 5/2002 |
| WO | 02/071259 A1 | 9/2002 |
| WO | 02073603 | 9/2002 |
| WO | WO 02/073603 A1 | 9/2002 |
| WO | 03/003152 A2 | 1/2003 |
| WO | 03/003765 A1 | 1/2003 |

(56) References Cited

FOREIGN PATENT DOCUMENTS

| | | | |
|---|---|---|---|
| WO | 03/023786 A2 | 3/2003 |
| WO | 03/041364 A2 | 5/2003 |
| WO | 03/049494 A1 | 6/2003 |
| WO | 03/056789 A1 | 7/2003 |
| WO | 03/067202 A2 | 8/2003 |
| WO | 03/084196 A1 | 10/2003 |
| WO | 03/094489 A1 | 11/2003 |
| WO | 2004/008801 A1 | 1/2004 |
| WO | 2004/025938 A1 | 3/2004 |
| WO | 2004/047415 A1 | 6/2004 |
| WO | 2004/055637 A2 | 7/2004 |
| WO | 2004/057486 A1 | 7/2004 |
| WO | 2004/061850 A1 | 7/2004 |
| WO | 2004/084413 A2 | 9/2004 |
| WO | 2005/003920 A2 | 1/2005 |
| WO | 2005/008505 A1 | 1/2005 |
| WO | 2005/008899 A1 | 1/2005 |
| WO | 2005/010725 A2 | 2/2005 |
| WO | 2005/027472 A2 | 3/2005 |
| WO | 2005/027485 A1 | 3/2005 |
| WO | 2005/031737 A1 | 4/2005 |
| WO | 2005/034085 A1 | 4/2005 |
| WO | 2005/041455 A1 | 5/2005 |
| WO | 2005/059895 A1 | 6/2005 |
| WO | 2005/069171 A1 | 7/2005 |
| WO | 2005/101176 A2 | 10/2005 |
| WO | 2006/020305 A2 | 2/2006 |
| WO | 2006/054724 A1 | 5/2006 |
| WO | 2006/056822 A1 | 6/2006 |
| WO | 2006/078246 A1 | 7/2006 |
| WO | 2006/101649 A2 | 9/2006 |
| WO | 2006/133571 A1 | 12/2006 |
| WO | WO 2006/129967 A1 | 12/2006 |
| WO | 2007/002753 A2 | 1/2007 |
| WO | 2007/083894 A1 | 7/2007 |
| WO | WO 2007080559 A2 | 7/2007 |
| WO | 2008/030970 A2 | 3/2008 |
| WO | 2008/071231 A1 | 6/2008 |
| WO | 2008085742 | 7/2008 |
| WO | WO 2008/085742 A2 | 7/2008 |
| WO | 2008109835 | 9/2008 |
| WO | WO 2008/109835 A2 | 9/2008 |
| WO | 2008/140236 A1 | 11/2008 |
| WO | 2008/153639 A1 | 12/2008 |
| WO | 2009/009240 A2 | 1/2009 |
| WO | 2009/016631 A2 | 2/2009 |
| WO | 2009/017280 A1 | 2/2009 |
| WO | 2009/104126 A1 | 8/2009 |
| WO | 2009/156438 A1 | 12/2009 |
| WO | 2010/075623 A1 | 7/2010 |
| WO | 2011/057346 A1 | 5/2011 |
| WO | 2011/060106 A1 | 5/2011 |
| WO | WO 2011/088053 A2 | 7/2011 |
| WO | 2011/116309 A1 | 9/2011 |
| WO | 2011/133543 A1 | 10/2011 |
| WO | 2011/150730 A1 | 12/2011 |
| WO | 2011/163350 A1 | 12/2011 |
| WO | 2012/154317 A1 | 11/2012 |
| WO | WO2012/167168 A2 | 12/2012 |
| WO | 2013/048880 A1 | 4/2013 |

OTHER PUBLICATIONS

EP Communication under Rule-161(2) and 162 EPC for Application No. 117079392.2-2201, 4 pages.
International Search Report and Written Opinion dated Nov. 29, 2011, received in International Application No. PCT/US2011/020861, which corresponds to U.S. Appl. No. 12/987,982, 15 pages (Gruber).
Alfred App, 2011, http://www.alfredapp.com/, 5 pages.
Ambite, JL., et al., "Design and Implementation of the CALO Query Manager," Copyright © 2006, American Association for Artificial Intelligence, (www.aaai.org), 8 pages.
Ambite, JL., et al., "Integration of Heterogeneous Knowledge Sources in the CALO Query Manager," 2005, The 4th International Conference on Ontologies, DataBases, and Applications of Semantics (ODBASE), Agia Napa, Cyprus, ttp://www.isi.edu/people/ambite/publications/integration_heterogeneous_knowledge_sources_calo_query_manager, 18 pages.
Belvin, R. et al., "Development of the HRL Route Navigation Dialogue System," 2001, In Proceedings of the First International Conference on Human Language Technology Research, Paper, Copyright © 2001 HRL Laboratories, LLC, http://citeseerx.ist.psu.edu/viewdoc/summary?doi=10.1.1.10.6538, 5 pages.
Berry, P. M., et al. "PTIME: Personalized Assistance for Calendaring," ACM Transactions on Intelligent Systems and Technology, vol. 2, No. 4, Article 40, Publication date: Jul. 2011, 40:1-22, 22 pages.
Butcher, M., "EVI arrives in town to go toe-to-toe with Siri," Jan. 23, 2012, http://techcrunch.com/2012/01/23/evi-arrives-in-town-to-go-toe-to-toe-with-siri/, 2 pages.
Chen, Y., "Multimedia Siri Finds And Plays Whatever You Ask For," Feb. 9, 2012, http://www.psfk.com/2012/02/multimedia-siri.html, 9 pages.
Cheyer, A. et al., "Spoken Language and Multimodal Applications for Electronic Realties," © Springer-Verlag London Ltd, Virtual Reality 1999, 3:1-15, 15 pages.
Cutkosky, M. R. et al., "PACT: An Experiment in Integrating Concurrent Engineering Systems," Journal, Computer, vol. 26 Issue 1, Jan. 1993, IEEE Computer Society Press Los Alamitos, CA, USA, http://dl.acm.org/citation.cfm?id=165320, 14 pages.
Elio, R. et al., "On Abstract Task Models and Conversation Policies," http://webdocs.cs.ualberta.ca/~ree/publications/papers2/ATS.AA99.pdf, 10 pages.
Ericsson, S. et al., "Software illustrating a unified approach to multimodality and multilinguality in the in-home domain," Dec. 22, 2006, Talk and Look: Tools for Ambient Linguistic Knowledge, http://www.talk-project.eurice.eu/fileadmin/talk/publications_public/deliverables_public/D1_6.pdf, 127 pages.
Evi, "Meet Evi: the one mobile app that provides solutions for your everyday problems," Feb. 8, 2012, http://www.evi.com/, 3 pages.
Feigenbaum, E., et al., "Computer-assisted Semantic Annotation of Scientific Life Works," 2007, http://tomgruber.org/writing/stanford-cs300.pdf, 22 pages.
Gannes, L., "Alfred App Gives Personalized Restaurant Recommendations," allthingsd.com, Jul. 18, 2011, http://allthingsd.com/20110718/alfred-app-gives-personalized-restaurant-recommendations/, 3 pages.
Gautier, P. O., et al. "Generating Explanations of Device Behavior Using Compositional Modeling and Causal Ordering," 1993, http://citeseerx.ist.psu.edu/viewdoc/summary?doi=10.1.1.42.8394, 9 pages.
Gervasio, M. T., et al., Active Preference Learning for Personalized Calendar Scheduling Assistancae, Copyright © 2005, http://www.ai.sri.com/~gervasio/pubs/gervasio-iui05.pdf, 8 pages.
Glass, A., "Explaining Preference Learning," 2006, http://cs229.stanford.edu/proj2006/Glass-ExplainingPreferenceLearning.pdf, 5 pages.
Gruber, T. R., et al., "An Ontology for Engineering Mathematics," In Jon Doyle, Piero Torasso, & Erik Sandewall, Eds., Fourth International Conference on Principles of Knowledge Representation and Reasoning, Gustav Stresemann Institut, Bonn, Germany, Morgan Kaufmann, 1994, http://www-ksl.stanford.edu/knowledge-sharing/papers/engmath.html, 22 pages.
Gruber, T. R., "A Translation Approach to Portable Ontology Specifications," Knowledge Systems Laboratory, Stanford University, Sep. 1992, Technical Report KSL 92-71, Revised Apr. 1993, 27 pages.
Gruber, T. R., "Automated Knowledge Acquisition for Strategic Knowledge," Knowledge Systems Laboratory, Machine Learning, 4, 293-336 (1989), 44 pages.
Gruber, T. R., "(Avoiding) the Travesty of the Commons," Presentation at NPUC 2006, New Paradigms for User Computing, IBM Almaden Research Center, Jul. 24, 2006. http://tomgruber.org/writing/avoiding-travestry.htm, 52 pages.
Gruber, T. R., "Big Think Small Screen: How semantic computing in the cloud will revolutionize the consumer experience on the phone," Keynote presentation at Web 3.0 conference, Jan. 27, 2010, http://tomgruber.org/writing/web30jan2010.htm, 41 pages.

(56) References Cited

OTHER PUBLICATIONS

Gruber, T. R., "Collaborating around Shared Content on the WWW," W3C Workshop on WWW and Collaboration, Cambridge, MA, Sep. 11, 1995, http://www.w3.org/Collaboration/Workshop/Proceedings/P9.html, 1 page.

Gruber, T. R., "Collective Knowledge Systems: Where the Social Web meets the Semantic Web," Web Semantics: Science, Services and Agents on the World Wide Web (2007), doi:10.1016/j.websem. 2007.11.011, keynote presentation given at the 5th International Semantic Web Conference, Nov. 7, 2006, 19 pages.

Gruber, T. R., "Where the Social Web meets the Semantic Web," Presentation at the 5th International Semantic Web Conference, Nov. 7, 2006, 38 pages.

Gruber, T. R., "Despite our Best Efforts, Ontologies are not the Problem," AAAI Spring Symposium, Mar. 2008, http://tomgruber.org/writing/aaai-ss08.htm, 40 pages.

Gruber, T. R., "Enterprise Collaboration Management with Intraspect," Intraspect Software, Inc., Instraspect Technical White Paper Jul. 2001, 24 pages.

Gruber, T. R., "Every ontology is a treaty—a social agreement—among people with some common motive in sharing," Interview by Dr. Miltiadis D. Lytras, Official Quarterly Bulletin of AIS Special Interest Group on Semantic Web and Information Systems, vol. 1, Issue 3, 2004, http://www.sigsemis.org 1, 5 pages.

Gruber, T. R., et al., "Generative Design Rationale: Beyond the Record and Replay Paradigm," Knowledge Systems Laboratory, Stanford University, Dec. 1991, Technical Report KSL 92-59, Updated Feb. 1993, 24 pages.

Gruber, T. R., "Helping Organizations Collaborate, Communicate, and Learn," Presentation to NASA Ames Research, Mountain View, CA, Mar. 2003, http://tomgruber.org/writing/organizational-intelligence-talk.htm, 30 pages.

Gruber, T. R., "Intelligence at the Interface: Semantic Technology and the Consumer Internet Experience," Presentation at Semantic Technologies conference (SemTech08), May 20, 2008, http://tomgruber.org/writing.htm, 40 pages.

Gruber, T. R., Interactive Acquisition of Justifications: Learning "Why" by Being Told "What" Knowledge Systems Laboratory, Stanford University, Oct. 1990, Technical Report KSL 91-17, Revised Feb. 1991, 24 pages.

Gruber, T. R., "It Is What It Does: The Pragmatics of Ontology for Knowledge Sharing," (c) 2000, 2003, http://www.cidoc-crm.org/docs/symposium_presentations/gruber_cidoc-ontology-2003.pdf, 21 pages.

Gruber, T. R., et al., "Machine-generated Explanations of Engineering Models: A Compositional Modeling Approach," (1993) In Proc. International Joint Conference on Artificial Intelligence, http://citeseerx.ist.psu.edu/viewdoc/summary?doi=10.1.1.34.930, 7 pages.

Gruber, T. R., "2021: Mass Collaboration and the Really New Economy," TNTY Futures, the newsletter of The Next Twenty Years series, vol. 1, Issue 6, Aug. 2001, http://www.tnty.com/newsletter/futures/archive/v01-05business.html, 5 pages.

Gruber, T. R., et al.,"Nike: A National Infrastructure for Knowledge Exchange," Oct. 1994, http://www.eit.com/papers/nike/nike.html and nike.ps, 10 pages.

Gruber, T. R., "Ontologies, Web 2.0 and Beyond," Apr. 24, 2007, Ontology Summit 2007, http://tomgruber.org/writing/ontolog-social-web-keynote.pdf, 17 pages.

Gruber, T. R., "Ontology of Folksonomy: A Mash-up of Apples and Oranges," Originally published to the web in 2005, Int'l Journal on Semantic Web & Information Systems, 3(2), 2007, 7 pages.

Gruber, T. R., "Siri, a Virtual Personal Assistant—Bringing Intelligence to the Interface," Jun. 16, 2009, Keynote presentation at Semantic Technologies conference, Jun. 2009. http://tomgruber.org/writing/semtech09.htm, 22 pages.

Gruber, T. R., "TagOntology," Presentation to Tag Camp, www.tagcamp.org, Oct. 29, 2005, 20 pages.

Gruber, T. R., et al., "Toward a Knowledge Medium for Collaborative Product Development," In Artificial Intelligence in Design 1992, from Proceedings of the Second International Conference on Artificial Intelligence in Design, Pittsburgh, USA, Jun. 22-25, 1992, 19 pages.

Gruber, T. R., "Toward Principles for the Design of Ontologies Used for Knowledge Sharing," In International Journal Human-Computer Studies 43, p. 907-928, substantial revision of paper presented at the International Workshop on Formal Ontology, Mar. 1993, Padova, Italy, available as Technical Report KSL 93-04, Knowledge Systems Laboratory, Stanford University, further revised Aug. 23, 1993, 23 pages.

Guzzoni, D., et al., "Active, A Platform for Building Intelligent Operating Rooms," Surgetica 2007 Computer-Aided Medical Interventions: tools and applications, pp. 191-198, Paris, 2007, Sauramps Médical, http://lsro.epfl.ch/page-68384-en.html, 8 pages.

Guzzoni, D., et al., "Active, A Tool for Building Intelligent User Interfaces," ASC 2007, Palma de Mallorca, http://lsro.epfl.ch/page-34241.html, 6 pages.

Hardawar, D., "Driving app Waze builds its own Siri for hands-free voice control," Feb. 9, 2012, http://venturebeat.com/2012/02/09/driving-app-waze-builds-its-own-siri-for-hands-free-voice-control/, 4 pages.

Intraspect Software, "The Intraspect Knowledge Management Solution: Technical Overview," http://tomgruber.org/writing/intraspect-whitepaper-1998.pdf, 18 pages.

Julia, L., et al., Un éditeur interactif de tableaux dessinés à main levée (An Interactive Editor for Hand-Sketched Tables), Traitement du Signal 1995, vol. 12, No. 6, 8 pages. No English Translation Available.

Karp, P. D., "A Generic Knowledge-Base Access Protocol," May 12, 1994, http://lecture.cs.buu.ac.th/~f50353/Document/gfp.pdf, 66 pages.

Lemon, O., et al., "Multithreaded Context for Robust Conversational Interfaces: Context-Sensitive Speech Recognition and Interpretation of Corrective Fragments," Sep. 2004, ACM Transactions on Computer-Human Interaction, vol. 11, No. 3, 27 pages.

Leong, L., et al., "CASIS: A Context-Aware Speech Interface System," IUI'05, Jan. 9-12, 2005, Proceedings of the 10th international conference on Intelligent user interfaces, San Diego, California, USA, 8 pages.

Lieberman, H., et al., "Out of context: Computer systems that adapt to, and learn from, context," 2000, IBM Systems Journal, vol. 39, Nos. 3/4, 2000, 16 pages.

Lin, B., et al., "A Distributed Architecture for Cooperative Spoken Dialogue Agents with Coherent Dialogue State and History," 1999, http://citeseerx.ist.psu.edu/viewdoc/summary?doi=10.1.1.42.272, 4 pages.

McGuire, J., et al., "Shade: Technology for Knowledge-Based Collaborative Engineering," 1993, Journal of Concurrent Engineering: Applications and Research (CERA), 18 pages.

Milward, D., et al., "D2.2: Dynamic Multimodal Interface Reconfiguration," Talk and Look: Tools for Ambient Linguistic Knowledge, Aug. 8, 2006, http://www.ihmc.us/users/nblaylock/Pubs/Files/talk_d2.2.pdf, 69 pages.

Mitra, P., et al., "A Graph-Oriented Model for Articulation of Ontology Interdependencies," 2000, http://ilpubs.stanford.edu:8090/442/1/2000-20.pdf, 15 pages.

Moran, D. B., et al., "Multimodal User Interfaces in the Open Agent Architecture," Proc. of the 1997 International Conference on Intelligent User Interfaces (IUI97), 8 pages.

Mozer, M., "An Intelligent Environment Must be Adaptive," Mar./Apr. 1999, IEEE Intelligent Systems, 3 pages.

Mühlhäuser, M., "Context Aware Voice User Interfaces for Workflow Support," Darmstadt 2007, http://tuprints.ulb.tu-darmstadt.de/876/1/PhD.pdf, 254 pages.

Naone, E., "TR10: Intelligent Software Assistant," Mar.-Apr. 2009, Technology Review, http://www.technologyreview.com/printer_friendly_article.aspx?id=22117, 2 pages.

Neches, R., "Enabling Technology for Knowledge Sharing," Fall 1991, AI Magazine, pp. 37-56, (21 pages).

Nöth, E., et al., "Verbmobil: The Use of Prosody in the Linguistic Components of a Speech Understanding System," IEEE Transactions on Speech and Audio Processing, vol. 8, No. 5, Sep. 2000, 14 pages.

(56) References Cited

OTHER PUBLICATIONS

Rice, J., et al., "Monthly Program: Nov. 14, 1995," The San Francisco Bay Area Chapter of ACM SIGCHI, http://www.baychi.org/calendar/19951114/, 2 pages.
Rice, J., et al., "Using the Web Instead of a Window System," Knowledge Systems Laboratory, Stanford University, http://tomgruber.org/writing/ksl-95-69.pdf, 14 pages.
Rivlin, Z., et al., "Maestro: Conductor of Multimedia Analysis Technologies," 1999 SRI International, Communications of the Association for Computing Machinery (CACM), 7 pages.
Sheth, A., et al., "Relationships at the Heart of Semantic Web: Modeling, Discovering, and Exploiting Complex Semantic Relationships," Oct. 13, 2002, Enhancing the Power of the Internet: Studies in Fuzziness and Soft Computing, SpringerVerlag, 38 pages.
Simonite, T., "One Easy Way to Make Siri Smarter," Oct. 18, 2011, Technology Review, http://www.technologyreview.com/printer_friendly_article.aspx?id=38915, 2 pages.
Stent, A., et al., "The CommandTalk Spoken Dialogue System," 1999, http://acl.ldc.upenn.edu/P/P99/P99-1024.pdf, 8 pages.
Tofel, K., et al., "SpeakToIt: A personal assistant for older iPhones, iPads," Feb. 9, 2012, http://gigaom.com/apple/speaktoit-siri-for-older-iphones-ipads/, 7 pages.
Tucker, J., "Too lazy to grab your TV remote? Use Siri instead," Nov. 30, 2011, http://www.engadget.com/2011/11/30/too-lazy-to-grab-your-tv-remote-use-siri-instead/, 8 pages.
Tur, G., et al., "The CALO Meeting Speech Recognition and Understanding System," 2008, Proc. IEEE Spoken Language Technology Workshop, 4 pages.
Tur, G., et al., "The-CALO-Meeting-Assistant System," IEEE Transactions on Audio, Speech, and Language Processing, vol. 18, No. 6, Aug. 2010, 11 pages.
YouTube, "Knowledge Navigator," 5:34 minute video uploaded to YouTube by Knownav on Apr. 29, 2008, http://www.youtube.com/watch?v=QRH8eimU_20on Aug. 3, 2006, 1 page.
YouTube, "Send Text, Listen to and Send E-Mail 'By Voice' www.voiceassist.com," 2:11 minute video uploaded to YouTube by VoiceAssist on Jul. 30, 2009, http://www.youtube.com/watch?v=0tEU61nHHA4, 1 page.
YouTube, "Text'nDrive App Demo—Listen and Reply to your Messages by Voice while Driving!," 1:57 minute video uploaded to YouTube by TextnDrive on Apr. 27, 2010, http://www.youtube.com/watch?v=WaGfzoHsAMw, 1 page.
YouTube, "Voice on the Go (BlackBerry)," 2:51 minute video uploaded to YouTube by VoiceOnTheGo on Jul. 27, 2009, http://www.youtube.com/watch?v=pJqpWgQS98w, 1 page.
International Search Report and Written Opinion dated Nov. 29, 2011, received in International Application No. PCT/US2011/20861, which corresponds to U.S. Appl. No. 12/987,982, 15 pages (Thomas Robert Gruber).
Guzzoni, Didier, et al., "Modeling Human-Agent Interaction with Active Ontologies", American Association for Artificial Intelligence, 2007, 8 pages.
Keleher, Erin, et al., "Vlingo Launches Voice Enablement Application of Apple App Store", Cambridge, Mass., Dec. 3, 2008, www.vlingo.com. 2 pages.
Agnäs, MS., et al., "Spoken Language Translator: First-Year Report," Jan. 1994, SICS (ISSN 0283-3638), SRI and Telia Research AB, 161 pages.
Allen, J., "Natural Language Understanding," 2nd Edition, Copyright © 1995 by the Benjamin/Cummings Publishing Company, Inc., 671 pages.
Alshawi, H., et al., "CLARE: A Contextual Reasoning and Cooperative Response Framework for the Core Language Engine," Dec. 1992, SRI International, Cambridge Computer Science Research Centre, Cambridge, 273 pages.
Alshawi, H., et al., "Declarative Derivation of Database Queries from Meaning Representations," Oct. 1991, Proceedings of the Bankai Workshop on Intelligent Information Access, 12 pages.
Alshawi H., et al., "Logical Forms in the Core Language Engine," 1989, Proceedings of the 27th Annual Meeting of the Association for Computational Linguistics, 8 pages.
Alshawi, H., et al., "Overview of the Core Language Engine," Sep. 1988, Proceedings of Future Generation Computing Systems, Tokyo, 13 pages.
Alshawi, H., "Translation and Monotonic Interpretation/Generation," Jul. 1992, SRI International, Cambridge Computer Science Research Centre, Cambridge, 18 pages, http://www.cam.sri.com/tr/crc024/paper.ps.Z_1992.
Appelt, D., et al., "Fastus: A Finite-state Processor for Information Extraction from Real-world Text," 1993, Proceedings of IJCAI, 8 pages.
Appelt, D., et al., "SRI: Description of the JV-FASTUS System Used for MUC-5," 1993, SRI International, Artificial Intelligence Center, 19 pages.
Appelt, D., et al., SRI International Fastus System MUC-6 Test Results and Analysis, 1995, SRI International, Menlo Park, California, 12 pages.
Archbold, A., et al., "A Team User's Guide," Dec. 21, 1981, SRI International, 70 pages.
Bear, J., et al., "A System for Labeling Self-Repairs in Speech," Feb. 22, 1993, SRI International, 9 pages.
Bear, J., et al., "Detection and Correction of Repairs in Human-Computer Dialog," May 5, 1992, SRI International, 11 pages.
Bear, J., et al., "Integrating Multiple Knowledge Sources for Detection and Correction of Repairs in Human-Computer Dialog," 1992, Proceedings of the 30th annual meeting on Association for Computational Linguistics (ACL), 8 pages.
Bear, J., et al., "Using Information Extraction to Improve Document Retrieval," 1998, SRI International, Menlo Park, California, 11 pages.
Berry, P., et al., "Task Management under Change and Uncertainty Constraint Solving Experience with the CALO Project," 2005, Proceedings of CP'05 Workshop on Constraint Solving under Change, 5 pages.
Bobrow, R. et al., "Knowledge Representation for Syntactic/Semantic Processing," From: AAA-80 Proceedings. Copyright © 1980, AAAI, 8 pages.
Bouchou, B., et al., "Using Transducers in Natural Language Database Query," Jun. 17-19, 1999, Proceedings of 4th International Conference on Applications of Natural Language to Information Systems, Austria, 17 pages.
Bratt, H., et al., "The SRI Telephone-based ATIS System," 1995, Proceedings of ARPA Workshop on Spoken Language Technology, 3 pages.
Bulyko, I. et al., "Error-Correction Detection and Response Generation in a Spoken Dialogue System," © 2004 Elsevier B.V., specom. 2004.09.009, 18 pages.
Burke, R., et al., "Question Answering from Frequently Asked Question Files," 1997, AI Magazine, vol. 18, No. 2, 10 pages.
Burns, A., et al., "Development of a Web-Based Intelligent Agent for the Fashion Selection and Purchasing Process via Electronic Commerce," Dec. 31, 1998, Proceedings of the Americas Conference on Information system (AMCIS), 4 pages.
Carter, D., "Lexical Acquisition in the Core Language Engine," 1989, Proceedings of the Fourth Conference on the European Chapter of the Association for Computational Linguistics, 8 pages.
Carter, D., et al., "The Speech-Language Interface in the Spoken Language Translator," Nov. 23, 1994, SRI International, 9 pages.
Chai, J., et al., "Comparative Evaluation of a Natural Language Dialog Based System and a Menu Driven System for Information Access: a Case Study," Apr. 2000, Proceedings of the International Conference on Multimedia Information Retrieval (RIAO), Paris, 11 pages.
Cheyer, A., et al., "Multimodal Maps: An Agent-based Approach," International Conference on Cooperative Multimodal Communication, 1995, 15 pages.
Cheyer, A., et al., "The Open Agent Architecture," Autonomous Agents and Multi-Agent systems, vol. 4, Mar. 1, 2001, 6 pages.
Cheyer, A., et al., "The Open Agent Architecture: Building communities of distributed software agents" Feb. 21, 1998, Artificial Intel-

(56) References Cited

OTHER PUBLICATIONS ligence Center SRI International, Power Point presentation, downloaded from http://www.ai.sri.com/~oaa/, 25 pages.
Codd, E. F., "Databases: Improving Usability and Responsiveness—'How About Recently'," Copyright © 1978, by Academic Press, Inc., 28 pages.
Cohen, P.R., et al., "An Open Agent Architecture," 1994, 8 pages. http://citeseerx.ist.psu.edu/viewdoc/summary?doi=10.1.1.30.480.
Coles, L. S., et al., "Chemistry Question-Answering," Jun. 1969, SRI International, 15 pages.
Coles, L. S., "Techniques for Information Retrieval Using an Inferential Question-Answering System with Natural-Language Input," Nov. 1972, SRI International, 198 Pages.
Coles, L. S., "The Application of Theorem Proving to Information Retrieval," Jan. 1971, SRI International, 21 pages.
Constantinides, P., et al., "A Schema Based Approach to Dialog Control," 1998, Proceedings of the International Conference on Spoken Language Processing, 4 pages.
Cox, R. V., et al., "Speech and Language Processing for Next-Millennium Communications Services," Proceedings of the IEEE, vol. 88, No. 8, Aug. 2000, 24 pages.
Craig, J., et al., "Deacon: Direct English Access and Control," Nov. 7-10, 1966 AFIPS Conference Proceedings, vol. 19, San Francisco, 18 pages.
Dar, S., et al., "DTL's DataSpot: Database Exploration Using Plain Language," 1998 Proceedings of the 24th VLCB Conference, New York, 5 pages.
Davis, Z., et al., "A Personal Handheld Multi-Modal Shopping Assistant," 2006 IEEE, 9 pages.
Decker, K., et al., "Designing Behaviors for Information Agents," The Robotics Institute, Carnegie-Mellon University, paper, Jul. 6, 1996, 15 pages.
Decker, K., et al., "Matchmaking and Brokering," The Robotics Institute, Carnegie-Mellon University, paper, May 16, 1996, 19 pages.
Dowding, J., et al., "Gemini: A Natural Language System for Spoken-Language Understanding," 1993, Proceedings of the Thirty-First Annual Meeting of the Association for Computational Linguistics, 8 pages.
Dowding, J., et al., "Interleaving Syntax and Semantics in an Efficient Bottom-Up Parser," 1994, Proceedings of the 32nd Annual Meeting of the Association for Computational Linguistics, 7 pages.
Epstein, M., et al., "Natural Language Access to a Melanoma Data Base," Sep. 1978, SRI International, 7 pages.
Exhibit 1, "Natural Language Interface Using Constrained Intermediate Dictionary of Results," Classes/Subclasses Manually Reviewed for the Search of U.S. Pat. No. 7,177,798, Mar. 22, 2013, 1 page.
Exhibit 1, "Natural Language Interface Using Constrained Intermediate Dictionary of Results," List of Publications Manually reviewed for the Search of U.S. Pat. No. 7,177,798, Mar. 22, 2013, 1 page.
Ferguson, G., et al., "Trips: An Integrated Intelligent Problem-Solving Assistant," 1998, Proceedings of the Fifteenth National Conference on Artificial Intelligence (AAAI-98) and Tenth Conference on Innovative Applications of Artificial Intelligence (IAAI-98), 7 pages.
Fikes, R., et al., "A Network-based knowledge Representation and its Natural Deduction System," Jul. 1977, SRI International, 43 pages.
Gambäck, B., et al., "The Swedish Core Language Engine," 1992 NOTEX Conference, 17 pages.
Glass, J., et al., "Multilingual Language Generation Across Multiple Domains," Sep. 18-22, 1994, International Conference on Spoken Language Processing, Japan, 5 pages.
Green, C. "The Application of Theorem Proving to Question-Answering Systems," Jun. 1969, SRI Stanford Research Institute, Artificial Intelligence Group, 169 pages.
Gregg, D. G., "DSS Access on the WWW: An Intelligent Agent Prototype," 1998 Proceedings of the Americas Conference on Information Systems—Association for Information Systems, 3 pages.
Grishman, R., "Computational Linguistics: An Introduction," © Cambridge University Press 1986, 172 pages.

Grosz, B. et al., "Dialogic: A Core Natural-Language Processing System," Nov. 9, 1982, SRI International, 17 pages.
Grosz, B. et al., "Research on Natural-Language Processing at SRI," Nov. 1981, SRI International, 21 pages.
Grosz, B., et al., "Team: An Experiment in the Design of Transportable Natural-Language Interfaces," Artificial Intelligence, vol. 32, 1987, 71 pages.
Grosz, B., "Team: A Transportable Natural-Language Interface System," 1983, Proceedings of the First Conference on Applied Natural Language Processing, 7 pages.
Guida, G., et al., "NLI: A Robust Interface for Natural Language Person-Machine Communication," Int. J. Man-Machine Studies, vol. 17, 1982, 17 pages.
Guzzoni, D., et al., "Active, A platform for Building Intelligent Software," Computational Intelligence 2006, 5 pages. http://www.informatik.uni-trier.de/~ley/pers/hd/g/Guzzoni:Didier.
Guzzoni, D., "Active: A unified platform for building intelligent assistant applications," Oct. 25, 2007, 262 pages.
Guzzoni, D., et al., "A Unified Platform for Building Intelligent Web Interaction Assistants," Proceedings of the 2006 IEEE/WIC/ACM International Conference on Web Intelligence and Intelligent Agent Technology, Computer Society, 4 pages.
Guzzoni, D., et al., "Many Robots Make Short Work," 1996 AAAI Robot Contest, SRI International, 9 pages.
Haas, N., et al., "An Approach to Acquiring and Applying Knowledge," Nov. 1980, SRI International, 22 pages.
Hadidi, R., et al., "Students' Acceptance of Web-Based Course Offerings: An Empirical Assessment," 1998 Proceedings of the Americas Conference on Information Systems (AMCIS), 4 pages.
Hawkins, J., et al., "Hierarchical Temporal Memory: Concepts, Theory, and Terminology," Mar. 27, 2007, Numenta, Inc., 20 pages.
He, Q., et al., "Personal Security Agent: KQML-Based PKI," The Robotics Institute, Carnegie-Mellon University, paper, Oct. 1, 1997, 14 pages.
Hendrix, G. et al., "Developing a Natural Language Interface to Complex Data," ACM Transactions on Database Systems, vol. 3, No. 2, Jun. 1978, 43 pages.
Hendrix, G., "Human Engineering for Applied Natural Language Processing," Feb. 1977, SRI International, 27 pages.
Hendrix, G., "Klaus: A System for Managing Information and Computational Resources," Oct. 1980, SRI International, 34 pages.
Hendrix, G., "Lifer: A Natural Language Interface Facility," Dec. 1976, SRI Stanford Research Institute, Artificial Intelligence Center, 9 pages.
Hendrix, G., "Natural-Language Interface," Apr.-Jun. 1982, American Journal of Computational Linguistics, vol. 8, No. 2, 7 pages.
Hendrix, G., "The Lifer Manual: A Guide to Building Practical Natural Language Interfaces," Feb. 1977, SRI International, 76 pages.
Hendrix, G., et al., "Transportable Natural-Language Interfaces to Databases," Apr. 30, 1981, SRI International, 18 pages.
Hirschman, L., et al., "Multi-Site Data Collection and Evaluation in Spoken Language Understanding," 1993, Proceedings of the workshop on Human Language Technology, 6 pages.
Hobbs, J., et al., "Fastus: A System for Extracting Information from Natural-Language Text," Nov. 19, 1992, SRI International, Artificial Intelligence Center, 26 pages.
Hobbs, J., et al.,"Fastus: Extracting Information from Natural-Language Texts," 1992, SRI International, Artificial Intelligence Center, 22 pages.
Hobbs, J., "Sublanguage and Knowledge," Jun. 1984, SRI International, Artificial Intelligence Center, 30 pages.
Hodjat, B., et al., "Iterative Statistical Language Model Generation for Use with an Agent-Oriented Natural Language Interface," vol. 4 of the Proceedings of HCI International 2003, 7 pages.
Huang, X., et al., "The SPHINX-II Speech Recognition System: An Overview," Jan. 15, 1992, Computer, Speech and Language, 14 pages.
Issar, S., et al., "CMU's Robust Spoken Language Understanding System," 1993, Proceedings of Eurospeech, 4 pages.
Issar, S., "Estimation of Language Models for New Spoken Language Applications," Oct. 3-6, 1996, Proceedings of 4th International Conference on Spoken language Processing, Philadelphia, 4 pages.

(56) References Cited

OTHER PUBLICATIONS

Janas, J., "The Semantics-Based Natural Language Interface to Relational Databases," © Springer-Verlag Berlin Heidelberg 1986, Germany, 48 pages.
Johnson, J., "A Data Management Strategy for Transportable Natural Language Interfaces," Jun. 1989, doctoral thesis submitted to the Department of Computer Science, University of British Columbia, Canada, 285 pages.
Julia, L., et al., "http://www.speech.sri.com/demos/atis.html," 1997, Proceedings of AAAI, Spring Symposium, 5 pages.
Kahn, M., et al., "CoABS Grid Scalability Experiments," 2003, Autonomous Agents and Multi-Agent Systems, vol. 7, 8 pages.
Kamel, M., et al., "A Graph Based Knowledge Retrieval System," © 1990 IEEE, 7 pages.
Katz, B., "Annotating the World Wide Web Using Natural Language," 1997, Proceedings of the 5th RIAO Conference on Computer Assisted Information Searching on the Internet, 7 pages.
Katz, B., "A Three-Step Procedure for Language Generation," Dec. 1980, Massachusetts Institute of Technology, Artificial Intelligence Laboratory, 42 pages.
Kats, B., et al., "Exploiting Lexical Regularities in Designing Natural Language Systems," 1988, Proceedings of the 12th International Conference on Computational Linguistics, Coling'88, Budapest, Hungary, 22 pages.
Katz, B., et al., "Rextor: A System for Generating Relations from Natural Language," In Proceedings of the ACL Oct. 2000 Workshop on Natural Language Processing and Information Retrieval (NLP &IR), 11 pages.
Katz, B., "Using English for Indexing and Retrieving," 1988 Proceedings of the 1st RIAO Conference on User-Oriented Content-Based Text and Image (RIAO'88), 19 pages.
Konolige, K., "A Framework for a Portable Natural-Language Interface to Large Data Bases," Oct. 12, 1979, SRI International, Artificial Intelligence Center, 54 pages.
Laird, J., et al., "SOAR: An Architecture for General Intelligence," 1987, Artificial Intelligence vol. 33, 64 pages.
Langly, P., et al., "A Design for the Icarus Architechture," SIGART Bulletin, vol. 2, No. 4, 6 pages.
Larks, "Intelligent Software Agents: Larks," 2006, downloaded on Mar. 15, 2013 from http://www.cs.cmu.edu/larks.html, 2 pages.
Martin, D., et al., "Building Distributed Software Systems with the Open Agent Architecture," Mar. 23-25, 1998, Proceedings of the Third International Conference on the Practical Application of Intelligent Agents and Multi-Agent Technology, 23 pages.
Martin, D., et al., "Development Tools for the Open Agent Architecture," Apr. 1996, Proceedings of the International Conference on the Practical Application of Intelligent Agents and Multi-Agent Technology, 17 pages.
Martin, D., et al., "Information Brokering in an Agent Architecture," Apr. 1997, Proceedings of the second International Conference on the Practical Application of Intelligent Agents and Multi-Agent Technology, 20 pages.
Martin, D., et al., "PAAM '98 Tutorial: Building and Using Practical Agent Applications," 1998, SRI International, 78 pages.
Martin, P., et al., "Transportability and Generality in a Natural-Language Interface System," Aug. 8-12, 1983, Proceedings of the Eight International Joint Conference on Artificial Intelligence, West Germany, 21 pages.
Matiasek, J., et al., "Tamic-P: A System for NL Access to Social Insurance Database," Jun. 17-19, 1999, Proceeding of the 4th International Conference on Applications of Natural Language to Information Systems, Austria, 7 pages.
Michos, S.E., et al., "Towards an adaptive natural language interface to command languages," Natural Language Engineering 2 (3), © 1994 Cambridge University Press, 19 pages.
Milstead, J., et al., "Metadata: Cataloging by Any Other Name . . . " Jan. 1999, Online, Copyright © 1999 Information Today, Inc., 18 pages.

Minker, W., et al., "Hidden Understanding Models for Machine Translation," 1999, Proceedings of ETRW on Interactive Dialogue in Multi-Modal Systems, 4 pages.
Modi, P. J., et al., "CMRadar: A Personal Assistant Agent for Calendar Management," © 2004, American Association for Artificial Intelligence, Intelligent Systems Demonstrations, 2 pages.
Moore, R., et al., "Combining Linguistic and Statistical Knowledge Sources in Natural-Language Processing for ATIS," 1995, SRI International, Artificial Intelligence Center, 4 pages.
Moore, R., "Handling Complex Queries in a Distributed Data Base," Oct. 8, 1979, SRI International, Artificial Intelligence Center, 38 pages.
Moore, R., "Practical Natural-Language Processing by Computer," Oct. 1981, SRI International, Artificial Intelligence Center, 34 pages.
Moore, R., et al., "SRI's Experience with the ATIS Evaluation," Jun. 24-27, 1990, Proceedings of a workshop held at Hidden Valley, Pennsylvania, 4 pages.
Moore, et al., "The Information Warefare Advisor: An Architecture for Interacting with Intelligent Agents Across the Web," Dec. 31, 1998 Proceedings of Americas Conference on Information Systems (AMCIS), 4 pages.
Moore, R., "The Role of Logic in Knowledge Representation and Commonsense Reasoning," Jun. 1982, SRI International, Artificial Intelligence Center, 19 pages.
Moore, R., "Using Natural-Language Knowledge Sources in Speech Recognition," Jan. 1999, SRI International, Artificial Intelligence Center, 24 pages.
Moran, D., et al., "Intelligent Agent-based User Interfaces," Oct. 12-13, 1995, Proceedings of International Workshop on Human Interface Technology, University of Aizu, Japan, 4 pages. http://www.dougmoran.com/dmoran/PAPERS/oaa-iwhit1995.pdf.
Moran, D., "Quantifier Scoping in the SRI Core Language Engine," 1988, Proceedings of the 26th annual meeting on Association for Computational Linguistics, 8 pages.
Motro, A., "Flex: A Tolerant and Cooperative User Interface to Databases," IEEE Transactions on Knowledge and Data Engineering, vol. 2, No. 2, Jun. 1990, 16 pages.
Murveit, H., et al., "Speech Recognition in SRI's Resource Management and ATIS Systems," 1991, Proceedings of the workshop on Speech and Natural Language (HTL'91), 7 pages.
OAA, "The Open Agent Architecture 1.0 Distribution Source Code," Copyright 1999, SRI International, 2 pages.
Odubiyi, J., et al., "SAIRE—a scalable agent-based information retrieval engine," 1997 Proceedings of the First International Conference on Autonomous Agents, 12 pages.
Owei, V., et al., "Natural Language Query Filtration in the Conceptual Query Language," © 1997 IEEE, 11 pages.
Pannu, A., et al., "A Learning Personal Agent for Text Filtering and Notification," 1996, The Robotics Institute School of Computer Science, Carnegie-Mellon University, 12 pages.
Pereira, "Logic for Natural Language Analysis," Jan. 1983, SRI International, Artificial Intelligence Center, 194 pages.
Perrault, C.R., et al., "Natural-Language Interfaces," Aug. 22, 1986, SRI International, 48 pages.
Pulman, S.G., et al., "Clare: A Combined Language and Reasoning Engine," 1993, Proceedings of JFIT Conference, 8 pages. URL: http://www.cam.sri.com/tr/crc042/paper.ps.Z.
Ravishankar, "Efficient Algorithms for Speech Recognition," May 15, 1996, Doctoral Thesis submitted to School of Computer Science, Computer Science Division, Carnegie Mellon University, Pittsburg, 146 pages.
Rayner, M., "Abductive Equivalential Translation and its application to Natural Language Database Interfacing," Sep. 1993 Dissertation paper, SRI International, 163 pages.
Rayner, M., et al., "Adapting the Core Language Engine to French and Spanish," May 10, 1996, Cornell University Library, 9 pages. http://arxiv.org/abs/cmp-lg/9605015.
Rayner, M., et al., "Deriving Database Queries from Logical Forms by Abductive Definition Expansion," 1992, Proceedings of the Third Conference on Applied Natural Language Processing, ANLC'92, 8 pages.

(56) References Cited

OTHER PUBLICATIONS

Rayner, M., "Linguistic Domain Theories: Natural-Language Database Interfacing from First Principles," 1993, SRI International, Cambridge, 11 pages.
Rayner, M., et al., "Spoken Language Translation With Mid-90's Technology: A Case Study," 1993, Eurospeech, ISCA, 4 pages. http://dblp.uni-trier.de/db/conf/interspeech/eurospeech1993.html#RaynerBCCDGKKLPPS93.
Rudnicky, A.I., et al., "Creating Natural Dialogs in the Carnegie Mellon Communicator System,".
Russell, S., et al., "Artificial Intelligence, A Modern Approach," © 1995 Prentice Hall, Inc., 121 pages.
Sacerdoti, E., et al., "A Ladder User's Guide (Revised)," Mar. 1980, SRI International, Artificial Intelligence Center, 39 pages.
Sagalowicz, D., "A D-Ladder User's Guide," Sep. 1980, SRI International, 42 pages.
Sameshima, Y., et al., "Authorization with security attributes and privilege delegation Access control beyond the ACL," Computer Communications, vol. 20, 1997, 9 pages.
San-Segundo, R., et al., "Confidence Measures for Dialogue Management in the CU Communicator System," Jun. 5-9, 2000, Proceedings of Acoustics, Speech, and Signal Processing (ICASSP'00), 4 pages.
Sato, H., "A Data Model, Knowledge Base, and Natural Language Processing for Sharing a Large Statistical Database," 1989, Statistical and Scientific Database Management, Lecture Notes in Computer Science, vol. 339, 20 pages.
Schnelle, D., "Context Aware Voice User Interfaces for Workflow Support," Aug. 27, 2007, Dissertation paper, 254 pages.
Sharoff, S., et al., "Register-domain Separation as a Methodology for Development of Natural Language Interfaces to Databases," 1999, Proceedings of Human-Computer Interaction (INTERACT'99), 7 pages.
Shimazu, H., et al., "CAPIT: Natural Language Interface Design Tool with Keyword Analyzer and Case-Based Parser," NEC Research & Development, vol. 33, No. 4, Oct. 1992, 11 pages.
Shinkle, L., "Team User's Guide," Nov. 1984, SRI International, Artificial Intelligence Center, 78 pages.
Shklar, L., et al., "Info Harness: Use of Automatically Generated Metadata for Search and Retrieval of Heterogeneous Information," 1995 Proceedings of CAiSE'95, Finland.
Singh, N., "Unifying Heterogeneous Information Models," 1998 Communications of the ACM, 13 pages.
SRI2009, "SRI Speech: Products: Software Development Kits: EduSpeak," 2009, 2 pages, available at http://web.archive.org/web/20090828084033/http://www.speechatsri.com/products/eduspeak.shtml.
Starr, B., et al., "Knowledge-Intensive Query Processing," May 31, 1998, Proceedings of the 5th KRDB Workshop, Seattle, 6 pages.
Stern, R., et al. "Multiple Approaches to Robust Speech Recognition," 1992, Proceedings of Speech and Natural Language Workshop, 6 pages.
Stickel, "A Nonclausal Connection-Graph Resolution Theorem-Proving Program," 1982, Proceedings of AAAI'82, 5 pages.
Sugumaran, V., "A Distributed Intelligent Agent-Based Spatial Decision Support System," Dec. 31, 1998, Proceedings of the Americas Conference on Information systems (AMCIS), 4 pages.
Sycara, K., et al., "Coordination of Multiple Intelligent Software Agents," International Journal of Cooperative Information Systems (IJCIS), vol. 5, Nos. 2 & 3, Jun. & Sep. 1996, 33 pages.
Sycara, K., et al., "Distributed Intelligent Agents," IEEE Expert, vol. 11, No. 6, Dec. 1996, 32 pages.
Sycara, K., et al., "Dynamic Service Matchmaking Among Agents in Open Information Environments ," 1999, SIGMOD Record, 7 pages.
Sycara, K., et al., "The RETSINA MAS Infrastructure," 2003, Autonomous Agents and Multi-Agent Systems, vol. 7, 20 pages.
Tyson, M., et al., "Domain-Independent Task Specification in the TACITUS Natural Language System," May 1990, SRI International, Artificial Intelligence Center, 16 pages.

Wahlster, W., et al., "Smartkom: multimodal communication with a life-like character," 2001 Eurospeech—Scandinavia, 7th European Conference on Speech Communication and Technology, 5 pages.
Waldinger, R., et al., "Deductive Question Answering from Multiple Resources," 2003, New Directions in Question Answering, published by AAAI, Menlo Park, 22 pages.
Walker, D., et al., "Natural Language Access to Medical Text," Mar. 1981, SRI International, Artificial Intelligence Center, 23 pages.
Waltz, D., "An English Language Question Answering System for a Large Relational Database," © 1978 ACM, vol. 21, No. 7, 14 pages.
Ward, W., et al., "A Class Based Language Model for Speech Recognition," © 1996 IEEE, 3 pages.
Ward, W., et al., "Recent Improvements in the CMU Spoken Language Understanding System," 1994, ARPA Human Language Technology Workshop, 4 pages.
Ward, W., "The CMU Air Travel Information Service: Understanding Spontaneous Speech," 3 pages.
Warren, D.H.D., et al., "An Efficient Easily Adaptable System for Interpreting Natural Language Queries," Jul.-Dec. 1982, American Journal of Computational Linguistics, vol. 8, No. 3-4, 11 pages.
Weizenbaum, J., "ELIZA—A Computer Program for the Study of Natural Language Communication Between Man and Machine," Communications of the ACM, vol. 9, No. 1, Jan. 1966, 10 pages.
Winiwarter, W., "Adaptive Natural Language Interfaces to FAQ Knowledge Bases," Jun. 17-19, 1999, Proceedings of 4th International Conference on Applications of Natural Language to Information Systems, Austria, 22 pages.
Wu, X. et al., "KDA: A Knowledge-based Database Assistant," Data Engineering, Feb. 6-10, 1989, Proceeding of the Fifth International Conference on Engineering (IEEE Cat. No. 89CH2695-5), 8 pages.
Yang, J., et al., "Smart Sight: A Tourist Assistant System," 1999 Proceedings of Third International Symposium on Wearable Computers, 6 pages.
Zeng, D., et al., "Cooperative Intelligent Software Agents," The Robotics Institute, Carnegie-Mellon University, Mar. 1995, 13 pages.
Zhao, L., "Intelligent Agents for Flexible Workflow Systems," Oct. 31, 1998 Proceedings of the Americas Conference on Information Systems (AMCIS), 4 pages.
Zue, V., et al., "From Interface to Content: Translingual Access and Delivery of On-Line Information," 1997, Eurospeech, 4 pages.
Zue, V., et al., "Jupiter: A Telephone-Based Conversational Interface for Weather Information," Jan. 2000, IEEE Transactions on Speech and Audio Processing, 13 pages.
Zue, V., et al., "Pegasus: A Spoken Dialogue Interface for On-Line Air Travel Planning," 1994 Elsevier, Speech Communication 15 (1994), 10 pages.
Zue, V., et al., "The Voyager Speech Understanding System: Preliminary Development and Evaluation," 1990, Proceedings of IEEE 1990 International Conference on Acoustics, Speech, and Signal Processing, 4 pages.
Australian Office Action dated Jul. 2, 2013 for Application No. 2011205426, 9 pages.
Certificate of Examination dated Apr. 29, 2013 for Australian Patent No. 2012101191, 4 pages.
Certificate of Examination dated May 21, 2013 for Australian Patent No. 2012101471, 5 pages.
Certificate of Examination dated May 10, 2013 for Australian Patent No. 2012101466, 4 pages.
Certificate of Examination dated May 9, 2013 for Australian Patent No. 2012101473, 4 pages.
Certificate of Examination dated May 6, 2013 for Australian Patent No. 2012101470, 5 pages.
Certificate of Examination dated May 2, 2013 for Australian Patent No. 2012101468, 5 pages.
Certificate of Examination dated May 6, 2013 for Australian Patent No. 2012101472, 5 pages.
Certificate of Examination dated May 6, 2013 for Australian Patent No. 2012101469, 4 pages.
Certificate of Examination dated May 13, 2013 for Australian Patent No. 2012101465, 5 pages.
Certificate of Examination dated May 13, 2013 for Australian Patent No. 2012101467, 5 pages.

(56) References Cited

OTHER PUBLICATIONS

Extended European Search Report dated Jul. 16, 2013, received in Application No. 12186663.6-1910, which corresponds to U.S. Appl. No. 13/250,854, 8 pages (Gruber).
Notice of Allowance dated Jul. 10, 2013, received in U.S. Appl. No. 13/725,656, 14 pages (Gruber).
Notice of Allowance dated Jun. 12, 2013, received in U.S. Appl. No. 11/518,292, 16 pages (Cheyer).
Final Office Action dated Jun. 13, 2013, received in U.S. Appl. No. 13/251,118, 42 pages (Gruber).
Office Action dated Jul. 26, 2013, received in U.S. Appl. No. 13/725,512, 36 pages (Gruber).
Office Action dated Jul. 11, 2013, received in U.S. Appl. No. 13/784,707, 29 pages (Cheyer).
Office Action dated Jul. 5, 2013, received in U.S. Appl. No. 13/725,713, 34 pages (Guzzoni).
Office Action dated Jul. 2, 2013, received in U.S. Appl. No. 13/725,761, 14 pages (Gruber).
Office Action dated Jun. 28, 2013, received in U.S. Appl. No. 13/725,616, 29 pages (Cheyer).
Office Action dated Jun. 27, 2013, received in U.S. Appl. No. 13/725,742, 29 pages (Cheyer).
Office Action dated May 23, 2013, received in U.S. Appl. No. 13/784,694, 27 pages (Gruber).
Office Action dated Jul. 5, 2013, received in U.S. Appl. No. 13/725,481, 26 pages (Gruber).
Australian Office Action dated Oct. 31, 2012 for Application No. 2012101191, 6 pages.
Martin, D., et al., "The Open Agent Architecture: A Framework for building distributed software systems," Jan.-Mar. 1999, Applied Artificial Intelligence: An International Journal, vol. 13, No. 1-2, http://adam.cheyer.com/papers/oaa.pdf, 38 pages.
Acero, A., et al., "Environmental Robustness in Automatic Speech Recognition," International Conference on Acoustics, Speech, and Signal Processing (ICASSP'90), Apr. 3-6, 1990, 4 pages.
Acero, A., et al., "Robust Speech Recognition by Normalization of the Acoustic Space," International Conference on Acoustics, Speech, and Signal Processing, 1991, 4 pages.
Ahlbom, G., et al., "Modeling Spectral Speech Transitions Using Temporal Decomposition Techniques," IEEE International Conference of Acoustics, Speech, and Signal Processing (ICASSP'87), Apr. 1987, vol. 12, 4 pages.
Aikawa, K., "Speech Recognition Using Time-Warping Neural Networks," Proceedings of the 1991 IEEE Workshop on Neural Networks for Signal Processing, Sep. 30 to Oct. 1, 1991, 10 pages.
Anastasakos, A., et al., "Duration Modeling in Large Vocabulary Speech Recognition," International Conference on Acoustics, Speech, and Signal Processing (ICASSP'95), May 9-12, 1995, 4 pages.
Anderson, R. H., "Syntax-Directed Recognition of Hand-Printed Two-Dimensional Mathematics," In Proceedings of Symposium on Interactive Systems for Experimental Applied Mathematics: Proceedings of the Association for Computing Machinery Inc. Symposium, © 1967, 12 pages.
Ansari, R., et al., "Pitch Modification of Speech using a Low-Sensitivity Inverse Filter Approach," IEEE Signal Processing Letters, vol. 5, No. 3, Mar. 1998, 3 pages.
Anthony, N. J., et al., "Supervised Adaption for Signature Verification System," Jun. 1, 1978, IBM Technical Disclosure, 3 pages.
Apple Computer, "Guide Maker User's Guide," © Apple Computer, Inc., Apr. 27, 1994, 8 pages.
Apple Computer, "Introduction to Apple Guide," © Apple Computer, Inc., Apr. 28, 1994, 20 pages.
Asanović, K., et al., "Experimental Determination of Precision Requirements for Back-Propagation Training of Artificial Neural Networks," In Proceedings of the 2nd International Conference of Microelectronics for Neural Networks, 1991, www.ICSI.Berkeley.EDU, 7 pages.
Atal, B. S., "Efficient Coding of LPC Parameters by Temporal Decomposition," IEEE International Conference on Acoustics, Speech, and Signal Processing (ICASSP'83), Apr. 1983, 4 pages.
Bahl, L. R., et al., "Acoustic Markov Models Used in the Tangora Speech Recognition System," In Proceeding of International Conference on Acoustics, Speech, and Signal Processing (ICASSP'88), Apr. 11-14, 1988, vol. 1, 4 pages.
Bahl, L. R., et al., "A Maximum Likelihood Approach to Continuous Speech Recognition," IEEE Transaction on Pattern Analysis and Machine Intelligence, vol. PAMI-5, No. 2, Mar. 1983, 13 pages.
Bahl, L. R., et al., "A Tree-Based Statistical Language Model for Natural Language Speech Recognition," IEEE Transactions on Acoustics, Speech and Signal Processing, vol. 37, Issue 7, Jul. 1989, 8 pages.
Bahl, L. R., et al., "Large Vocabulary Natural Language Continuous Speech Recognition," In Proceedings of 1989 International Conference on Acoustics, Speech, and Signal Processing, May 23-26, 1989, vol. 1, 6 pages.
Bahl, L. R., et al, "Multonic Markov Word Models for Large Vocabulary Continuous Speech Recognition," IEEE Transactions on Speech and Audio Processing, vol. 1, No. 3, Jul. 1993, 11 pages.
Bahl, L. R., et al., "Speech Recognition with Continuous-Parameter Hidden Markov Models," In Proceeding of International Conference on Acoustics, Speech, and Signal Processing (ICASSP'88), Apr. 11-14, 1988, vol. 1, 8 pages.
Banbrook, M., "Nonlinear Analysis of Speech from a Synthesis Perspective," A thesis submitted for the degree of Doctor of Philosophy, The University of Edinburgh, Oct. 15, 1996, 35 pages.
Belaid, A., et al., "A Syntactic Approach for Handwritten Mathematical Formula Recognition," IEEE Transactions on Pattern Analysis and Machine Intelligence, vol. PAMI-6, No. 1, Jan. 1984, 7 pages.
Bellegarda, E. J., et al., "On-Line Handwriting Recognition Using Statistical Mixtures," Advances in Handwriting and Drawings: A Multidisciplinary Approach, Europia, 6th International IGS Conference on Handwriting and Drawing, Paris-France, Jul. 1993, 11 pages.
Bellegarda, J. R., "A Latent Semantic Analysis Framework for Large-Span Language Modeling," 5th European Conference on Speech, Communication and Technology, (Eurospeech'97), Sep. 22-25, 1997, 4 pages.
Bellegarda, J. R., "A Multispan Language Modeling Framework for Large Vocabulary Speech Recognition," IEEE Transactions on Speech and Audio Processing, vol. 6, No. 5, Sep. 1998, 12 pages.
Bellegarda, J. R., et al., "A Novel Word Clustering Algorithm Based on Latent Semantic Analysis," In Proceedings of the IEEE International Conference on Acoustics, Speech, and Signal Processing (ICASSP'96), vol. 1, 4 pages.
Bellegarda, J. R., et al., "Experiments Using Data Augmentation for Speaker Adaptation," International Conference on Acoustics, Speech, and Signal Processing (ICASSP'95), May 9-12, 1995, 4 pages.
Bellegarda, J. R., "Exploiting Both Local and Global Constraints for Multi-Span Statistical Language Modeling," Proceeding of the 1998 IEEE International Conference on Acoustics, Speech, and Signal Processing (ICASSP'98), vol. 2, May 12-15, 1998, 5 pages.
Bellegarda, J. R., "Exploiting Latent Semantic Information in Statistical Language Modeling," In Proceedings of the IEEE, Aug. 2000, vol. 88, No. 8, 18 pages.
Bellegarda, J. R., "Interaction-Driven Speech Input—A Data-Driven Approach to the Capture of Both Local and Global Language Constraints," 1992, 7 pages, available at http://old.sigchi.org/bulletin/1998.2/bellegarda.html.
Bellegarda, J. R., "Large Vocabulary Speech Recognition with Multispan Statistical Language Models," IEEE Transactions on Speech and Audio Processing, vol. 8, No. 1, Jan. 2000, 9 pages.
Bellegarda, J. R., et al., "Performance of the IBM Large Vocabulary Continuous Speech Recognition System on the ARPA Wall Street Journal Task," Signal Processing VII: Theories and Applications, © 1994 European Association for Signal Processing, 4 pages.
Bellegarda, J. R., et al., "The Metamorphic Algorithm: A Speaker Mapping Approach to Data Augmentation," IEEE Transactions on Speech and Audio Processing, vol. 2, No. 3, Jul. 1994, 8 pages.

(56) References Cited

OTHER PUBLICATIONS

Black, A. W., et al., "Automatically Clustering Similar Units for Unit Selection in Speech Synthesis," In Proceedings of Eurospeech 1997, vol. 2, 4 pages.
Blair, D. C., et al., "An Evaluation of Retrieval Effectiveness for a Full-Text Document-Retrieval System," Communications of the ACM, vol. 28, No. 3, Mar. 1985, 11 pages.
Briner, L. L., "Identifying Keywords in Text Data Processing," In Zelkowitz, Marvin V., ED, Directions and Challenges, 15th Annual Technical Symposium, Jun. 17, 1976, Gaithersbury, Maryland, 7 pages.
Bulyko, I., et al., "Joint Prosody Prediction and Unit Selection for Concatenative Speech Synthesis," Electrical Engineering Department, University of Washington, Seattle, 2001, 4 pages.
Bussey, H. E., et al., "Service Architecture, Prototype Description, and Network Implications of a Personalized Information Grazing Service," INFOCOM'90, Ninth Annual Joint Conference of the IEEE Computer and Communication Societies, Jun. 3-7, 1990, http://slrohall.com/publications/, 8 pages.
Buzo, A., et al., "Speech Coding Based Upon Vector Quantization," IEEE Transactions on Acoustics, Speech, and Signal Processing, vol. Assp-28, No. 5, Oct. 1980, 13 pages.
Caminero-Gil, J., et al., "Data-Driven Discourse Modeling for Semantic Interpretation," In Proceedings of the IEEE International Conference on Acoustics, Speech, and Signal Processing, May 7-10, 1996, 6 pages.
Cawley, G. C., "The Application of Neural Networks to Phonetic Modelling," PhD Thesis, University of Essex, Mar. 1996, 13 pages.
Chang, S., et al., "A Segment-based Speech Recognition System for Isolated Mandarin Syllables," Proceedings TENCON '93, IEEE Region 10 conference on Computer, Communication, Control and Power Engineering, Oct. 19-21, 1993, vol. 3, 6 pages.
Conklin, J., "Hypertext: An Introduction and Survey," Computer Magazine, Sep. 1987, 25 pages.
Connolly, F. T., et al., "Fast Algorithms for Complex Matrix Multiplication Using Surrogates," IEEE Transactions on Acoustics, Speech, and Signal Processing, Jun. 1989, vol. 37, No. 6, 13 pages.
Deerwester, S., et al., "Indexing by Latent Semantic Analysis," Journal of the American Society for Information Science, vol. 41, No. 6, Sep. 1990, 19 pages.
Deller, Jr., J. R., et al., "Discrete-Time Processing of Speech Signals," © 1987 Prentice Hall, ISBN: 0-02-328301-7, 14 pages.
Digital Equipment Corporation, "Open VMS Software Overview," Dec. 1995, software manual, 159 pages.
Donovan, R. E., "A New Distance Measure for Costing Spectral Discontinuities in Concatenative Speech Synthesisers," 2001, http://citeseerx.ist.psu.edu/viewdoc/summary?doi=10.1.1.21.6398, 4 pages.
Frisse, M. E., "Searching for Information in a Hypertext Medical Handbook," Communications of the ACM, vol. 31, No. 7, Jul. 1988, 8 pages.
Goldberg, D., et al., "Using Collaborative Filtering to Weave an Information Tapestry," Communications of the ACM, vol. 35, No. 12, Dec. 1992, 10 pages.
Gorin, A. L., et al., "On Adaptive Acquisition of Language," International Conference on Acoustics, Speech, and Signal Processing (ICASSP'90), vol. 1, Apr. 3-6, 1990, 5 pages.
Gotoh, Y., et al., "Document Space Models Using Latent Semantic Analysis," In Proceedings of Eurospeech, 1997, 4 pages.
Gray, R. M., "Vector Quantization," IEEE ASSP Magazine, Apr. 1984, 26 pages.
Harris, F. J., "On the Use of Windows for Harmonic Analysis with the Discrete Fourier Transform," In Proceedings of the IEEE, vol. 66, No. 1, Jan. 1978, 34 pages.
Helm, R., et al., "Building Visual Language Parsers," In Proceedings of CHI'91 Proceedings of the SIGCHI Conference on Human Factors in Computing Systems, 8 pages, 1991.
Hermansky, H., "Perceptual Linear Predictive (PLP) Analysis of Speech," Journal of the Acoustical Society of America, vol. 87, No. 4, Apr. 1990, 15 pages.

Hermansky, H., "Recognition of Speech in Additive and Convolutional Noise Based on Rasta Spectral Processing," In proceedings of IEEE International Conference on Acoustics, speech, and Signal Processing (ICASSP'93), Apr. 27-30, 1993, 4 pages.
Hoehfeld M., et al., "Learning with Limited Numerical Precision Using the Cascade-Correlation Algorithm," IEEE Transactions on Neural Networks, vol. 3, No. 4, Jul. 1992, 18 pages.
Holmes, J. N., "Speech Synthesis and Recognition—Stochastic Models for Word Recognition," Speech Synthesis and Recognition, Published by Chapman & Hall, London, ISBN 0 412 53430 4, © 1998 J. N. Holmes, 7 pages.
Hon, H.W., et al., "CMU Robust Vocabulary-Independent Speech Recognition System," IEEE International Conference on Acoustics, Speech, and Signal Processing (ICASSP-91), Apr. 14-17, 1991, 4 pages.
IBM Technical Disclosure Bulletin, "Speech Editor," vol. 29, No. 10, Mar. 10, 1987, 3 pages.
IBM Technical Disclosure Bulletin, "Integrated Audio-Graphics User Interface," vol. 33, No. 11, Apr. 1991, 4 pages.
IBM Technical Disclosure Bulletin, "Speech Recognition with Hidden Markov Models of Speech Waveforms," vol. 34, No. 1, Jun. 1991, 10 pages.
Iowegian International, "FIR Filter Properties," dspGuro, Digital Signal Processing Central, http://www.dsaguru.com/dsp/taqs/fir/properties, downloaded on Jul. 28, 2010, 6 pages.
Jacobs, P. S., et al., "Scisor: Extracting Information from On-Line News," Communications of the ACM, vol. 33, No. 11, Nov. 1990, 10 pages.
Jelinek, F., "Self-Organized Language Modeling for Speech Recognition," Readings in Speech Recognition, edited by Alex Waibel and Kai-Fu Lee, May 15, 1990, © 1990 Morgan Kaufmann Publishers, Inc., ISBN: 1-55860-124-4, 63 pages.
Jennings, A., et al., "A Personal News Service Based on a User Model Neural Network," IEICE Transactions on Information and Systems, vol. E75-D, No. 2, Mar. 1992, Tokyo, JP, 12 pages.
Ji, T., et al., "A Method for Chinese Syllables Recognition based upon Sub-syllable Hidden Markov Model," 1994 International Symposium on Speech, Image Processing and Neural Networks, Apr. 13-16, 1994, Hong Kong, 4 pages.
Jones, J., "Speech Recognition for Cyclone," Apple Computer, Inc., E.R.S., Revision 2.9, Sep. 10, 1992, 93 pages.
Katz, S. M., "Estimation of Probabilities from Sparse Data for the Language Model Component of a Speech Recognizer," IEEE Transactions on Acoustics, Speech, and Signal Processing, vol. ASSP-35, No. 3, Mar. 1987, 3 pages.
Kitano, H., "PhiDM-Dialog, An Experimental Speech-to-Speech Dialog Translation System," Jun. 1991 Computer, vol. 24, No. 6, 13 pages.
Klabbers, E., et al., "Reducing Audible Spectral Discontinuities," IEEE Transactions on Speech and Audio Processing, vol. 9, No. 1, Jan. 2001, 13 pages.
Klatt, D. H., "Linguistic Uses of Segmental Duration in English: Acoustic and Perpetual Evidence," Journal of the Acoustical Society of America, vol. 59, No. 5, May 1976, 16 pages.
Kominek, J., et al., "Impact of Durational Outlier Removal from Unit Selection Catalogs," 5th ISCA Speech Synthesis Workshop, Jun. 14-16, 2004, 6 pages.
Kubala, F., et al., "Speaker Adaptation from a Speaker-Independent Training Corpus," International Conference on Acoustics, Speech, and Signal Processing (ICASSP'90), Apr. 3-6, 1990, 4 pages.
Kubala, F., et al., "The Hub and Spoke Paradigm for CSR Evaluation," Proceedings of the Spoken Language Technology Workshop, Mar. 6-8, 1994, 9 pages.
Lee, K.F., "Large-Vocabulary Speaker-Independent Continuous Speech Recognition: The SPHINX System," Apr. 18, 1988, Partial fulfillment of the requirements for the degree of Doctor of Philosophy, Computer Science Department, Carnegie Mellon University, 195 pages.
Lee, L., et al., "A Real-Time Mandarin Dictation Machine for Chinese Language with Unlimited Texts and Very Large Vocabulary," International Conference on Acoustics, Speech and Signal Processing, vol. 1, Apr. 3-6, 1990, 5 pages.

(56) References Cited

OTHER PUBLICATIONS

Lee, L, et al., "Golden Mandarin(II)—An Improved Single-Chip Real-Time Mandarin Dictation Machine for Chinese Language with Very Large Vocabulary," 0-7803-0946-4/93 © 1993IEEE, 4 pages.

Lee, L, et al., "Golden Mandarin(II)—An Intelligent Mandarin Dictation Machine for Chinese Character Input with Adaptation/Learning Functions," International Symposium on Speech, Image Processing and Neural Networks, Apr. 13-16, 1994, Hong Kong, 5 pages.

Lee, L., et al., "System Description of Golden Mandarin (I) Voice Input for Unlimited Chinese Characters," International Conference on Computer Processing of Chinese & Oriental Languages, vol. 5, Nos. 3 & 4, Nov. 1991, 16 pages.

Lin, C.H., et al., "A New Framework for Recognition of Mandarin Syllables With Tones Using Sub-syllabic Unites," IEEE International Conference on Acoustics, Speech, and Signal Processing (ICASSP-93), Apr. 27-30, 1993, 4 pages.

Linde, Y., et al., "An Algorithm for Vector Quantizer Design," IEEE Transactions on Communications, vol. 28, No. 1, Jan. 1980, 12 pages.

Liu, F.H., et al., "Efficient Joint Compensation of Speech for the Effects of Additive Noise and Linear Filtering," IEEE International Conference of Acoustics, Speech, and Signal Processing, ICASSP-92, Mar. 23-26, 1992, 4 pages.

Logan, B., "Mel Frequency Cepstral Coefficients for Music Modeling," In International Symposium on Music Information Retrieval, 2000, 2 pages.

Lowerre, B. T., "The-Harpy Speech Recognition System," Doctoral Dissertation, Department of Computer Science, Carnegie Mellon University, Apr. 1976, 20 pages.

Maghbouleh, A., "An Empirical Comparison of Automatic Decision Tree and Linear Regression Models for Vowel Durations," Revised version of a paper presented at the Computational Phonology in Speech Technology workshop, 1996 annual meeting of the Association for Computational Linguistics in Santa Cruz, California, 7 pages.

Markel, J. D., et al., "Linear Prediction of Speech," Springer-Verlag, Berlin Heidelberg New York 1976, 12 pages.

Morgan, B., "Business Objects," (Business Objects for Windows) Business Objects Inc., DBMS Sep. 1992, vol. 5, No. 10, 3 pages.

Mountford, S. J., et al., "Talking and Listening to Computers," The Art of Human-Computer Interface Design, Copyright © 1990 Apple Computer, Inc. Addison-Wesley Publishing Company, Inc., 17 pages.

Murty, K. S. R., et al., "Combining Evidence from Residual Phase and MFCC Features for Speaker Recognition," IEEE Signal Processing Letters, vol. 13, No. 1, Jan. 2006, 4 pages.

Murveit H. et al., "Integrating Natural Language Constraints into HMM-based Speech Recognition," 1990 International Conference on Acoustics, Speech, and Signal Processing, Apr. 3-6, 1990, 5 pages.

Nakagawa, S., et al., "Speaker Recognition by Combining MFCC and Phase Information," IEEE International Conference on Acoustics Speech and Signal Processing (ICASSP), Mar. 14-19, 2010, 4 pages.

Niesler, T. R., et al., "A Variable-Length Category-Based N-Gram Language Model," IEEE International Conference on Acoustics, Speech, and Signal Processing (ICASSP'96), vol. 1, May 7-10, 1996, 6 pages.

Papadimitriou, C. H., et al., "Latent Semantic Indexing: A Probabilistic Analysis," Nov. 14, 1997, http://citeseerx.ist.psu.edu/messages/downloadsexceeded.html, 21 pages.

Parsons, T. W., "Voice and Speech Processing," Linguistics and Technical Fundamentals, Articulatory Phonetics and Phonemics, © 1987 McGraw-Hill, Inc., ISBN: 0-07-0485541-0, 5 pages.

Parsons, T. W., "Voice and Speech Processing," Pitch and Formant Estimation, © 1987 McGraw-Hill, Inc., ISBN: 0-07-0485541-0, 15 pages.

Picone, J., "Continuous Speech Recognition Using Hidden Markov Models," IEEE ASSP Magazine, vol. 7, No. 3, Jul. 1990, 16 pages.

Rabiner, L. R., et al., "Fundamental of Speech Recognition," © 1993 AT&T, Published by Prentice-Hall, Inc., ISBN: 0-13-285826-6, 17 pages.

Rabiner, L. R., et al., "Note on the Properties of a Vector Quantizer for LPC Coefficients," The Bell System Technical Journal, vol. 62, No. 8, Oct. 1983, 9 pages.

Ratcliffe, M., "ClearAccess 2.0 allows SQL searches off-line," (Structured Query Language), ClearAcess Corp., MacWeek Nov. 16, 1992, vol. 6, No. 41, 2 pages.

Remde, J. R., et al., "SuperBook: An Automatic Tool for Information Exploration-Hypertext?," In Proceedings of Hypertext'87 papers, Nov. 13-15, 1987, 14 pages.

Reynolds, C. F., "On-Line Reviews: A New Application of the HICOM Conferencing System," IEE Colloquium on Human Factors in Electronic Mail and Conferencing Systems, Feb. 3, 1989, 4 pages.

Rigoll, G., "Speaker Adaptation for Large Vocabulary Speech Recognition Systems Using Speaker Markov Models," International Conference on Acoustics, Speech, and Signal Processing (ICASSP'89), May 23-26, 1989, 4 pages.

Riley, M. D., "Tree-Based Modelling of Segmental Durations," Talking Machines Theories, Models, and Designs, 1992 © Elsevier Science Publishers B.V., North-Holland, ISBN: 08-444-89115.3, 15 pages.

Rivoira, S., et al., "Syntax and Semantics in a Word-Sequence Recognition System," IEEE International Conference on Acoustics, Speech, and Signal Processing (ICASSP'79), Apr. 1979, 5 pages.

Rosenfeld, R., "A Maximum Entropy Approach to Adaptive Statistical Language Modelling," Computer Speech and Language, vol. 10, No. 3, Jul. 1996, 25 pages.

Roszkiewicz, A., "Extending your Apple," Back Talk—Lip Service, A+ Magazine, The Independent Guide for Apple Computing, vol. 2, No. 2, Feb. 1984, 5 pages.

Sakoe, H., et al., "Dynamic Programming Algorithm Optimization for Spoken Word Recognition," IEEE Transactins on Acoustics, Speech, and Signal Processing, Feb. 1978, vol. ASSP-26 No. 1, 8 pages.

Salton, G., et al., "On the Application of Syntactic Methodologies in Automatic Text Analysis," Information Processing and Management, vol. 26, No. 1, Great Britain 1990, 22 pages.

Savoy, J., "Searching Information in Hypertext Systems Using Multiple Sources of Evidence," International Journal of Man-Machine Studies, vol. 38, No. 6, Jun. 1993, 15 pages.

Scagliola, C., "Language Models and Search Algorithms for Real-Time Speech Recognition," International Journal of Man-Machine Studies, vol. 22, No. 5, 1985, 25 pages.

Schmandt, C., et al., "Augmenting a Window System with Speech Input," IEEE Computer Society, Computer Aug. 1990, vol. 23, No. 8, 8 pages.

Schütze, H., "Dimensions of Meaning," Proceedings of Supercomputing'92 Conference, Nov. 16-20, 1992, 10 pages.

Sheth B., et al., "Evolving Agents for Personalized Information Filtering," In Proceedings of the Ninth Conference on Artificial Intelligence for Applications, Mar. 1-5, 1993, 9 pages.

Shikano, K., et al., "Speaker Adaptation Through Vector Quantization," IEEE International Conference on Acoustics, Speech, and Signal Processing (ICASSP'86), vol. 11, Apr. 1986, 4 pages.

Sigurdsson, S., et al., "Mel Frequency Cepstral Coefficients: An Evaluation of Robustness of MP3 Encoded Music," In Proceedings of the 7th International Conference on Music Information Retrieval (ISMIR), 2006, 4 pages.

Silverman, K. E. A., et al., "Using a Sigmoid Transformation for Improved Modeling of Phoneme Duration," Proceedings of the IEEE International Conference on Acoustics, Speech, and Signal Processing, Mar. 15-19, 1999, 5 pages.

Tenenbaum, A.M., et al., "Data Structure Using Pascal," 1981 Prentice-Hall, Inc., 34 pages.

Tsai, W.H., et al., "Attributed Grammar—A Tool for Combining Syntactic and Statistical Approaches to Pattern Recognition," IEEE Transactions on Systems, Man, and Cybernetics, vol. SMC-10, No. 12, Dec. 1980, 13 pages.

Udell, J., "Computer Telephony," BYTE, vol. 19, No. 7, Jul. 1, 1994, 9 pages.

van Santen, J. P. H., "Contextual Effects on Vowel Duration," Journal Speech Communication, vol. 11, No. 6, Dec. 1992, 34 pages.

Vepa, J., et al., "New Objective Distance Measures for Spectral Discontinuities in Concatenative Speech Synthesis," In Proceedings of the IEEE 2002 Workshop on Speech Synthesis, 4 pages.

(56) References Cited

OTHER PUBLICATIONS

Verschelde, J., "MATLAB Lecture 8. Special Matrices in MATLAB," Nov. 23, 2005, UIC Dept. of Math., Stat.. & C.S., MCS 320, Introduction to Symbolic Computation, 4 pages.
Vingron, M. "Near-Optimal Sequence Alignment," Deutsches Krebsforschungszentrum (DKFZ), Abteilung Theoretische Bioinformatik, Heidelberg, Germany, Jun. 1996, 20 pages.
Werner, S., et al., "Prosodic Aspects of Speech," Université de Lausanne, Switzerland, 1994, Fundamentals of Speech Synthesis and Speech Recognition: Basic Concepts, State of the Art, and Future Challenges, 18 pages.
Wolff, M., "Poststructuralism and the Artful Database: Some Theoretical Considerations," Information Technology and Libraries, vol. 13, No. 1, Mar. 1994, 10 pages.
Wu, M., "Digital Speech Processing and Coding," ENEE408G Capstone-Multimedia Signal Processing, Spring 2003, Lecture-2 course presentation, University of Maryland, College Park, 8 pages.
Wu, M., "Speech Recognition, Synthesis, and H.C.I.," ENEE408G Capstone-Multimedia Signal Processing, Spring 2003, Lecture-3 course presentation, University of Maryland, College Park, 11 pages.
Wyle, M. F., "A Wide Area Network Information Filter," In Proceedings of First International Conference on Artificial Intelligence on Wall Street, Oct. 9-11, 1991, 6 pages.
Yankelovich, N., et al., "Intermedia: The Concept and the Construction of a Seamless Information Environment," Computer Magazine, Jan. 1988, © 1988 IEEE, 16 pages.
Yoon, K., et al., "Letter-to-Sound Rules for Korean," Department of Linguistics, The Ohio State University, 2002, 4 pages.
Zhao, Y., "An Acoustic-Phonetic-Based Speaker Adaptation Technique for Improving Speaker-Independent Continuous Speech Recognition," IEEE Transactions on Speech and Audio Processing, vol. 2, No. 3, Jul. 1994, 15 pages.
Zovato, E., et al., "Towards Emotional Speech Synthesis: A Rule Based Approach," 2 pages.
International Search Report dated Nov. 9, 1994, received in International Application No. PCT/US1993/12666, which corresponds to U.S. Appl. No. 07/999,302, 8 pages (Robert Don Strong).
International Preliminary Examination Report dated Mar. 1, 1995, received in International Application No. PCT/US1993/12666, which corresponds to U.S. Appl. No. 07/999,302, 5 pages (Robert Don Strong).
International Preliminary Examination Report dated Apr. 10, 1995, received in International Application No. PCT/US1993/12637, which corresponds to U.S. Appl. No. 07/999,354, 7 pages (Alejandro Acero).
International Search Report dated Feb. 8, 1995, received in International Application No. PCT/US1994/11011, which corresponds to U.S. Appl. No. 08/129,679, 7 pages (Yen-Lu Chow).
International Preliminary Examination Report dated Feb. 28, 1996, received in International Application No. PCT/US1994/11011, which corresponds to U.S. Appl. No. 08/129,679, 4 pages (Yen-Lu Chow).
Written Opinion dated Aug. 21, 1995, received in International Application No. PCT/US1994/11011, which corresponds to U.S. Appl. No. 08/129,679, 4 pages (Yen-Lu Chow).
International Search Report dated Nov. 8, 1995, received in International Application No. PCT/US1995/08369, which corresponds to U.S. Appl. No. 08/271,639, 6 pages (Peter V. De Souza).
International Preliminary Examination Report dated Oct. 9, 1996, received in International Application No. PCT/US1995/08369, which corresponds to U.S. Appl. No. 08/271,639, 4 pages (Peter V. De Souza).
Office Action dated Mar. 7, 2013, received in U.S. Appl. No. 13/492,809, 26 pages (Gruber).
Car Working Group, "Bluetooth Doc Hands-Free Profile 1.5 HFP1. 5_SPEC," Nov. 25, 2005, www.bluetooth.org, 84 pages.
Cohen, Michael H., et al., "Voice User Interface Design," excerpts from Chapter 1 and Chapter 10, Addison-Wesley ISBN:0-321-18576-5, 2004, 36 pages.
Gong, J., et al., "Guidelines for Handheld Mobile Device Interface Design," Proceedings of DSI 2004 Annual Meeting, pp. 3751-3756.
Horvitz, E., "Handsfree Decision Support: Toward a Non-invasive Human-Computer Interface," Proceedings of the Symposium on Computer Applications in Medical Care, IEEE Computer Society Press, Nov. 1995, 1 page.
Horvitz, E., "In Pursuit of Effective Handsfree Decision Support: Coupling Bayesian Inference, Speech Understanding, and User Models," 1995, 8 pages.
"Top 10 Best Practices for Voice User Interface Design," Nov. 1, 2002, http://www.developer.com/voice/article.php/1567051/Top-10-Best-Practices-for-Voice-User-Interface-Design.htm, 4 pages.
Australian Office Action dated Dec. 7, 2012 for Application No. 2010254812, 8 pages.
Australian Office Action dated Nov. 27, 2012 for Application No. 2012101471, 6 pages.
Australian Office Action dated Nov. 22, 2012 for Application No. 2012101466, 6 pages.
Australian Office Action dated Nov. 14, 2012 for Application No. 2012101473, 6 pages.
Australian Office Action dated Nov. 19, 2012 for Application No. 2012101470, 5 pages.
Australian Office Action dated Nov. 28, 2012 for Application No. 2012101468, 5 pages.
Australian Office Action dated Nov. 19, 2012 for Application No. 2012101472, 5 pages.
Australian Office Action dated Nov. 19, 2012 for Application No. 2012101469, 6 pages.
Australian Office Action dated Nov. 15, 2012 for Application No. 2012101465, 6 pages.
Australian Office Action dated Nov. 30, 2012 for Application No. 2012101467, 6 pages.
Canadian Office Action dated Mar. 27, 2013 for Application No. 2,793,118, 3 pages.
Current claims of PCT Application No. PCT/US11/20861 dated Jan. 11, 2011, 17 pages.
Notice of Allowance dated Feb. 29, 2012, received in U.S. Appl. No. 11/518,292, 29 pages (Cheyer).
Final Office Action dated Jun. 19, 2012, received in U.S. Appl. No. 12/479,477, 46 pages (van Os).
Final Office Action dated May 10, 2011, received in U.S. Appl. No. 11/518,292, 14 pages (Cheyer).
Final Office Action dated Mar. 25, 2013, received in U.S. Appl. No. 13/251,127, 53 pages (Gruber).
Office Action dated Sep. 29, 2011, received in U.S. Appl. No. 12/479,477, 32 pages (van Os).
Office Action dated Nov. 24, 2010, received in U.S. Appl. No. 11/518,292, 12 pages (Cheyer).
Office Action dated Nov. 9, 2009, received in U.S. Appl. No. 11/518,292, 10 pages (Cheyer).
Office Action dated Jan. 31, 2013, received in U.S. Appl. No. 13/251,088, 38 pages (Gruber).
Office Action dated Nov. 28, 2012, received in U.S. Appl. No. 13/251,104, 49 pages (Gruber).
Office Action dated Dec. 7, 2012, received in U.S. Appl. No. 13/251,118, 52 pages (Gruber).
Office Action dated Nov. 8, 2012, received in U.S. Appl. No. 13/251,127, 35 pages (Gruber).
Office Action dated Apr. 16, 2013, received in U.S. Appl. No. 13/725,550, 8 pages (Cheyer).
Office Action dated Mar. 27, 2013, received in U.S. Appl. No. 13/725,656, 22 pages (Gruber).
Russian Office Action dated Nov. 8, 2012 for Application No. 2012144647, 7 pages.
Russian Office Action dated Dec. 6, 2012 for Application No. 2012144605, 6 pages.
GB Patent Act 1977: Combined Search Report and Examination Report under Sections 17 and 18(3) for Application No. GB1009318. 5, report dated Oct. 8, 2010, 5 pages.
GB Patent Act 1977: Combined Search Report and Examination Report under Sections 17 and 18(3) for Application No. GB1217449. 6, report dated Jan. 17, 2013, 6 pages.

(56) References Cited

OTHER PUBLICATIONS

International Search Report and Written Opinion dated Aug. 25, 2010, received in International Application No. PCT/US2010/037378, which corresponds to U.S. Appl. No. 12/479,477, 16 pages (Apple Inc.).
International Search Report and Written Opinion dated Nov. 16, 2012, received in International Application No. PCT/US2012/040571, which corresponds to U.S. Appl. No. 13/251,088 14 pages (Apple Inc.).
International Search Report and Written Opinion dated Dec. 20, 2012, received in International Application No. PCT/US2012/056382, which corresponds to U.S. Appl. No. 13/250,947, 11 pages (Gruber).
Extended European Search Report received for European Patent Application No. 12185276.8, mailed on Dec. 18, 2012, 4 pages.
International Preliminary Report on Patentability received for PCT Patent Application No. PCT/US2012/029810, mailed on Oct. 3, 2013, 9 pages.
International Search Report and Written Opinion received for PCT Patent Application No. PCT/US2012/029810, mailed on Aug. 17, 2012, 11 pages.
International Search Report and Written Opinion received for PCT Patent Application No. PCT/US2013/040971, mailed on Nov. 12, 2013, 11 pages.
"2004 Chrysler Pacifica: U-Connect Hands-Free Communication System", The Best and Brightest of 2004, Brief Article, Automotive Industries, Sep. 2003.
"2007 Lexus GS 450h 4dr Sedan (3.5L 6cyl Gas/Electric Hybrid CVT)", available online at <http:// http://review.cnet.com/4505-10865_16-31833144.html>, Retrieved on Aug. 3, 2006.
"All Music Website", available online at <http://www.allmusic.com/>, Retrieved on Mar. 19, 2007.
"BluePhoneElite: About", available online at <http://www.reelintelligence.com/BluePhoneElite>, Retrieved on Sep. 25, 2006.
"BluePhoneElite: Features", available online at < http://www.reelintelligence.com/BluePhoneElite/features.shtml,>, Retrieved on Sep. 25, 2006.
"Chrysler Pacifica: U-Connect Hands-Free Communication System", available online at <http://www.wirelessground.com>, Retrieved on Mar. 19, 2007.
"Interactive Voice", available online at <http://www.helloivee.com/company/> retrived from internet on Feb. 10, 2014, 2 pages.
"Meet Ivee Your Wi-Fi Voice Activated Assistant", available online at <http://www.helloivee.com/> retrived from internet on Feb. 10, 2014, 8 pages.
"What is Fuzzy Logic?", available online at <http://www.cs.cmu.edu>, Retrieved on Apr. 15, 1993.
"Speaker Recognition", Wikipedia, The Free Enclyclopedia, Nov. 2, 2010, 3 pages.
Apple Computer, Video Entitled, "Knowledge Navigator", published by Apple Computer no later than 2008, as depicted in Exemplary Screenshots from video entitled 'Knowledge Navigator', 2008, 7 pages.
Applebaum et al., "Enhancing the Discrimination of Speaker Independent Hidden Markov Models with Corrective Training", International Conference on Acoustics, Speech, and Signal Processing, May 23, 1989, pp. 302-305.
Bellegarda et al., "Tied Mixture Continuous Parameter Modeling for Speech Recognition", IEEE Transactions on Acoustics, Speech and Signal Processing, vol. 38, No. 12, Dec. 1990, pp. 2033-2045.
Bellegarda, Jr., "Latent Semantic Mapping", IEEE Signal Processing Magazine, vol. 22, No. 5, Sep. 2005, pp. 70-80.
Brain, "How MP3 Files Work", available online at < http:// www.howstuffworks.com>, Retrieved on Mar. 19, 2007.
Chang et al., "Discriminative Training of Dynamic Programming based Speech Recognizers", IEEE Transactions on Speech and Audio Processing, vol. 1, No. 2, Apr. 1993, pp. 135-143.
Cheyer et al., "Demonstration Video of Multimodal Maps Using an Agent Architecture", published by SRI International no later than 1996, as depicted in Exemplary Screenshots from video entitled 'Demonstration Video of Multimodal Maps Using an Agent Architecture', 1996, 6 pages.
Cheyer et al., "Demonstration Video of Multimodal Maps Using an Open-Agent Architecture", published by SRI International no later than 1996, as depicted in Exemplary Screenshots from video entitled 'Demonstration Video of Multimodal Maps Using an Open-Agent Architecture', 6 pages.
Cheyer, A., "Demonstration Video of Vanguard Mobile Portal", published by SRI International no later than 2004, as depicted in Exemplary Screenshots from video entitled Demonstration Video of Vanguard Mobile Portal, 2004, 10 pages.
Choi et al., "Acoustic and Visual Signal based Context Awareness System for Mobile Application", IEEE Transactions on Consumer Electronics, vol. 57, No. 2, May 2011, pp. 738-746.
Guzzoni et al., "Modeling Human-Agent Interaction with Active Ontologies", AAAI Spring Symposium, Interaction Challenges for Intelligent Assistants, Stanford University, Palo Alto, California, 2007, 8 pages.
Kickstarter, "Ivee Sleek: Wi-Fi Voice-Activated Assistant", available online at <https://www.kickstarter.com/projects/ivee/ivee-sleek-wi-fi-voice-activated-assistant> retrived from internet on Feb. 10, 2014, 13 pages.
Navigli, Roberto, "Word Sense Disambiguation: A Survey", Article 10, ACM Computing Surveys, vol. 41, No. 2, Feb. 2009, 70 pages.
Parson, T. W., "Voice and Speech Processing", Pitch and Formant Estimation © 1987, McGraw-Hill, Inc., ISBN: 0-07-0485541-0, 1987, 15 pages.
Vlingo, "Vlingo Launches Voice Enablement Application on Apple App Store", Press Release, Dec. 3, 2008, 2 pages.
Xu, "Speech-Based Interactive Games for Language Learning: Reading, Translation, and Question-Answering", Computational Linguistics and Chinese Language Processing, vol. 14, No. 2, Jun. 2009, pp. 133-160.
Yunker, John, "Beyond Borders: Web Globalization Strategies", New Riders, Aug. 22, 2002, 11 pages.
Pearl, Amy, "System Support for Integrated Desktop Video Conferencing", Sunmicrosystems Laboratories, Dec. 1992, pp. 1-15.
Penn et al., "Ale for Speech: A Translation Prototype", Bell Laboratories, 1999, 4 pages.
Phillipps, Ben, "Touchscreens are Changing the Face of Computers—Today's Users Have Five Types of Touchscreens to Choose from, Each with its Own Unique Characteristics", Electronic Products, Nov. 1994, pp. 63-70.
Phillips, Dick, "The Multi-Media Workstation", SIGGRAPH '89 Panel Proceedings, 1989, pp. 93-109.
Pickering, J. A., "Touch-Sensitive Screens: The Technologies and Their Application", International Journal of Man-Machine Studies, vol. 25, No. 3, Sep. 1986, pp. 249-269.
Pingali et al., "Audio-Visual Tracking for Natural Interactivity", ACM Multimedia, Oct. 1999, pp. 373-382.
Plaisant et al., "Touchscreen Interfaces for Alphanumeric Data Entry", Proceedings of the Human Factors and Ergonomics Society 36th Annual Meeting, 1992, pp. 293-297.
Plaisant et al., "Touchscreen Toggle Design", CHI'92, May 3-7, 1992, pp. 667-668.
Poly-Optical Products, Inc., "Poly-Optical Fiber Optic Membrane Switch Backlighting", available at <http://www.poly-optical.com/membrane_switches.html>, retrieved on Dec. 19, 2002, 3 pages.
Poor, Alfred, "Microsoft Publisher", PC Magazine, vol. 10, No. 20, Nov. 26, 1991, 1 page.
Potter et al., "An Experimental Evaluation of Three Touch Screen Strategies within a Hypertext Database", International Journal of Human-Computer Interaction, vol. 1, No. 1, 1989, pp. 41-52.
Potter et al., "Improving the Accuracy of Touch Screens: An Experimental Evaluation of Three Strategies", CHI '88 ACM, 1988, pp. 27-32.
Public Safety Technologies, "Tracer 2000 Computer", available at <http://www.pst911.com/tracer.html>, retrieved on Dec. 19, 2002, 3 pages.
Quazza et al., "Actor: A Multilingual Unit-Selection Speech Synthesis System", Proceedings of 4th ISCA Tutorial and Research Workshop on Speech Synthesis, Jan. 1, 2001, 6 pages.

(56) References Cited

OTHER PUBLICATIONS

Rabiner et al., "Digital Processing of Speech Signals", Prentice Hall, 1978, pp. 274-277.
Rampe et al., "SmartForm Designer and SmartForm Assistant", News release, Claris Corp., Jan. 9, 1989, 1 page.
Rao et al., "Exploring Large Tables with the Table Lens", Apple Inc., Video Clip, Xerox Corp., on a CD, 1994.
Rao et al., "Exploring Large Tables with the Table Lens", CHI'95 Mosaic of Creativity, ACM, May 7-11, 1995, pp. 403-404.
Rao et al., "The Table Lens: Merging Graphical and Symbolic Representations in an Interactive Focus+Context Visualization for Tabular Information", Proceedings of the ACM SIGCHI Conference on Human Factors in Computing Systems, Apr. 1994, pp. 1-7.
Raper, Larry K., "The C-MU PC Server Project", (CMU-ITC-86-051), Dec. 1986, pp. 1-30.
Ratcliffe et al., "Intelligent Agents Take U.S. Bows", MacWeek, vol. 6, No. 9, Mar. 2, 1992, 1 page.
Reddy, D. R., "Speech Recognition by Machine: A Review", Proceedings of the IEEE, Apr. 1976, pp. 501-531.
Reininger et al., "Speech and Speaker Independent Codebook Design in VQ Coding Schemes", (Proceedings of the IEEE International Acoustics, Speech and Signal Processing Conference, Mar. 1985), as reprinted in Vector Quantization (IEEE Press, 1990), 1990, pp. 271-273.
Ren et al., "Efficient Strategies for Selecting Small Targets on Pen-Based Systems: An Evaluation Experiment for Selection Strategies and Strategy Classifications", Proceedings of the IFIP TC2/TC13 WG2.7/WG13.4 Seventh Working Conference on Engineering for Human-Computer Interaction, vol. 150, 1998, pp. 19-37.
Ren et al., "Improving Selection Performance on Pen-Based Systems: A Study of Pen-Based Interaction for Selection Tasks", ACM Transactions on Computer-Human Interaction, vol. 7, No. 3, Sep. 2000, pp. 384-416.
Ren et al., "The Best among Six Strategies for Selecting a Minute Target and the Determination of the Minute Maximum Size of the Targets on a Pen-Based Computer", Human-Computer Interaction INTERACT, 1997, pp. 85-92.
Ricker, Thomas, "Apple Patents Audio User Interface", Engadget, available at <http://www.engadget.com/2006/05/04/apple-patents-audio-user-interface/>, May 4, 2006, 6 pages.
Riecken, R D., "Adaptive Direct Manipulation", IEEE Xplore, 1991, pp. 1115-1120.
Rioport, "Rio 500: Getting Started Guide", available at <http://ec1.images-amazon.com/media/i3d/01/A/man-migrate/MANUAL000023453.pdf>, 1999, 2 pages.
Robbin et al., "MP3 Player and Encoder for Macintosh!", SoundJam MP Plus, Version 2.0, 2000, 76 pages.
Robertson et al., "Information Visualization Using 3D Interactive Animation", Communications of the ACM, vol. 36, No. 4, Apr. 1993, pp. 57-71.
Robertson et al., "The Document Lens", UIST '93, Nov. 3-5, 1993, pp. 101-108.
Root, Robert, "Design of a Multi-Media Vehicle for Social Browsing", Bell Communications Research, 1988, pp. 25-38.
Roseberry, Catherine, "How to Pair a Bluetooth Headset & Cell Phone", available at <http://mobileoffice.about.com/od/usingyourphone/ht/blueheadset_p.htm>, retrieved on Apr. 29, 2006, 2 pages.
Rosenberg et al., "An Overview of the Andrew Message System", Information Technology Center Carnegie-Mellon University, Jul. 1987, pp. 99-108.
Rosner et al., "In Touch: A Graphical User Interface Development Tool", IEEE Colloquium on Software Tools for Interface Design, Nov. 8, 1990, pp. 1211-1217.
Rossfrank, "Konstenlose Sprachmitteilungsnetz Festnetz", XP002234425, Dec. 10, 2000, pp. 1-4.
Roucos et al., "A Segment Vocoder at 150 B/S", (Proceedings of the IEEE International Acoustics, Speech and Signal Processing Conference, Apr. 1983), as reprinted in Vector Quantization (IEEE Press, 1990), 1990, pp. 246-249.

Roucos et al., "High Quality Time-Scale Modification for Speech", Proceedings of the 1985 IEEE Conference on Acoustics, Speech and Signal Processing, 1985, pp. 493-496.
Sabin et al., "Product Code Vector Quantizers for Waveform and Voice Coding", (IEEE Transactions on Acoustics, Speech and Signal Processing, Jun. 1984), as reprinted in Vector Quantization (IEEE Press, 1990), 1990, pp. 274-288.
Santaholma, Marianne E., "Grammar Sharing Techniques for Rule-based Multilingual NLP Systems", Proceedings of the 16th Nordic Conference of Computational Linguistics, NODALIDA 2007, May 25, 2007, 8 pages.
Santen, Jan P., "Assignment of Segmental Duration in Text-to-Speech Synthesis", Computer Speech and Language, vol. 8, No. 2, Apr. 1994, pp. 95-128.
Sarawagi, Sunita, "CRF Package Page", available at <http://crf.sourceforge.net/>, retrieved on Apr. 6, 2011, 2 pages.
Sarkar et al., "Graphical Fisheye Views", Communications of the ACM, vol. 37, No. 12, Dec. 1994, pp. 73-83.
Sarkar et al., "Graphical Fisheye Views of Graphs", Systems Research Center, Digital Equipment Corporation Mar. 17, 1992, 31 pages.
Sarkar et al., "Graphical Fisheye Views of Graphs", CHI '92 Proceedings of the SIGCHI Conference on Human Factors in Computing Systems, May 3-7, 1992, pp. 83-91.
Sarkar et al., "Stretching the Rubber Sheet: A Metaphor for Viewing Large Layouts on Small Screens", UIST'93, ACM, Nov. 3-5, 1993, pp. 81-91.
Sastry, Ravindra W., "A Need for Speed: A New Speedometer for Runners", submitted to the Department of Electrical Engineering and Computer Science at the Massachusetts Institute of Technology, 1999, pp. 1-42.
Schafer et al., "Digital Representations of Speech Signals", Proceedings of the IEEE, vol. 63, No. 4, Apr. 1975, pp. 662-677.
Schaffer et al., "Navigating Hierarchically Clustered Networks through Fisheye and Full-Zoom Methods", ACM Transactions on Computer-Human Interaction, vol. 3, No. 2, Jun. 1996, pp. 162-188.
Sullivan, Danny, "How Google Instant's Autocomplete Suggestions Work", available at <http://searchengineland.com/how-google-instant-autocomplete-suggestions-work-62592>, Apr. 6, 2011, 12 pages.
Summerfield et al., "ASIC Implementation of the Lyon Cochlea Model", Proceedings of the 1992 International Conference on Acoustics, Speech and Signal Processing, IEEE, vol. V, 1992, pp. 673-676.
T3 Magazine, "Creative MuVo TX 256MB", available at <http://www.t3.co.uk/reviews/entertainment/mp3_player/creative_muvo_tx_256mb>, Aug. 17, 2004, 1 page.
Taos, "Taos, Inc. Announces Industry's First Ambient Light Sensor to Convert Light Intensity to Digital Signals", News Release, available at <http://www.taosinc.com/pressrelease_090902.htm>, Sep. 16, 2002, 3 pages.
Taylor et al., "Speech Synthesis By Phonological Structure Matching", International Speech Communication Association, vol. 2, Section 3, 1999, 4 pages.
Tello, Ernest R., "Natural-Language Systems", Mastering AI Tools and Techniques, Howard W. Sams & Company, 1988.
TG3 Electronics, Inc., "BL82 Series Backlit Keyboards", available at <http://www.tg3electronics.com/products/backlit/backlit.htm>, retrieved on Dec. 19, 2002, 2 pages.
The HP 150, "Hardware: Compact, Powerful, and Innovative", vol. 8, No. 10, Oct. 1983, pp. 36-50.
Tidwell, Jenifer, "Animated Transition", Designing Interfaces, Patterns for effective Interaction Design, Nov. 2005, First Edition, 4 pages.
Touch, Joseph, "Zoned Analog Personal Teleconferencing", USC / Information Sciences Institute, 1993, pp. 1-19.
Toutanova et al., "Feature-Rich Part-of-Speech Tagging with a Cyclic Dependency Network", Computer Science Dept., Stanford University, Stanford CA 94305-9040, 2003, 8 pages.
Trigg et al., "Hypertext Habitats: Experiences of Writers in NoteCards", Hypertext '87 Papers; Intelligent Systems Laboratory, Xerox Palo Alto Research Center, 1987, pp. 89-108.

(56) References Cited

OTHER PUBLICATIONS

Trowbridge, David, "Using Andrew for Development of Educational Applications", Center for Design of Educational Computing, Carnegie-Mellon University (CMU-ITC-85-065), Jun. 2, 1985, pp. 1-6.
Tsao et al., "Matrix Quantizer Design for LPC Speech Using the Generalized Lloyd Algorithm", (IEEE Transactions on Acoustics, Speech and Signal Processing, Jun. 1985), as reprinted in Vector Quantization (IEEE Press, 1990), 1990, pp. 237-245.
Turletti, Thierry, "The INRIA Videoconferencing System (IVS)", Oct. 1994, pp. 1-7.
Uslan et al., "A Review of Henter-Joyce's MAGic for Windows NT", Journal of Visual Impairment and Blindness, Dec. 1999, pp. 666-668.
Uslan et al., "A Review of Supernova Screen Magnification Program for Windows", Journal of Visual Impairment & Blindness, Feb. 1999, pp. 108-110.
Uslan et al.,"A Review of Two Screen Magnification Programs for Windows 95: Magnum 95 and LP-Windows", Journal of Visual Impairment & Blindness, Sep.-Oct. 1997, pp. 9-13.
Veiga, Alex, "AT&T Wireless Launching Music Service", available at <http://bizyahoo.com/ap/041005/at_t_mobile_music_5.html?printer=1>, Oct. 5, 2004, 2 pages.
Vogel et al., "Shift: A Technique for Operating Pen-Based Interfaces Using Touch", CHI '07 Proceedings, Mobile Interaction Techniques I, Apr. 28-May 3, 2007, pp. 657-666.
W3C Working Draft, "Speech Synthesis Markup Language Specificiation for the Speech Interface Framework", available at <http://www.w3org./TR/speech-synthesis>, retrieved on Dec. 14, 2000, 42 pages.
Wadlow, M. G., "The Role of Human Interface Guidelines in the Design of Multimedia Applications", Carnegie Mellon University (To be Published in Current Psychology: Research and Reviews, Summer 1990 (CMU-ITC-91-101), 1990, pp. 1-22.
Walker et al., "The LOCUS Distributed Operating System 1", University of California Los Angeles, 1983, pp. 49-70.
Wang et al., "An Initial Study on Large Vocabulary Continuous Mandarin Speech Recognition with Limited Training Data Based on Sub-Syllabic Models", International Computer Symposium, vol. 2, 1994, pp. 1140-1145.
Wang et al., "Tone Recognition of Continuous Mandarin Speech Based on Hidden Markov Model", International Journal of Pattern Recognition and Artificial Intelligence, vol. 8, 1994, pp. 233-245.
Ware et al., "The DragMag Image Magnifier", CHI '95 Mosaic of Creativity, May 7-11, 1995, pp. 407-408.
Ware et al., "The DragMag Image Magnifier Prototype I", Apple Inc., Video Clip, Marlon, on a CD, Applicant is not Certain about the Date for the Video Clip., 1995.
Watabe et al., "Distributed Multiparty Desktop Conferencing System: Mermaid", CSCW 90 Proceedings, Oct. 1990, pp. 27-38.
White, George M., "Speech Recognition, Neural Nets, and Brains", Jan. 1992, pp. 1-48.
Wikipedia, "Acoustic Model", available at <http://en.wikipedia.org/wiki/AcousticModel>, retrieved on Sep. 14, 2011, 2 pages.
Wikipedia, "Language Model", available at <http://en.wikipedia.org/wiki/Language_model>, retrieved on Sep. 14, 2011, 3 pages.
Wikipedia, "Speech Recognition", available at <http://en.wikipedia.org/wiki/Speech_recognition>, retrieved on Sep. 14, 2011, 10 pages.
Wilensky et al., "Talking to UNIX in English: An Overview of UC", Communications of the ACM, vol. 27, No. 6, Jun. 1984, pp. 574-593.
Wilson, Mark, "New iPod Shuffle Moves Buttons to Headphones, Adds Text to Speech", available at <http://gizmodo.com/5167946/new-ipod-shuffle-moves-buttons-to-headphones-adds-text-to-speech>, Mar. 11, 2009, 13 pages.
Wirelessinfo, "SMS/MMS Ease of Use (8.0)", available at <http://www.wirelessinfo.com/content/palm-Treo-750-Cell-Phone-Review/Messaging.htm>, Mar. 2007, 3 pages.
Wong et al., "An 800 Bit/s Vector Quantization LPC Vocoder", (IEEE Transactions on Acoustics, Speech and Signal Processing, Oct. 1982), as reprinted in Vector Quantization (IEEE Press, 1990), 1990, pp. 222-232.
Wong et al., "Very Low Data Rate Speech Compression with LPC Vector and Matrix Quantization", (Proceedings of the IEEE Int'l Acoustics, Speech and Signal Processing Conference, Apr. 1983), as reprinted in Vector Quantization (IEEE Press, 1990), 1990, pp. 233-236.
Wu et al., "Automatic Generation of Synthesis Units and Prosodic Information for Chinese Concatenative Synthesis", Speech Communication, vol. 35, No. 3-4, Oct. 2001, pp. 219-237.
Ahlstrom et al., "Overcoming Touchscreen User Fatigue by Workplace Design", CHI '92 Posters and Short Talks of the 1992 SIGCHI Conference on Human Factors in Computing Systems, 1992, pp. 101-102.
Yang et al., "Auditory Representations of Acoustic Signals", IEEE Transactions of Information Theory, vol. 38, No. 2, Mar. 1992, pp. 824-839.
Yang et al., "Hidden Markov Model for Mandarin Lexical Tone Recognition", IEEE Transactions on Acoustics, Speech and Signal Processing, vol. 36, No. 7, Jul. 1988, pp. 988-992.
Yiourgalis et al., "Text-to-Speech system for Greek", ICASSP 91, vol. 1, May 14-17, 1991., pp. 525-528.
Ahmed et al., "Intelligent Natural Language Query Processor", TENCON '89, Fourth IEEE Region 10 International Conference, Nov. 22-24, 1989, pp. 47-49.
Zainab, "Google Input Tools Shows Onscreen Keyboard in Multiple Languages [Chrome]", available at <http://www.addictivetips.com/internet-tips/google-input-tools-shows-multiple-language-onscreen-keyboards-chrome/>, Jan. 3, 2012, 3 pages.
Zelig, "A Review of the Palm Treo 750v", available at <http://www.mtekk.com.au/Articles/tabid/54/articleType/ArticleView/articleId/769/A-Review-of-the-Palm-Treo-750v.aspx>, Feb. 5, 2007, 3 pages.
Zhang et al., "Research of Text Classification Model Based on Latent Semantic Analysis and Improved HS-SVM", Intelligent Systems and Applications (ISA), 2010 2nd International Workshop, May 22-23, 2010, 5 pages.
Ziegler, K, "A Distributed Information System Study", IBM Systems Journal, vol. 18, No. 3, 1979, pp. 374-401.
Zipnick et al., "U.S. Appl. No. 10/859,661, filed Jun. 2, 2004".
"Corporate Ladder", BLOC Publishing Corporation, 1991, 1 page.
"Diagrammaker", Action Software, 1989.
"Diagram-Master", Ashton-Tate, 1989.
"Digital Audio in the New Era", Electronic Design and Application, No. 6, Jun. 30, 2003, 3 pages.
"Glossary of Adaptive Technologies: Word Prediction", available at <http://www.utoronto.ca/atrc/reference/techwordpred.html>, retrieved on Dec. 6, 2005, 5 pages.
"iAP Sports Lingo 0x09 Protocol V1.00", May 1, 2006, 17 pages.
"IEEE 1394 (Redirected from Firewire", Wikipedia, The Free Encyclopedia, avialable at <http://www.wikipedia.org/wiki/Firewire>, retrieved on Jun. 8, 2003, 2 pages.
"Mobile Speech Solutions, Mobile Accessibility", SVOX AG Product Information Sheet, available at <http://www.svox.com/site/bra840604/con782768/mob965831936.aSQ?osLang=1>, Sep. 27, 2012, 1 page.
"PhatNoise", Voice Index on Tap, Kenwood Music Keg, available at <http://www.phatnoise.com/kenwood/kenwoodssamail.html>, retrieved on Jul. 13, 2006, 1 page.
Ahuja et al., "A Comparison Of Application Sharing Mechanisms in Real-Time Desktop Conferencing Systems", At&T Bell Laboratories, 1990, pp. 238-248.
Aikawa, K. "Time-Warping Neural Network for Phoneme Recognition", IEEE International Joint Conference on Neural Networks, vol. 3, Nov. 18-21, 1991, pp. 2122-2127.
Aikawa, T. et al., "Generation for Multilingual MT", available at <http://mtarchive.info/MTS-2001-Aikawa.pdf>, retrieved on Sep. 18, 2001, 6 pages.
Allen et al., "Automated Natural Spoken Dialog", Computer, vol. 35, No. 4, Apr. 2002, pp. 51-56.
Alleva et al., "Applying SPHINX-II to DARPA Wall Street Journal CSR Task", Proceedings of Speech and Natural Language Workshop, Feb. 1992, pp. 393-398.
Amrel Corporation, "Rocky Matrix BackLit Keyboard", available at <http://www.amrel.com/asi_matrixkeyboard.html>, retrieved on Dec. 19, 2002, 1 page.

(56) References Cited

OTHER PUBLICATIONS

ANHUI USTC IFL YTEK Co. Ltd., "Flytek Research Center Information Datasheet", available at <http://www.iflttek.com/english/Research.htm>, retrieved on Oct. 15, 2004, 3 pages.
Extended European Search Report (includes European Search Report and European Search Opinion) received for European Patent Application No. 12186113.2, mailed on Apr. 28, 2014, 14 pages.
Extended European Search Report (includes European Search Report and European Search Opinion) received for European Patent Application No. 13155688.8, mailed on Aug. 22, 2013, 11 pages.
"Windows XP: A Big Surprise!—Experiencing Amazement from Windows XP", New Computer, No. 2, Feb. 28, 2002, 8 pages.
Schnelle, Dirk, "Context Aware Voice User Interfaces for Workflow Support", Dissertation paper, Aug. 27, 2007, 254 pages.
"Minimum Phase", Wikipedia the free Encyclopedia, Last Modified on Jan. 12, 2010, and retrieved on Jul. 28, 2010, available online at <http://en.wikipedia.org/wiki/Minimum_phase>, 8 pages.
"Mel Scale", Wikipedia the Free Encyclopedia, Last modified on Oct. 13, 2009, and retrieved on Jul. 28, 2010, available online at <http://en.wikipedia.org/wiki/Mel_scale>, 2 pages.
Non-Final Office Action received for U.S. Appl. No. 13/492,809, mailed on Nov. 27, 2013, 8 pages.
Final Office Action received for U.S. Appl. No. 13/725,481, mailed on Dec. 19, 2013, 16 pages.
Apple Computer, Inc., "iTunes 2: Specification Sheet", 2001, 2 pages.
Apple Computer, Inc., "iTunes, Playlist Related Help Screens", iTunes v1.0, 2000-2001, 8 pages.
Apple Computer, Inc., "QuickTime Movie Playback Programming Guide", Aug. 11, 2005, pp. 1-58.
Apple Computer, Inc., "QuickTime Overview", Aug. 11, 2005, pp. 1-34.
Apple Computer, Inc., "Welcome to Tiger", available at <http://www.maths.dundee.ac.uk/software/Welcome_to_Mac_OS_X_v10.4_Tiger.pdf>, 2005, pp. 1-32.
Apple Computer, Inc., "Apple Announces iTunes 2", Press Release, Oct. 23, 2001, 2 pages.
Arango et al., "Touring Machine: A Software Platform for Distributed Multimedia Applications", 1992 IFIP International Conference on Upper Layer Protocols, Architectures, and Applications, May 1992, pp. 1-11.
Arons, Barry M., "The Audio-Graphical Interface to a Personal Integrated Telecommunications System", Thesis Submitted to the Department of Architecture at the Massachusetts Institute of Technology, Jun. 1984, 88 pages.
Badino et al., "Language Independent Phoneme Mapping for Foreign TTS", 5th ISCA Speech Synthesis Workshop, Pittsburgh, PA, Jun. 14-16, 2004, 2 pages.
Baechtle et al., "Adjustable Audio Indicator", IBM Technical Disclosure Bulletin, Jul. 1, 1984, 2 pages.
Baeza-Yates, Ricardo, "Visualization of Large Answers in Text Databases", AVI '96 Proceedings of the Workshop on Advanced Visual Interfaces, 1996, pp. 101-107.
Bahl et al., "Recognition of a Continuously Read Natural Corpus", IEEE International Conference on Acoustics, Speech, and Signal Processing, vol. 3, Apr. 1978, pp. 422-424.
Bajarin, Tim, "With Low End Launched, Apple Turns to Portable Future", PC Week, vol. 7, Oct. 1990, p. 153 (1).
Barthel, B., "Information Access for Visually Impaired Persons: Do We Still Keep a "Document" in "Documentation"?", Professional Communication Conference, Sep. 1995, pp. 62-66.
Baudel et al., "2 Techniques for Improved HC Interaction: Toolglass & Magic Lenses: The See-Through Interface", Apple Inc., Video Clip, CHI'94 Video Program on a CD, 1994.
Beck et al., "Integrating Natural Language, Query Processing, and Semantic Data Models", COMCON Spring '90. IEEE Computer Society International Conference, 1990, Feb. 26-Mar. 2, 1990, pp. 538-543.

Bederson et al., "Pad++: A Zooming Graphical Interface for Exploring Alternate Interface Physics", UIST' 94 Proceedings of the 7th Annual ACM symposium on User Interface Software and Technology, Nov. 1994, pp. 17-26.
Bederson et al., "The Craft of Information Visualization", Elsevier Science, Inc., 2003, 435 pages.
Apple, "VoiceOver", available at <http://www.apple.com/accessibility/voiceover/>, Feb. 2009, 5 pages.
Apple Computer, Inc., "Apple—iPod—Technical Specifications, iPod 20GB and 60GB Mac + PC", available at <http://www.apple.com/ipod/color/specs.html>, 2005, 3 pages.
Benel et al., "Optimal Size and Spacing of Touchscreen Input Areas", Human-Computer Interaction—INTERACT, 1987, pp. 581-585.
Beringer et al.,"Operator Behavioral Biases Using High-Resolution Touch Input Devices", Proceedings of the Human Factors and Ergonomics Society 33rd Annual Meeting, 1989, 3 pages.
Beringer, Dennis B., "Target Size, Location, Sampling Point and Instruction Set: More Effects on Touch Panel Operation", Proceedings of the Human Factors and Ergonomics Society 34th Annual Meeting, 1990, 5 pages.
Bernabei et al., "Graphical I/O Devices for Medical Users", 14th Annual International Conference of the IEEE on Engineering in Medicine and Biology Society, vol. 3, 1992, pp. 834-836.
Bernstein, Macrophone, "Speech Corpus", IEEE/ICASSP, Apr. 22, 1994, pp. 1-81 to 1-84.
Berry et al., "Symantec", New version of MORE.TM, Apr. 10, 1990, 1 page.
Best Buy, "When it Comes to Selecting a Projection TV, Toshiba Makes Everything Perfectly Clear", Previews of New Releases, available at <http://www.bestbuy.com/HomeAudioVideo/Specials/ToshibaTVFeatures.asp>, retrieved on Jan. 23, 2003, 5 pages.
Betts et al., "Goals and Objectives for User Interface Software", Computer Graphics, vol. 21, No. 2, Apr. 1987, pp. 73-78.
Biemann, Chris, "Unsupervised Part-of-Speech Tagging Employing Efficient Graph Clustering", Proceeding COLING ACL '06 Proceedings of the 21st International Conference on computational Linguistics and 44th Annual Meeting of the Association for Computational Linguistics: Student Research Workshop, 2006, pp. 7-12.
Bier et al., "Toolglass and Magic Lenses: The See-Through Interface", Computer Graphics (SIGGRAPH '93 Proceedings), vol. 27, 1993, pp. 73-80.
Birrell, Andrew, "Personal Jukebox (PJB)", available at <http://birrell.org/andrew/talks/pjb-overview.ppt>, Oct. 13, 2000, 6 pages.
Black et al., "Multilingual Text-to-Speech Synthesis", Acoustics, Speech and Signal Processing (ICASSP'04) Proceedings of the IEEE International Conference, vol. 3, May 17-21, 2004, 4 pages.
Bleher et al., "A Graphic Interactive Application Monitor", IBM Systems Journal, vol. 19, No. 3, Sep. 1980, pp. 382-402.
Bluetooth PC Headsets, "'Connecting' Your Bluetooth Headset with Your Computer", Enjoy Wireless VoIP Conversations, available at <http://www.bluetoothpcheadsets.com/connect.htm>, retrieved on Apr. 29, 2006, 4 pages.
Bocchieri et al., "Use of Geographical Meta-Data in ASR Language and Acoustic Models", IEEE International Conference on Acoustics Speech and Signal Processing, 2010, pp. 5118-5121.
Bociurkiw, Michael, "Product Guide: Vanessa Matz", available at <http://www.forbes.com/asap/2000/1127/vmartz_print.html>, retrieved on Jan. 23, 2003, 2 pages.
Borden IV, G.R., "An Aural User Interface for Ubiquitous Computing", Proceedings of the 6th International Symposium on Wearable Computers, IEEE, 2002, 2 pages.
Borenstein, Nathaniel S., "Cooperative Work in the Andrew Message System", Information Technology Center and Computer Science Department, Carnegie Mellon University; Thyberg, Chris A. Academic Computing, Carnegie Mellon University, 1988, pp. 306-323.
Boy, Guy A., "Intelligent Assistant Systems", Harcourt Brace Jovanovicy, 1991, 1 page.
Apple Computer, Inc., "Apple Introduces iTunes—World's Best and Easiest to Use Jukebox Software", Macworld Expo, Jan. 9, 2001, 2 pages.
Brown et al., "Browing Graphs Using a Fisheye View", Apple Inc., Video Clip, Systems Research Center, CHI '92 Continued Proceedings on a CD, 1992.

(56) References Cited

OTHER PUBLICATIONS

Brown et al., "Browsing Graphs Using a Fisheye View", CHI '93 Proceedings of the INTERACT '93 and CHI '93 Conference on Human Factors in Computing Systems, 1993, p. 516.
Burger, D., "Improved Access to Computers for the Visually Handicapped: New Prospects and Principles", IEEE Transactions on Rehabilitation Engineering, vol. 2, No. 3, Sep. 1994, pp. 111-118.
Busemann et al., "Natural Language Diaglogue Service for Appointment Scheduling Agents", Technical Report RR-97-02, Deutsches Forschungszentrum fur Kunstliche Intelligenz GmbH, 1997, 8 pages.
Butler, Travis, "Archos Jukebox 6000 Challenges Nomad Jukebox", available at <http://tidbits.com/article/6521>, Aug. 13, 2001, 5 pages.
Butler, Travis, "Portable MP3: The Nomad Jukebox", available at <http://tidbits.com/article/6261>, Jan. 8, 2001, 4 pages.
Buxton et al., "EuroPARC's Integrated Interactive Intermedia Facility (IIIF): Early Experiences", Proceedings of the IFIP WG 8.4 Conference on Multi-User Interfaces and Applications, 1990, pp. 11-34.
Call Centre, "Word Prediction", The CALL Centre & Scottish Executive Education Dept., 1999, pp. 63-73.
Campbell et al., "An Expandable Error-Protected 4800 BPS CELP Coder (U.S. Federal Standard 4800 BPS Voice Coder)", (Proceedings of IEEE Int'l Acoustics, Speech, and Signal Processing Conference, May 1983), as reprinted in Vector Quantization (IEEE Press, 1990), 1990, pp. 328-330.
Card et al., "Readings in Information Visualization Using Vision to Think", Interactive Technologies, 1999, 712 pages.
Carpendale et al., "3-Dimensional Pliable Surfaces: For the Effective Presentation of Visual Information", UIST '95 Proceedings of the 8th Annual ACM Symposium on User Interface and Software Technology, Nov. 14-17, 1995, pp. 217-226.
Carpendale et al., "Extending Distortion Viewing from 2D to 3D", IEEE Computer Graphics and Applications, Jul./Aug. 1997, pp. 42-51.
Carpendale et al., "Making Distortions Comprehensible", IEEE Proceedings of Symposium on Visual Languages, 1997, 10 pages.
Casner et al., "N-Way Conferencing with Packet Video", The Third International Workshop on Packet Video, Mar. 22-23, 1990, pp. 1-6.
Chakarova et al., "Digital Still Cameras—Downloading Images to a Computer", Multimedia Reporting and Convergence, available at <http://journalism.berkeley.edu/multimedia/tutorials/stillcams/downloading.html>, retrieved on May 9, 2005, 2 pages.
Apple Computer, Inc., "Apple's iPod Available in Stores Tomorrow", Press Release, Nov. 9, 2001, 1 page.
Chartier, David, "Using Multi-Network Meebo Chat Service on Your iPhone", available at <http://www.tuaw.com/2007/07/04/using-multi-network-meebo-chat-service-on-your-iphone/>, Jul. 4, 2007, 5 pages.
Apple Computer, Inc., "Inside Macintosh", vol. VI, 1985.
Apple Computer, Inc., "iTunes 2, Playlist Related Help Screens", iTunes v2.0, 2000-2001, 8 pages.
ABCOM PTY. Ltd. "12.1" 925 Candela Mobile PC", LCDHardware.com, available at <http://www.lcdhardware.com/panel/12_1_panel/default.asp.>, retrieved on Dec. 19, 2002, 2 pages.
ABF Software, "Lens—Magnifying Glass 1.5", available at <http://download.com/3000-2437-10262078.html?tag=1st-0-1>, retrieved on Feb. 11, 2004, 1 page.
Cisco Systems, Inc., "Cisco Unity Unified Messaging User Guide", Release 4.0(5), Apr. 14, 2005, 152 pages.
Cisco Systems, Inc., "Installation Guide for Cisco Unity Unified Messaging with Microsoft Exchange 2003/2000 (With Failover Configured)", Release 4.0(5), Apr. 14, 2005, 152 pages.
Cisco Systems, Inc., "Operations Manager Tutorial, Cisco's IPC Management Solution", 2006, 256 pages.
Coleman, David W., "Meridian Mail Voice Mail System Integrates Voice Processing and Personal Computing", Speech Technology, vol. 4, No. 2, Mar./Apr. 1988, pp. 84-87.
Compaq, "Personal Jukebox", available at <http://research.compaq.com/SRC/pjb/>, 2001, 3 pages.

Compaq Inspiration Technology, "Personal Jukebox (PJB)—Systems Research Center and PAAD", Oct. 13, 2000, 25 pages.
Conkie et al., "Preselection of Candidate Units in a Unit Selection-Based Text-to-Speech Synthesis System", ISCA, 2000, 4 pages.
Conklin, Jeffrey, "A Survey of Hypertext", MCC Software Technology Program, Dec. 1987, 40 pages.
Copperi et al., "CELP Coding for High Quality Speech at 8 kbits/s", Proceedings of IEEE International Acoustics, Speech and Signal Processing Conference, Apr. 1986), as reprinted in Vector Quantization (IEEE Press), 1990, pp. 324-327.
Corr, Paul, "Macintosh Utilities for Special Needs Users", available at <http://homepage.mac.com/corrp/macsupt/columns/specneeds.html>, Feb. 1994 (content updated Sep. 19, 1999), 4 pages.
Creative, "Creative NOMAD MuVo", available at <http://web.archive.org/web/20041024075901/www.creative.com/products/product.asp?category=213&subcategory=216&product=4983>, retrieved on Jun. 7, 2006, 1 page.
Creative, "Creative NOMAD MuVo TX", available at <http://web.archive.org/web/20041024175952/www.creative.com/products/pfriendly.asp?product=9672>, retrieved on Jun. 6, 2006, 1 page.
Creative, "Digital MP3 Player", available at <http://web.archive.org/web/20041024074823/www.creative.com/products/product.asp?category=213&subcategory=216&product=4983, 2004, 1 page.
Creative Technology Ltd., "Creative NOMAD® : Digital Audio Player: User Guide (On-Line Version)", available at <http://ec1.images-amazon.com/media/i3d/01/a/man-migrate/MANUAL000010757.pdf>, Jun. 1999, 40 pages.
Creative Technology Ltd., "Creative NOMAD® II: Getting Started—User Guide (on Line Version)", available at <http://ec1.images-amazon.com/media/i3d/01/a/man-migrate/MANUAL000026434.pdf>, Apr. 2000, 46 pages.
Creative Technology Ltd., "Nomad Jukebox", User Guide, Version 1.0, Aug. 2000, 52 pages.
Croft et al., "Task Support in an Office System", Proceedings of the Second ACM-SIGOA Conference on Office Information Systems, 1984, pp. 22-24.
Crowley et al., "MMConf: An Infrastructure for Building Shared Multimedia Applications", CSCW 90 Proceedings, Oct. 1990, pp. 329-342.
Cuperman et al., "Vector Predictive Coding of Speech at 16 kbit s/s", (IEEE Transactions on Communications, Jul. 1985), as reprinted in Vector Quantization (IEEE Press, 1990), 1990, pp. 300-311.
Abut et al., "Low-Rate Speech Encoding Using Vector Quantization and Subband Coding", (Proceedings of the IEEE International Acoustics, Speech and Signal Processing Conference, Apr. 1986), as reprinted in Vector Quantization IEEE Press, 1990, pp. 312-315.
Davis et al., "Stone Soup Translation", Department of Linguistics, Ohio State University, 2001, 11 pages.
De Herrera, Chris, "Microsoft ActiveSync 3.1", Version 1.02, available at <http://www.cewindows.net/wce/activesync3.1.htm>, Oct. 13, 2000, 8 pages.
Degani et al., "'Soft' Controls for Hard Displays: Still a Challenge", Proceedings of the 36th Annual Meeting of the Human Factors Society, 1992, pp. 52-56.
Del Strother, Jonathan, "Coverflow", available at <http://www.steelskies.com/coverflow>, retrieved on Jun. 15, 2006, 14 pages.
Diamond Multimedia Systems, Inc., "Rio PMP300: User's Guide", available at <http://ec1.images-amazon.com/media/i3d/01/A/man-migrate/MANUAL000022854.pdf>, 1998, 28 pages.
Dickinson et al., "Palmtips: Tiny Containers for All Your Data", PC Magazine, vol. 9, Mar. 1990, p. 218(3).
Digital Equipment Corporation, "OpenVMS RTL DECtalk (DTK$) Manual", May 1993, 56 pages.
Donahue et al., "Whiteboards: A Graphical Database Tool", ACM Transactions on Office Information Systems, vol. 4, No. 1, Jan. 1986, pp. 24-41.
Dourish et al., "Portholes: Supporting Awareness in a Distributed Work Group", CHI 1992;, May 1992, pp. 541-547.
Dusan et al., "Multimodal Interaction on PDA's Integrating Speech and Pen Inputs", Eurospeech Geneva, 2003, 4 pages.
Dyslexic.com, "AlphaSmart 3000 with CoWriter SmartApplet: Don Johnston Special Needs", available at <http://www.dyslexic.com/

(56) References Cited

OTHER PUBLICATIONS procuts.php?catid-2&pid=465&PHPSESSID=2511b800000f7da>, retrieved on Dec. 6, 2005, 13 pages.
Edwards, John R., "Q&A: Integrated Software with Macros and an Intelligent Assistant", Byte Magazine, vol. 11, No. 1, Jan. 1986, pp. 120-122.
Egido, Carmen, "Video Conferencing as a Technology to Support Group Work: A Review of its Failures", Bell Communications Research, 1988, pp. 13-24.
Elliot, Chip, "High-Quality Multimedia Conferencing Through a Long-Haul Packet Network", BBN Systems and Technologies, 1993, pp. 91-98.
Elliott et al., "Annotation Suggestion and Search for Personal Multimedia Objects on the Web", CIVR, Jul. 7-9, 2008, pp. 75-84.
Elofson et al., "Delegation Technologies: Environmental Scanning with Intelligent Agents", Jour. of Management Info. Systems, Summer 1991, vol. 8, No. 1, 1991, pp. 37-62.
Eluminx, "Illuminated Keyboard", available at <http://www.elumix.com/>, retrieved on Dec. 19, 2002, 1 page.
Engst, Adam C., "SoundJam Keeps on Jammin", available at <http://db.tidbits.com/getbits.acgi?tbart=05988>, Jun. 19, 2000, 3 pages.
Ericsson Inc., "Cellular Phone with Integrated MP3 Player", Research Disclosure Journal No. 41815, Feb. 1999, 2 pages.
Eslambolchilar et al., "Making Sense of Fisheye Views", Second Dynamics and Interaction Workshop at University of Glasgow, Aug. 2005, 6 pages.
Eslambolchilar et al., "Multimodal Feedback for Tilt Controlled Speed Dependent Automatic Zooming", UIST'04, Oct. 24-27, 2004, 2 pages.
Fanty et al., "A Comparison of DFT, PLP and Cochleagram for Alphabet Recognition", IEEE, Nov. 1991.
Findlater et al., "Beyond QWERTY: Augmenting Touch-Screen with Keyboards with Multi-Touch Gestures for Non-Alphanumeric Input", CHI '12, Austin, Texas, USA, May 5-10, 2012, 4 pages.
Fisher et al., "Virtual Environment Display System", Interactive 3D Graphics, Oct. 23-24, 1986, pp. 77-87.
Forsdick, Harry, "Explorations into Real-Time Multimedia Conferencing", Proceedings of the Ifip Tc 6 International Symposium on Computer Message Systems, 1986, 331 pages.
Furnas et al., "Space-Scale Diagrams: Understanding Multiscale Interfaces", CHI '95 Proceedings of the SIGCHI Conference on Human Factors in Computing Systems, 1995, pp. 234-241.
Furnas, George W., "Effective View Navigation", Proceedings of the ACM SIGCHI Conference on Human Factors in Computing Systems, Mar. 1997, pp. 367-374.
Furnas, George W., "Generalized Fisheye Views", CHI '86 Proceedings of the SIGCHI Conference on Human Factors in Computing Systems, vol. 17, No. 4, Apr. 1986, pp. 16-23.
Furnas, George W., "The Fisheye Calendar System", Bellcore Technical Memorandum, Nov. 19, 1991.
Gardner, Jr., P. C., "A System for the Automated Office Environment", IBM Systems Journal, vol. 20, No. 3, 1981, pp. 321-345.
Garretson, R., "IBM Adds 'Drawing Assistant' Design Tool to Graphic Series", PC Week, vol. 2, No. 32, Aug. 13, 1985, 1 page.
Gaver et al., "One Is Not Enough: Multiple Views in a Media Space", INTERCHI, Apr. 24-29, 1993, pp. 335-341.
Gaver et al., "Realizing a Video Environment: EuroPARC's RAVE System", Rank Xerox Cambridge EuroPARC, 1992, pp. 27-35.
Giachin et al., "Word Juncture Modeling Using Inter-Word Context-Dependent Phone-Like Units", Cselt Technical Reports, vol. 20, No. 1, Mar. 1992, pp. 43-47.
Gillespie, Kelly, "Adventures in Integration", Data Based Advisor, vol. 9, No. 9, Sep. 1991, pp. 90-92.
Gillespie, Kelly, "Internationalize Your Applications with Unicode", Data Based Advisor, vol. 10, No. 10, Oct. 1992, pp. 136-137.
Gilloire et al., "Innovative Speech Processing for Mobile Terminals: An Annotated Bibliography", Signal Processing, vol. 80, No. 7, Jul. 2000, pp. 1149-1166.
Glinert-Stevens, Susan, "Microsoft Publisher: Desktop Wizardry", PC Sources, vol. 3, No. 2, Feb. 1992, 1 page.
Gmail, "About Group Chat", available at <http://mail.google.com/support/bin/answer.py?answer=81090>, Nov. 26, 2007, 2 pages.
Goldberg, Cheryl, "IBM Drawing Assistant: Graphics for the EGA", PC Magazine, vol. 4, No. 26, Dec. 24, 1985, 1 page.
Good et al., "Building a User-Derived Interface", Communications of the ACM; (Oct. 1984) vol. 27, No. 10, Oct. 1984, pp. 1032-1043.
Gray et al., "Rate Distortion Speech Coding with a Minimum Discrimination Information Distortion Measure", (IEEE Transactions on Information Theory, Nov. 1981), as reprinted in Vector Quantization (IEEE Press), 1990, pp. 208-221.
Greenberg, Saul, "A Fisheye Text Editor for Relaxed-WYSIWIS Groupware", CHI '96 Companion, Vancouver, Canada, Apr. 13-18, 1996, 2 pages.
Griffin et al., "Signal Estimation From Modified Short-Time Fourier Transform", IEEE Transactions on Acoustics, Speech and Signal Processing, vol. ASSP-32, No. 2, Apr. 1984, pp. 236-243.
Gruhn et al., "A Research Perspective on Computer-Assisted Office Work", IBM Systems Journal, vol. 18, No. 3, 1979, pp. 432-456.
Hain et al., "The Papageno TTS System", Siemens AG, Corporate Technology, Munich, Germany TC-STAR Workshop, 2006, 6 pages.
Halbert, D. C., "Programming by Example", Dept. Electrical Engineering and Comp. Sciences, University of California, Berkley, Nov. 1984, pp. 1-76.
Hall, William S., "Adapt Your Program for Worldwide Use with Windows.TM. Internationalization Support", Microsoft Systems Journal, vol. 6, No. 6, Nov./Dec. 1991, pp. 29-58.
Haoui et al., "Embedded Coding of Speech: A Vector Quantization Approach", (Proceedings of the IEEE International Acoustics, Speech and Signal Processing Conference, Mar. 1985), as reprinted in Vector Quantization (IEEE Press, 1990), 1990, pp. 297-299.
Hartson et al., "Advances in Human-Computer Interaction", Chapters 1, 5, and 6, vol. 3, 1992, 121 pages.
Heger et al., "KNOWBOT: An Adaptive Data Base Interface", Nuclear Science and Engineering, V. 107, No. 2, Feb. 1991, pp. 142-157.
Hendrix et al., "The Intelligent Assistant: Technical Considerations Involved in Designing Q&A's Natural-Language Interface", Byte Magazine, Issue 14, Dec. 1987, 1 page.
Heyer et al., "Exploring Expression Data: Identification and Analysis of Coexpressed Genes", Genome Research, vol. 9, 1999, pp. 1106-1115.
Hill, R. D., "Some Important Features and Issues in User Interface Management System", Dynamic Graphics Project, University of Toronto, CSRI, vol. 21, No. 2, Apr. 1987, pp. 116-120.
Hinckley et al., "A Survey of Design Issues in Spatial Input", UIST '94 Proceedings of the 7th Annual ACM Symposium on User Interface Software and Technology, 1994, pp. 213-222.
Hiroshi, "TeamWork Station: Towards a Seamless Shared Workspace", NTT Human Interface Laboratories, CSCW 90 Proceedings, Oct. 1990, pp. 13-26.
Holmes, "Speech System and Research", 1955, pp. 129-135, 152-153.
Hon et al., "Towards Large Vocabulary Mandarin Chinese Speech Recognition", Conference on Acoustics, Speech, and Signal Processing, ICASSP-94, IEEE International, vol. 1, Apr. 1994, pp. 545-548.
Hopper, Andy, "Pandora—An Experimental System for Multimedia Applications", Olivetti Research Laboratory, Apr. 1990, pp. 19-34.
Howard, John H., "(Abstract) An Overview of the Andrew File System", Information Technology Center, Carnegie Mellon University; (CMU-ITC-88-062) to Appear in a future issue of the ACM Transactions on Computer Systems, 1988, pp. 1-6.
Huang et al., "Real-Time Software-Based Video Coder for Multimedia Communication Systems", Department of Computer Science and Information Engineering, 1993, 10 pages.
Hukin, R. W., "Testing an Auditory Model by Resynthesis", European Conference on Speech Communication and Technology, Sep. 26-29, 1989, pp. 243-246.
Hunt, "Unit Selection in a Concatenative Speech Synthesis System Using a Large Speech Database", Copyright 1996 IEEE. "To appear in Proc. ICASSP-96, May 7-10, Atlanta, GA" ATR Interpreting Telecommunications Research Labs, Kyoto Japan, 1996, pp. 373-376.
IBM, "Why Buy: ThinkPad", available at <http://www.pc.ibm.com/us/thinkpad/easeofuse.html>, retrieved on Dec. 19, 2002, 2 pages.

(56) References Cited

OTHER PUBLICATIONS

IBM Corporation, "Simon Says Here's How", Users Manual, 1994, 3 pages.
iChat AV, "Video Conferencing for the Rest of Us", Apple—Mac OS X—iChat AV, available at <http://www.apple.com/macosx/features/ichat/>, retrieved on Apr. 13, 2006, 3 pages.
iPhone Hacks, "Native iPhone MMS Application Released", available at <http://www.iphonehacks.com/2007/12/iPhone-mms-app.html>, retrieved on Dec. 25, 2007, 5 pages.
iPhonechat, "iChat for iPhone in JavaScript", available at <http://www.publictivity.com/iPhoneChat/>, retrieved on Dec. 25, 2007, 2 pages.
JABRA, "Bluetooth Headset: User Manual", 2005, 17 pages.
Omologo et al., "Microphone Array Based Speech Recognition with Different Talker-Array Positions", IEEE International Conference on Acoustics, Speech, and Signal Processing, vol. 1, Apr. 21-24, 1997, pp. 227-230.
Oregon Scientific, "512MB Waterproof MP3 Player with FM Radio & Built-in Pedometer", available at <http://www2.oregonscientific.com/shop/product.asp?cid=4&scid=11&pid=581>, retrieved on Jul. 31, 2006, 2 pages.
Oregon Scientific, "Waterproof Music Player with FM Radio and Pedometer (MP121)—User Manual", 2005, 24 pages.
Padilla, Alfredo, "Palm Treo 750 Cell Phone Review—Messaging", available at <http://www.wirelessinfo.com/content/palm-Treo-750-Cell-Phone-Review/Messaging.htm>, Mar. 17, 2007, 6 pages.
Palay et al., "The Andrew Toolkit: An Overview", Information Technology Center, Carnegie-Mellon University, 1988, pp. 1-15.
Palm, Inc., "User Guide : Your Palm® Treo.TM. 755p Smartphone", 2005-2007, 304 pages.
Panasonic, "Toughbook 28: Powerful, Rugged and Wireless", Panasonic: Toughbook Models, available at <http://www.panasonic.com/computer/notebook/html/01a_s8.htm>, retrieved on Dec. 19, 2002, 3 pages.
Parks et al., "Classification of Whale and Ice Sounds with a cochlear Model", IEEE, Mar. 1992.
Patterson et al., "Rendezvous: An Architecture for Synchronous Multi-User Applications", CSCW '90 Proceedings, 1990, pp. 317-328.
International Search Report received for PCT Patent Application No. PCT/US2002/033330, mailed on Feb. 4, 2003, 6 pages.
International Search Report and Written Opinion received for PCT Patent Application No. PCT/US2004/016519, mailed on Nov. 3, 2005, 16 pages.
Partial International Search Report and Invitation to Pay Additional Fees received for PCT Patent Application No. PCT/US2004/016519, mailed on Aug. 4, 2005, 6 pages.
International Search Report and Written Opinion received for PCT Patent Application No. PCT/US2005/038819, mailed on Apr. 5, 2006, 12 pages.
International Search Report received for PCT Patent Application No. PCT/US2005/046797, mailed on Nov. 24, 2006, 6 pages.
Invitation to Pay Additional Fees and Partial Search Report received for PCT Application No. PCT/US2005/046797, mailed on Jul. 3, 2006, 6 pages.
Written Opinion received for PCT Patent Application No. PCT/US2005/046797, mailed on Nov. 24, 2006, 9 pages.
International Search Report and Written Opinion received for PCT Patent Application No. PCT/US2006/048669, mailed on Jul. 2, 2007, 12 pages.
International Search Report and Written Opinion received for PCT Patent Application No. PCT/US2006/048670, mailed on May 21, 2007, 11 pages.
Invitation to Pay Addition Fees and Partial International Search Report received for PCT Patent Application No. PCT/US2006/048738, mailed on Jul. 10, 2007, 4 pages.
International Search Report and Written Opinion received for PCT Patent Application No. PCT/US2006/048753, mailed on Jun. 19, 2007, 15 pages.
International Search Report and Written Opinion received for PCT Patent Application No. PCT/US2007/026243, mailed on Mar. 31, 2008, 10 pages.
International Search Report and Written Opinion received for PCT Patent Application No. PCT/US2007/077424, mailed on Jun. 19, 2008, 13 pages.
Invitation to Pay Additional Fees received for PCT Application No. PCT/US2007/077424, mailed on Apr. 29, 2008, 6 pages.
International Search Report and Written Opinion received for PCT Patent Application No. PCT/US2007/077443, mailed on Feb. 21, 2008, 8 pages.
International Search Report and Written Opinion received for PCT Patent Application No. PCT/US2007/088872, mailed on May 8, 2008, 8 pages.
International Search Report and Written Opinion received for PCT Patent Application No. PCT/US2007/088873, mailed on May 8, 2008, 7 pages.
International Search Report and Written Opinion received for PCT Patent Application No. PCT/US2008/000032, mailed on Jun. 12, 2008, 7 pages.
International Search Report and Written Opinion received for PCT Patent Application No. PCT/US2008/000042, mailed on May 21, 2008, 7 pages.
International Search Report and Written Opinion received for PCT Patent Application No. PCT/US2008/000043, mailed on Oct. 10, 2008, 12 pages.
Invitation to Pay Additional Fees received for PCT Patent Application No. PCT/US2008/000043, mailed on Jun. 27, 2008, 4 pages.
International Search Report and Written Opinion received for PCT Patent Application No. PCT/US2008/000045, mailed Jun. 12, 2008, 7 pages.
International Search Report and Written Opinion received for PCT Patent Application No. PCT/US2008/000047, mailed on Sep. 11, 2008, 12 pages.
Invitation to Pay Additional Fees received for PCT Patent Application No. PCT/US2008/000047, mailed on Jul. 4, 2008, 4 pages.
International Search Report and Written Opinion received for PCT Patent Application No. PCT/US2008/000059, mailed on Sep. 19, 2008, 18 pages.
International Search Report and Written Opinion received for PCT Patent Application No. PCT/US2008/000061, mailed on Jul. 1, 2008, 13 pages.
International Search Report and Written Opinion received for PCT Patent Application No. PCT/US2008/050083, mailed on Jul. 4, 2008, 9 pages.
International Search Report and Written Opinion received for PCT Patent Application No. PCT/US2011/020350, mailed on Jun. 30, 2011, 17 pages.
Invitation to Pay Additional Fees and Partial International Search Report received for PCT Patent Application No. PCT/US2011/020350, mailed on Apr. 14, 2011, 5 pages.
International Preliminary Report on Patentability received for PCT Patent Application No. PCT/US2011/020861, mailed on Aug. 2, 2012, 11 pages.
International Search Report received for PCT Patent Application No. PCT/US2011/037014, mailed on Oct. 4, 2011, 16 pages.
Invitation to Pay Additional Search Fees received for PCT Application No. PCT/US2011/037014, mailed on Aug. 2, 2011, 6 pages.
Extended European Search Report (includes European Search Report and European Search Opinion) received for European Patent Application No. 06256215.2, mailed on Feb. 20, 2007, 6 pages.
Extended European Search Report (includes Supplementary European Search Report and Search Opinion) received for European Patent Application No. 07863218.9, mailed on Dec. 9, 2010, 7 pages.
International Search Report and Written Opinion received for PCT Patent Application No. PCT/US2012/034028, mailed on Jun. 11, 2012, 9 pages.
International Search Report and Written Opinion received for PCT Patent Application No. PCT/US2012/040931, mailed on Feb. 1, 2013, 4 pages (International Search Report only).
International Search Report and Written Opinion received for PCT Patent Application No. PCT/US2012/043098, mailed on Nov. 14, 2012, 9 pages.

(56) References Cited

OTHER PUBLICATIONS

Ahlberg et al., "The Alphaslider: A Compact Rapid Selector", CHI '94 Proceedings of the SIGCHI Conference Factors in Computing Systems, Apr. 1994, pp. 365-371.
International Search Report and Written Opinion received for PCT Patent Application No. PCT/US2013/041225, mailed on Aug. 23, 2013, 3 pages (International Search Report only).
Invitation to Pay Additional Fees received for PCT Patent Application No. PCT/US2013/047659, mailed on Feb. 27, 2014, 7 pages.
Invitation to Pay Additional Fees received for PCT Application No. PCT/US2013/052558, mailed on Nov. 7, 2013, 6 pages.
Scheifler, R. W., "The X Window System", MIT Laboratory for Computer Science and Gettys, Jim Digital Equipment Corporation and MIT Project Athena; ACM Transactions on Graphics, vol. 5, No. 2, Apr. 1986, pp. 79-109.
Schluter et al., "Using Phase Spectrum Information for Improved Speech Recognition Performance", IEEE International Conference on Acoustics, Speech, and Signal Processing, 2001, pp. 133-136.
Schmandt et al., "A Conversational Telephone Messaging System", IEEE Transactions on Consumer Electronics, vol. CE-30, Aug. 1984, pp. xxi-xxiv.
Schmandt et al., "Phone Slave: A Graphical Telecommunications Interface", Society for Information Display, International Symposium Digest of Technical Papers, Jun. 1984, 4 pages.
Schmandt et al., "Phone Slave: A Graphical Telecommunications Interface", Proceedings of the SID, vol. 26, No. 1, 1985, pp. 79-82.
Schmid, H., "Part-of-speech tagging with neural networks", COLING '94 Proceedings of the 15th conference on Computational linguistics—vol. 1, 1994, pp. 172-176.
Schooler et al., "A Packet-switched Multimedia Conferencing System", By Eve Schooler, et al; ACM SIGOIS Bulletin, vol. I, No. 1, Jan. 1989, pp. 12-22.
Schooler et al., "An Architecture for Multimedia Connection Management", Proceedings IEEE 4th Comsoc International Workshop on Multimedia Communications, Apr. 1992, pp. 271-274.
Schooler et al., "Multimedia Conferencing: Has it Come of Age?", Proceedings 24th Hawaii International Conference on System Sciences, vol. 3, Jan. 1991, pp. 707-716.
Schooler et al., "The Connection Control Protocol: Architecture Overview", USC/Information Sciences Institute, Jan. 28, 1992, pp. 1-6.
Schooler, Eve, "A Distributed Architecture for Multimedia Conference Control", ISI Research Report, Nov. 1991, pp. 1-18.
Schooler, Eve M., "Case Study: Multimedia Conference Control in a Packet-Switched Teleconferencing System", Journal of Internetworking: Research and Experience, vol. 4, No. 2, Jun. 1993, pp. 99-120.
Schooler, Eve M., "The Impact of Scaling on a Multimedia Connection Architecture", Multimedia Systems, vol. 1, No. 1, 1993, pp. 2-9.
Schütze, H., "Distributional part-of-speech tagging", EACL '95 Proceedings of the seventh conference on European chapter of the Association for Computational Linguistics, 1995, pp. 141-148.
Schütze, Hinrich, "Part-of-speech induction from scratch", ACL '93 Proceedings of the 31st annual meeting on Association for Computational Linguistics, 1993, pp. 251-258.
Schwartz et al., "Context-Dependent Modeling for Acoustic-Phonetic Recognition of Continuous Speech", IEEE International Conference on Acoustics, Speech, and Signal Processing, vol. 10, Apr. 1985, pp. 1205-1208.
Schwartz et al., "Improved Hidden Markov Modeling of Phonemes for Continuous Speech Recognition", IEEE International Conference on Acoustics, Speech, and Signal Processing, vol. 9, 1984, pp. 21-24.
Schwartz et al., "The N-Best Algorithm: An Efficient and Exact Procedure For Finding The N Most Likely Sentence Hypotheses", IEEE, 1990, pp. 81-84.
Scott et al., "Designing Touch Screen Numeric Keypads: Effects of Finger Size, Key Size, and Key Spacing", Proceedings of the Human Factors and Ergonomics Society 41st Annual Meeting, Oct. 1997, pp. 360-364.
Seagrave, Jim, "A Faster Way to Search Text", EXE, vol. 5, No. 3, Aug. 1990, pp. 50-52.
Sears et al., "High Precision Touchscreens: Design Strategies and Comparisons with a Mouse", International Journal of Man-Machine Studies, vol. 34, No. 4, Apr. 1991, pp. 593-613.
Sears et al., "Investigating Touchscreen Typing: The Effect of Keyboard Size on Typing Speed", Behavior & Information Technology, vol. 12, No. 1, 1993, pp. 17-22.
Sears et al., "Touchscreen Keyboards", Apple Inc., Video Clip, Human-Computer Interaction Laborato, on a CD, Apr. 1991.
Seide et al., "Improving Speech Understanding by Incorporating Database Constraints and Dialogue History", Proceedings of Fourth International Conference on Philadelphia,, 1996, pp. 1017-1020.
Shiraki et al., "LPC Speech Coding Based on Variable-Length Segment Quantization", (IEEE Transactions on Acoustics, Speech and Signal Processing, Sep. 1988), as reprinted in Vector Quantization (IEEE Press, 1990), 1990, pp. 250-257.
Shneiderman, Ben, "Designing the User Interface: Strategies for Effective Human-Computer Interaction", Second Edition, 1992, 599 pages.
Shneiderman, Ben, "Designing the User Interface: Strategies for Effective Human-Computer Interaction", Third Edition, 1998, 669 pages.
Shneiderman, Ben, "Direct Manipulation for Comprehensible, Predictable and Controllable User Interfaces", Proceedings of the 2nd International Conference on Intelligent User Interfaces, 1997, pp. 33-39.
Shneiderman, Ben, "Sparks of Innovation in Human-Computer Interaction", 1993, (Table of Contents, Title Page, Ch. 4, Ch. 6 and List of References).
Shneiderman, Ben, "The Eyes Have It: A Task by Data Type Taxonomy for Information Visualizations", IEEE Proceedings of Symposium on Visual Languages, 1996, pp. 336-343.
Shneiderman, Ben, "Touch Screens Now Offer Compelling Uses", IEEE Software, Mar. 1991, pp. 93-94.
Shoham et al., "Efficient Bit and Allocation for an Arbitrary Set of Quantizers", (IEEE Transactions on Acoustics, Speech, and Signal Processing, Sep. 1988) as reprinted in Vector Quantization (IEEE Press, 1990), 1990, pp. 289-296.
Simkovitz, Daniel, "LP-DOS Magnifies the PC Screen", IEEE, 1992, pp. 203-204.
Singh et al., "Automatic Generation of Phone Sets and Lexical Transcriptions", Acoustics, Speech and Signal Processing (ICASSP'00), 2000, 1 page.
Sinitsyn, Alexander, "A Synchronization Framework for Personal Mobile Servers", Proceedings of the Second IEEE Annual Conference on Pervasive Computing and Communications Workshops, Piscataway, 2004, pp. 1, 3 and 5.
Slaney et al., "On the Importance of Time—A Temporal Representation of Sound", Visual Representation of Speech Signals, 1993, pp. 95-116.
Smeaton, Alan F., "Natural Language Processing and Information Retrieval", Information Processing and Management, vol. 26, No. 1, 1990, pp. 19-20.
Smith et al., "Guidelines for Designing User Interface Software", User Lab, Inc., Aug. 1986, pp. 1-384.
Smith et al., "Relating Distortion to Performance in Distortion Oriented Displays", Proceedings of Sixth Australian Conference on Computer-Human Interaction, Nov. 1996, pp. 6-11.
Sony Eiicsson Corporate, "Sony Ericsson to introduce Auto pairing.TM. to Improve Bluetooth.TM. Connectivity Between Headsets and Phones", Press Release, available at <http://www.sonyericsson.com/spg.jsp?cc=global&lc=en&ver=4001&template=pc3_1_1&z...>, Sep. 28, 2005, 2 pages.
Soong et al., "A High Quality Subband Speech Coder with Backward Adaptive Predictor and Optimal Time-Frequency Bit Assignment", (Proceedings of the IEEE International Acoustics, Speech, and Signal Processing Conference, Apr. 1986), as reprinted in Vector Quantization (IEEE Press, 1990), 1990, pp. 316-319.
Spiller, Karen, "Low-Decibel Earbuds Keep Noise at a Reasonable Level", available at <http://www.nashuatelegraph.com/apps/pbcs.dll/article?Date=20060813&Cate...>, Aug. 13, 2006, 3 pages.

(56) References Cited

OTHER PUBLICATIONS

Ahlberg et al., "Visual Information Seeking: Tight Coupling of Dynamic Query Filters with Starfield Displays", Proceedings of the SIGCHI Conference on Human Factors in Computing Systems, Apr. 24-28, 1994, pp. 313-317.
Srinivas et al., "Monet: A Multi-Media System for Conferencing and Application Sharing in Distributed Systems", CERC Technical Report Series Research Note, Feb. 1992.
Stealth Computer Corporation, "Peripherals for Industrial Keyboards & Pointing Devices", available at <http://www.stealthcomputercom/peripherals_oem.htm>, retrieved on Dec. 19, 2002, 6 pages.
Steinberg, Gene, "Sonicblue Rio Car (10 GB, Reviewed: 6 GB)", available at <http://electronics.cnet.com/electronics/0-6342420-1304-4098389.html>, Dec. 12, 2000, 2 pages.
Stent et al., "Geo-Centric Language Models for Local Business Voice Search", AT&T Labs—Research, 2009, pp. 389-396.
Stone et al., "The Movable Filter as a User Interface Tool", CHI '94 Human Factors in Computing Systems, 1994, pp. 306-312.
Su et al., "A Review of ZoomText Xtra Screen Magnification Program for Windows 95", Journal of Visual Impairment & Blindness, Feb. 1998, pp. 116-119.
Su, Joseph C., "A Review of Telesensory's Vista PCI Screen Magnification System", Journal of Visual Impairment & Blindness, Oct. 1998, pp. 705, 707-710.
JABRA, "Bluetooth Introduction", 2004, 15 pages.
JABRA Corporation, "FreeSpeak: BT200 User Manual", 2002, 42 pages.
Jaybird, "Everything Wrong with AIM: Because We've All Thought About It", available at <http://www.psychonoble.com/archives/articles/82.html>, May 24, 2006, 3 pages.
Jeffay et al., "Kernel Support for Live Digital Audio and Video", In Proc. of the Second Intl. Workshop on Network and Operating System Support for Digital Audio and Video, vol. 614, Nov. 1991, pp. 10-21.
Jelinek et al., "Interpolated Estimation of Markov Source Parameters from Sparse Data", In Proceedings of the Workshop on Pattern Recognition in Practice May 1980, pp. 381-397.
Johnson, Jeff A., "A Comparison of User Interfaces for Panning on a Touch-Controlled Display", CHI '95 Proceedings, 1995, 8 pages.
Kaeppner et al., "Architecture of HeiPhone: A Testbed for Audio/Video Teleconferencing", IBM European Networking Center, 1993.
Kamba et al., "Using Small Screen Space More Efficiently", CHI '96 Proceedings of the SIGCHI Conference on Human Factors in Computing Systems, Apr. 13-18, 1996, pp. 383-390.
Kang et al., "Quality Improvement of LPC-Processed Noisy Speech by Using Spectral Subtraction", IEEE Transactions on Acoustics, Speech and Signal Processing, vol. 37, No. 6, Jun. 1989, pp. 939-942.
Keahey et al., "Non-Linear Image Magnification", Apr. 24, 1996, 11 pages.
Keahey et al., "Nonlinear Magnification Fields", Proceedings of the 1997 IEEE Symposium on Information Visualization, 1997, 12 pages.
Keahey et al., "Techniques for Non-Linear Magnification Transformations", IEEE Proceedings of Symposium on Information Visualization, Oct. 1996, pp. 38-45.
Keahey et al., "Viewing Text With Non-Linear Magnification: An Experimental Study", Department of Computer Science, Indiana University, Apr. 24, 1996, pp. 1-9.
Kennedy, P J., "Digital Data Storage Using Video Disc", IBM Technical Disclosure Bulletin, vol. 24, No. 2, Jul. 1981, p. 1171.
Kerr, "An Incremental String Search in C: This Data Matching Algorithm Narrows the Search Space with each Keystroke", Computer Language, vol. 6, No. 12, Dec. 1989, pp. 35-39.
Abut et al., "Vector Quantization of Speech and Speech-Like Waveforms", (IEEE Transactions on Acoustics, Speech, and Signal Processing, Jun. 1982), as reprinted in Vector Quantization (IEEE Press, 1990), 1990, pp. 258-270.
Kim, E.A. S., "The Structure and Processing of Fundamental Frequency Contours", University of Cambridge, Doctoral Thesis, Apr. 1987, 378 pages.
Kirstein et al., "Piloting of Multimedia Integrated Communications for European Researchers", Proc. INET '93, 1993, pp. 1-12.
Kjelldahl et al., "Multimedia—Principles, Systems, and Applications", Proceedings of the 1991 Eurographics Workshop on Multimedia Systems, Applications, and Interaction, Apr. 1991.
Kline et al., "Improving GUI Accessibility for People with Low Vision", CHI '95 Proceedings of the SIGCHI Conference on Human Factors in Computing Systems, May 7-11, 1995, pp. 114-121.
Kline et al., "UnWindows 1.0: X Windows Tools for Low Vision Users", ACM SIGCAPH Computers and the Physically Handicapped, No. 49, Mar. 1994, pp. 1-5.
Knight et al., "Heuristic Search", Production Systems, Artificial Intelligence, 2nd ed., McGraw-Hill, Inc., 1983-1991.
Kroon et al., "Quantization Procedures for the Excitation in CELP Coders", (Proceedings of IEEE International Acoustics, Speech, and Signal Processing Conference, Apr. 1987), as reprinted in Vector Quantization (IEEE Press, 1990), 1990, pp. 320-323.
Kuo et al., "A Radical-Partitioned code Block Adaptive Neural Network Structure for Large-Volume Chinese Character Recognition", International Joint Conference on Neural Networks, vol. 3, Jun. 1992, pp. 597-601.
Kuo et al., "A Radical-Partitioned Neural Network System Using a Modified Sigmoid Function and a Weight-Dotted Radical Selector for Large-Volume Chinese Character Recognition VLSI", IEEE Int. Symp. Circuits and Systems, Jun. 1994, pp. 3862-3865.
Kurlander et al., "Comic Chat", [Online], 1996 [Retrieved on: Feb. 4, 2013], SIGGRAPH '96 Proceedings of the 23rd annual conference on Computer graphics and interactive techniques, [Retrieved from: http://delivery.acm.org/10.1145/240000/237260/p225-kurlander.pdf], 1996, pp. 225-236.
Laface et al., "A Fast Segmental Viterbi Algorithm for Large Vocabulary Recognition", International Conference on Acoustics, Speech, and Signal Processing, vol. 1, May 1995, pp. 560-563.
Lafferty et al., "Conditional Random Fields: Probabilistic Models for Segmenting and Labeling Sequence Data", Proceedings of the 18th International Conference on Machine Learning, 2001, 9 pages.
Lamel et al., "Generation and synthesis of Broadcast Messages", Proceedings of ESCA-NATO Workshop: Applications of Speech Technology, Sep. 1, 1993, 4 pages.
Lamping et al., "Laying Out and Visualizing Large Trees Using a Hyperbolic Space", Proceedings of the ACM Symposium on User Interface Software and Technology, Nov. 1994, pp. 13-14.
Lamping et al., "Visualizing Large Trees Using the Hyperbolic Browser", Apple Inc., Video Clip, MIT Media Library, on a CD, 1995.
Lantz et al., "Towards a Universal Directory Service", Departments of Computer Science and Electrical Engineering, Stanford University, 1985, pp. 250-260.
Lantz, Keith, "An Experiment in Integrated Multimedia Conferencing", 1986, pp. 267-275.
Lauwers et al., "Collaboration Awareness in Support of Collaboration Transparency: Requirements for the Next Generation of Shared Window Systems", CHI'90 Proceedings, 1990, pp. 303-311.
Lauwers et al., "Replicated Architectures for Shared Window Systems: A Critique", COCS '90 Proceedings of the ACM SIGOIS and IEEE CS TC-OA conference on Office information systems, ACM SIGOIS Bulletin, 1990, pp. 249-260.
Lazzaro, Joseph J., "Adapting Desktop Computers to Meet the Needs of Disabled Workers is Easier Than You Might Think", Computers for the Disabled, BYTE Magazine, Jun. 1993, 4 pages.
Leahy et al., "Effect of Touch Screen Target Location on User Accuracy", Proceedings of the Human Factors Society 34th Annual Meeting, 1990, 5 pages.
Lee, Kai-Fu, "Automatic Speech Recognition", 1989, 14 pages (Table of Contents).
Leung et al., "A Review and Taxonomy of Distortion-Oriented Presentation Techniques", ACM Transactions on Computer-Human Interaction (TOCHI), vol. 1, No. 2, Jun. 1994, pp. 126-160.
Levinson et al., "Speech synthesis in telecommunications", IEEE Communications Magazine, vol. 31, No. 11, Nov. 1993, pp. 46-53.
Lewis, "Speech synthesis in a computer aided learning environment", UK IT, Mar. 19-22, 1990, pp. 294-298.

(56) References Cited

OTHER PUBLICATIONS

Lewis, Peter, "Two New Ways to Buy Your Bits", CNN Money, available at <http://money.cnn.com/2003/12/30/commentary/ontechnology/download/>,, Dec. 31, 2003, 4 pages.
Lieberman, Henry, "A Multi-Scale, Multi-Layer, Translucent Virtual Space", Proceedings of IEEE Conference on Information Visualization, Aug. 1997, pp. 124-131.
Lieberman, Henry, "Powers of Ten Thousand: Navigating in Large Information Spaces", Proceedings of the ACM Symposium on User Interface Software and Technology, Nov. 1994, pp. 1-2.
Lyon, R., "A Computational Model of Binaural Localization and Separation", Proceedings of IEEE International Conference on Acoustics, Speech and Signal Processing, Apr. 1983, pp. 1148-1151.
Lyons et al., "Augmenting Conversations Using Dual-Purpose Speech", Proceedings of the 17th Annual ACM Symposium on User interface Software and Technology, 2004, 10 pages.
Lyons, Richard F., "CCD Correlators for Auditory Models", Proceedings of the Twenty-Fifth Asilomar Conference on Signals, Systems and Computers, Nov. 4-6, 1991, pp. 785-789.
Mackenzie et al., "Alphanumeric Entry on Pen-Based Computers", International Journal of Human-Computer Studies, vol. 41, 1994, pp. 775-792.
MacKinlay et al., "The Perspective Wall: Detail and Context Smoothly Integrated", ACM, 1991, pp. 173-179.
Macsimum News, "Apple Files Patent for an Audio Interface for the iPod", available at <http://www.macsimumnews.com/index.php/archive/apple_files_patent_for_an_audio_interface_for_the_ipod>, retrieved on Jul. 13, 2006, 8 pages.
Mactech, "KeyStrokes 3.5 for Mac OS X Boosts Word Prediction", available at <http://www.mactech.com/news/?p=1007129>, retrieved on Jan. 7, 2008, 3 pages.
Mahedero et al., "Natural Language Processing of Lyrics", In Proceedings of the 13th Annual ACM International Conference on Multimedia, ACM, Nov. 6-11, 2005, 4 pages.
Marcus et al., "Building a Large Annotated Corpus of English: The Penn Treebank", Computational Linguistics, vol. 19, No. 2, 1993, pp. 313-330.
Markel et al., "Linear Production of Speech", Reviews, 1976, pp. xii, 288.
Masui, Toshiyuki, "POBox: An Efficient Text Input Method for Handheld and Ubiquitous Computers", Proceedings of the 1st International Symposium on Handheld and Ubiquitous Computing, 1999, 12 pages.
Matsui et al., "Speaker Adaptation of Tied-Mixture-Based Phoneme Models for Text-Prompted Speaker Recognition", 1994 IEEE International Conference on Acoustics, Speech and Signal Processing, Apr. 19-22, 1994, 1-125-1-128.
Matsuzawa, A, "Low-Voltage and Low-Power Circuit Design for Mixed Analog/Digital Systems in Portable Equipment", IEEE Journal of Solid-State Circuits, vol. 29, No. 4, 1994, pp. 470-480.
Mellinger, David K., "Feature-Map Methods for Extracting Sound Frequency Modulation", IEEE Computer Society Press, 1991, pp. 795-799.
Menico, Costas, "Faster String Searches", Dr. Dobb's Journal, vol. 14, No. 7, Jul. 1989, pp. 74-77.
Menta, Richard, "1200 Song MP3 Portable is a Milestone Player", available at <http://www.mp3newswire.net/stories/personaljuke.html>, Jan. 11, 2000, 4 pages.
Meyer, Mike, "A Shell for Modern Personal Computers", University of California, Aug. 1987, pp. 13-19.
Meyrowitz et al., "Bruwin: An Adaptable Design Strategy for Window Manager/Virtual Terminal Systems", Department of Computer Science, Brown University, 1981, pp. 180-189.
Miastkowski, Stan, "paperWorks Makes Paper Intelligent", Byte Magazine, Jun. 1992.
Microsoft, "Turn on and Use Magnifier", available at <http://www.microsoft.com/windowsxp/using/accessibility/magnifierturnon.mspx>, retrieved on Jun. 6, 2009.

Microsoft Corporation, Microsoft Office Word 2003 (SP2), Microsoft Corporation, SP3 as of 2005, pp. MSWord 2003 Figures 1-5, 1983-2003.
Microsoft Corporation, "Microsoft MS-DOS Operating System User's Guide", Microsoft Corporation, 1982, pp. 4-1 to 4-16, 5-1 to 5-19.
Microsoft Press, "Microsoft Windows User's Guide for the Windows Graphical Environment", version 3.0, 1985-1990, pp. 33-41 & 70-74.
Microsoft Windows XP, "Magnifier Utility", Oct. 25, 2001, 2 pages.
Microsoft Word 2000 Microsoft Corporation, pp. MSWord Figures 1-5, 1999.
Microsoft/Ford, "Basic Sync Commands", www.SyncMyRide.com, Sep. 14, 2007, 1 page.
Milner, N. P., "A Review of Human Performance and Preferences with Different Input Devices to Computer Systems", Proceedings of the Fourth Conference of the British Computer Society on People and Computers, Sep. 5-9, 1988, pp. 341-352.
Miniman, Jared, "Applian Software's Replay Radio and Player v1.02", pocketnow.com—Review, available at <http://www.pocketnow.com/reviews/replay/replay.htm>, Jul. 31, 2001, 16 pages.
Moberg et al., "Cross-Lingual Phoneme Mapping for Multilingual Synthesis Systems", Proceedings of the 8th International Conference on Spoken Language Processing, Jeju Island, Korea, INTERSPEECH 2004, Oct. 4-8, 2004, 4 pages.
Moberg, M., "Contributions to Multilingual Low-Footprint TTS System for Hand-Held Devices", Doctoral Thesis, Tampere University of Technology, Aug. 17, 2007, 82 pages.
Mobile Tech News, "T9 Text Input Software Updated", available at <http://www.mobiletechnews.com/info/2004/11/231122155.html>, Nov. 23, 2004, 4 pages.
Mok et al., "Media Searching on Mobile Devices", IEEE EIT 2007 Proceedings, 2007, pp. 126-129.
Morland, D. V., "Human Factors Guidelines for Terminal Interface Design", Communications ofthe ACM vol. 26, No. 7, Jul. 1983, pp. 484-494.
Morris et al., "Andrew: A Distributed Personal Computing Environment", Communications of the ACM, (Mar. 1986); vol. 29 No. 3 Mar. 1986, pp. 184-201.
Muller et al., "CSCW'92 Demonstrations", 1992, pp. 11-14.
Musicmatch, "Musicmatch and Xing Technology Introduce Musicmatch Jukebox", Press Releases, available at <http://www.musicmatch.com/info/company/press/releases/?year=1998&release=2>, May 18, 1998, 2 pages.
Muthesamy et al., "Speaker-Independent Vowel Recognition: Spectograms versus Cochleagrams", IEEE, Apr. 1990.
My Cool Aids, "What's New", available at <http://www.mycoolaids.com/>, 2012, 1 page.
Myers, Brad A., "Shortcutter for Palm", available at <http://www.cs.cmu.edu/~pebbles/v5/shortcutter/palm/index.html>, retrieved on Jun. 18, 2014, 10 pages.
Nadoli et al., "Intelligent Agents in the Simulation of Manufacturing Systems", Proceedings of the SCS Multiconference on AI and Simulation, 1989, 1 page.
Nakagawa et al., "Unknown Word Guessing and Part-of-Speech Tagging Using Support Vector Machines", Proceedings of the 6th NLPRS, 2001, pp. 325-331.
Adium, "AboutAdium—Adium X—Trac", available at <http://web.archive.org/web/20070819113247/http://trac.adiumx.com/wiki/AboutAdium>, retrieved on Nov. 25, 2011, 2 pages.
NCIP, "NCIP Library: Word Prediction Collection", available at <http://www2.edc.org/ncip/library/wp/toc.htm>, 1998, 4 pages.
NCIP, "What is Word Prediction?", available at <http://www2.edc.org/NCIP/library/wp/what_is.htm>, 1998, 2 pages.
NCIP Staff, "Magnification Technology", available at <http://www2.edc.org/ncip/library/vi/magnifi.htm>, 1994, 6 pages.
Newton, Harry, "Newton's Telecom Dictionary", Mar. 1998, pp. 62, 155, 610-611, 771.
Nguyen et al., "Generic Manager for Spoken Dialogue Systems", In DiaBruck: 7th Workshop on the Semantics and Pragmatics of Dialogue, Proceedings, 2003, 2 pages.
Nilsson, B. A., "Microsoft Publisher is an Honorable Start for DTP Beginners", Computer Shopper, Feb. 1, 1992, 2 pages.

(56) References Cited

OTHER PUBLICATIONS

Noik, Emanuel G., "Layout-Independent Fisheye Views of Nested Graphs", IEEE Proceedings of Symposium on Visual Languages, 1993, 6 pages.
Nonhoff-Arps et al., "StraBenmusik: Portable MP3-Spieler mit USB Anschluss", CT Magazin Fuer Computer Technik, Verlag Heinz Heise GMBH, Hannover DE, No. 25, 2000, pp. 166-175.
Northern Telecom, "Meridian Mail PC User Guide", 1988, 17 pages.
Notenboom, Leo A., "Can I Retrieve Old MSN Messenger Conversations?", available at <http://ask-leo.com/can_i_retrieve_old_msn_messenger_conversations.html>, Mar. 11, 2004, 23 pages.
O'Connor, Rory J., "Apple Banking on Newton's Brain", San Jose Mercury News, Apr. 22, 1991.
Ohsawa et al., "A computational Model of an Intelligent Agent Who Talks with a Person", Research Reports on Information Sciences, Series C, No. 92, Apr. 1989, pp. 1-18.
Ohtomo et al., "Two-Stage Recognition Method of Hand-Written Chinese Characters Using an Integrated Neural Network Model", Denshi Joohoo Tsuushin Gakkai Ronbunshi, D-II, vol. J74, Feb. 1991, pp. 158-165.
Okazaki et al., "Multi-Fisheye Transformation Method for Large-Scale Network Maps", IEEE Japan, vol. 44, No. 6, 1995, pp. 495-500.
Adobe.com, "Reading PDF Documents with Adobe Reader 6.0 A Guide for People with Disabilities", Available online at "https://www.adobe.com/enterprise/accessibility/pdfs/acro6_cg_ue.pdf", Jan. 2004, 76 pages.
Bertolucci, Jeff, "Google Adds Voice Search to Chrome Browser", PC World, Jun. 14, 2011, 5 pages.
Dobrisek et al., "Evolution of the Information-Retrieval System for Blind and Visually-Impaired People", International Journal of Speech Technology, vol. 6, 2003, pp. 301-309.
Lee et al., "A Multi-Touch Three Dimensional Touch-Sensitive Tablet", CHI '85 Proceedings of the SIGCHI Conference on Human Factors in Computing Systems, Apr. 1985, pp. 21-25.
Martins et al., "Extracting and Exploring the Geo-Temporal Semantics of Textual Resources", Semantic Computing, IEEE International Conference, 2008, pp. 1-9.
Rios, Mafe, "New Bar Search for Facebook", YouTube, available at "https://www.youtube.com/watch?v=vwgN1WbvCas", Jul. 19, 2013, 2 pages.
Rubine, Dean, "Combining Gestures and Direct Manipulation", CHI '92, May 3-7, 1992, pp. 659-660.
Rubine, Dean Harris., "The Automatic Recognition of Gestures", CMU-CS-91-202, Thesis Submitted in Partial Fulfillment of the Requirements for the Degree of Doctor of Philosophy in Computer Science at Carnegie Mellon University, Dec. 1991, 285 pages.
Sen et al., "Indian Accent Text-to-Speech System for Web Browsing", Sadhana, vol. 27, No. 1, Feb. 2002, pp. 113-126.
Tombros et al., "Users' Perception of Relevance of Spoken Documents", Journal of the American Society for Information Science, vol. 51, No. 10, New York, Aug. 2000, pp. 929-939.
Westerman, Wayne, "Hand Tracking, Finger Identification and Chordic Manipulation on a Multi-Touch Surface", Doctoral Dissertation, 1999, 363 pages.
Extended European Search Report (inclusive of the Partial European Search Report and European Search Opinion) received for European Patent Application No. 12729332.2, mailed on Oct. 31, 2014, 6 pages.
International Preliminary Report on Patentability received for PCT Patent Application No. PCT/US2007/077443, issued on Mar. 10, 2009, 6 pages.
International Preliminary Report on Patentability received for PCT Patent Application No. PCT/US2009/055577, completed on Aug. 6, 2010, 12 pages.
International Search Report and Written Opinion received for PCT Patent Application No. PCT/US2009/055577, mailed on Jan. 26, 2010, 9 pages.
International Preliminary Report on Patentability received for PCT Patent Application No. PCT/US2013/041225, mailed on Nov. 27, 2014, 9 pages.
International Preliminary Report on Patentability received for PCT Patent Application No. PCT/US2013/047668, mailed on Jan. 8, 2015, 13 pages.
International Search Report and Written Opinion received for PCT Patent Application No. PCT/US2013/047668, mailed on Feb. 13, 2014, 17 pages.
International Preliminary Report on Patentability received for PCT Patent Application No. PCT/US2013/052558, mailed on Feb. 12, 2015, 12 pages.
International Preliminary Report and Written Opinion received for PCT Patent Application No. PCT/US2013/052558, mailed on Jan. 30, 2014, 15 pages.
International Preliminary Report on Patentability received for PCT Patent Application No. PCT/US2013/058916, mailed on Mar. 19, 2015, 8 pages.
International Preliminary Report on Patentability received for PCT Patent Application No. PCT/US2013/060121, mailed on Apr. 2, 2015, 6 pages.
International Search Report and Written Opinion received for PCT Patent Application No. PCT/US2013/060121, mailed on Dec. 6, 2013, 8 pages.
International Search Report and Written Opinion received for PCT Patent Application No. PCT/US2014/040961, mailed on Mar. 10, 2015, 5 pages.
Invitation to Pay Additional Fees received for PCT Application No. PCT/US2014/040961, mailed on Jan. 14, 2015, 3 pages.
AppleEvent Manager, which is described in the publication Inside Macintosh vol. VI, available from Addison-Wesley Publishing Company, 1985.
Dual Rate Speech Coder for Multimedia Communications Transmitting at 5.3 and 6.3 kbit/s, International Telecommunication Union Recommendation G.723, 7 pages.
N200 Hands-Free Bluetooth Car Kit, available at <www.wirelessground.com>, retrieved on Mar. 19, 2007, 3 pages.
Quick Search Algorithm, Communications of the ACM, 33(8), 1990, pp. 132-142.
Worldwide Character Encoding, Version 2.0, vols. 1,2 by Unicode, Inc., 12 pages.
Extended European Search Report (includes Supplementary European Search Report and Search Opinion) received for European Patent Application No. 12727027.0, mailed on Sep. 26, 2014, 7 pages.
Extended European Search Report (includes Partial European Search Report and European Search Opinion) received for European Patent Application No. 13169672.6, mailed on Aug. 14, 2013, 11 pages.
Barrett et al., "How to Personalize the Web", 1997 In proceddings of the ACM SIGCHI Conference on Human Factors in Computer Systems, Mar. 22-27, 1997, pp. 75-82.
Biemann et al., "Disentangling from Babylonian Confusion—Unsupervised Language Identification", CICLing'05 Proceedings of the 6th international conference on Computational Linguistics and Intelligent Text Processing, vol. 3406, 2005, pp. 773-784.
Boyer et al., "A Fast String Searching Algorithm", Communications of the ACM, vol. 20, 1977, pp. 762-772.
Cao et al., "Adapting Ranking SVM to Document Retrieval", SIGIR '06, Seattle, WA, Aug. 6-11, 2006, 8 pages.
Chomsky et al., "The Sound Pattern of English", New York, Harper and Row, 1968, 242 pages.
Choularton et al., "User Responses to Speech Recognition Errors: Consistency of Behaviour Across Domains", Proceedings of the 10th Australian International Conference on Speech Science and Technology, Dec. 8-10, 2004, pp. 457-462.
Church, Kenneth W., "Phonological Parsing in Speech Recognition", Kluwer Academic Publishers, 1987.
Cucerzan et al., "Bootstrapping a Multilingual Part-of-Speech Tagger in One Person-Day", In Proceedings of the 6th Conference on Natural Language Learning, vol. 20, 2002, pp. 1-7.
Erol et al., "Multimedia Clip Generation From Documents for Browsing on Mobile Devices", IEEE Transactions on Multimiedia, vol. 10, No. 5, Aug. 2008, 13 pages.
Evermann et al., "Posterior Probability Decoding, Confidence Estimation and System Combination", Proceedings Speech Transcription Workshop, 2000, 4 pages.

(56) References Cited

OTHER PUBLICATIONS

Fiscus, J. G., "A Post-Processing System to Yield Reduced Word Error Rates: Recognizer Output Voting Error Reduction (ROVER)", IEEE Proceedings, Automatic Speech Recognition and Understanding, Dec. 14-17, 1997, pp. 347-354.
Gonnet et al., "Handbook of Algorithms and Data Structures: in Pascal and C. (2nd ed.)", Addison-Wesley Longman Publishing Co., 1991, 17 pages.
Gruber et al., U.S. Appl. No. 61/186,414, filed Jun. 12, 2009 titled "System and Method for Semantic Auto-Completion", 13 pages.
Gruber et al., U.S. Appl. No. 61/493,201, filed Jun. 3, 2011 titled "Generating and Processing Data Items That Represent Tasks to Perform", 68 pages.
Gruber et al., U.S. Appl. No. 61/657,744, filed Jun. 9, 2012 titled "Automatically Adapting User Interfaces for Hands-Free Interaction" 40 pages.
Gruber al., U.S. Appl. No. 07/976,970, filed Nov. 16, 1992 titled "Status Bar for Application Windows".
Guay, Matthew, "Location-Driven Productivity with Task Ave", available at <http://iphone.appstorm.net/reviews/productivity/location-driven-productivity-with-task-ave/>, Feb. 19, 2011, 7 pages.
Guim, Mark, "How to Set a Person-Based Reminder with Cortana", available at <http://www.wpcentral.com/how-to-person-based-reminder-cortana>, Apr. 26, 2014, 15 pages.
Haitsma et al., "A Highly Robust Audio Fingerprinting System", In Proceedings of the International Symposium on Music Information Retrieval (ISMIR), 2002, 9 pages.
Hendrickson, Bruce, "Latent Semantic Analysis and Fiedler Retrieval", Discrete Algorithms and Mathematics Department, Sandia National Labs, Albuquerque, NM, Sep. 21, 2006, 12 pages.
Henrich et al., "Language Identification for the Automatic Grapheme-To-Phoneme Conversion of Foreign Words in A German Text-To-Speech System", Proceedings of the European Conference on Speech Communication and Technology, vol. 2, Sep. 1989, pp. 220-223.
ID3.org, "id3v2.4.0—Frames", available at <http://id3.org/id3v2.4.0-frames?action=print>, retrieved on Jan. 22, 2015, 41 pages.
Jawaid et al., "Machine Translation with Significant Word Reordering and Rich Target-Side Morphology", WDS'11 Proceedings of Contributed Papers, Part I, 2011, pp. 161-166.
Jiang et al., "A Syllable-based Name Transliteration System", Proceedings of the 2009 Named Entities Workshop, Aug. 7, 2009, pp. 96-99.
Kane et al., "Slide Rule: Making Mobile Touch Screens Accessible to Blind People Using Multi-Touch Interaction Techniques", ASSETS, Oct. 13-15, 2008, pp. 73-80.
Kazemzadeh et al., "Acoustic Correlates of User Response to Error in Human-Computer Dialogues", Automatic Speech Recognition and Understanding, 2003, pp. 215-220.
Kikui, Gen-Itiro, "Identifying the Coding System and Language of On-Line Documents on the Internet", International Conference on Computational, Aug. 1996, pp. 652-657.
Kohler, Joachim, "Multilingual Phone Models for Vocabulary-Independent Speech Recognition Tasks", Speech Communication, vol. 35, No. 1-2, Aug. 2001, pp. 21-30.
Kroon et al., "Pitch Predictors with High Temporal Resolution", IEEE, vol. 2, 1990, pp. 661-664.
Ladefoged, Peter, "A Course in Phonetics", New York, Harcourt, Brace, Jovanovich, Second Edition, 1982.
Lau et al., "Trigger-Based Language Models: A Maximum Entropy Approach", ICASSP'93 Proceedings of the 1993 IEEE international conference on Acoustics, speech, and signal processing: speech processing—vol. II, 1993, pp. 45-48.
Lee et al., "On URL Normalization", Proceedings of the International Conference on Computational Science and its Applications, ICCSA 2005, pp. 1076-1085.
Leveseque et al., "A Fundamental Tradeoff in Knowledge Representation and Reasoning", Readings in Knowledge Representation 1985, 30 pages.
Mangu et al., "Finding Consensus in Speech Recognition: Word Error Minimization and Other Applications of Confusion Networks", Computer Speech and Language, vol. 14, No. 4, 2000, pp. 291-294.
Manning et al., "Foundations of Statistical Natural Language Processing", The MIT Press, Cambridge Massachusetts, 1999, pp. 10-11.
Meng et al., "Generating Phonetic Cognates to Handle Named Entities in English-Chinese Cross-Language Spoken Document Retrieval", Automatic Speech Recognition and Understanding, 2001, pp. 311-314.
Miller, Chance, "Google Keyboard Updated with New Personalized Suggestions Feature", available at <http://9to5google.com/2014/03/19/google-keyboard-updated-with-new-personalized-suggestions-feature/>, Mar. 19, 2014, 4 pages.
International Preliminary Report on Patentability received for PCT Patent Application No. PCT/GB2009/051684, mailed on Jun. 23, 2011, 10 pages.
International Search Report received for PCT Patent Application No. PCT/GB2009/051684, mailed on Mar. 12, 2010, 4 pages.
International Preliminary Examination Report on received for PCT Patent Application No. PCT/US1993/12637, mailed on Apr. 10, 1995, 7 pages.
International Preliminary Report on Patentability received for PCT Patent Application No. PCT/US2009/051954, issued on Mar. 24, 2011, 8 pages.
International Search Report and Written Opinion received for PCT Patent Application No. PCT/US2009/051954, mailed on Oct. 30, 2009, 10 pages.
International Preliminary Report on Patentability received for PCT Patent Application No. PCT/US2012/040571, mailed on Dec. 19, 2013, 10 pages.
International Preliminary Report on Patentability received for PCT Patent Application No. PCT/US2005/030234, issued on Mar. 20, 2007, 9 pages.
International Search Report and Written Opinion received for PCT Patent Application No. PCT/US2005/030234, mailed on Mar. 17, 2006, 11 pages.
International Preliminary Report on Patentability received for PCT Patent Application No. PCT/US2012/040801, mailed on Dec. 19, 2013, 16 pages.
International Search Report and Written Opinion received for PCT Patent Application No. PCT/US2012/040801, mailed on Oct. 22, 2012, 20 pages.
Amano, Junko, "A User-Friendly Authoring System for Digital Talking Books", IEICE Technical Report, The Institute of Electronics, Information and Communication Engineers, vol. 103 No. 418, Nov. 6, 2003, pp. 33-40.
International Search Report and Written Opinion received for PCT Patent Application No. PCT/US2012/043100, mailed on Nov. 15, 2012, 8 pages.
International Preliminary Report on Patentability received for PCT Patent Application No. PCT/US2012/056382, mailed on Apr. 10, 2014, 9 pages.
International Preliminary Report on Patentability received for PCT Patent Application No. PCT/US2013/028412, mailed on Sep. 12, 2014, 12 pages.
International Search Report and Written Opinion received for PCT Patent Application No. PCT/US2013/028412, mailed on Sep. 26, 2013, 17 pages.
International Preliminary Report on Patentability received for PCT Patent Application No. PCT/US2013/028920, mailed on Sep. 18, 2014, 11 pages.
International Search Report and Written Opinion received for PCT Patent Application No. PCT/US2013/028920, mailed on Jun. 27, 2013, 14 pages.
International Preliminary Report on Patentability received for PCT Patent Application No. PCT/US2013/029156, mailed on Sep. 18, 2014, 7 pages.
International Search Report and Written Opinion received for PCT Patent Application No. PCT/US2013/029156, mailed on Jul. 15, 2013, 9 pages.

(56) References Cited

OTHER PUBLICATIONS

International Preliminary Report on Patentability received for PCT Patent Application No. PCT/US2013/041233, issued on Nov. 18, 2014, 8 pages.
International Search Report received for PCT Patent Application No. PCT/US2013/041233, mailed on Nov. 22, 2013, 3 pages.
International Search Report and Written Opinion received for PCT Patent Application No. PCT/US2013/058916, mailed on Sep. 8, 2014, 10 pages.
International Search Report and Written Opinion received for PCT Patent Application No. PCT/US2014/015418, mailed on Aug. 26, 2014, 17 pages.
International Search Report and Written Opinion received for PCT Patent Application No. PCT/US2014/028785, mailed on Oct. 17, 2014, 23 pages.
International Search Report and Written Opinion received for PCT Patent Application No. PCT/US2014/029050, mailed on Jul. 31, 2014, 9 pages.
International Search Report and Written Opinion received for PCT Patent Application No. PCT/US2014/029562, mailed on Sep. 18, 2014, 21 pages.
International Search Report and Written Opinion received for PCT Patent Application No. PCT/US2014/040401, mailed on Sep. 4, 2014, 10 pages.
International Search Report and Written Opinion received for PCT Patent Application No. PCT/US2014/040403, mailed on Sep. 23, 2014, 9 pages.
International Search Report and Written Opinion received for PCT Patent Application No. PCT/US2014/041159, mailed on Sep. 26, 2014, 10 pages.
International Search Report and Written Opinion received for PCT Patent Application No. PCT/US2014/041173, mailed on Sep. 10, 2014, 11 pages.
International Search Report and Written Opinion received for PCT Patent Application No. PCT/US2014/049568, mailed on Nov. 14, 2014, 12 pages.
International Search Report and Written Opinion received for PCT Patent Application No. PCT/US2014/23822 mailed on Sep. 25, 2014, 14 pages.
Roddy et al., "Interface Issues in Text Based Chat Rooms", SIGCHI Bulletin, vol. 30, No. 2, Apr. 1998, pp. 119-123.
Rose et al., "Inside Macintosh", vols. I, II, and III, Addison-Wesley Publishing Company, Inc., Jul. 1988, 1284 pages.
Russo et al., "Urgency is a Non-Monotonic Function of Pulse Rate", Journal of the Acoustical Society of America, vol. 122, No. 5, 2007, 6 pages.
Sankar, Ananth, "Bayesian Model Combination (BAYCOM) for Improved Recognition", IEEE International Conference on Acoustics, Speech, and Signal Processing (ICASSP), Mar. 18-23, 2005, pp. 845-848.
Schone et al., "Knowledge-Free Induction of Morphology Using Latent Semantic Analysis", Proceedings of the 2nd Workshop on Learning Language in Logic and the 4th Conference on Computational Natural Language Learning, vol. 7, 2000, pp. 67-72.
Sethy et al., "A Syllable Based Approach for Improved Recognition of Spoken Names", ITRW on Pronunciation Modeling and Lexicon Adaptation for Spoken language Technology (PMLA2002), Sep. 14-15, 2002, pp. 30-35.
Stifleman, L, "Not Just Another Voice Mail System", Proceedings of 1991 Conference, American Voice, Sep. 24-26, 1991, Atlanta GA,, Sep. 1991, pp. 21-26.
Strom et al., "Intelligent Barge-In in Conversational Systems", MIT laboratory for Computer Science, 2000, 4 pages.
Stuker et al., "Cross-System Adaptation and Combination for Continuous Speech Recognition: The Influence of Phoneme Set and Acoustic Front-End", Influence of Phoneme Set and Acoustic Front-End, Interspeech, Sep. 17-21, 2006, pp. 521-524.
Sundaram et al., "Latent Perceptual Mapping with Data-Driven Variable-Length Acoustic Units for Template-Based Speech Recognition", ICASSP 2012, Mar. 2012, pp. 4125-4128.
Viegas et al., "Chat Circles", SIGCHI Conference on Human Factors in Computing Systems, May 15-20, 1999, pp. 9-16.
Waibel, Alex, "Interactive Translation of Conversational Speech", Computer, vol. 29, No. 7, Jul. 1996, pp. 41-48.
Wang et al., "An Industrial-Strength Audio Search Algorithm", In Proceedings of the International Conference on Music Information Retrieval (ISMIR), 2003, 7 pages.
Amano et al., "A User-friendly Multimedia Book Authoring System", The Institute of Electronics, Information and Communication Engineers Technical Report, vol. 103, No. 416, Nov. 2003, pp. 33-40.
Glass, J., et al., "Multilingual Spoken-Language Understanding in the MIT Voyager System," Aug. 1995, http://groups.csail.mit.edu/sls/publications/1995/speechcomm95-voyager.pdf, 29 pages.
Goddeau, D., et al., "A Form-Based Dialogue Manager for Spoken Language Applications," Oct. 1996, http://phasedance.com/pdf/icslp96.pdf, 4 pages.
Goddeau, D., et al., "Galaxy: A Human-Language Interface to On-Line Travel Information," 1994 International Conference on Spoken Language Processing, Sep. 18-22, 1994, Pacific Convention Plaza Yokohama, Japan, 6 pages.
Meng, H., et al., "Wheels: A Conversational System in the Automobile Classified Domain," Oct. 1996, httphttp://citeseerx.ist.psu.edu/viewdoc/summary?doi=10.1.1.16.3022, 4 pages.
*Phoenix Solutions, Inc. v. West Interactive Corp.*, Document 40, Declaration of Christopher Schmandt Regarding the MIT Galaxy System dated Jul. 2, 2010, 162 pages.
Seneff, S., et al., "A New Restaurant Guide Conversational System: Issues in Rapid Prototyping for Specialized Domains," Oct. 1996, citeseerx.ist.psu.edu/viewdoc/download?doi=10.1.1.16 . . . rep . . . , 4 pages.
Vlingo InCar, "Distracted Driving Solution with Vlingo InCar," 2:38 minute video uploaded to YouTube by Vlingo Voice on Oct. 6, 2010, http://www.youtube.com/watch?v=Vqs8XfXxgz4, 2 pages.
Zue, V., "Conversational Interfaces: Advances and Challenges," Sep. 1997, http://www.cs.cmu.edu/~dod/papers/zue97.pdf, 10 pages.
Zue, V. W., "Toward Systems that Understand Spoken Language," Feb. 1994, ARPA Strategic Computing Institute, ©1994 IEEE, 9 pages.
Final office action in U.S. Appl. No. 11/518,292, mailed on May 10, 2011.
Applicant's office action response in U.S. Appl. No. 11/518,292, mailed on Sep. 6, 2011.
David Roddy, Leo Orbst, Adam Cheyer; "Communication and Collaboration in a Landscape of B2B eMARKETPLACE", Jun. 2001.
Adam Cheyer; "A Perspective on AI & Agent Technologies for SCM", 2001.
Adam Cheyer; "Active: A unified platform for building intelligent web interaction assistants"; Dec. 18, 2006.
WSMO Working Group: John Domingue, Dumitru Roman, Michael Stollberg; "Web Service Modeling Ontology (WSMO)"; Jun. 2005.
Bussler et al; "Web Service Execution Environment (WSMX)"; Jun. 3, 2005.

\* cited by examiner

INTELLIGENT AUTOMATED ASSISTANT

CROSS-REFERENCE TO RELATED APPLICATIONS

This application claims priority from U.S. Provisional Patent Application Ser. No. 61/295,774 for "Intelligent Automated Assistant", filed Jan. 18, 2010, which is incorporated herein by reference.

This application is further related to U.S. patent application Ser. No. 11/518,292 for "Method and Apparatus for Building an Intelligent Automated Assistant", filed Sep. 8, 2006, which is incorporated herein by reference.

This application is further related to U.S. Provisional Patent Application Ser. No. 61/186,414 for "System and Method for Semantic Auto-Completion", filed Jun. 12, 2009, which is incorporated herein by reference.

FIELD OF THE INVENTION

The present invention relates to intelligent systems, and more specifically for classes of applications for intelligent automated assistants.

BACKGROUND OF THE INVENTION

Today's electronic devices are able to access a large, growing, and diverse quantity of functions, services, and information, both via the Internet and from other sources. Functionality for such devices is increasing rapidly, as many consumer devices, smartphones, tablet computers, and the like, are able to run software applications to perform various tasks and provide different types of information. Often, each application, function, website, or feature has its own user interface and its own operational paradigms, many of which can be burdensome to learn or overwhelming for users. In addition, many users may have difficulty even discovering what functionality and/or information is available on their electronic devices or on various websites; thus, such users may become frustrated or overwhelmed, or may simply be unable to use the resources available to them in an effective manner.

In particular, novice users, or individuals who are impaired or disabled in some manner, and/or are elderly, busy, distracted, and/or operating a vehicle may have difficulty interfacing with their electronic devices effectively, and/or engaging online services effectively. Such users are particularly likely to have difficulty with the large number of diverse and inconsistent functions, applications, and websites that may be available for their use.

Accordingly, existing systems are often difficult to use and to navigate, and often present users with inconsistent and overwhelming interfaces that often prevent the users from making effective use of the technology.

SUMMARY

According to various embodiments of the present invention, an intelligent automated assistant is implemented on an electronic device, to facilitate user interaction with a device, and to help the user more effectively engage with local and/or remote services. In various embodiments, the intelligent automated assistant engages with the user in an integrated, conversational manner using natural language dialog, and invokes external services when appropriate to obtain information or perform various actions.

According to various embodiments of the present invention, the intelligent automated assistant integrates a variety of capabilities provided by different software components (e.g., for supporting natural language recognition and dialog, multimodal input, personal information management, task flow management, orchestrating distributed services, and the like). Furthermore, to offer intelligent interfaces and useful functionality to users, the intelligent automated assistant of the present invention may, in at least some embodiments, coordinate these components and services. The conversation interface, and the ability to obtain information and perform follow-on task, are implemented, in at least some embodiments, by coordinating various components such as language components, dialog components, task management components, information management components and/or a plurality of external services.

According to various embodiments of the present invention, intelligent automated assistant systems may be configured, designed, and/or operable to provide various different types of operations, functionalities, and/or features, and/or to combine a plurality of features, operations, and applications of an electronic device on which it is installed. In some embodiments, the intelligent automated assistant systems of the present invention can perform any or all of: actively eliciting input from a user, interpreting user intent, disambiguating among competing interpretations, requesting and receiving clarifying information as needed, and performing (or initiating) actions based on the discerned intent. Actions can be performed, for example, by activating and/or interfacing with any applications or services that may be available on an electronic device, as well as services that are available over an electronic network such as the Internet. In various embodiments, such activation of external services can be performed via APIs or by any other suitable mechanism. In this manner, the intelligent automated assistant systems of various embodiments of the present invention can unify, simplify, and improve the user's experience with respect to many different applications and functions of an electronic device, and with respect to services that may be available over the Internet. The user can thereby be relieved of the burden of learning what functionality may be available on the device and on web-connected services, how to interface with such services to get what he or she wants, and how to interpret the output received from such services; rather, the assistant of the present invention can act as a go-between between the user and such diverse services.

In addition, in various embodiments, the assistant of the present invention provides a conversational interface that the user may find more intuitive and less burdensome than conventional graphical user interfaces. The user can engage in a form of conversational dialog with the assistant using any of a number of available input and output mechanisms, such as for example speech, graphical user interfaces (buttons and links), text entry, and the like. The system can be implemented using any of a number of different platforms, such as device APIs, the web, email, and the like, or any combination thereof. Requests for additional input can be presented to the user in the context of such a conversation. Short and long term memory can be engaged so that user input can be interpreted in proper context given previous events and communications within a given session, as well as historical and profile information about the user.

In addition, in various embodiments, context information derived from user interaction with a feature, operation, or application on a device can be used to streamline the operation of other features, operations, or applications on the device or on other devices. For example, the intelligent automated assistant can use the context of a phone call (such as the person called) to streamline the initiation of a text message (for example to determine that the text message should be sent to the same person, without the user having to explicitly specify the recipient of the text message). The intelligent automated assistant of the present invention can thereby interpret instructions such as "send him a text message", wherein the "him" is interpreted according to context information derived from a current phone call, and/or from any feature, operation, or application on the device. In various embodiments, the intelligent automated assistant takes into account various types of available context data to determine which address book contact to use, which contact data to use, which telephone number to use for the contact, and the like, so that the user need not re-specify such information manually.

In various embodiments, the assistant can also take into account external events and respond accordingly, for example, to initiate action, initiate communication with the user, provide alerts, and/or modify previously initiated action in view of the external events. If input is required from the user, a conversational interface can again be used.

In one embodiment, the system is based on sets of interrelated domains and tasks, and employs additional functionally powered by external services with which the system can interact. In various embodiments, these external services include web-enabled services, as well as functionality related to the hardware device itself. For example, in an embodiment where the intelligent automated assistant is implemented on a smartphone, personal digital assistant, tablet computer, or other device, the assistant can control many operations and functions of the device, such as to dial a telephone number, send a text message, set reminders, add events to a calendar, and the like.

In various embodiments, the system of the present invention can be implemented to provide assistance in any of a number of different domains. Examples include:
- Local Services (including location- and time-specific services such as restaurants, movies, automated teller machines (ATMs), events, and places to meet);
- Personal and Social Memory Services (including action items, notes, calendar events, shared links, and the like);
- E-commerce (including online purchases of items such as books, DVDs, music, and the like);
- Travel Services (including flights, hotels, attractions, and the like).

One skilled in the art will recognize that the above list of domains is merely exemplary. In addition, the system of the present invention can be implemented in any combination of domains.

In various embodiments, the intelligent automated assistant systems disclosed herein may be configured or designed to include functionality for automating the application of data and services available over the Internet to discover, find, choose among, purchase, reserve, or order products and services. In addition to automating the process of using these data and services, at least one intelligent automated assistant system embodiment disclosed herein may also enable the combined use of several sources of data and services at once. For example, it may combine information about products from several review sites, check prices and availability from multiple distributors, and check their locations and time constraints, and help a user find a personalized solution to their problem. Additionally, at least one intelligent automated assistant system embodiment disclosed herein may be configured or designed to include functionality for automating the use of data and services available over the Internet to discover, investigate, select among, reserve, and otherwise learn about things to do (including but not limited to movies, events, performances, exhibits, shows and attractions); places to go (including but not limited to travel destinations, hotels and other places to stay, landmarks and other sites of interest, etc.); places to eat or drink (such as restaurants and bars), times and places to meet others, and any other source of entertainment or social interaction which may be found on the Internet. Additionally, at least one intelligent automated assistant system embodiment disclosed herein may be configured or designed to include functionality for enabling the operation of applications and services via natural language dialog that may be otherwise provided by dedicated applications with graphical user interfaces including search (including location-based search); navigation (maps and directions); database lookup (such as finding businesses or people by name or other properties); getting weather conditions and forecasts, checking the price of market items or status of financial transactions; monitoring traffic or the status of flights; accessing and updating calendars and schedules; managing reminders, alerts, tasks and projects; communicating over email or other messaging platforms; and operating devices locally or remotely (e.g., dialing telephones, controlling light and temperature, controlling home security devices, playing music or video, etc.). Further, at least one intelligent automated assistant system embodiment disclosed herein may be configured or designed to include functionality for identifying, generating, and/or providing personalized recommendations for activities, products, services, source of entertainment, time management, or any other kind of recommendation service that benefits from an interactive dialog in natural language and automated access to data and services.

In various embodiments, the intelligent automated assistant of the present invention can control many features and operations of an electronic device. For example, the intelligent automated assistant can call services that interface with functionality and applications on a device via APIs or by other means, to perform functions and operations that might otherwise be initiated using a conventional user interface on the device. Such functions and operations may include, for example, setting an alarm, making a telephone call, sending a text message or email message, adding a calendar event, and the like. Such functions operations may be performed as add-on functions in the context of a conversational dialog between a user and the assistant. Such functions and operations can be specified by the user in the context of such a dialog, or they may be automatically performed based on the context of the dialog. One skilled in the art will recognize that the assistant can thereby be used as a control mechanism for initiating and controlling various operations on the electronic device, which may be used as an alternative to conventional mechanisms such as buttons or graphical user interfaces.

BRIEF DESCRIPTION OF THE DRAWINGS

The accompanying drawings illustrate several embodiments of the invention and, together with the description, serve to explain the principles of the invention according to the embodiments. One skilled in the art will recognize that the particular embodiments illustrated in the drawings are merely exemplary, and are not intended to limit the scope of the present invention.

DETAILED DESCRIPTION OF THE EMBODIMENTS

Figure 1:
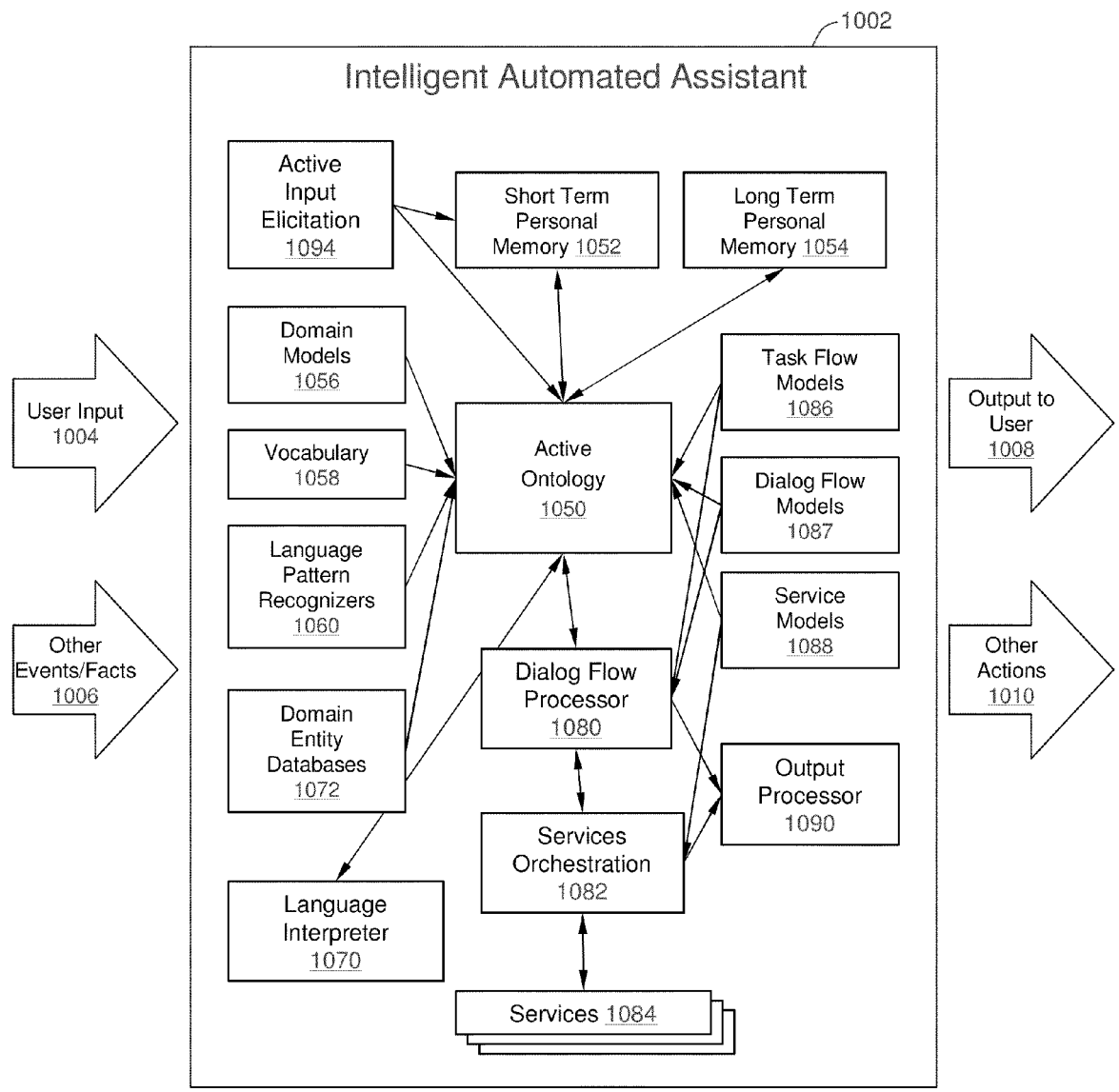
FIG. 1 is a block diagram depicting an example of one embodiment of an intelligent automated assistant system.

Various techniques will now be described in detail with reference to a few example embodiments thereof as illustrated in the accompanying drawings. In the following description, numerous specific details are set forth in order to provide a thorough understanding of one or more aspects and/or features described or reference herein. It will be apparent, however, to one skilled in the art, that one or more aspects and/or features described or reference herein may be practiced without some or all of these specific details. In other instances, well known process steps and/or structures have not been described in detail in order to not obscure some of the aspects and/or features described or reference herein.

One or more different inventions may be described in the present application. Further, for one or more of the invention(s) described herein, numerous embodiments may be described in this patent application, and are presented for illustrative purposes only. The described embodiments are not intended to be limiting in any sense. One or more of the invention(s) may be widely applicable to numerous embodiments, as is readily apparent from the disclosure. These embodiments are described in sufficient detail to enable those skilled in the art to practice one or more of the invention(s), and it is to be understood that other embodiments may be utilized and that structural, logical, software, electrical and other changes may be made without departing from the scope of the one or more of the invention(s). Accordingly, those skilled in the art will recognize that the one or more of the invention(s) may be practiced with various modifications and alterations. Particular features of one or more of the invention(s) may be described with reference to one or more particular embodiments or figures that form a part of the present disclosure, and in which are shown, by way of illustration, specific embodiments of one or more of the invention(s). It should be understood, however, that such features are not limited to usage in the one or more particular embodiments or figures with reference to which they are described. The present disclosure is neither a literal description of all embodiments of one or more of the invention(s) nor a listing of features of one or more of the invention(s) that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. To the contrary, a variety of optional components are described to illustrate the wide variety of possible embodiments of one or more of the invention(s).

Further, although process steps, method steps, algorithms or the like may be described in a sequential order, such processes, methods and algorithms may be configured to work in alternate orders. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred.

When a single device or article is described, it will be readily apparent that more than one device/article (whether or not they cooperate) may be used in place of a single device/article. Similarly, where more than one device or article is described (whether or not they cooperate), it will be readily apparent that a single device/article may be used in place of the more than one device or article.

The functionality and/or the features of a device may be alternatively embodied by one or more other devices that are not explicitly described as having such functionality/features. Thus, other embodiments of one or more of the invention(s) need not include the device itself.

Techniques and mechanisms described or reference herein will sometimes be described in singular form for clarity. However, it should be noted that particular embodiments include multiple iterations of a technique or multiple instantiations of a mechanism unless noted otherwise.

Although described within the context of intelligent automated assistant technology, it may be understood that the various aspects and techniques described herein (such as those associated with active ontologies, for example) may also be deployed and/or applied in other fields of technology involving human and/or computerized interaction with software.

Other aspects relating to intelligent automated assistant technology (e.g., which may be utilized by, provided by, and/or implemented at one or more intelligent automated assistant system embodiments described herein) are disclosed in one or more of the following references:

U.S. Provisional Patent Application Ser. No. 61/295,774 for "Intelligent Automated Assistant", filed Jan. 18, 2010, the disclosure of which is incorporated herein by reference;

U.S. patent application Ser. No. 11/518,292 for "Method And Apparatus for Building an Intelligent Automated Assistant", filed Sep. 8, 2006, the disclosure of which is incorporated herein by reference; and U.S. Provisional Patent Application Ser. No. 61/186,414 for "System and Method for Semantic Auto-Completion", filed Jun. 12, 2009, the disclosure of which is incorporated herein by reference.

Hardware Architecture

Generally, the intelligent automated assistant techniques disclosed herein may be implemented on hardware or a combination of software and hardware. For example, they may be implemented in an operating system kernel, in a separate user process, in a library package bound into network applications, on a specially constructed machine, or on a network interface card. In a specific embodiment, the techniques disclosed herein may be implemented in software such as an operating system or in an application running on an operating system.

Software/hardware hybrid implementation(s) of at least some of the intelligent automated assistant embodiment(s) disclosed herein may be implemented on a programmable machine selectively activated or reconfigured by a computer program stored in memory. Such network devices may have multiple network interfaces which may be configured or designed to utilize different types of network communication protocols. A general architecture for some of these machines may appear from the descriptions disclosed herein. According to specific embodiments, at least some of the features and/or functionalities of the various intelligent automated assistant embodiments disclosed herein may be implemented on one or more general-purpose network host machines such as an end-user computer system, computer, network server or server system, mobile computing device (e.g., personal digital assistant, mobile phone, smartphone, laptop, tablet computer, or the like), consumer electronic device, music player, or any other suitable electronic device, router, switch, or the like, or any combination thereof. In at least some embodiments, at least some of the features and/or functionalities of the various intelligent automated assistant embodiments disclosed herein may be implemented in one or more virtualized computing environments (e.g., network computing clouds, or the like).

Figure 3:
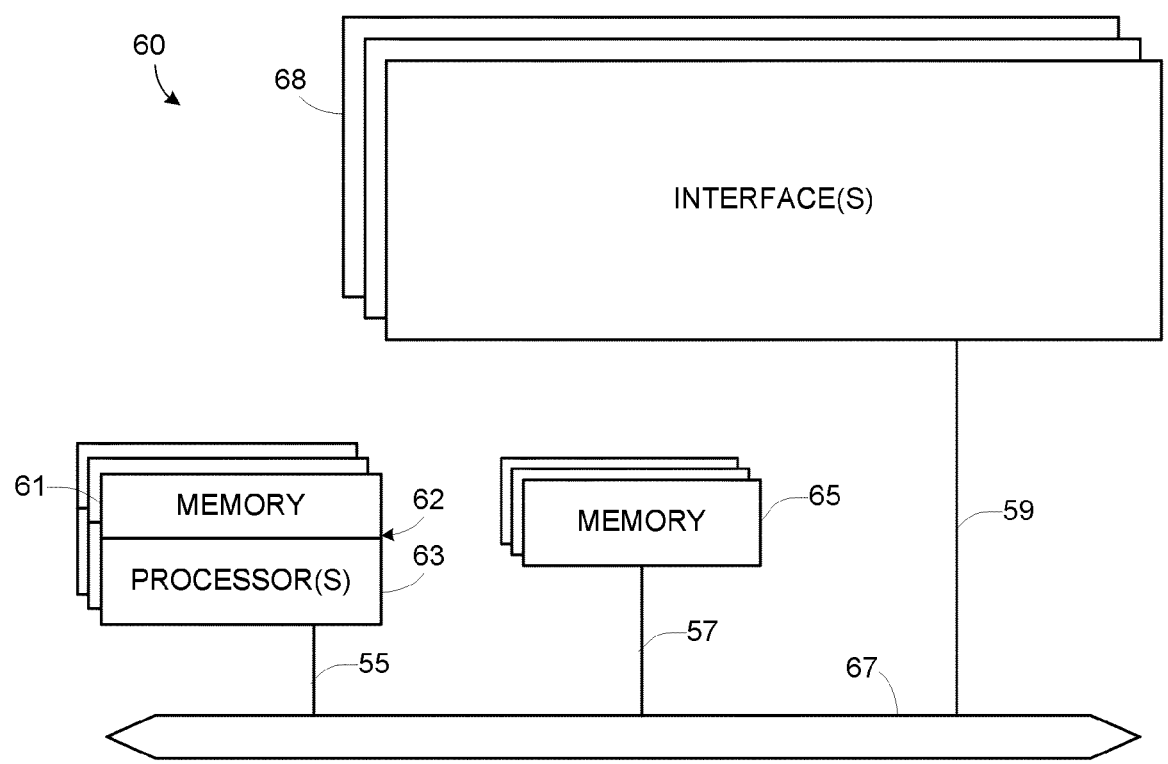
FIG. 3 is a block diagram depicting a computing device suitable for implementing at least a portion of an intelligent automated assistant according to at least one embodiment.

Referring now to FIG. 3, there is shown a block diagram depicting a computing device 60 suitable for implementing at least a portion of the intelligent automated assistant features and/or functionalities disclosed herein. Computing device 60 may be, for example, an end-user computer system, network server or server system, mobile computing device (e.g., personal digital assistant, mobile phone, smartphone, laptop, tablet computer, or the like), consumer electronic device, music player, or any other suitable electronic device, or any combination or portion thereof. Computing device 60 may be adapted to communicate with other computing devices, such as clients and/or servers, over a communications network such as the Internet, using known protocols for such communication, whether wireless or wired.

In one embodiment, computing device 60 includes central processing unit (CPU) 62, interfaces 68, and a bus 67 (such as a peripheral component interconnect (PCI) bus). When acting under the control of appropriate software or firmware, CPU 62 may be responsible for implementing specific functions associated with the functions of a specifically configured computing device or machine. For example, in at least one embodiment, a user's personal digital assistant (PDA) may be configured or designed to function as an intelligent automated assistant system utilizing CPU 62, memory 61, 65, and interface(s) 68. In at least one embodiment, the CPU 62 may be caused to perform one or more of the different types of intelligent automated assistant functions and/or operations under the control of software modules/components, which for example, may include an operating system and any appropriate applications software, drivers, and the like.

CPU 62 may include one or more processor(s) 63 such as, for example, a processor from the Motorola or Intel family of microprocessors or the MIPS family of microprocessors. In some embodiments, processor(s) 63 may include specially designed hardware (e.g., application-specific integrated circuits (AS-ICs), electrically erasable programmable read-only memories (EEPROMs), field-programmable gate arrays (FPGAs), and the like) for controlling the operations of computing device 60. In a specific embodiment, a memory 61 (such as non-volatile random access memory (RAM) and/or read-only memory (ROM)) also forms part of CPU 62. However, there are many different ways in which memory may be coupled to the system. Memory block 61 may be used for a variety of purposes such as, for example, caching and/or storing data, programming instructions, and the like.

As used herein, the term "processor" is not limited merely to those integrated circuits referred to in the art as a processor, but broadly refers to a microcontroller, a microcomputer, a programmable logic controller, an application-specific integrated circuit, and any other programmable circuit.

In one embodiment, interfaces 68 are provided as interface cards (sometimes referred to as "line cards"). Generally, they control the sending and receiving of data packets over a computing network and sometimes support other peripherals used with computing device 60. Among the interfaces that may be provided are Ethernet interfaces, frame relay interfaces, cable interfaces, DSL interfaces, token ring interfaces, and the like. In addition, various types of interfaces may be provided such as, for example, universal serial bus (USB), Serial, Ethernet, Firewire, PCI, parallel, radio frequency (RF), Bluetooth™, near-field communications (e.g., using near-field magnetics), 802.11 (WiFi), frame relay, TCP/IP, ISDN, fast Ethernet interfaces, Gigabit Ethernet interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 68 may include ports appropriate for communication with the appropriate media. In some cases, they may also include an independent processor and, in some instances, volatile and/or non-volatile memory (e.g., RAM).

Although the system shown in FIG. 3 illustrates one specific architecture for a computing device 60 for implementing the techniques of the invention described herein, it is by no means the only device architecture on which at least a portion of the features and techniques described herein may be implemented. For example, architectures having one or any number of processors 63 can be used, and such processors 63 can be present in a single device or distributed among any number of devices. In one embodiment, a single processor 63 handles communications as well as routing computations. In various embodiments, different types of intelligent automated assistant features and/or functionalities may be implemented in an intelligent automated assistant system which includes a client device (such as a personal digital assistant or smartphone running client software) and server system(s) (such as a server system described in more detail below).

Regardless of network device configuration, the system of the present invention may employ one or more memories or memory modules (such as, for example, memory block 65) configured to store data, program instructions for the general-purpose network operations and/or other information relating to the functionality of the intelligent automated assistant techniques described herein. The program instructions may control the operation of an operating system and/or one or more applications, for example. The memory or memories may also be configured to store data structures, keyword taxonomy information, advertisement information, user click and impression information, and/or other specific non-program information described herein.

Because such information and program instructions may be employed to implement the systems/methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as floptical disks, and hardware devices that are specially configured to store and perform program instructions, such as read-only memory devices (ROM), flash memory, memristor memory, random access memory (RAM), and the like. Examples of program instructions include both machine code, such as produced by a compiler, and files containing higher level code that may be executed by the computer using an interpreter.

Figure 4:
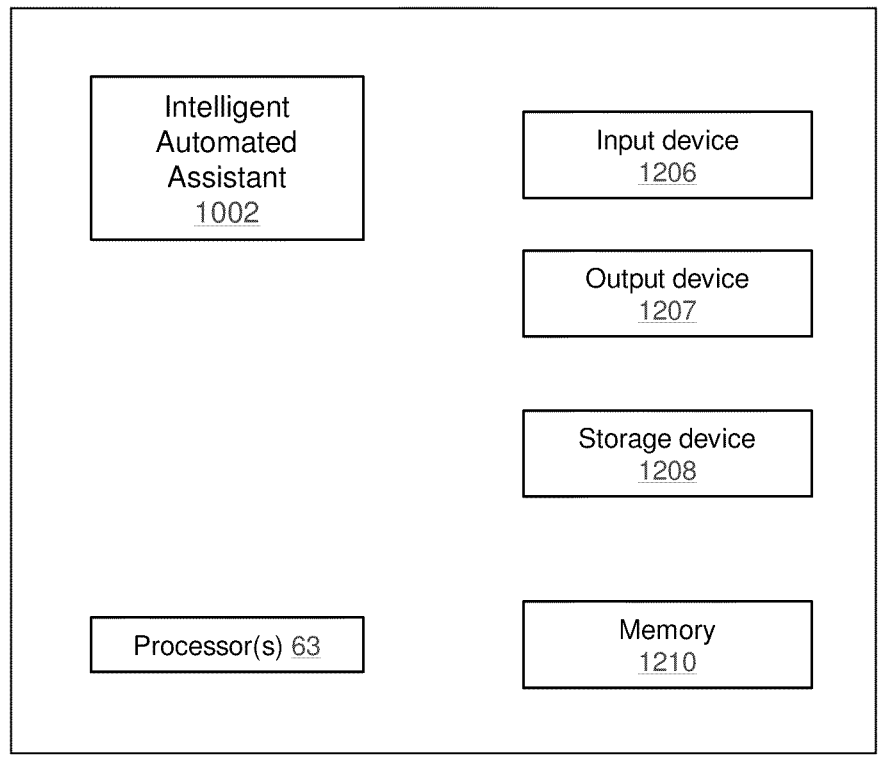
FIG. 4 is a block diagram depicting an architecture for implementing at least a portion of an intelligent automated assistant on a standalone computing system, according to at least one embodiment.

In one embodiment, the system of the present invention is implemented on a standalone computing system. Referring now to FIG. 4, there is shown a block diagram depicting an architecture for implementing at least a portion of an intelligent automated assistant on a standalone computing system, according to at least one embodiment. Computing device 60 includes processor(s) 63 which run software for implementing intelligent automated assistant 1002. Input device 1206 can be of any type suitable for receiving user input, including for example a keyboard, touchscreen, microphone (for example, for voice input), mouse, touchpad, trackball, five-way switch, joystick, and/or any combination thereof. Output device 1207 can be a screen, speaker, printer, and/or any combination thereof. Memory 1210 can be random-access memory having a structure and architecture as are known in the art, for use by processor(s) 63 in the course of running software. Storage device 1208 can be any magnetic, optical, and/or electrical storage device for storage of data in digital form; examples include flash memory, magnetic hard drive, CD-ROM, and/or the like.

Figure 5:
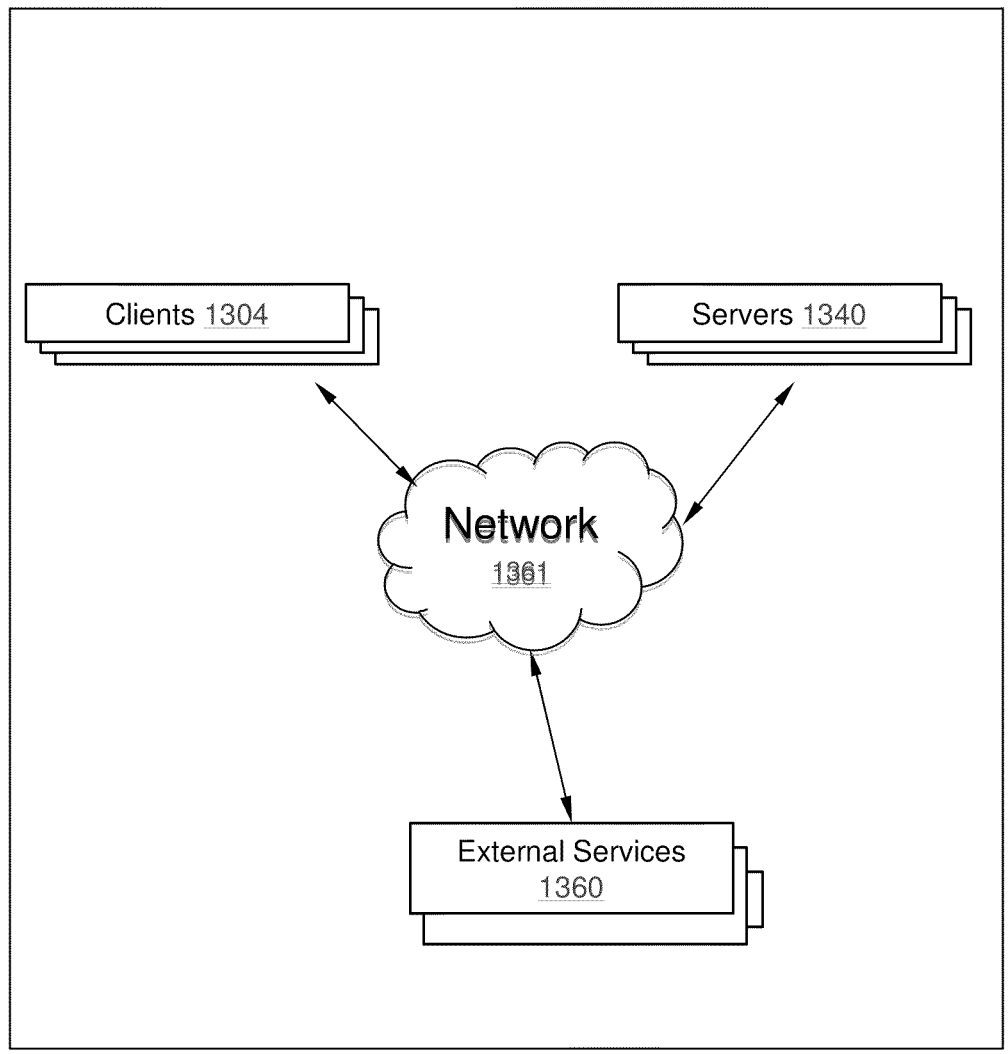
FIG. 5 is a block diagram depicting an architecture for implementing at least a portion of an intelligent automated assistant on a distributed computing network, according to at least one embodiment.

In another embodiment, the system of the present invention is implemented on a distributed computing network, such as one having any number of clients and/or servers. Referring now to FIG. 5, there is shown a block diagram depicting an architecture for implementing at least a portion of an intelligent automated assistant on a distributed computing network, according to at least one embodiment.

In the arrangement shown in FIG. 5, any number of clients 1304 are provided; each client 1304 may run software for implementing client-side portions of the present invention. In addition, any number of servers 1340 can be provided for handling requests received from clients 1304. Clients 1304 and servers 1340 can communicate with one another via electronic network 1361, such as the Internet. Network 1361 may be implemented using any known network protocols, including for example wired and/or wireless protocols.

In addition, in one embodiment, servers 1340 can call external services 1360 when needed to obtain additional information or refer to store data concerning previous interactions with particular users. Communications with external services 1360 can take place, for example, via network 1361. In various embodiments, external services 1360 include web-enabled services and/or functionality related to or installed on the hardware device itself. For example, in an embodiment where assistant 1002 is implemented on a smartphone or other electronic device, assistant 1002 can obtain information stored in a calendar application ("app"), contacts, and/or other sources.

In various embodiments, assistant 1002 can control many features and operations of an electronic device on which it is installed. For example, assistant 1002 can call external services 1360 that interface with functionality and applications on a device via APIs or by other means, to perform functions and operations that might otherwise be initiated using a conventional user interface on the device. Such functions and operations may include, for example, setting an alarm, making a telephone call, sending a text message or email message, adding a calendar event, and the like. Such functions and operations may be performed as add-on functions in the context of a conversational dialog between a user and assistant 1002. Such functions and operations can be specified by the user in the context of such a dialog, or they may be automatically performed based on the context of the dialog. One skilled in the art will recognize that assistant 1002 can thereby be used as a control mechanism for initiating and controlling various operations on the electronic device, which may be used as an alternative to conventional mechanisms such as buttons or graphical user interfaces.

For example, the user may provide input to assistant 1002 such as "I need to wake tomorrow at 8 am". Once assistant 1002 has determined the user's intent, using the techniques described herein, assistant 1002 can call external services 1360 to interface with an alarm clock function or application on the device. Assistant 1002 sets the alarm on behalf of the user. In this manner, the user can use assistant 1002 as a replacement for conventional mechanisms for setting the alarm or performing other functions on the device. If the user's requests are ambiguous or need further clarification, assistant 1002 can use the various techniques described herein, including active elicitation, paraphrasing, suggestions, and the like, to obtain the needed information so that the correct services 1360 are called and the intended action taken. In one embodiment, assistant 1002 may prompt the user for confirmation before calling a service 1360 to perform a function. In one embodiment, a user can selectively disable assistant's 1002 ability to call particular server 1340, or can disable all such service-calling if desired.

Figure 6:
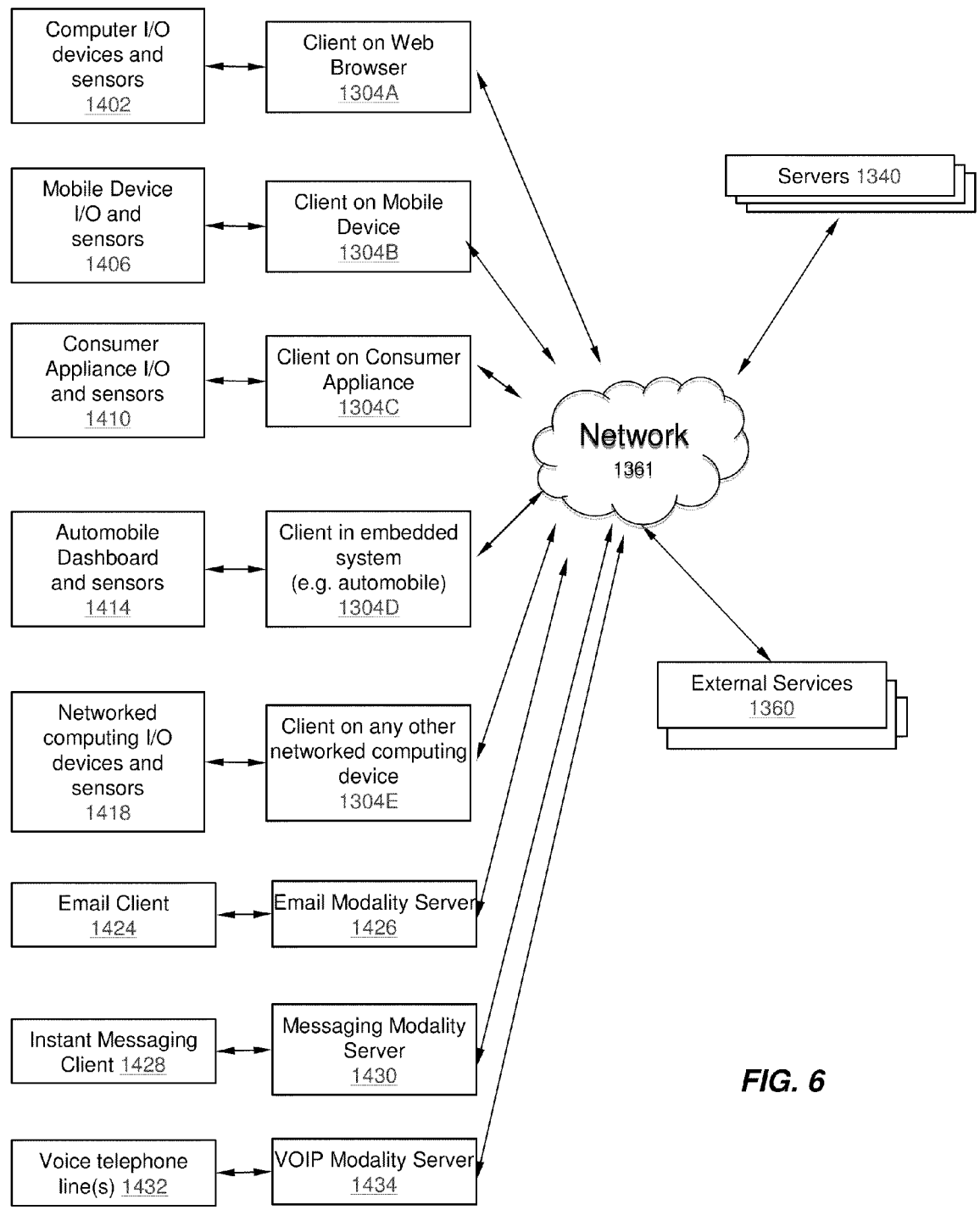
FIG. 6 is a block diagram depicting a system architecture illustrating several different types of clients and modes of operation.

The system of the present invention can be implemented with many different types of clients 1304 and modes of operation. Referring now to FIG. 6, there is shown a block diagram depicting a system architecture illustrating several different types of clients 1304 and modes of operation. One skilled in the art will recognize that the various types of clients 1304 and modes of operation shown in FIG. 6 are merely exemplary, and that the system of the present invention can be implemented using clients 1304 and/or modes of operation other than those depicted. Additionally, the system can include any or all of such clients 1304 and/or modes of operation, alone or in any combination. Depicted examples include:

Computer devices with input/output devices and/or sensors 1402. A client component may be deployed on any such computer device 1402. At least one embodiment may be implemented using a web browser 1304A or other software application for enabling communication with servers 1340 via network 1361. Input and output channels may of any type, including for example visual and/or auditory channels. For example, in one embodiment, the system of the invention can be implemented using voice-based communication methods, allowing for an embodiment of the assistant for the blind whose equivalent of a web browser is driven by speech and uses speech for output.

Mobile Devices with I/O and sensors 1406, for which the client may be implemented as an application on the mobile device 1304B. This includes, but is not limited to, mobile phones, smartphones, personal digital assistants, tablet devices, networked game consoles, and the like.

Consumer Appliances with I/O and sensors 1410, for which the client may be implemented as an embedded application on the appliance 1304C.

Automobiles and other vehicles with dashboard interfaces and sensors 1414, for which the client may be implemented as an embedded system application 1304D. This includes, but is not limited to, car navigation systems, voice control systems, in-car entertainment systems, and the like.

Networked computing devices such as routers 1418 or any other device that resides on or interfaces with a network, for which the client may be implemented as a device-resident application 1304E.

Email clients 1424, for which an embodiment of the assistant is connected via an Email Modality Server 1426. Email Modality server 1426 acts as a communication bridge, for example taking input from the user as email messages sent to the assistant and sending output from the assistant to the user as replies.

Instant messaging clients 1428, for which an embodiment of the assistant is connected via a Messaging Modality Server 1430. Messaging Modality server 1430 acts as a communication bridge, taking input from the user as messages sent to the assistant and sending output from the assistant to the user as messages in reply.

Voice telephones 1432, for which an embodiment of the assistant is connected via a Voice over Internet Protocol (VoIP) Modality Server 1434. VoIP Modality server 1434 acts as a communication bridge, taking input from the user as voice spoken to the assistant and sending output from the assistant to the user, for example as synthesized speech, in reply.

For messaging platforms including but not limited to email, instant messaging, discussion forums, group chat sessions, live help or customer support sessions and the like, assistant 1002 may act as a participant in the conversations. Assistant 1002 may monitor the conversation and reply to individuals or the group using one or more the techniques and methods described herein for one-to-one interactions.

Figure 7:
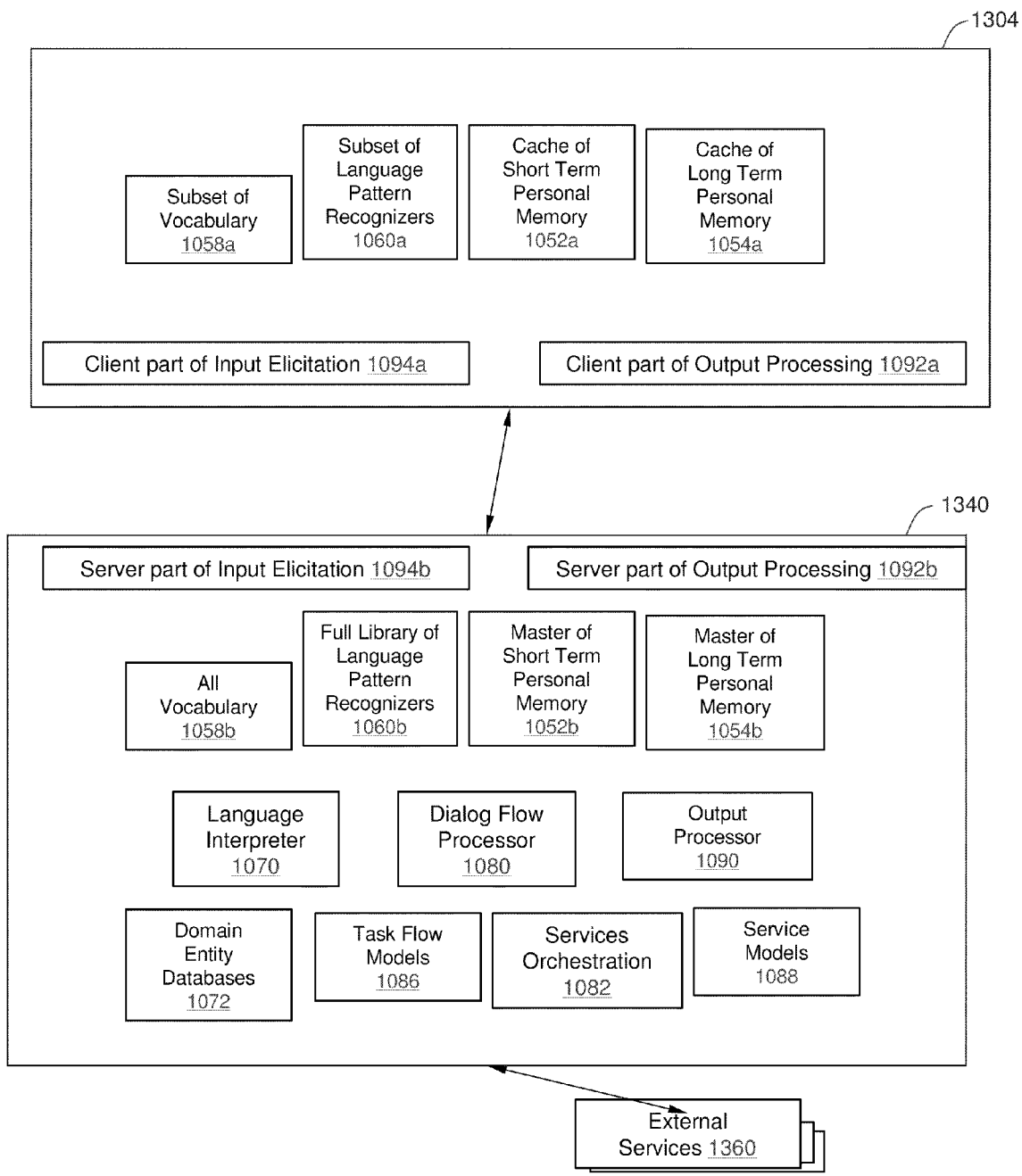
FIG. 7 is a block diagram depicting a client and a server, which communicate with each other to implement the present invention according to one embodiment.

In various embodiments, functionality for implementing the techniques of the present invention can be distributed among any number of client and/or server components. For example, various software modules can be implemented for performing various functions in connection with the present invention, and such modules can be variously implemented to run on server and/or client components. Referring now to FIG. 7, there is shown an example of a client 1304 and a server 1340, which communicate with each other to implement the present invention according to one embodiment. FIG. 7 depicts one possible arrangement by which software modules can be distributed among client 1304 and server 1340. One skilled in the art will recognize that the depicted arrangement is merely exemplary, and that such modules can be distributed in many different ways. In addition, any number of clients 1304 and/or servers 1340 can be provided, and the modules can be distributed among these clients 1304 and/or servers 1340 in any of a number of different ways.

In the example of FIG. 7, input elicitation functionality and output processing functionality are distributed among client 1304 and server 1340, with client part of input elicitation 1094*a* and client part of output processing 1092*a* located at client 1304, and server part of input elicitation 1094*b* and server part of output processing 1092*b* located at server 1340. The following components are located at server 1340:
 complete vocabulary 1058*b*;
 complete library of language pattern recognizers 1060*b*;
 master version of short term personal memory 1052*b*;
 master version of long term personal memory 1054*b*.

In one embodiment, client 1304 maintains subsets and/or portions of these components locally, to improve responsiveness and reduce dependence on network communications. Such subsets and/or portions can be maintained and updated according to well known cache management techniques. Such subsets and/or portions include, for example:
 subset of vocabulary 1058*a*;
 subset of library of language pattern recognizers 1060*a*;
 cache of short term personal memory 1052*a*;
 cache of long term personal memory 1054*a*.

Additional components may be implemented as part of server 1340, including for example:
 language interpreter 1070;
 dialog flow processor 1080;
 output processor 1090;
 domain entity databases 1072;
 task flow models 1086;
 services orchestration 1082;
 service capability models 1088.

Each of these components will be described in more detail below. Server 1340 obtains additional information by interfacing with external services 1360 when needed.

Conceptual Architecture

Referring now to FIG. 1, there is shown a simplified block diagram of a specific example embodiment of an intelligent automated assistant 1002. As described in greater detail herein, different embodiments of intelligent automated assistant systems may be configured, designed, and/or operable to provide various different types of operations, functionalities, and/or features generally relating to intelligent automated assistant technology. Further, as described in greater detail herein, many of the various operations, functionalities, and/or features of the intelligent automated assistant system(s) disclosed herein may provide may enable or provide different types of advantages and/or benefits to different entities interacting with the intelligent automated assistant system(s). The embodiment shown in FIG. 1 may be implemented using any of the hardware architectures described above, or using a different type of hardware architecture.

For example, according to different embodiments, at least some intelligent automated assistant system(s) may be configured, designed, and/or operable to provide various different types of operations, functionalities, and/or features, such as, for example, one or more of the following (or combinations thereof):
 automate the application of data and services available over the Internet to discover, find, choose among, purchase, reserve, or order products and services. In addition to automating the process of using these data and services, intelligent automated assistant 1002 may also enable the combined use of several sources of data and services at once. For example, it may combine information about products from several review sites, check prices and availability from multiple distributors, and check their locations and time constraints, and help a user find a personalized solution to their problem.
 automate the use of data and services available over the Internet to discover, investigate, select among, reserve, and otherwise learn about things to do (including but not limited to movies, events, performances, exhibits, shows and attractions); places to go (including but not limited to travel destinations, hotels and other places to stay, landmarks and other sites of interest, and the like); places to eat or drink (such as restaurants and bars), times and places to meet others, and any other source of entertainment or social interaction which may be found on the Internet.
 enable the operation of applications and services via natural language dialog that are otherwise provided by dedicated applications with graphical user interfaces including search (including location-based search); navigation (maps and directions); database lookup (such as finding businesses or people by name or other properties); getting weather conditions and forecasts, checking the price of market items or status of financial transactions; monitoring traffic or the status of flights; accessing and updating calendars and schedules; managing reminders, alerts, tasks and projects; communicating over email or other messaging platforms; and operating devices locally or remotely (e.g., dialing telephones, controlling light and temperature, controlling home security devices, playing music or video, and the like). In one embodiment, assistant 1002 can be used to initiate, operate, and control many functions and apps available on the device.
 offer personal recommendations for activities, products, services, source of entertainment, time management, or any other kind of recommendation service that benefits from an interactive dialog in natural language and automated access to data and services.

According to different embodiments, at least a portion of the various types of functions, operations, actions, and/or other features provided by intelligent automated assistant 1002 may be implemented at one or more client systems(s), at one or more server systems (s), and/or combinations thereof.

Figure 33:
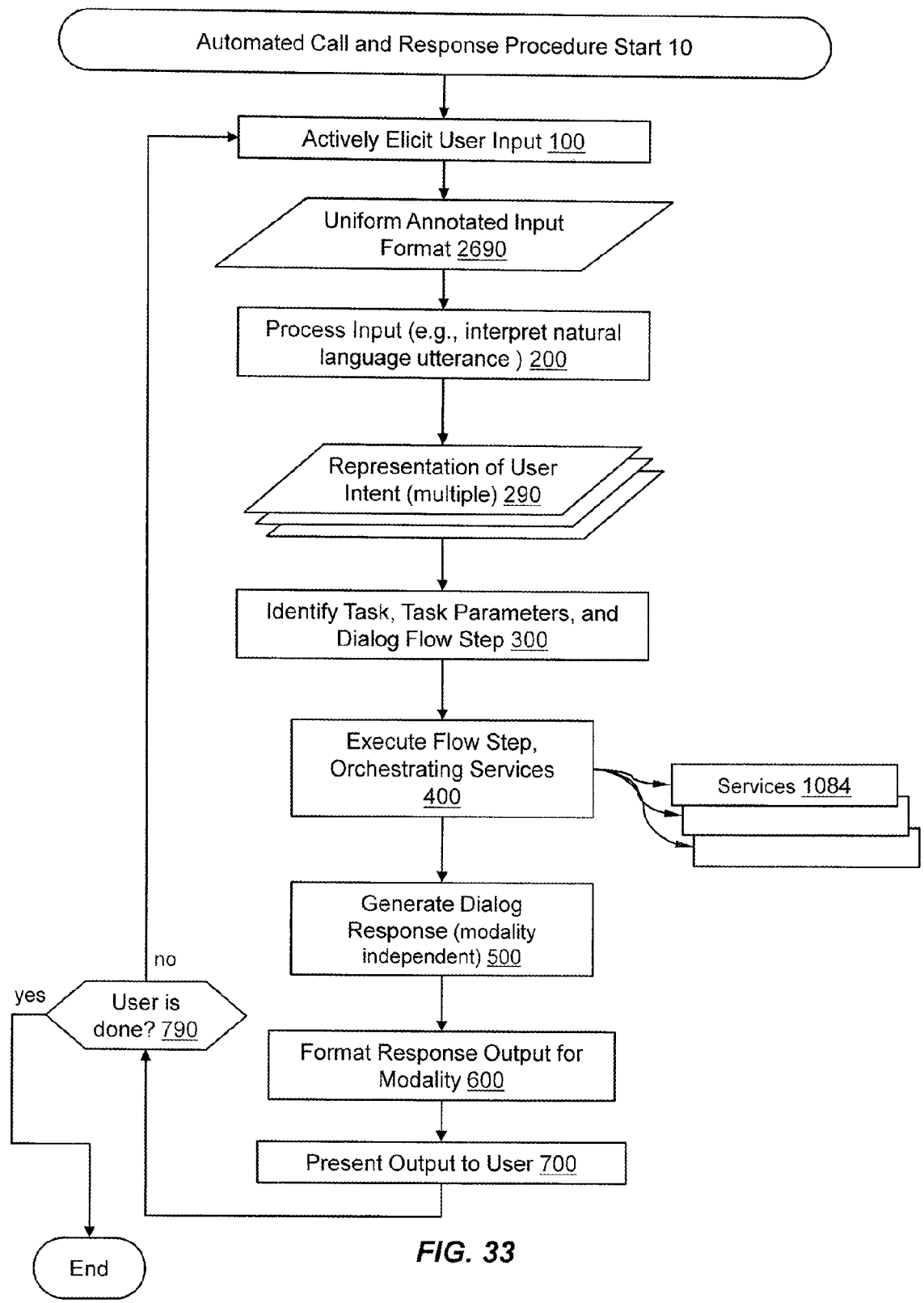
FIG. 33 is a flow diagram depicting an automatic call and response procedure, according to one embodiment.

According to different embodiments, at least a portion of the various types of functions, operations, actions, and/or other features provided by assistant 1002 may implement by at least one embodiment of an automated call and response procedure, such as that illustrated and described, for example, with respect to FIG. 33.

Additionally, various embodiments of assistant 1002 described herein may include or provide a number of different advantages and/or benefits over currently existing intelligent automated assistant technology such as, for example, one or more of the following (or combinations thereof):
 The integration of speech-to-text and natural language understanding technology that is constrained by a set of explicit models of domains, tasks, services, and dialogs. Unlike assistant technology that attempts to implement a general-purpose artificial intelligence system, the embodiments described herein may apply the multiple sources of constraints to reduce the number of solutions to a more tractable size. This results in fewer ambiguous interpretations of language, fewer relevant domains or tasks, and fewer ways to operationalize the intent in services. The focus on specific domains, tasks, and dialogs also makes it feasible to achieve coverage over domains and tasks with human-managed vocabulary and mappings from intent to services parameters.

The ability to solve user problems by invoking services on their behalf over the Internet, using APIs. Unlike search engines which only return links and content, some embodiments of automated assistants 1002 described herein may automate research and problem-solving activities. The ability to invoke multiple services for a given request also provides broader functionality to the user than is achieved by visiting a single site, for instance to produce a product or service or find something to do.

The application of personal information and personal interaction history in the interpretation and execution of user requests. Unlike conventional search engines or question answering services, the embodiments described herein use information from personal interaction history (e.g., dialog history, previous selections from results, and the like), personal physical context (e.g., user's location and time), and personal information gathered in the context of interaction (e.g., name, email addresses, physical addresses, phone numbers, account numbers, preferences, and the like). Using these sources of information enables, for example, better interpretation of user input (e.g., using personal history and physical context when interpreting language);

more personalized results (e.g., that bias toward preferences or recent selections);

improved efficiency for the user (e.g., by automating steps involving the signing up to services or filling out forms).

The use of dialog history in interpreting the natural language of user inputs. Because the embodiments may keep personal history and apply natural language understanding on user inputs, they may also use dialog context such as current location, time, domain, task step, and task parameters to interpret the new inputs. Conventional search engines and command processors interpret at least one query independent of a dialog history. The ability to use dialog history may make a more natural interaction possible, one which resembles normal human conversation.

Active input elicitation, in which assistant 1002 actively guides and constrains the input from the user, based on the same models and information used to interpret their input. For example, assistant 1002 may apply dialog models to suggest next steps in a dialog with the user in which they are refining a request; offer completions to partially typed input based on domain and context specific possibilities; or use semantic interpretation to select from among ambiguous interpretations of speech as text or text as intent.

The explicit modeling and dynamic management of services, with dynamic and robust services orchestration. The architecture of embodiments described enables assistant 1002 to interface with many external services, dynamically determine which services may provide information for a specific user request, map parameters of the user request to different service APIs, call multiple services at once, integrate results from multiple services, fail over gracefully on failed services, and/or efficiently maintain the implementation of services as their APIs and capabilities evolve.

The use of active ontologies as a method and apparatus for building assistants 1002, which simplifies the software engineering and data maintenance of automated assistant systems. Active ontologies are an integration of data modeling and execution environments for assistants. They provide a framework to tie together the various sources of models and data (domain concepts, task flows, vocabulary, language pattern recognizers, dialog context, user personal information, and mappings from domain and task requests to external services. Active ontologies and the other architectural innovations described herein make it practical to build deep functionality within domains, unifying multiple sources of information and services, and to do this across a set of domains.

In at least one embodiment, intelligent automated assistant 1002 may be operable to utilize and/or generate various different types of data and/or other types of information when performing specific tasks and/or operations. This may include, for example, input data/information and/or output data/information. For example, in at least one embodiment, intelligent automated assistant 1002 may be operable to access, process, and/or otherwise utilize information from one or more different types of sources, such as, for example, one or more local and/or remote memories, devices and/or systems. Additionally, in at least one embodiment, intelligent automated assistant 1002 may be operable to generate one or more different types of output data/information, which, for example, may be stored in memory of one or more local and/or remote devices and/or systems.

Examples of different types of input data/information which may be accessed and/or utilized by intelligent automated assistant 1002 may include, but are not limited to, one or more of the following (or combinations thereof):

Voice input: from mobile devices such as mobile telephones and tablets, computers with microphones, Bluetooth headsets, automobile voice control systems, over the telephone system, recordings on answering services, audio voicemail on integrated messaging services, consumer applications with voice input such as clock radios, telephone station, home entertainment control systems, and game consoles.

Text input from keyboards on computers or mobile devices, keypads on remote controls or other consumer electronics devices, email messages sent to the assistant, instant messages or similar short messages sent to the assistant, text received from players in multiuser game environments, and text streamed in message feeds.

Location information coming from sensors or location-based systems. Examples include Global Positioning System (GPS) and Assisted GPS (A-GPS) on mobile phones. In one embodiment, location information is combined with explicit user input. In one embodiment, the system of the present invention is able to detect when a user is at home, based on known address information and current location determination. In this manner, certain inferences may be made about the type of information the user might be interested in when at home as opposed to outside the home, as well as the type of services and actions that should be invoked on behalf of the user depending on whether or not he or she is at home.

Time information from clocks on client devices. This may include, for example, time from telephones or other client devices indicating the local time and time zone. In addition, time may be used in the context of user requests, such as for instance, to interpret phrases such as "in an hour" and "tonight".

Compass, accelerometer, gyroscope, and/or travel velocity data, as well as other sensor data from mobile or handheld devices or embedded systems such as automobile control systems. This may also include device positioning data from remote controls to appliances and game consoles.

Clicking and menu selection and other events from a graphical user interface (GUI) on any device having a GUI. Further examples include touches to a touch screen.

Events from sensors and other data-driven triggers, such as alarm clocks, calendar alerts, price change triggers, location triggers, push notification onto a device from servers, and the like.

The input to the embodiments described herein also includes the context of the user interaction history, including dialog and request history.

Examples of different types of output data/information which may be generated by intelligent automated assistant 1002 may include, but are not limited to, one or more of the following (or combinations thereof):

Text output sent directly to an output device and/or to the user interface of a device Text and graphics sent to a user over email Text and graphics send to a user over a messaging service Speech output, may include one or more of the following (or combinations thereof):
Synthesized speech
Sampled speech
Recorded messages Graphical layout of information with photos, rich text, videos, sounds, and hyperlinks. For instance, the content rendered in a web browser.

Actuator output to control physical actions on a device, such as causing it to turn on or off, make a sound, change color, vibrate, control a light, or the like.

Invoking other applications on a device, such as calling a mapping application, voice dialing a telephone, sending an email or instant message, playing media, making entries in calendars, task managers, and note applications, and other applications.

Actuator output to control physical actions to devices attached or controlled by a device, such as operating a remote camera, controlling a wheelchair, playing music on remote speakers, playing videos on remote displays, and the like.

It may be appreciated that the intelligent automated assistant 1002 of FIG. 1 is but one example from a wide range of intelligent automated assistant system embodiments which may be implemented. Other embodiments of the intelligent automated assistant system (not shown) may include additional, fewer and/or different components/features than those illustrated, for example, in the example intelligent automated assistant system embodiment of FIG. 1.

User Interaction

Figure 2:
FIG. 2 illustrates an example of an interaction between a user and an intelligent automated assistant according to at least one embodiment.

Referring now to FIG. 2, there is shown an example of an interaction between a user and at least one embodiment of an intelligent automated assistant 1002. The example of FIG. 2 assumes that a user is speaking to intelligent automated assistant 1002 using input device 1206, which may be a speech input mechanism, and the output is graphical layout to output device 1207, which may be a scrollable screen. Conversation screen 101A features a conversational user interface showing what the user said 101B ("I'd like a romantic place for Italian food near my office") and assistant's 1002 response, which is a summary of its findings 101C ("OK, I found these Italian restaurants which reviews say are romantic close to your work:") and a set of results 101D (the first three of a list of restaurants are shown). In this example, the user clicks on the first result in the list, and the result automatically opens up to reveal more information about the restaurant, shown in information screen 101E. Information screen 101E and conversation screen 101A may appear on the same output device, such as a touchscreen or other display device; the examples depicted in FIG. 2 are two different output states for the same output device.

In one embodiment, information screen 101E shows information gathered and combined from a variety of services, including for example, any or all of the following:

Addresses and geolocations of businesses;
Distance from user's current location;
Reviews from a plurality of sources;

In one embodiment, information screen 101E also includes some examples of services that assistant 1002 might offer on behalf of the user, including:

Dial a telephone to call the business ("call");
Remember this restaurant for future reference ("save");
Send an email to someone with the directions and information about this restaurant ("share");
Show the location of and directions to this restaurant on a map ("map it");
Save personal notes about this restaurant ("my notes").

As shown in the example of FIG. 2, in one embodiment, assistant 1002 includes intelligence beyond simple database applications, such as, for example, Processing a statement of intent in a natural language 101B, not just keywords;
Inferring semantic intent from that language input, such as interpreting "place for Italian food" as "Italian restaurants";
Operationalizing semantic intent into a strategy for using online services and executing that strategy on behalf of the user (e.g., operationalizing the desire for a romantic place into the strategy of checking online review sites for reviews that describe a place as "romantic").

Intelligent Automated Assistant Components

According to various embodiments, intelligent automated assistant 1002 may include a plurality of different types of components, devices, modules, processes, systems, and the like, which, for example, may be implemented and/or instantiated via the use of hardware and/or combinations of hardware and software. For example, as illustrated in the example embodiment of FIG. 1, assistant 1002 may include one or more of the following types of systems, components, devices, processes, and the like (or combinations thereof):

One or more active ontologies 1050;
Active input elicitation component(s) 1094 (may include client part 1094*a* and server part 1094*b* (see FIG. 7));
Short term personal memory component(s) 1052 (may include master version 1052*b* and cache 1052*a* (see FIG. 7));
Long-term personal memory component(s) 1054 (may include master version 1052*b* and cache 1052*a* (see FIG. 7));
Domain models component(s) 1056;
Vocabulary component(s) 1058 (may include complete vocabulary 1058*b* and subset 1058*a* (see FIG. 7));
Language pattern recognizer(s) component(s) 1060 (may include full library 1060*b* and subset 1560*a* (see FIG. 7));
Language interpreter component(s) 1070;
Domain entity database(s) 1072;
Dialog flow processor component(s) 1080;
Services orchestration component(s) 1082;
Services component(s) 1084;
Task flow models component(s) 1086;
Dialog flow models component(s) 1087;

Service models component(s) 1088;

Output processor component(s) 1090.

As described in connection with FIG. 7, in certain client/server-based embodiments, some or all of these components may be distributed between client 1304 and server 1340.

For purposes of illustration, at least a portion of the different types of components of a specific example embodiment of intelligent automated assistant 1002 will now be described in greater detail with reference to the example intelligent automated assistant 1002 embodiment of FIG. 1.

Active Ontologies 1050

Active ontologies 1050 serve as a unifying infrastructure that integrates models, components, and/or data from other parts of embodiments of intelligent automated assistants 1002. In the field of computer and information science, ontologies provide structures for data and knowledge representation such as classes/types, relations, attributes/properties and their instantiation in instances. Ontologies are used, for example, to build models of data and knowledge. In some embodiments of the intelligent automated assistant 1002, ontologies are part of the modeling framework in which to build models such as domain models.

Within the context of the present invention, an "active ontology" 1050 may also serve as an execution environment, in which distinct processing elements are arranged in an ontology-like manner (e.g., having distinct attributes and relations with other processing elements). These processing elements carry out at least some of the tasks of intelligent automated assistant 1002. Any number of active ontologies 1050 can be provided.

In at least one embodiment, active ontologies 1050 may be operable to perform and/or implement various types of functions, operations, actions, and/or other features such as, for example, one or more of the following (or combinations thereof):

Act as a modeling and development environment, integrating models and data from various model and data components, including but not limited to Domain models 1056

Vocabulary 1058

Domain entity databases 1072

Task flow models 1086

Dialog flow models 1087

Service capability models 1088

Act as a data-modeling environment on which ontology-based editing tools may operate to develop new models, data structures, database schemata, and representations.

Act as a live execution environment, instantiating values for elements of domain 1056, task 1086, and/or dialog models 1087, language pattern recognizers, and/or vocabulary 1058, and user-specific information such as that found in short term personal memory 1052, long term personal memory 1054, and/or the results of service orchestration 1082. For example, some nodes of an active ontology may correspond to domain concepts such as restaurant and its property restaurant name. During live execution, these active ontology nodes may be instantiated with the identity of a particular restaurant entity and its name, and how its name corresponds to words in a natural language input utterance. Thus, in this embodiment, the active ontology is serving as both a modeling environment specifying the concept that restaurants are entities with identities that have names, and for storing dynamic bindings of those modeling nodes with data from entity databases and parses of natural language.

Enable the communication and coordination among components and processing elements of an intelligent automated assistant, such as, for example, one or more of the following (or combinations thereof):

Active input elicitation component(s) 1094

Language interpreter component(s) 1070

Dialog flow processor component(s) 1080

Services orchestration component(s) 1082

Services component(s) 1084

In one embodiment, at least a portion of the functions, operations, actions, and/or other features of active ontologies 1050 described herein may be implemented, at least in part, using various methods and apparatuses described in U.S. patent application Ser. No. 11/518,292 for "Method and Apparatus for Building an Intelligent Automated Assistant", filed Sep. 8, 2006.

In at least one embodiment, a given instance of active ontology 1050 may access and/or utilize information from one or more associated databases. In at least one embodiment, at least a portion of the database information may be accessed via communication with one or more local and/or remote memory devices. Examples of different types of data which may be accessed by active ontologies 1050 may include, but are not limited to, one or more of the following (or combinations thereof):

Static data that is available from one or more components of intelligent automated assistant 1002;

Data that is dynamically instantiated per user session, for example, but not limited to, maintaining the state of the user-specific inputs and outputs exchanged among components of intelligent automated assistant 1002, the contents of short term personal memory, the inferences made from previous states of the user session, and the like.

In this manner, active ontologies 1050 are used to unify elements of various components in intelligent automated assistant 1002. An active ontology 1050 allows an author, designer, or system builder to integrate components so that the elements of one component are identified with elements of other components. The author, designer, or system builder can thus combine and integrate the components more easily.

Figure 8:
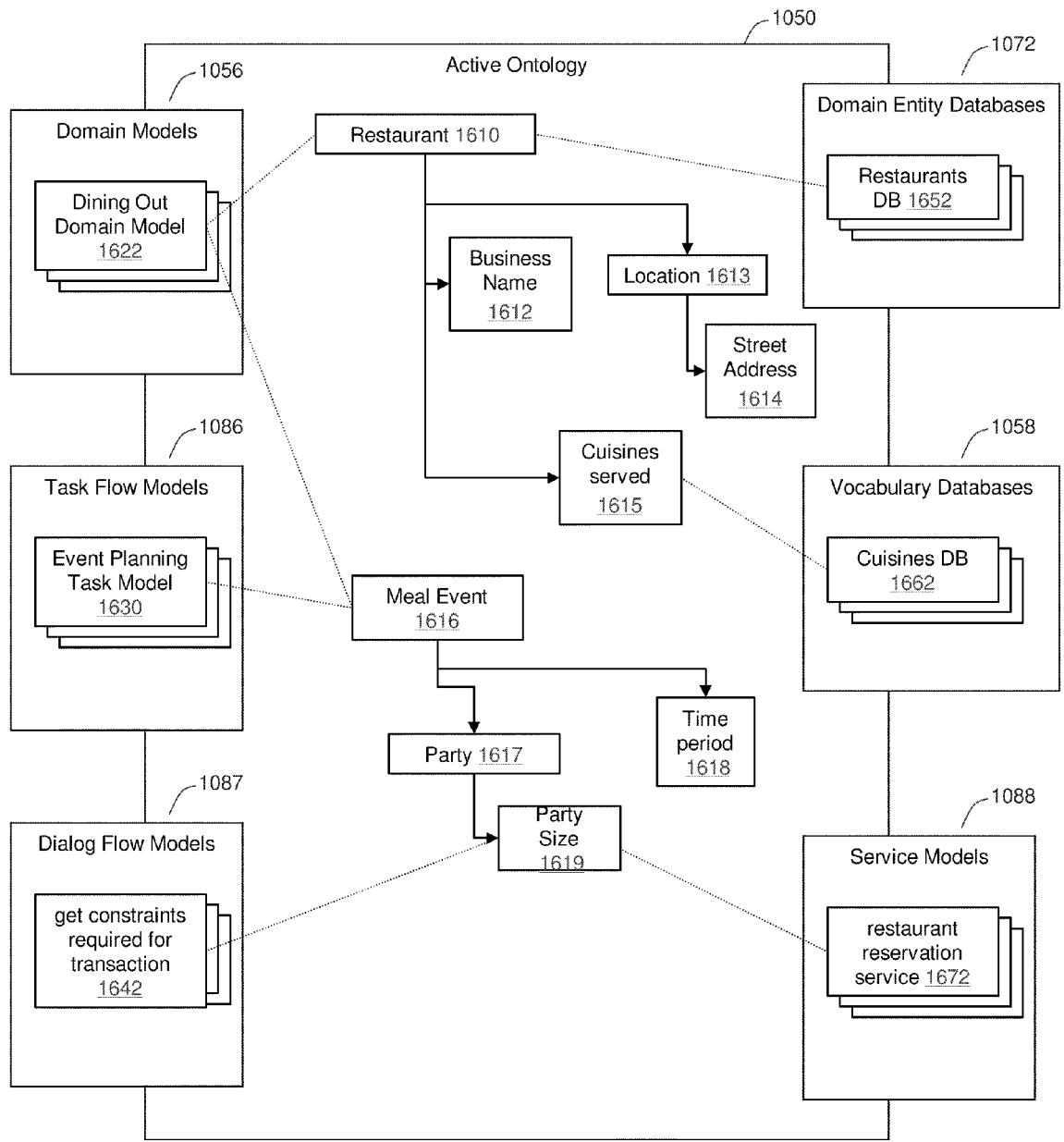
FIG. 8 is a block diagram depicting a fragment of an active ontology according to one embodiment.

Referring now to FIG. 8, there is shown an example of a fragment of an active ontology 1050 according to one embodiment. This example is intended to help illustrate some of the various types of functions, operations, actions, and/or other features that may be provided by active ontologies 1050.

Active ontology 1050 in FIG. 8 includes representations of a restaurant and meal event. In this example, a restaurant is a concept 1610 with properties such as its name 1612, cuisines served 1615, and its location 1613, which in turn might be modeled as a structured node with properties for street address 1614. The concept of a meal event might be modeled as a node 1616 including a dining party 1617 (which has a size 1619) and time period 1618.

Active ontologies may include and/or make reference to domain models 1056. For example, FIG. 8 depicts a dining out domain model 1622 linked to restaurant concept 1610 and meal event concept 1616. In this instance, active ontology 1050 includes dining out domain model 1622; specifically, at least two nodes of active ontology 1050, namely restaurant 1610 and meal event 1616, are also included in and/or referenced by dining out domain model 1622. This domain model represents, among other things, the idea that dining out involves meal event that occur at restaurants. The active ontology nodes restaurant 1610 and meal event 1616 are also included and/or referenced by other components of the intelligent automated assistant, a shown by dotted lines in FIG. 8.

Active ontologies may include and/or make reference to task flow models 1086. For example, FIG. 8 depicts an event planning task flow model 1630, which models the planning of events independent of domains, applied to a domain-specific kind of event: meal event 1616. Here, active ontology 1050 includes general event planning task flow model 1630, which comprises nodes representing events and other concepts involved in planning them. Active ontology 1050 also includes the node meal event 1616, which is a particular kind of event. In this example, meal event 1616 is included or made reference to by both domain model 1622 and task flow model 1630, and both of these models are included in and/or referenced by active ontology 1050. Again, meal event 1616 is an example of how active ontologies can unify elements of various components included and/or referenced by other components of the intelligent automated assistant, a shown by dotted lines in FIG. 8.

Active ontologies may include and/or make reference to dialog flow models 1087. For example, FIG. 8 depicts a dialog flow model 1642 for getting the values of constraints required for a transaction instantiated on the constraint party size as represented in concept 1619. Again, active ontology 1050 provides a framework for relating and unifying various components such as dialog flow models 1087. In this case, dialog flow model 1642 has a general concept of a constraint that is instantiated in this particular example to the active ontology node party size 1619. This particular dialog flow model 1642 operates at the abstraction of constraints, independent of domain. Active ontology 1050 represents party size property 1619 of party node 1617, which is related to meal event node 1616. In such an embodiment, intelligent automated assistant 1002 uses active ontology 1050 to unify the concept of constraint in dialog flow model 1642 with the property of party size 1619 as part of a cluster of nodes representing meal event concept 1616, which is part of the domain model 1622 for dining out.

Active ontologies may include and/or make reference to service models 1088. For example, FIG. 8 depicts a model of a restaurant reservation service 1672 associated with the dialog flow step for getting values required for that service to perform a transaction. In this instance, service model 1672 for a restaurant reservation service specifies that a reservation requires a value for party size 1619 (the number of people sitting at a table to reserve). The concept party size 1619, which is part of active ontology 1050, also is linked or related to a general dialog flow model 1642 for asking the user about the constraints for a transaction; in this instance, the party size is a required constraint for dialog flow model 1642.

Active ontologies may include and/or make reference to domain entity databases 1072. For example, FIG. 8 depicts a domain entity database of restaurants 1652 associated with restaurant node 1610 in active ontology 1050. Active ontology 1050 represents the general concept of restaurant 1610, as may be used by the various components of intelligent automated assistant 1002, and it is instantiated by data about specific restaurants in restaurant database 1652.

Active ontologies may include and/or make reference to vocabulary databases 1058. For example, FIG. 8 depicts a vocabulary database of cuisines 1662, such as Italian, French, and the like, and the words associated with each cuisine such as "French", "continental", "provincial", and the like. Active ontology 1050 includes restaurant node 1610, which is related to cuisines served node 1615, which is associated with the representation of cuisines in cuisines database 1662. A specific entry in database 1662 for a cuisine, such as "French", is thus related through active ontology 1050 as an instance of the concept of cuisines served 1615.

Active ontologies may include and/or make reference to any database that can be mapped to concepts or other representations in ontology 1050. Domain entity databases 1072 and vocabulary databases 1058 are merely two examples of how active ontology 1050 may integrate databases with each other and with other components of automated assistant 1002. Active ontologies allow the author, designer, or system builder to specify a nontrivial mapping between representations in the database and representations in ontology 1050. For example, the database schema for restaurants database 1652 may represent a restaurant as a table of strings and numbers, or as a projection from a larger database of business, or any other representation suitable for database 1652. In this example active ontology 1050, restaurant 1610 is a concept node with properties and relations, organized differently from the database tables. In this example, nodes of ontology 1050 are associated with elements of database schemata. The integration of database and ontology 1050 provides a unified representation for interpreting and acting on specific data entries in databases in terms of the larger sets of models and data in active ontology 1050. For instance, the word "French" may be an entry in cuisines database 1662. Because, in this example, database 1662 is integrated in active ontology 1050, that same word "French" also has an interpretation as a possible cuisine served at a restaurant, which is involved in planning meal events, and this cuisine serves as a constraint to use when using restaurants reservation services, and so forth. Active ontologies can thus integrate databases into the modeling and execution environment to inter-operate with other components of automated assistant 1002.

As described above, active ontology 1050 allows the author, designer, or system builder to integrate components; thus, in the example of FIG. 8, the elements of a component such as constraint in dialog flow model 1642 can be identified with elements of other components such as required parameter of restaurant reservation service 1672.

Active ontologies 1050 may be embodied as, for example, configurations of models, databases, and components in which the relationships among models, databases, and components are any of:
  containership and/or inclusion;
  relationship with links and/or pointers;
  interface over APIs, both internal to a program and between programs.

Figure 9:
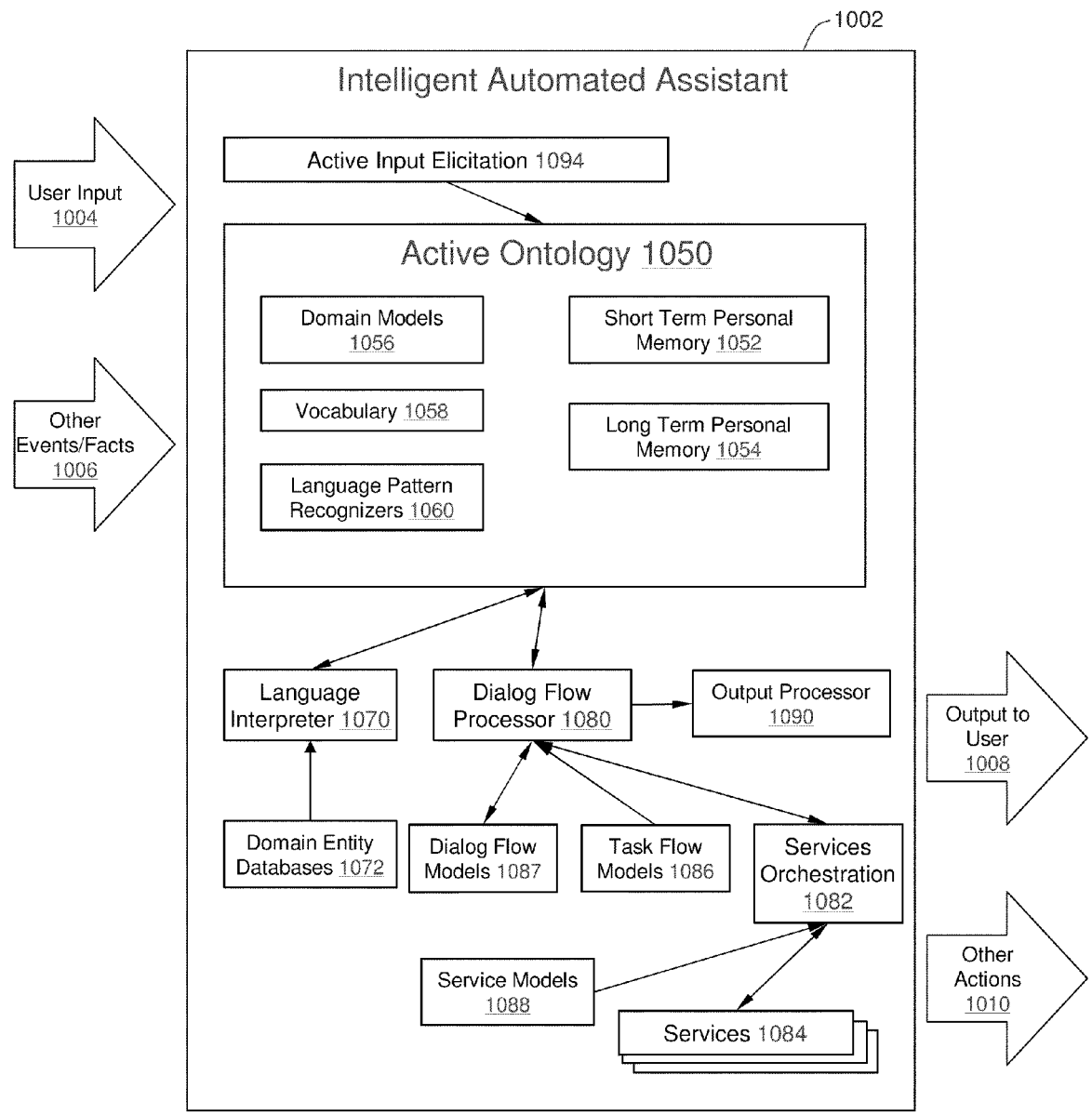
FIG. 9 is a block diagram depicting an example of an alternative embodiment of an intelligent automated assistant system.

For example, referring now to FIG. 9, there is shown an example of an alternative embodiment of intelligent automated assistant system 1002, wherein domain models 1056, vocabulary 1058, language pattern recognizers 1060, short term personal memory 1052, and long term personal memory 1054 components are organized under a common container associated with active ontology 1050, and other components such as active input elicitation component(s) 1094, language interpreter 1070 and dialog flow processor 1080 are associated with active ontology 1050 via API relationships.

Active Input Elicitation Component(s) 1094

In at least one embodiment, active input elicitation component(s) 1094 (which, as described above, may be implemented in a stand-alone configuration or in a configuration including both server and client components) may be operable to perform and/or implement various types of functions, operations, actions, and/or other features such as, for example, one or more of the following (or combinations thereof):

Elicit, facilitate and/or process input from the user or the user's environment, and/or information about their need(s) or request(s). For example, if the user is looking to find a restaurant, the input elicitation module may get information about the user's constraints or preferences for location, time, cuisine, price, and so forth.

Facilitate different kinds of input from various sources, such as for example, one or more of the following (or combinations thereof):
input from keyboards or any other input device that generates text
input from keyboards in user interfaces that offer dynamic suggested completions of partial input
input from voice or speech input systems
input from Graphical User Interfaces (GUIs) in which users click, select, or otherwise directly manipulate graphical objects to indicate choices
input from other applications that generate text and send it to the automated assistant, including email, text messaging, or other text communication platforms By performing active input elicitation, assistant 1002 is able to disambiguate intent at an early phase of input processing. For example, in an embodiment where input is provided by speech, the waveform might be sent to a server 1340 where words are extracted, and semantic interpretation performed. The results of such semantic interpretation can then be used to drive active input elicitation, which may offer the user alternative candidate words to choose among based on their degree of semantic fit as well as phonetic match.

Figure 10:
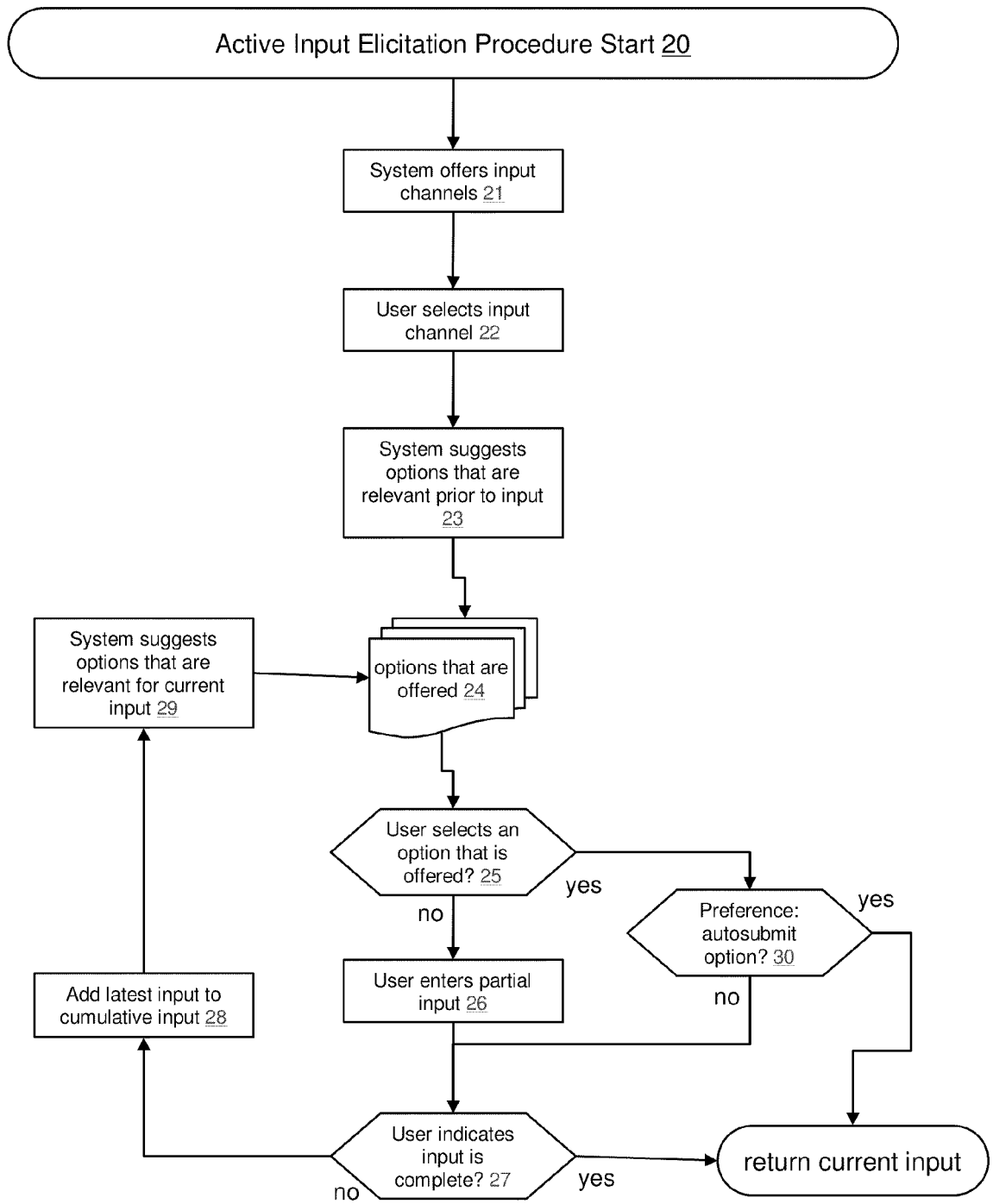
FIG. 10 is a flow diagram depicting a method of operation for active input elicitation component(s) according to one embodiment.

In at least one embodiment, active input elicitation component(s) 1094 actively, automatically, and dynamically guide the user toward inputs that may be acted upon by one or more of the services offered by embodiments of assistant 1002. Referring now to FIG. 10, there is shown a flow diagram depicting a method of operation for active input elicitation component(s) 1094 according to one embodiment.

The procedure begins 20. In step 21, assistant 1002 may offer interfaces on one or more input channels. For example, a user interface may offer the user options to speak or type or tap at any stage of a conversational interaction. In step 22, the user selects an input channel by initiating input on one modality, such as pressing a button to start recording speech or to bring up an interface for typing.

In at least one embodiment, assistant 1002 offers default suggestions for the selected modality 23. That is, it offers options 24 that are relevant in the current context prior to the user entering any input on that modality. For example, in a text input modality, assistant 1002 might offer a list of common words that would begin textual requests or commands such as, for example, one or more of the following (or combinations thereof): imperative verbs (e.g., find, buy, reserve, get, call, check, schedule, and the like), nouns (e.g., restaurants, movies, events, businesses, and the like), or menu-like options naming domains of discourse (e.g., weather, sports, news, and the like)

If the user selects one of the default options in 25, and a preference to autosubmit 30 is set, the procedure may return immediately. This is similar to the operation of a conventional menu selection.

However, the initial option may be taken as a partial input, or the user may have started to enter a partial input 26. At any point of input, in at least one embodiment, the user may choose to indicate that the partial input is complete 27, which causes the procedure to return.

In 28, the latest input, whether selected or entered, is added to the cumulative input.

In 29, the system suggests next possible inputs that are relevant given the current input and other sources of constraints on what constitutes relevant and/or meaningful input.

In at least one embodiment, the sources of constraints on user input (for example, which are used in steps 23 and 29) are one or more of the various models and data sources that may be included in assistant 1002, which may include, but are not limited to, one or more of the following (or combinations thereof):

Vocabulary 1058. For example, words or phrases that match the current input may be suggested. In at least one embodiment, vocabulary may be associated with any or one or more nodes of active ontologies, domain models, task models, dialog models, and/or service models.

Domain models 1056, which may constrain the inputs that may instantiate or otherwise be consistent with the domain model. For example, in at least one embodiment, domain models 1056 may be used to suggest concepts, relations, properties, and/or instances that would be consistent with the current input.

Language pattern recognizers 1060, which may be used to recognize idioms, phrases, grammatical constructs, or other patterns in the current input and be used to suggest completions that fill out the pattern.

Domain entity databases 1072, which may be used to suggest possible entities in the domain that match the input (e.g., business names, movie names, event names, and the like).

Short term personal memory 1052, which may be used to match any prior input or portion of prior input, and/or any other property or fact about the history of interaction with a user. For example, partial input may be matched against cities that the user has encountered in a session, whether hypothetically (e.g., mentioned in queries) and/or physically (e.g., as determined from location sensors).

In at least one embodiment, semantic paraphrases of recent inputs, request, or results may be matched against the current input. For example, if the user had previously request "live music" and obtained concert listing, and then typed "music" in an active input elicitation environment, suggestions may include "live music" and/or "concerts".

Long term personal memory 1054, which may be used to suggest matching items from long term memory. Such matching items may include, for example, one or more or any combination of: domain entities that are saved (e.g., "favorite" restaurants, movies, theaters, venues, and the like), to-do items, list items, calendar entries, people names in contacts/address books, street or city names mentioned in contact/address books, and the like.

Task flow models 1086, which may be used to suggest inputs based on the next possible steps of in a task flow.

Dialog flow models 1087, which may be used to suggest inputs based on the next possible steps of in a dialog flow.

Service capability models 1088, which may be used to suggest possible services to employ, by name, category, capability, or any other property in the model. For example, a user may type part of the name of a preferred review site, and assistant 1002 may suggest a complete command for querying that review site for review.

In at least one embodiment, active input elicitation component(s) 1094 present to the user a conversational interface, for example, an interface in which the user and assistant communicate by making utterances back and forth in a conversational manner. Active input elicitation component(s) 1094 may be operable to perform and/or implement various types of conversational interfaces.

In at least one embodiment, active input elicitation component(s) 1094 may be operable to perform and/or implement various types of conversational interfaces in which assistant 1002 uses plies of the conversation to prompt for information from the user according to dialog models. Dialog models may represent a procedure for executing a dialog, such as, for example, a series of steps required to elicit the information needed to perform a service.

In at least one embodiment, active input elicitation component(s) 1094 offer constraints and guidance to the user in real time, while the user is in the midst of typing, speaking, or otherwise creating input. For example, active elicitation may guide the user to type text inputs that are recognizable by an embodiment of assistant 1002 and/or that may be serviced by one or more services offered by embodiments of assistant 1002. This is an advantage over passively waiting for unconstrained input from a user because it enables the user's efforts to be focused on inputs that may or might be useful, and/or it enables embodiments of assistant 1002 to apply its interpretations of the input in real time as the user is inputting it.

At least a portion of the functions, operations, actions, and/or other features of active input elicitation described herein may be implemented, at least in part, using various methods and apparatuses described in U.S. patent application Ser. No. 11/518,292 for "Method and Apparatus for Building an Intelligent Automated Assistant", filed Sep. 8, 2006.

According to specific embodiments, multiple instances or threads of active input elicitation component(s) 1094 may be concurrently implemented and/or initiated via the use of one or more processors 63 and/or other combinations of hardware and/or hardware and software.

According to different embodiments, one or more different threads or instances of active input elicitation component(s) 1094 may be initiated in response to detection of one or more conditions or events satisfying one or more different types of minimum threshold criteria for triggering initiation of at least one instance of active input elicitation component(s) 1094. Various examples of conditions or events which may trigger initiation and/or implementation of one or more different threads or instances of active input elicitation component(s) 1094 may include, but are not limited to, one or more of the following (or combinations thereof):

Start of user session. For example, when the user session starts up an application that is an embodiment of assistant 1002, the interface may offer the opportunity for the user to initiate input, for example, by pressing a button to initiate a speech input system or clicking on a text field to initiate a text input session.

User input detected.

When assistant 1002 explicitly prompts the user for input, as when it requests a response to a question or offers a menu of next steps from which to choose.

When assistant 1002 is helping the user perform a transaction and is gathering data for that transaction, e.g., filling in a form.

In at least one embodiment, a given instance of active input elicitation component(s) 1094 may access and/or utilize information from one or more associated databases. In at least one embodiment, at least a portion of the database information may be accessed via communication with one or more local and/or remote memory devices. Examples of different types of data which may be accessed by active input elicitation component(s) 1094 may include, but are not limited to, one or more of the following (or combinations thereof):

database of possible words to use in a textual input;
grammar of possible phrases to use in a textual input utterance;
database of possible interpretations of speech input;
database of previous inputs from a user or from other users;
data from any of the various models and data sources that may be part of embodiments of assistant 1002, which may include, but are not limited to, one or more of the following (or combinations thereof):
Domain models 1056;
Vocabulary 1058;
Language pattern recognizers 1060;
Domain entity databases 1072;
Short term personal memory 1052;
Long term personal memory 1054;
Task flow models 1086;
Dialog flow models 1087;
Service capability models 1088.

According to different embodiments, active input elicitation component(s) 1094 may apply active elicitation procedures to, for example, one or more of the following (or combinations thereof):

typed input;
speech input;
input from graphical user interfaces (GUIs), including gestures;
input from suggestions offered in a dialog; and
events from the computational and/or sensed environments.

Active Typed Input Elicitation

Figure 11:
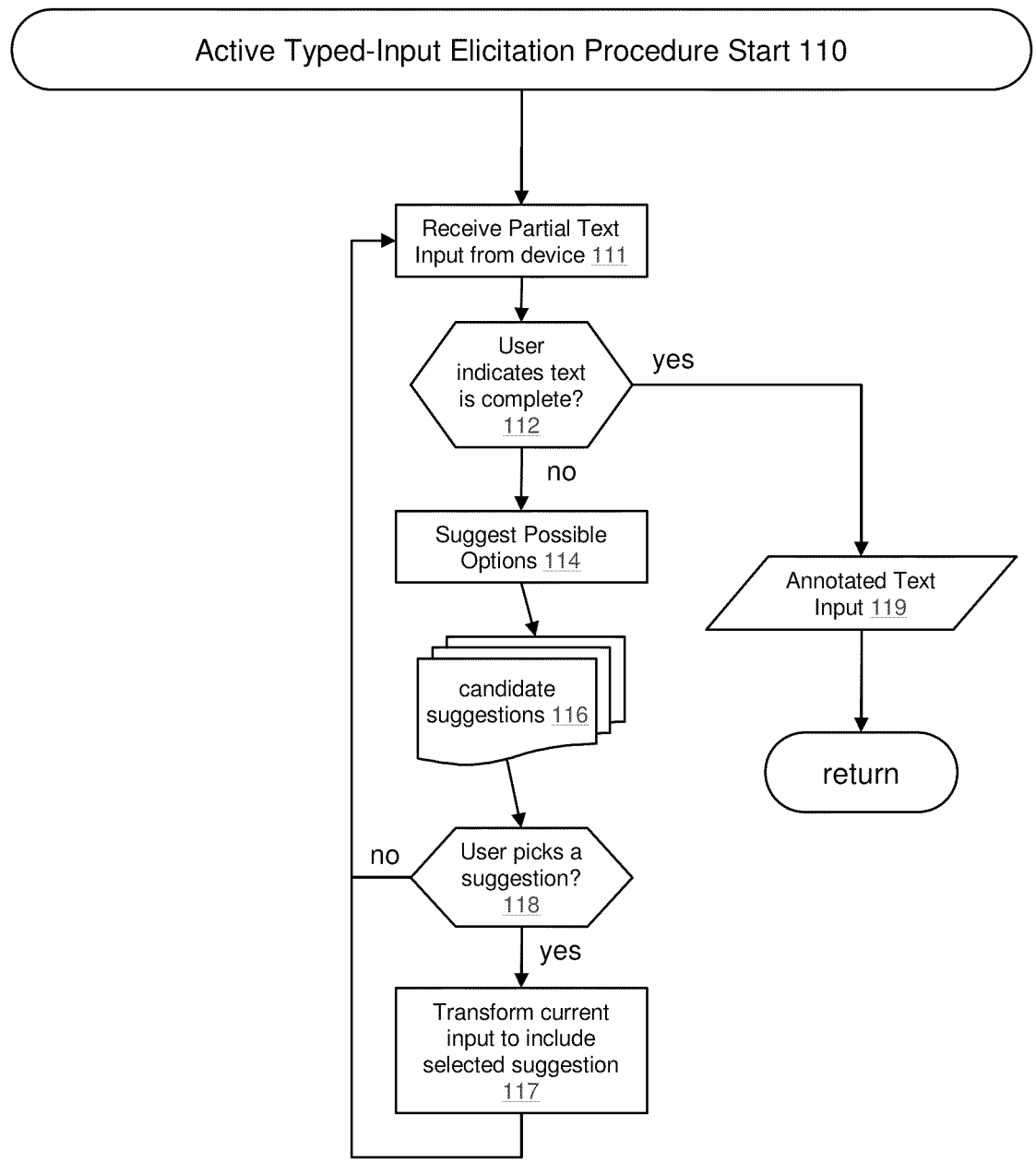
FIG. 11 is a flow diagram depicting a method for active typed-input elicitation according to one embodiment.

Referring now to FIG. 11, there is shown a flow diagram depicting a method for active typed input elicitation according to one embodiment.

The method begins 110. Assistant 1002 receives 111 partial text input, for example via input device 1206. Partial text input may include, for example, the characters that have been typed so far in a text input field. At any time, a user may indicate that the typed input is complete 112, as, for example, by pressing an Enter key. If not complete, a suggestion generator generates 114 candidate suggestions 116. These suggestions may be syntactic, semantic, and/or other kinds of suggestion based any of the sources of information or constraints described herein. If the suggestion is selected 118, the input is transformed 117 to include the selected suggestion.

In at least one embodiment, the suggestions may include extensions to the current input. For example, a suggestion for "rest" may be "restaurants".

In at least one embodiment, the suggestions may include replacements of parts of the current input. For example, a suggestion for "rest" may be "places to eat".

In at least one embodiment, the suggestions may include replacing and rephrasing of parts of the current input. For example, if the current input is "find restaurants of style" a suggestion may be "italian" and when the suggestion is chosen, the entire input may be rewritten as "find Italian restaurants".

In at least one embodiment, the resulting input that is returned is annotated 119, so that information about which choices were made in 118 is preserved along with the textual input. This enables, for example, the semantic concepts or entities underlying a string to be associated with the string when it is returned, which improves accuracy of subsequent language interpretation.

Referring now to FIGS. 12 to 21, there are shown screen shots illustrating some portions of some of the procedures for active typed-input elicitation according to one embodiment. The screen shots depict an example of an embodiment of assistant 1002 as implemented on a smartphone such as the iPhone available from Apple Inc. of Cupertino, Calif. Input is provided to such device via a touchscreen, including on-screen keyboard functionality. One skilled in the art will recognize that the screen shots depict an embodiment that is merely exemplary, and that the techniques of the present invention can be implemented on other devices and using other layouts and arrangements.

Figure 12:
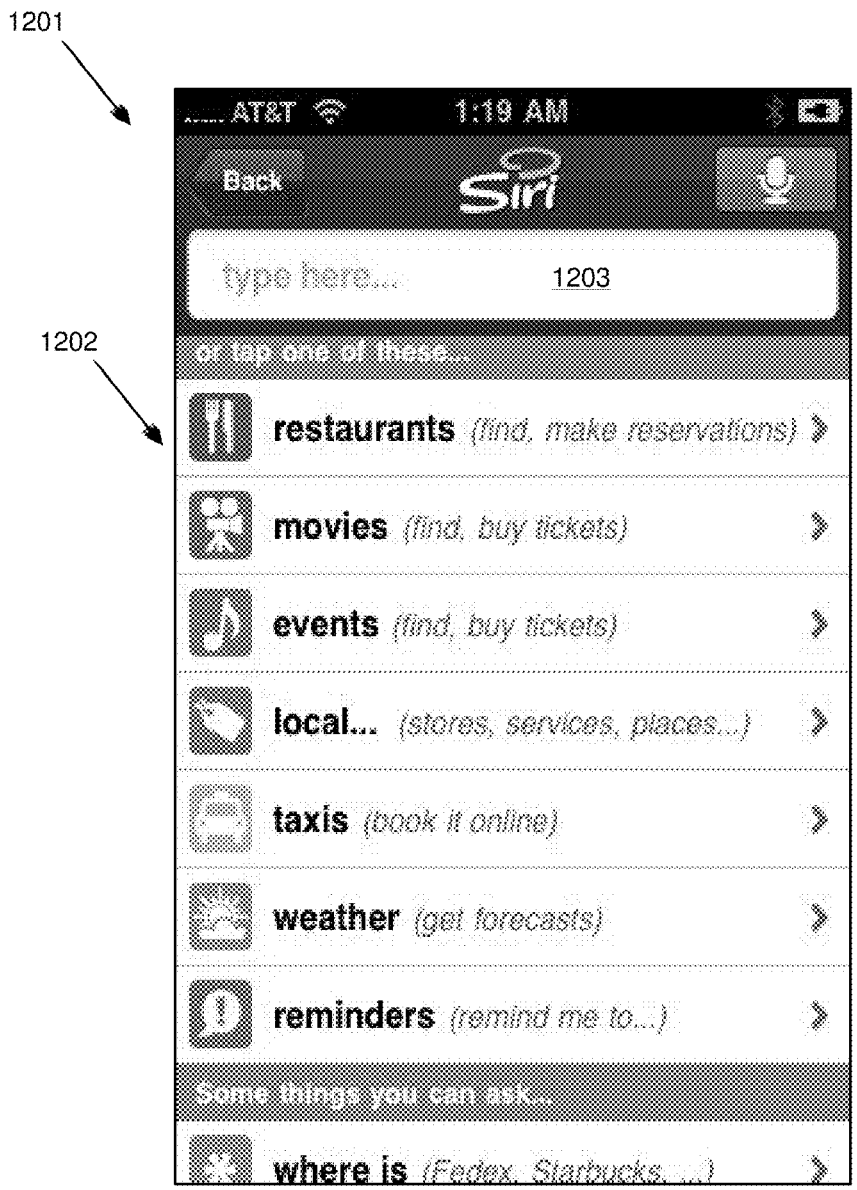
FIGS. 12 to 21 are screen shots illustrating some portions of some of the procedures for active typed-input elicitation according to one embodiment.

In FIG. 12, screen 1201 includes a top-level set of suggestions 1202 shown when no input has been provided in field 1203. This corresponds to no-input step 23 of FIG. 10 applied to step 114 of FIG. 11 where there is no input.

Figure 13:
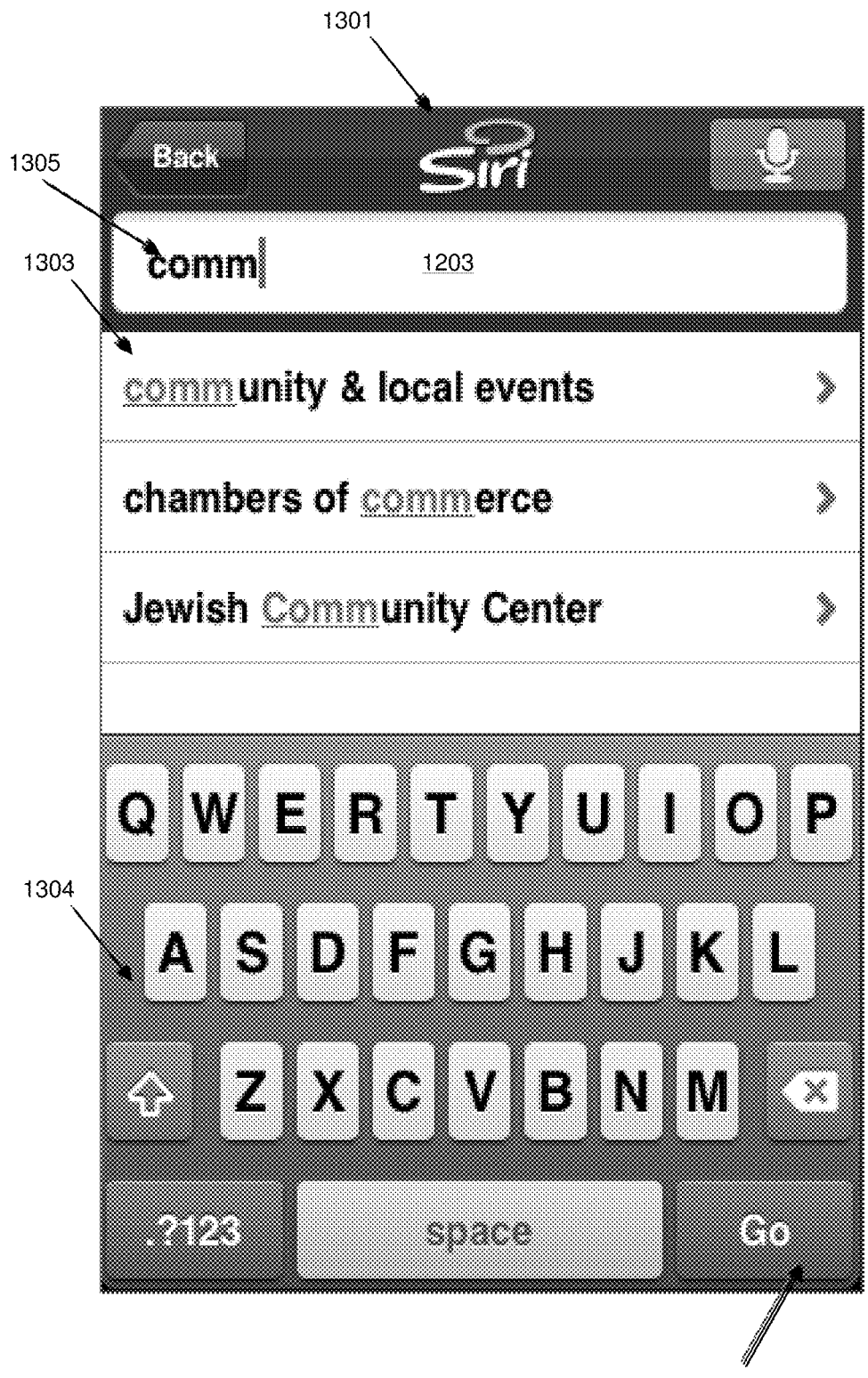

In FIG. 13, screen 1301 depicts an example of the use of vocabulary to offer suggested completions 1303 of partial user input 1305 entered in field 1203 using on-screen keyboard 1304. These suggested completions 1303 may be part of the function of active input elicitation 1094. The user has entered partial user input 1305 including the string "comm". Vocabulary component 1058 has provided a mapping of this string into three different kinds of instances, which are listed as suggested completions 1303: the phrase "community & local events" is a category of the events domain; "chambers of commerce" is a category of the local business search domain, and "Jewish Community Center" is the name of an instance of local businesses. Vocabulary component 1058 may provide the data lookup and management of name spaces like these. The user can tap Go button 1306 to indicate that he or she has finished entering input; this causes assistant 1002 to proceed with the completed text string as a unit of user input.

Figure 14:
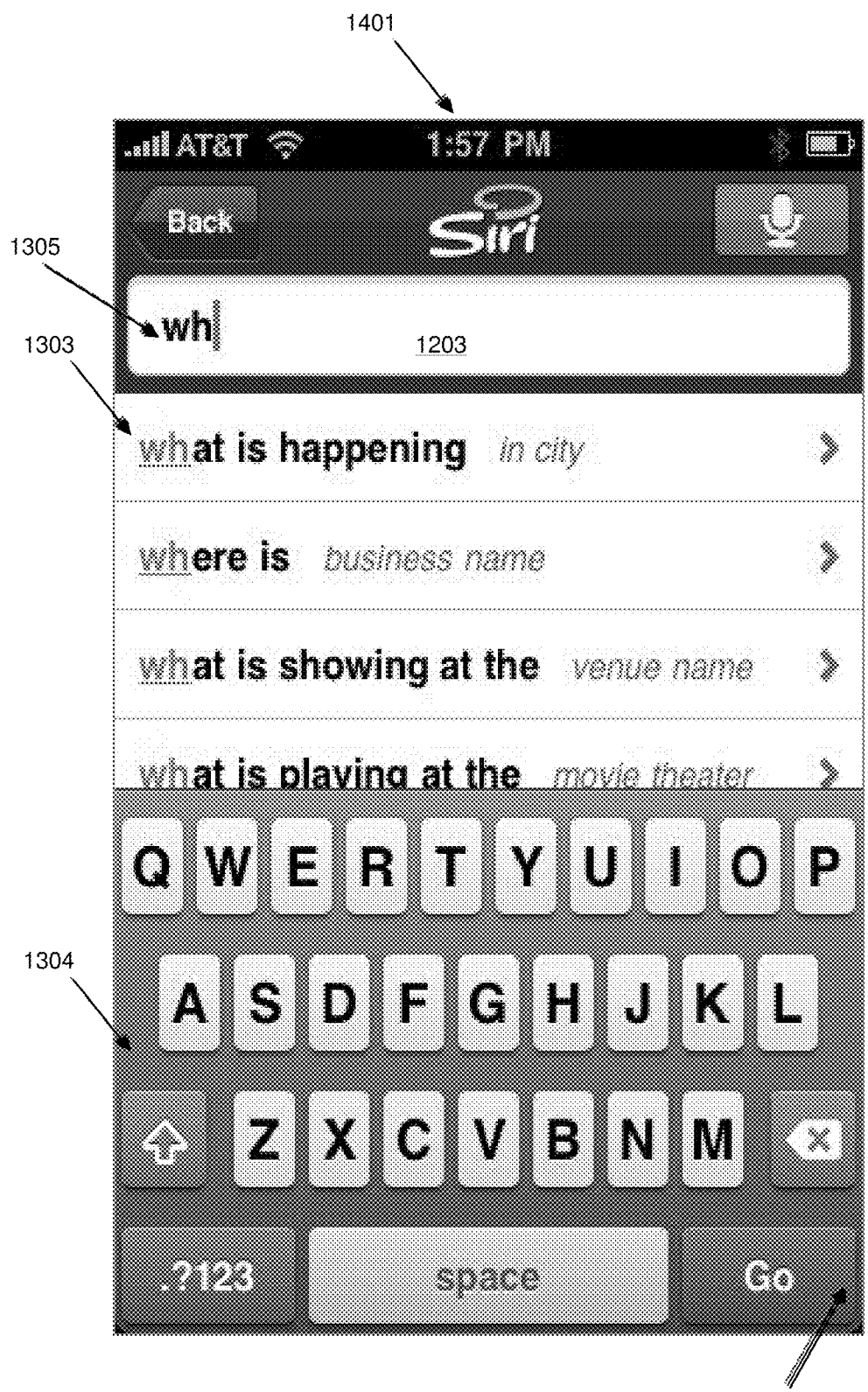

In FIG. 14, screen 1401 depicts an example in which suggested semantic completions 1303 for a partial string "wh" 1305 include entire phrases with typed parameters. These kinds of suggestions may be enabled by the use of one or more of the various models and sources of input constraints described herein. For example, in one embodiment shown in FIG. 14, "what is happening in city" is an active elicitation of the location parameter of the Local Events domain; "where is business name" is an active elicitation of the Business Name constraint of the Local Business Search domain; "what is showing at the venue name" is an active elicitation of the Venue Name constraint of the Local Events domain; and "what is playing at the movie theater" is an active elicitation of the Movie Theater Name constraint of the Local Events domain. These examples illustrate that the suggested completions are generated by models rather than simply drawn from a database of previously entered queries.

Figure 15:
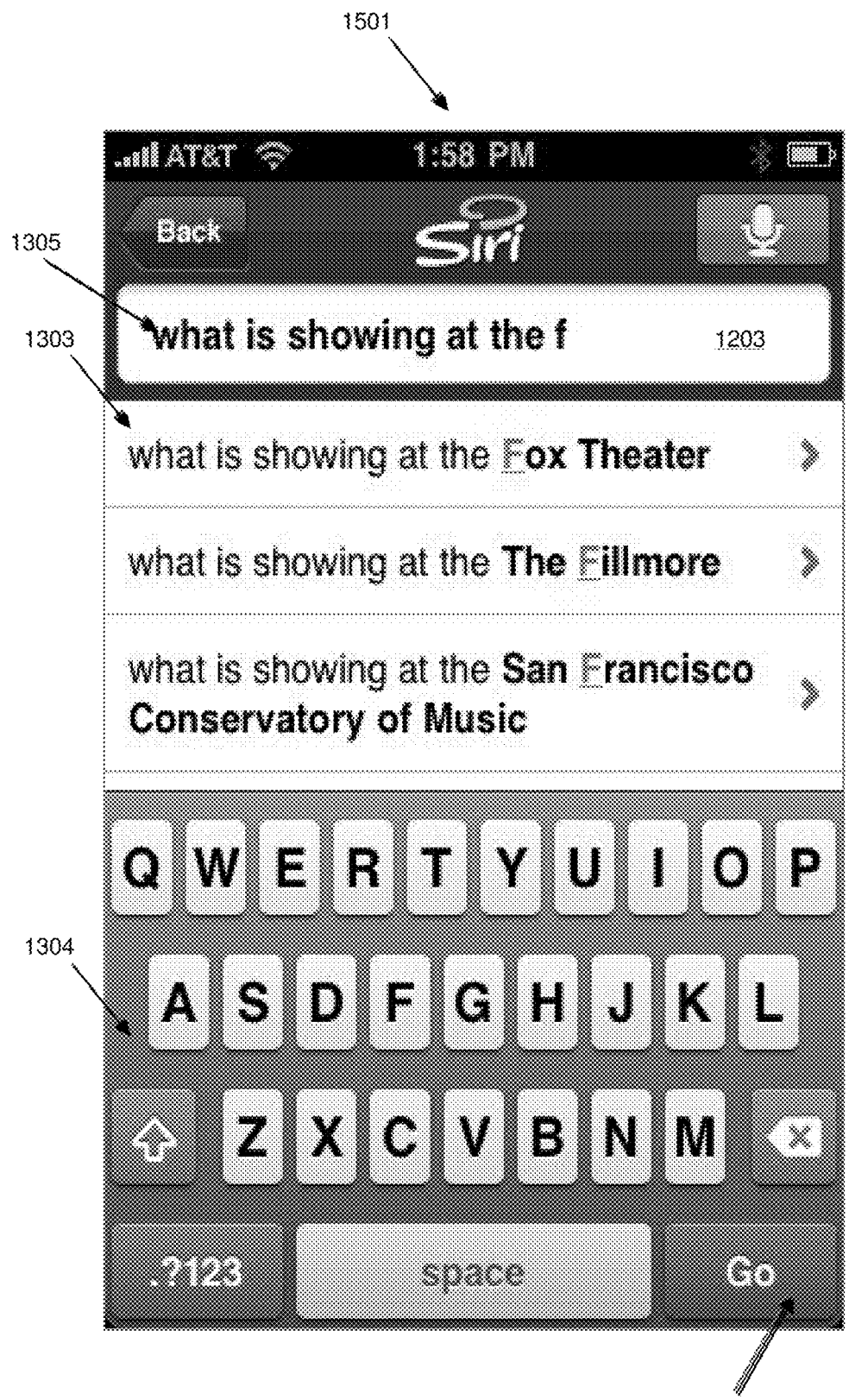

In FIG. 15, screen 1501 depicts a continuation of the same example, after the user has entered additional text 1305 in field 1203. Suggested completions 1303 are updated to match the additional text 1305. In this example, data from a domain entity database 1072 were used: venues whose name starts with "f". Note that this is a significantly smaller and more semantically relevant set of suggestions than all words that begin with "f". Again, the suggestions are generated by applying a model, in this case the domain model that represents Local Events as happening at Venues, which are Businesses with Names. The suggestions actively elicit inputs that would make potentially meaningful entries when using a Local Events service.

Figure 16:
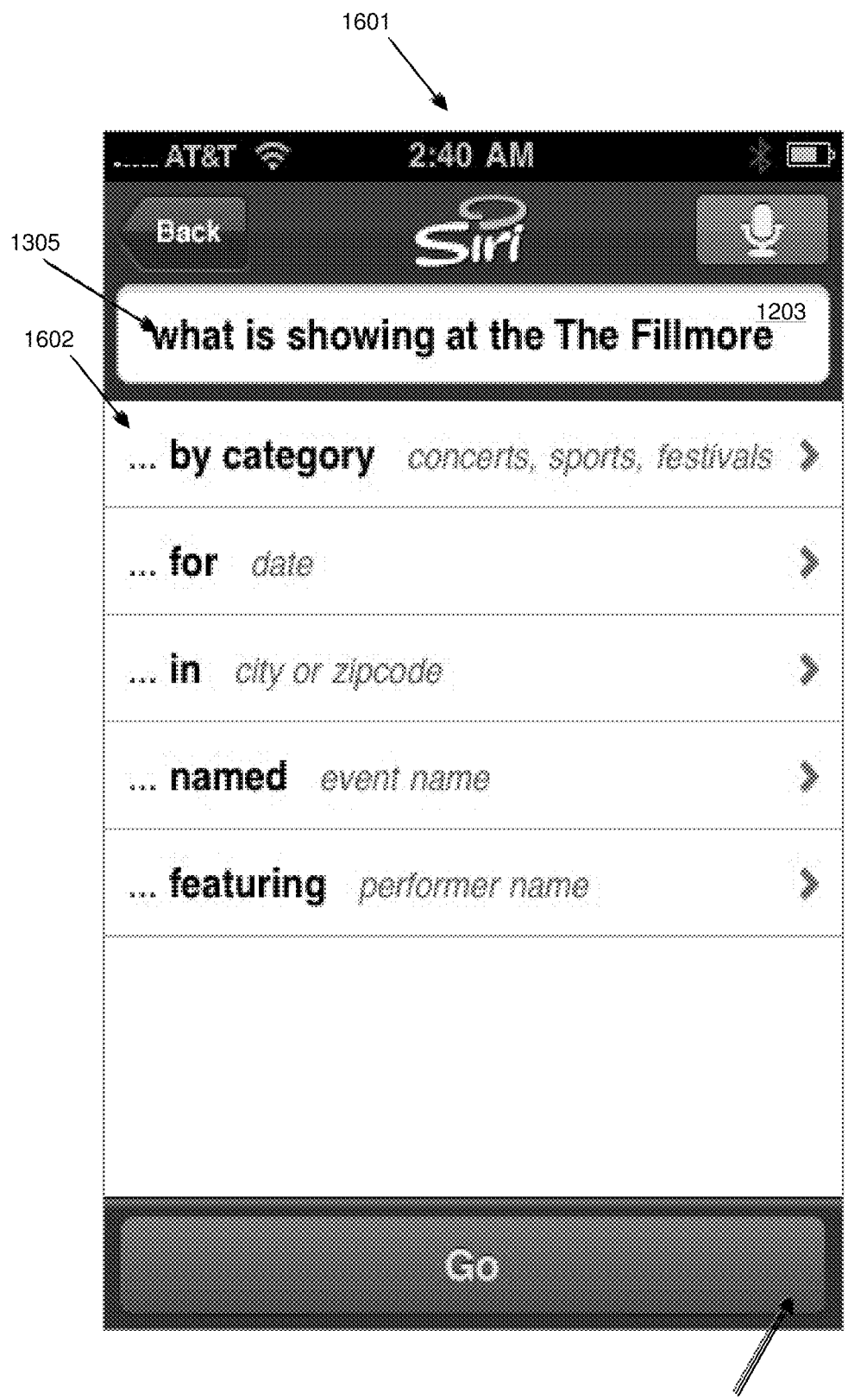

In FIG. 16, screen 1601 depicts a continuation of the same example, after the user has selected one of suggested completions 1303. Active elicitation continues by prompting the user to further specify the type of information desired, here by presenting a number of specifiers 1602 from which the user can select. In this example, these specifiers are generated by the domain, task flow, and dialog flow models. The Domain is Local Events, which includes Categories of events that happen on Dates in Locations and have Event Names and Feature Performers. In this embodiment, the fact that these five options are offered to the user is generated from the Dialog Flow model that indicates that users should be asked for Constraints that they have not yet entered and from the Service Model that indicates that these five Constraints are parameters to Local Event services available to the assistant. Even the choice of preferred phrases to use as specifiers, such as "by category" and "featured", are generated from the Domain Vocabulary databases.

Figure 17:
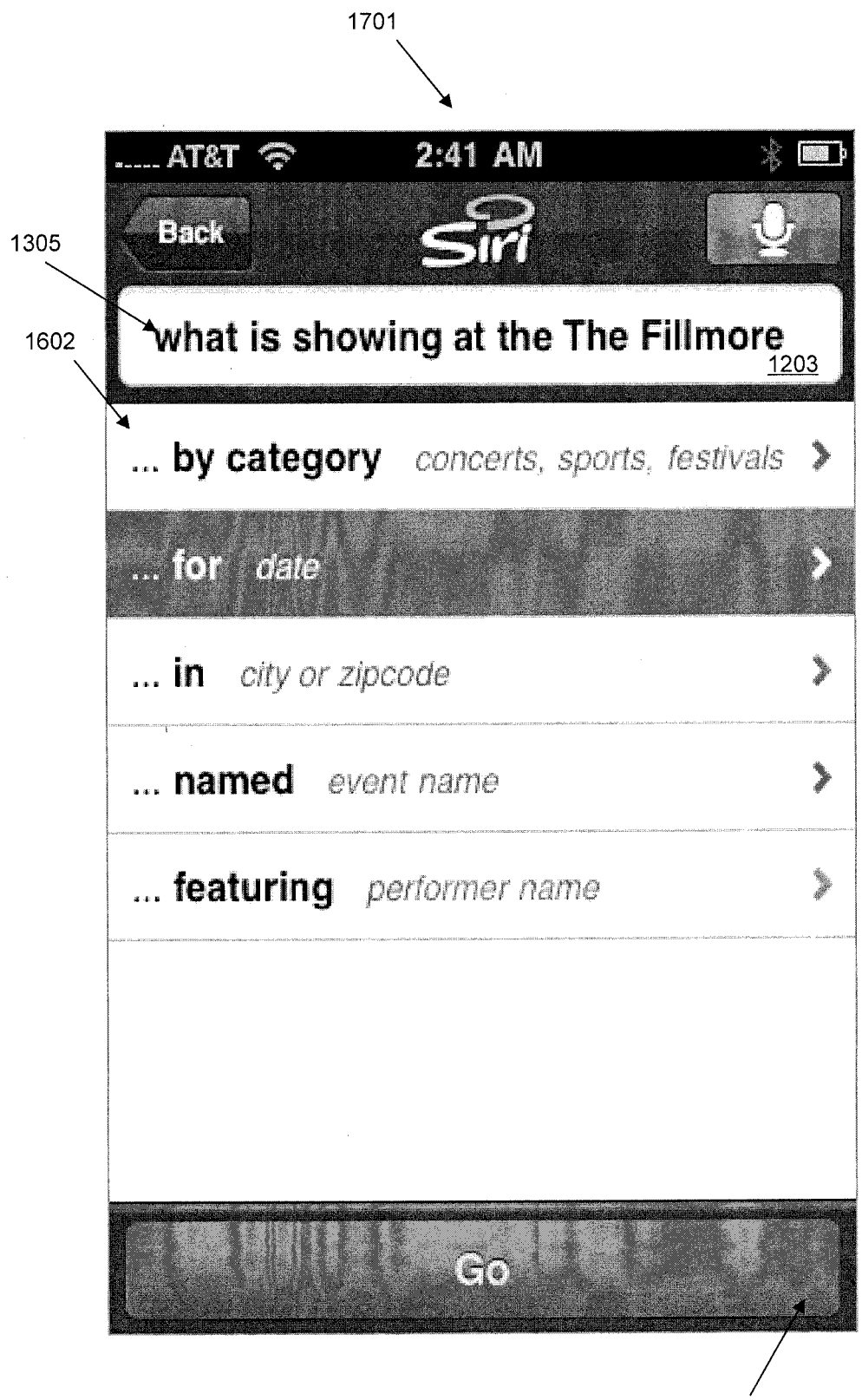

In FIG. 17, screen 1701 depicts a continuation of the same example, after the user has selected one of specifiers 1602.

Figure 18:
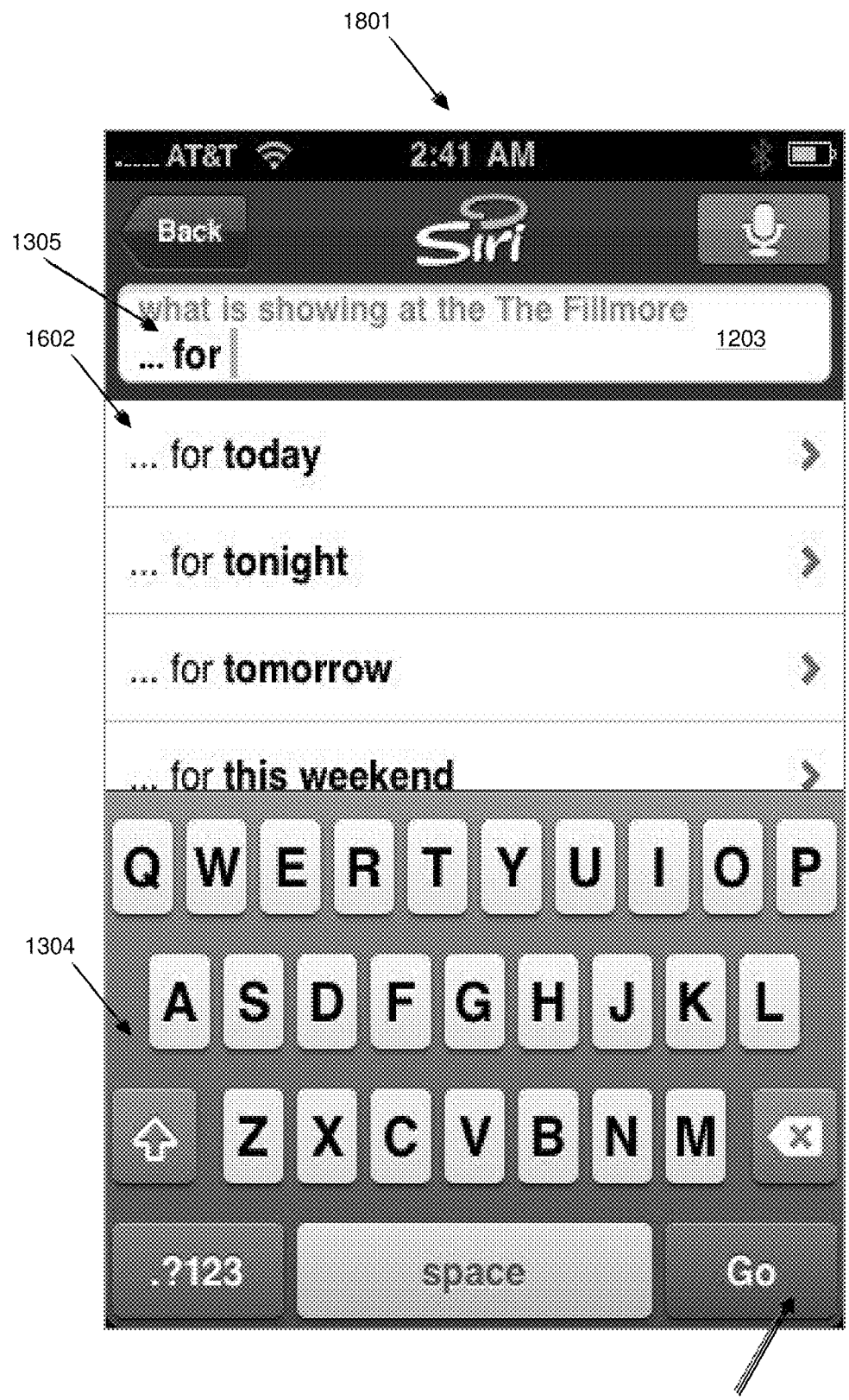

In FIG. 18, screen 1801 depicts a continuation of the same example, wherein the selected specifier 1602 has been added to field 1203, and additional specifiers 1602 are presented. The user can select one of specifiers 1602 and/or provide additional text input via keyboard 1304.

Figure 19:
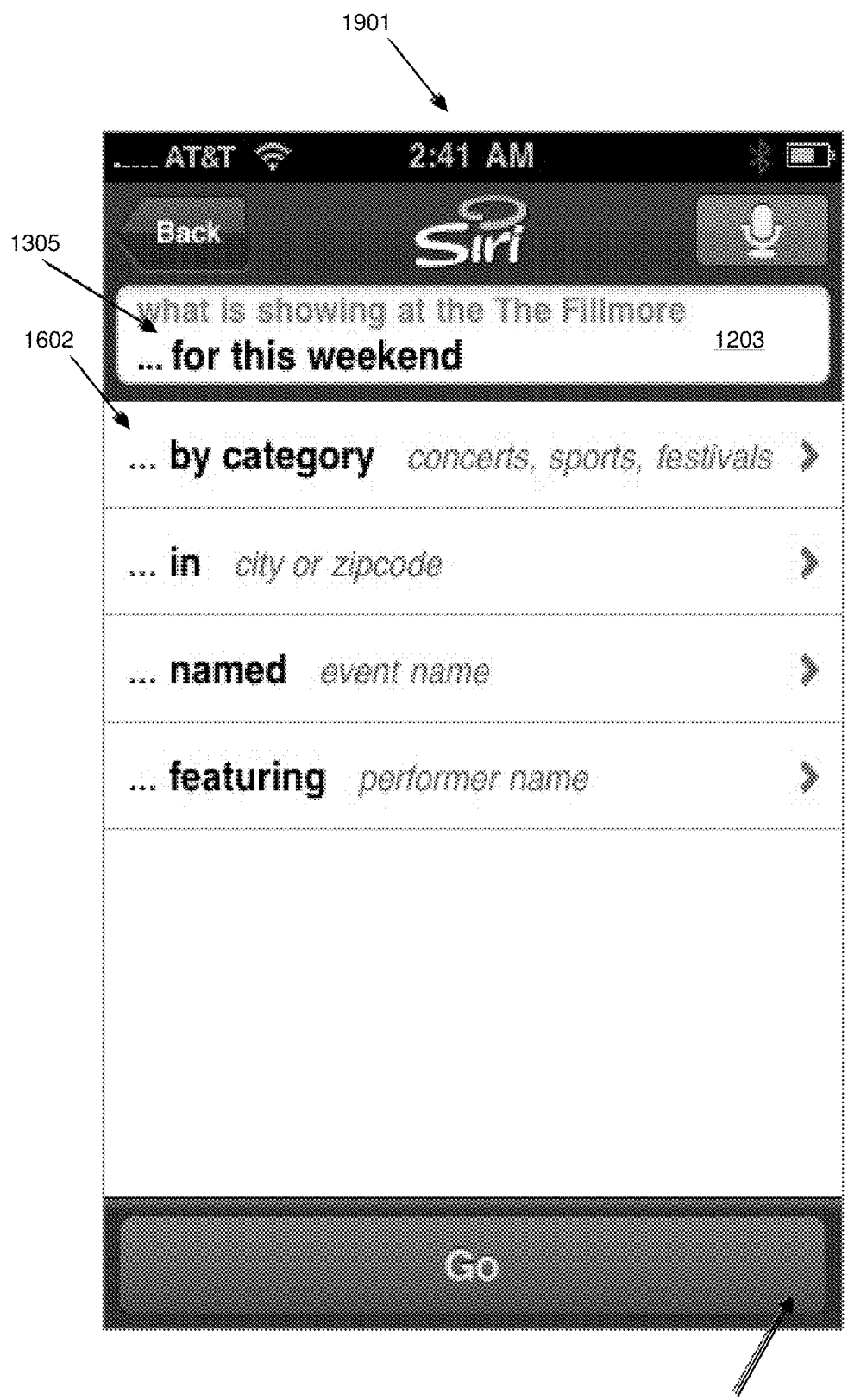

In FIG. 19, screen 1901 depicts a continuation of the same example, wherein the selected specifier 1602 has been added to field 1203, and yet more specifiers 1602 are presented. In this example, previously entered constraints are not actively elicited redundantly.

Figure 20:

In FIG. 20, screen 2001 depicts a continuation of the same example, wherein the user has tapped the Go button 1306. The user's input is shown in box 2002, and a message is shown in box 2003, providing feedback to the user as to the query being performed in response to the user's input.

Figure 21:
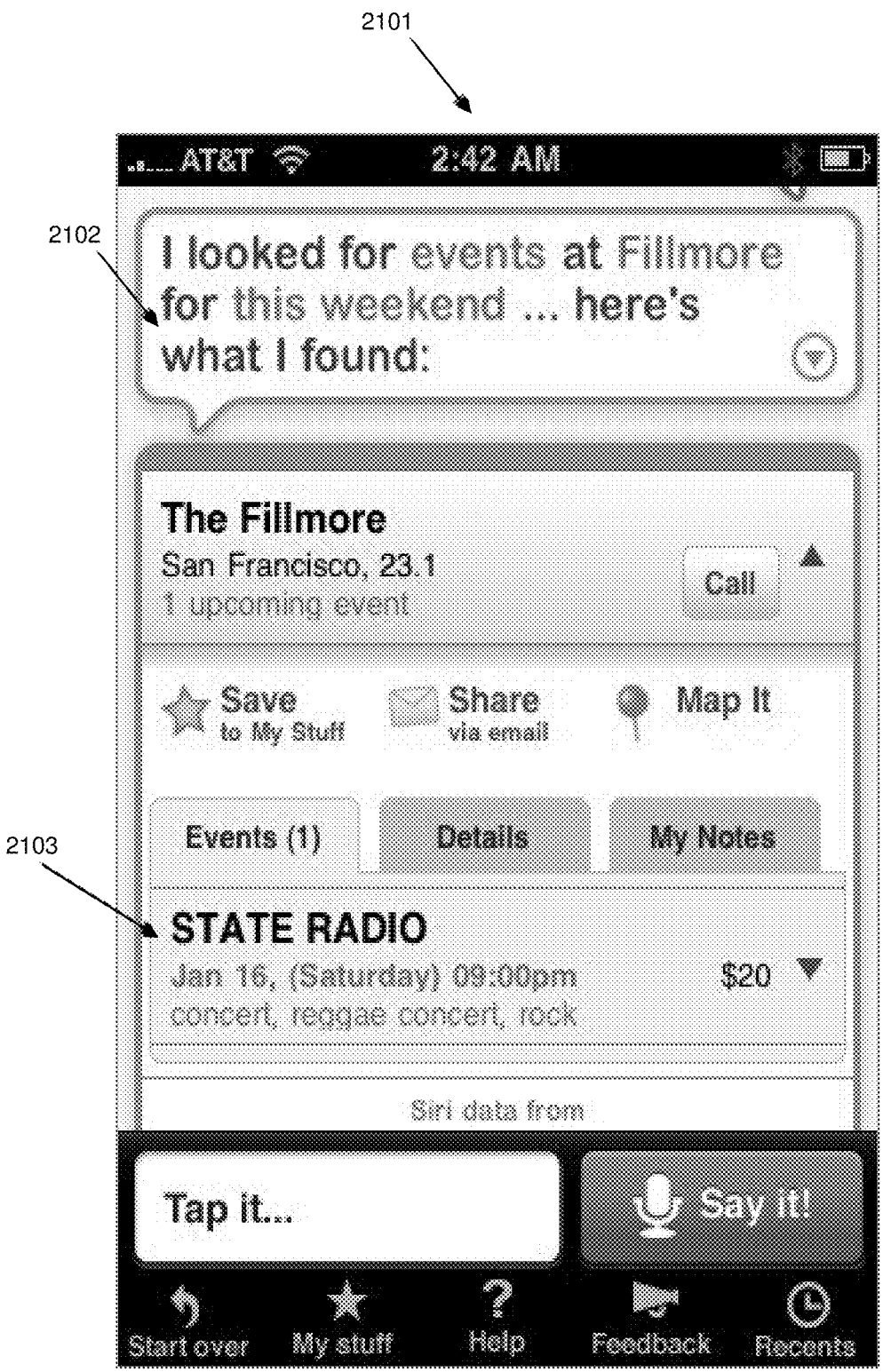

In FIG. 21, screen 2101 depicts a continuation of the same example, wherein results have been found. Message is shown in box 2102. Results 2103, including input elements allowing the user to view further details, save the identified event, buy tickets, add notes, or the like.

In one screen 2101, and other displayed screens, are scrollable, allowing the user to scroll upwards to see screen 2001 or other previously presented screens, and to make changes to the query if desired.

Active Speech Input Elicitation

Figure 22:
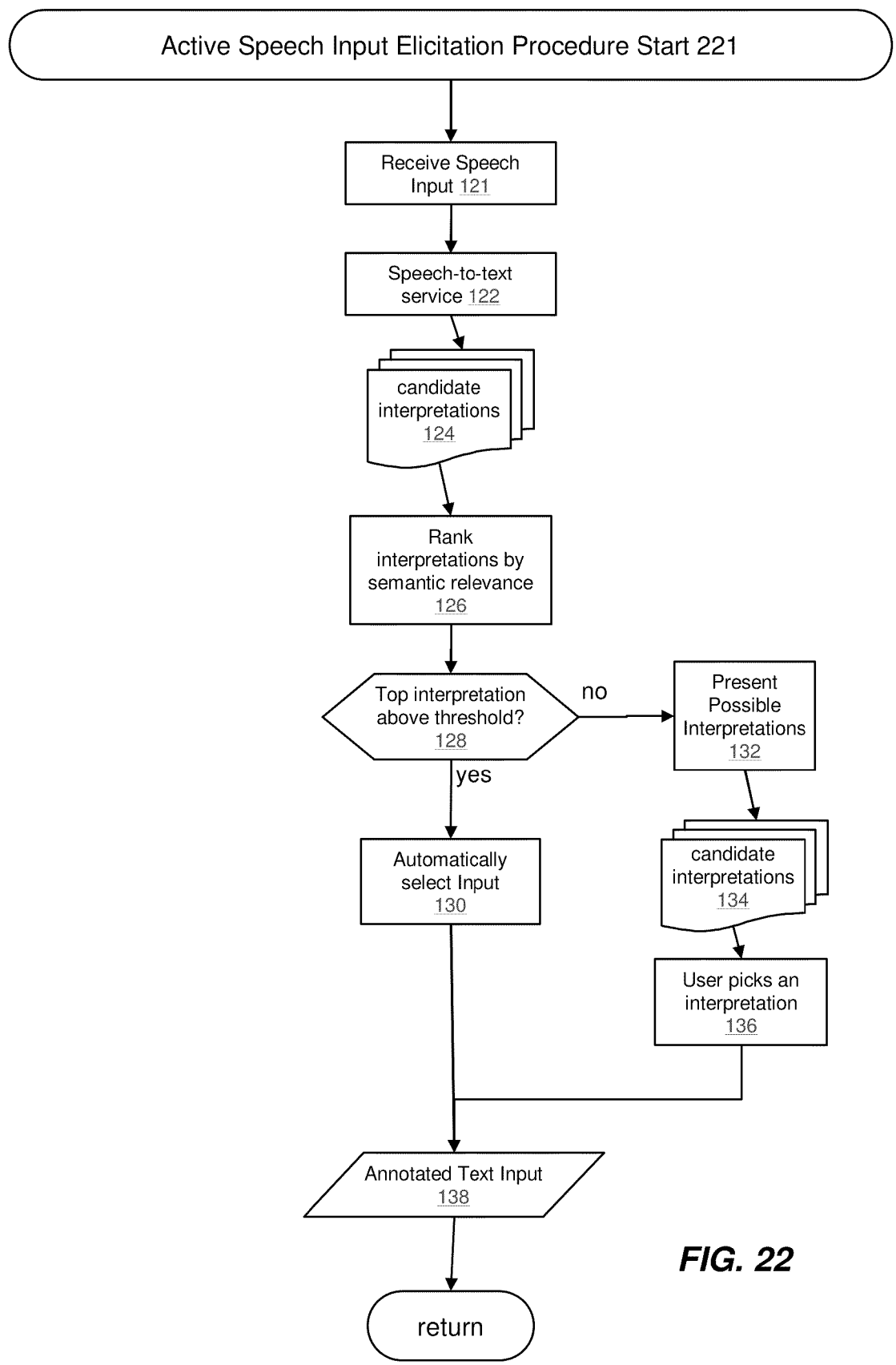
FIG. 22 is a flow diagram depicting a method for active input elicitation for voice or speech input according to one embodiment.

Referring now to FIG. 22, there is shown a flow diagram depicting a method for active input elicitation for voice or speech input according to one embodiment.

The method begins 221. Assistant 1002 receives voice or speech input 121 in the form of an auditory signal. A speech-to-text service 122 or processor generates a set of candidate text interpretations 124 of the auditory signal. In one embodiment, speech-to-text service 122 is implemented using, for example, Nuance Recognizer, available from Nuance Communications, Inc. of Burlington, Mass.

In one embodiment, assistant 1002 employs statistical language models to generate candidate text interpretations 124 of speech input 121.

In addition, in one embodiment, the statistical language models are tuned to look for words, names, and phrases that occur in the various models of assistant 1002 shown in FIG. 8. For example, in at least one embodiment the statistical language models are given words, names, and phrases from some or all of: domain models 1056 (e.g., words and phrases relating to restaurant and meal events), task flow models 1086 (e.g., words and phrases relating to planning an event), dialog flow models 1087 (e.g., words and phrases related to the constraints that are needed to gather the inputs for a restaurant reservation), domain entity databases 1072 (e.g., names of restaurants), vocabulary databases 1058 (e.g., names of cuisines), service models 1088 (e.g., names of service provides such as OpenTable), and/or any words, names, or phrases associated with any node of active ontology 1050.

In one embodiment, the statistical language models are also tuned to look for words, names, and phrases from long-term personal memory 1054. For example, statistical language models can be given text from to-do items, list items, personal notes, calendar entries, people names in contacts/address books, email addresses, street or city names mentioned in contact/address books, and the like.

A ranking component analyzes the candidate interpretations 124 and ranks 126 them according to how well they fit syntactic and/or semantic models of intelligent automated assistant 1002. Any sources of constraints on user input may be used. For example, in one embodiment, assistant 1002 may rank the output of the speech-to-text interpreter according to how well the interpretations parse in a syntactic and/or semantic sense, a domain model, task flow model, and/or dialog model, and/or the like: it evaluates how well various combinations of words in the text interpretations 124 would fit the concepts, relations, entities, and properties of active ontology 1050 and its associated models. For example, if speech-to-text service 122 generates the two candidate interpretations "italian food for lunch" and "italian shoes for lunch", the ranking by semantic relevance 126 might rank "italian food for lunch" higher if it better matches the nodes assistant's 1002 active ontology 1050 (e.g., the words "italian", "food" and "lunch" all match nodes in ontology 1050 and they are all connected by relationships in ontology 1050, whereas the word "shoes" does not match ontology 1050 or matches a node that is not part of the dining out domain network).

Figure 28:
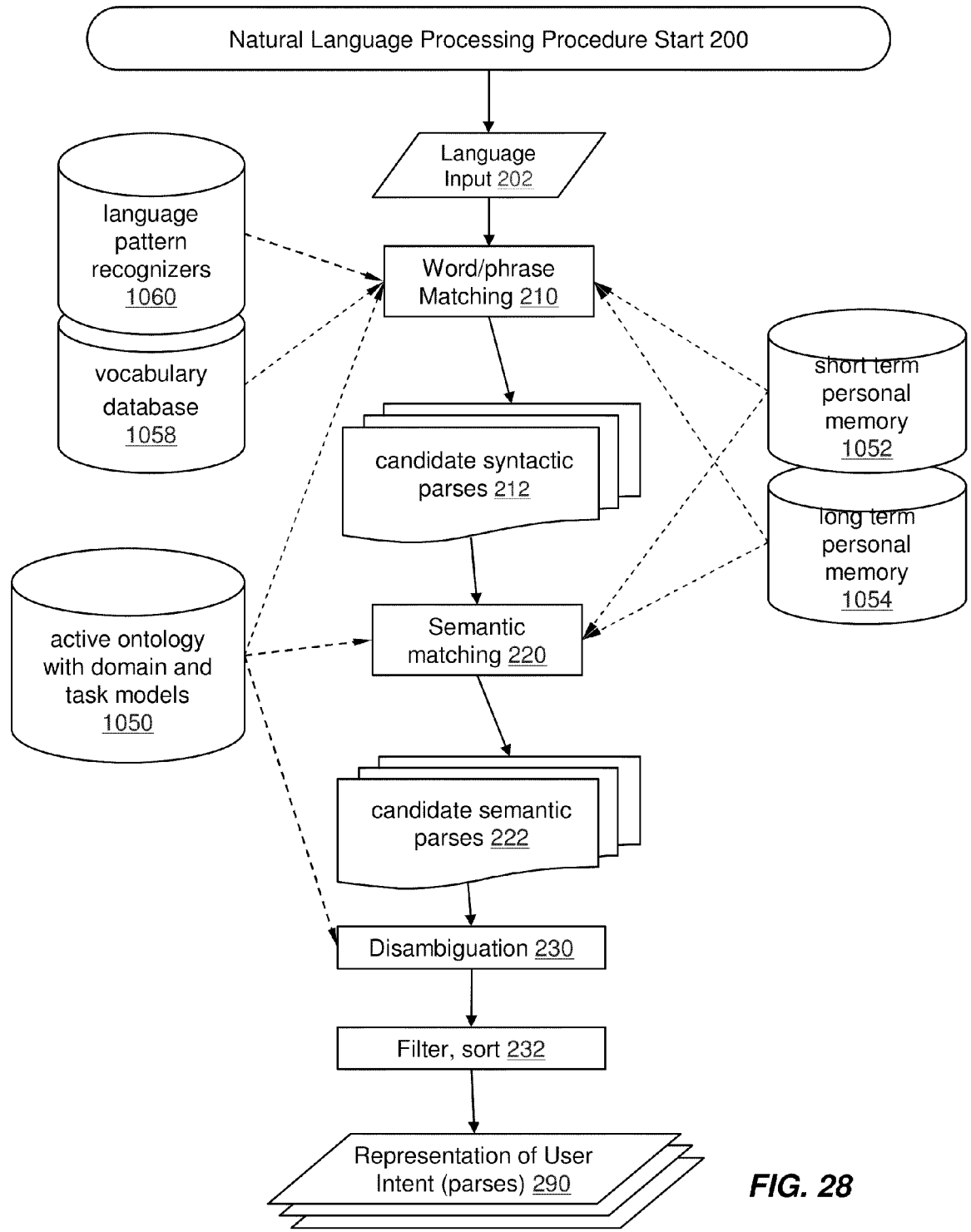
FIG. 28 is a flow diagram depicting an example of a method for natural language processing according to one embodiment.

In various embodiments, algorithms or procedures used by assistant 1002 for interpretation of text inputs, including any embodiment of the natural language processing procedure shown in FIG. 28, can be used to rank and score candidate text interpretations 124 generated by speech-to-text service 122.

In one embodiment, if ranking component 126 determines 128 that the highest-ranking speech interpretation from interpretations 124 ranks above a specified threshold, the highest-ranking interpretation may be automatically selected 130. If no interpretation ranks above a specified threshold, possible candidate interpretations of speech 134 are presented 132 to the user. The user can then select 136 among the displayed choices.

In various embodiments, user selection 136 among the displayed choices can be achieved by any mode of input, including for example any of the modes of multimodal input described in connection with FIG. 26. Such input modes include, without limitation, actively elicited typed input 2610, actively elicited speech input 2620, actively presented GUI for input 2640, and/or the like. In one embodiment, the user can select among candidate interpretations 134, for example by tapping or speaking. In the case of speaking, the possible interpretation of the new speech input is highly constrained by the small set of choices offered 134. For example, if offered "Did you mean italian food or Italian shoes?" the user can just say "food" and the assistant can match this to the phrase "italian food" and not get it confused with other global interpretations of the input.

Whether input is automatically selected 130 or selected 136 by the user, the resulting input 138 is returned. In at least one embodiment, the returned input is annotated 138, so that information about which choices were made in step 136 is preserved along with the textual input. This enables, for example, the semantic concepts or entities underlying a string to be associated with the string when it is returned, which improves accuracy of subsequent language interpretation.

For example, if "Italian food" was offered as one of the candidate interpretations 134 based on a semantic interpretation of Cuisine=ItalianFood, then the machine-readable semantic interpretation can be sent along with the user's selection of the string "Italian food" as annotated text input 138.

In at least one embodiment, candidate text interpretations 124 are generated based on speech interpretations received as output of speech-to-text service 122.

In at least one embodiment, candidate text interpretations 124 are generated by paraphrasing speech interpretations in terms of their semantic meaning. In some embodiments, there can be multiple paraphrases of the same speech interpretation, offering different word sense or homonym alternatives. For example, if speech-to-text service 122 indicates "place for meet", the candidate interpretations presented to the user could be paraphrased as "place to meet (local businesses)" and "place for meat (restaurants)".

In at least one embodiment, candidate text interpretations 124 include offers to correct substrings.

In at least one embodiment, candidate text interpretations 124 include offers to correct substrings of candidate interpretations using syntactic and semantic analysis as described herein.

In at least one embodiment, when the user selects a candidate interpretation, it is returned.

In at least one embodiment, the user is offered an interface to edit the interpretation before it is returned.

In at least one embodiment, the user is offered an interface to continue with more voice input before input is returned. This enables one to incrementally build up an input utterance, getting syntactic and semantic corrections, suggestions, and guidance at one iteration.

In at least one embodiment, the user is offered an interface to proceed directly from 136 to step 111 of a method of active typed input elicitation (described above in connection with FIG. 11). This enables one to interleave typed and spoken input, getting syntactic and semantic corrections, suggestions, and guidance at one step.

In at least one embodiment, the user is offered an interface to proceed directly from step 111 of an embodiment of active typed input elicitation to an embodiment of active speech input elicitation. This enables one to interleave typed and spoken input, getting syntactic and semantic corrections, suggestions, and guidance at one step.

Active GUI-Based Input Elicitation

Figure 23:
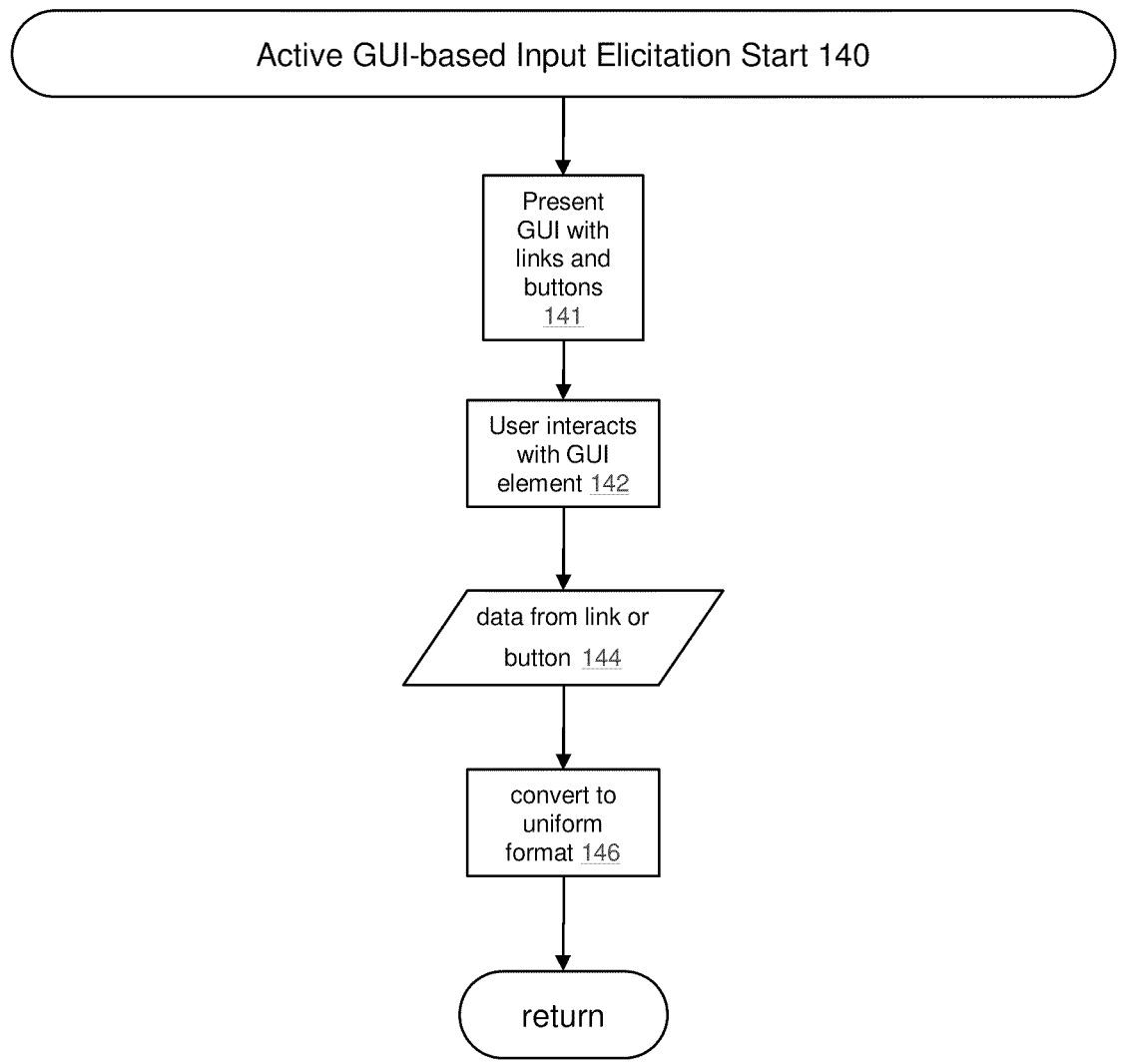
FIG. 23 is a flow diagram depicting a method for active input elicitation for GUI-based input according to one embodiment.

Referring now to FIG. 23, there is shown a flow diagram depicting a method for active input elicitation for GUI-based input according to one embodiment.

The method begins 140. Assistant 1002 presents 141 graphical user interface (GUI) on output device 1207, which may include, for example, links and buttons. The user interacts 142 with at least one GUI element. Data 144 is received, and converted 146 to a uniform format. The converted data is then returned.

In at least one embodiment, some of the elements of the GUI are generated dynamically from the models of the active ontology, rather than written into a computer program. For example, assistant 1002 can offer a set of constraints to guide a restaurant reservation service as regions for tapping on a screen, with each region representing the name of the constraint and/or a value. For instance, the screen could have rows of a dynamically generated GUI layout with regions for the constraints Cuisine, Location, and Price Range. If the models of the active ontology change, the GUI screen would automatically change without reprogramming.

Active Dialog Suggestion Input Elicitation

Figure 24:
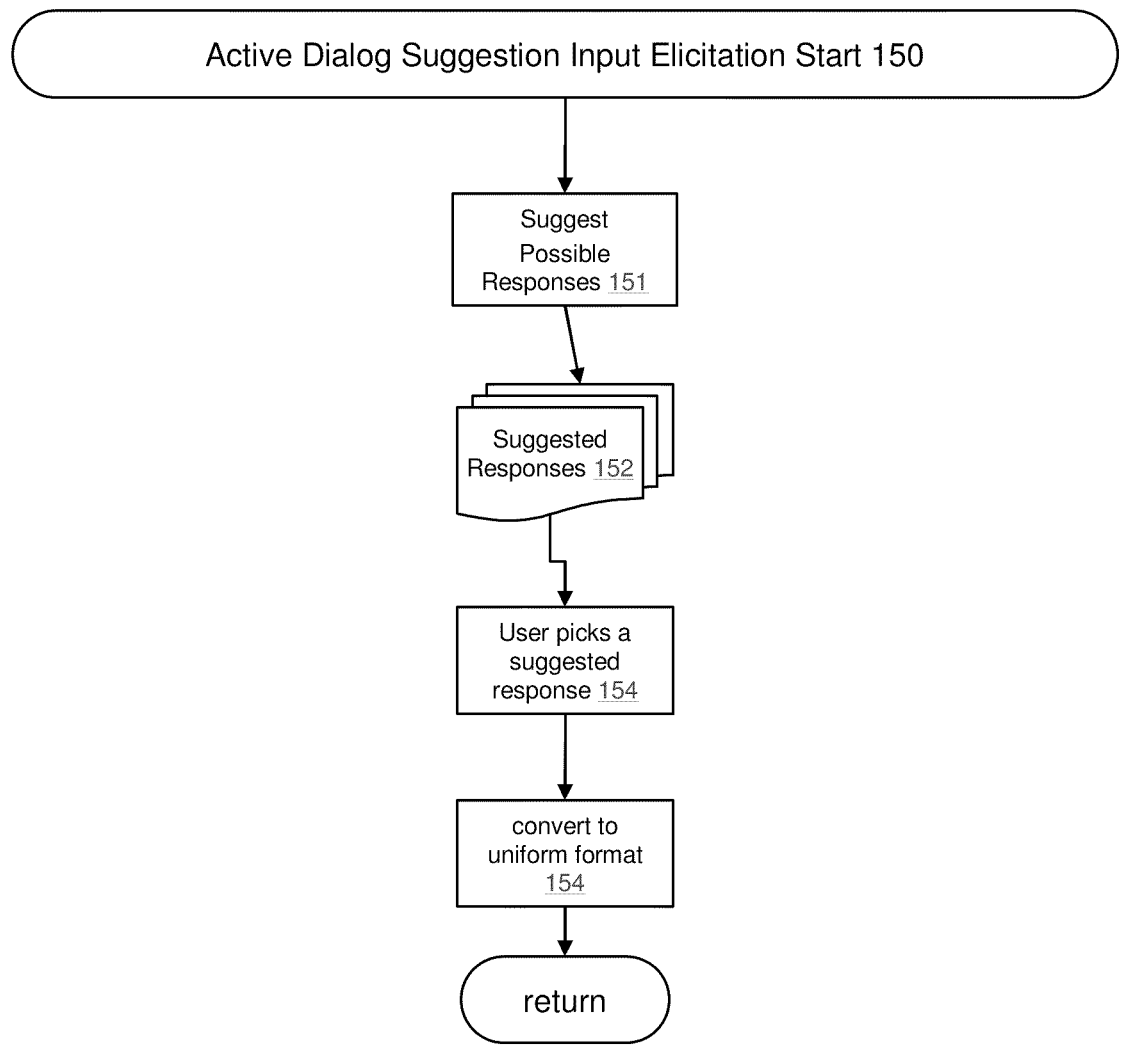
FIG. 24 is a flow diagram depicting a method for active input elicitation at the level of a dialog flow according to one embodiment.

FIG. 24 is a flow diagram depicting a method for active input elicitation at the level of a dialog flow according to one embodiment. The method begins 150. Assistant 1002 suggests 151 possible responses 152. The user selects 154 a suggested response. The received input is converted 154 to a uniform format. The converted data is then returned.

In at least one embodiment, the suggestions offered in step 151 are offered as follow-up steps in a dialog and/or task flow.

In at least one embodiment, the suggestions offer options to refine a query, for example using parameters from a domain and/or task model. For example, one may be offered to change the assumed location or time of a request.

In at least one embodiment, the suggestions offer options to choose among ambiguous alternative interpretations given by a language interpretation procedure or component.

In at least one embodiment, the suggestions offer options to choose among ambiguous alternative interpretations given by a language interpretation procedure or component.

In at least one embodiment, the suggestions offer options to choose among next steps in a workflow associated dialog flow model 1087. For example, dialog flow model 1087 may suggest that after gathering the constrained for one domain (e.g., restaurant dining), assistant 1002 should suggest other related domains (e.g., a movie nearby).

Active Monitoring for Relevant Events

In at least one embodiment, asynchronous events may be treated as inputs in an analogous manner to the other modalities of active elicited input. Thus, such events may be provided as inputs to assistant 1002. Once interpreted, such events can be treated in a manner similar to any other input.

For example, a flight status change may initiate an alert notification to be sent to a user. If a flight is indicated as being late, assistant 1002 may continue the dialog by presenting alternative flights, making other suggestions, and the like, based on the detected event.

Such events can be of any type. For example, assistant 1002 might detect that the user just got home, or is lost (off a specified route), or that a stock price hit a threshold value, or that a television show the user is interested in is starting, or that a musician of interest is touring in the area. In any of these situations, assistant 1002 can proceed with a dialog in substantially the same manner as if the user had him- or herself initiated the inquiry. In one embodiment, events can even be based on data provided from other devices, for example to tell the user when a coworker has returned from lunch (the coworker's device can signal such an event to the user's device, at which time assistant 1002 installed on the user's device responds accordingly).

In one embodiment, the events can be notifications or alerts from a calendar, clock, reminder, or to-do application. For example, an alert from a calendar application about a dinner date can initiate a dialog with assistant 1002 about the dining event. The dialog can proceed as if the user had just spoken or typed the information about the upcoming dinner event, such as "dinner for 2 in San Francisco".

In one embodiment, the context of possible event trigger 162 (FIG. 25) can include information about people, places, times, and other data. These data can be used as part of the input to assistant 1002 to use in various steps of processing.

In one embodiment, these data from the context of event trigger 162 can be used to disambiguate speech or text inputs from the user. For example, if a calendar event alert includes the name of a person invited to the event, that information can help disambiguate input which might match several people with the same or similar name.

Figure 25:
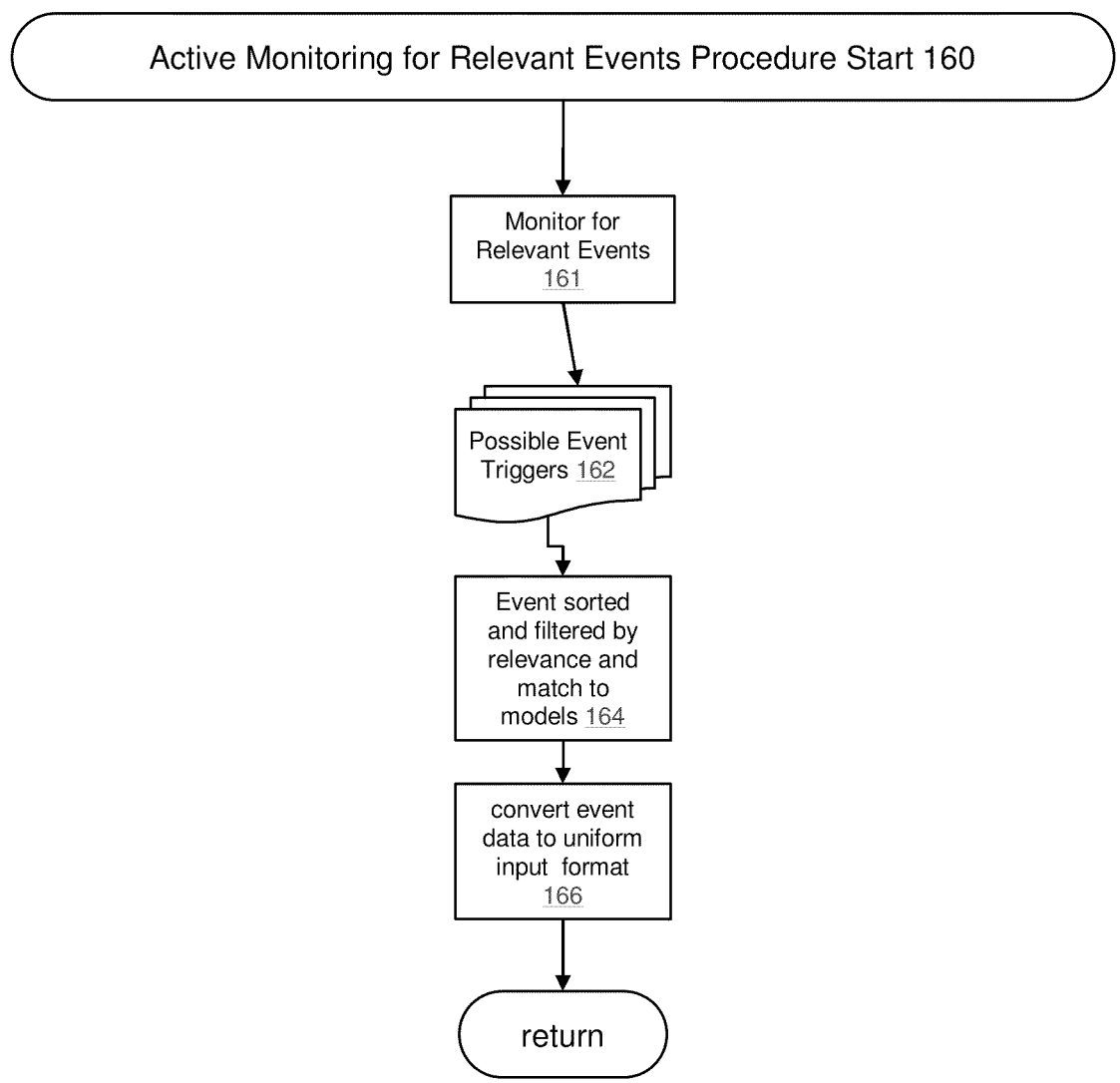
FIG. 25 is a flow diagram depicting a method for active monitoring for relevant events according to one embodiment.

Referring now to FIG. 25, there is shown a flow diagram depicting a method for active monitoring for relevant events according to one embodiment. In this example, event trigger events are sets of input 162. Assistant 1002 monitors 161 for such events. Detected events may be filtered and sorted 164 for semantic relevance using models, data and information available from other components in intelligent automated assistant 1002. For example, an event that reports a change in flight status may be given higher relevance if the short-term or long-term memory records for a user indicate that the user is on that flight and/or have made inquiries about it to assistant 1002. This sorting and filtering may then present only the top events for review by the user, who may then choose to pick one or more and act on them.

Event data is converted 166 to a uniform input format, and returned.

In at least one embodiment, assistant 1002 may proactively offer services associated with events that were suggested for user attention. For example, if a flight status alert indicates a flight may be missed, assistant 1002 may suggest to the user a task flow for re-planning the itinerary or booking a hotel.

Input Elicitation Component(s) Example:

The following example is intended to help illustrate some of the various types of functions, operations, actions, and/or other features which may be provided by active input elicitation component(s) 1094.

Example: Command Completion (What can the User Say to Assistant 1002?)

The user is facing a text input box with the general instruction to enter "what do you want to do?" Depending on the context and the user input, any of several system responses are provided. Examples are shown below Case: Null Input

| User Input | System Response | Comment |
|---|---|---|
| With an empty field and no dialog context, type a question or space character, or enter nothing for some period of time. | | Find restaurants, hotels, movies, . . . Book a table, a room, a seat, . . . Order food, flowers, . . . Buy a ticket, a book, a DVD, . . . Schedule a meeting, an event, . . . Remember to a thing to do . . . Explain results | Black text would be inserted into the input field. Italicized text would be the follow-up suggestions once the text was inserted. |

Case: First Word Input

| User Input | System Response | Comment |
|---|---|---|
| With empty dialog context If the user types the first letter of any command, it is suggested. For example F| | Find restaurants, hotels, movies, . . . | Black text would be inserted into the input field. Italicized text would be the follow-up suggestions once the text was inserted. |

Case: Key Word Input

| User Input | System Response | Comment |
|---|---|---|
| With empty dialog context If the user types the first two letters of any keyword, it | Remember to a thing to do . . . Find restaurants by location, cuisine, | Black text would be inserted into the input field. Italicized text would be the |

-continued

| User Input | System Response | Comment |
|---|---|---|
| is suggested as well as command. For example Re| | | follow-up suggestions once the text was inserted. |

Case: Prompting for Arguments

| User Input | System Response | Comment |
|---|---|---|
| The user has entered or selected a "command" verb and nothing else. For example, Find_| | restaurants by location, cuisine, . . . hotels by location, availability, . . . movies by location, genre, . . . name of place | Offer not only the selection class but advertise the constraint options. Note that name of place is a just a prompt, and would not insert text. |

Case: Suggesting Criteria

| User Input | System Response | Comment |
|---|---|---|
| The user has already entered enough to establish a task and domain, and now is prompted for constraints in order. Find restaurants_| | in city, zip code near home, office, place name named restaurant name | Black text would be inserted into the input field. Italicized text would be the follow-up suggestions once the text was inserted. |

Case: Adding Criteria

| User Input | System Response | Comment |
|---|---|---|
| The user has said "in" and now is prompted for locations Find restaurants in_| | city, zip code Palo Alto, CA Menlo Park, CA | Until they enter the next word, the suggestions are a prompt for what kind of thing to type. The Places are cities from personal memory. The Places are one or more places from personal memory. |
| The user has said "near" and now is prompted for locations Find restaurants near_| | my home my work Palo Alto, CA Menlo Park, CA | |

Case: Adding Location or Other Constraints

| User Input | System Response | Comment |
|---|---|---|
| Find restaurants in Palo Alto_| | serving food type or cuisine with availability tonight, tomorrow, . . . described as romantic, good service | Prompt for other constraints |
| Find restaurants in Palo Alto with availability_| | tonight tomorrow at 7 pm at 9 pm other time or date | The 7:00 and 9:00 are our suggestions based on current time |

Case: Starting from Constraint, Unknown Task or Domain

| User Input | System Response | Comment |
|---|---|---|
| romantic_| | restaurants by location, cuisine, . . . hotels by location, availability, . . . movies by location, genre, . . . | Constraint value from ontology tells you which selection classes to use. |
| comedy_| | movies by location, genre, . . . events by location, . . . clubs by location | "comedy" is a constraint value for genre in movies, a genre in events, and "comedy clubs" is a local directory business category |

Example: Name Completion

Here, the user has typed some text without accepting any of the commands, or he or she is just extending a command with an entity name. The system may attempt to complete the names, depending on context. It also disambiguates the domain.

Case: Words without Context

| User Input | System Response | Comment |
|---|---|---|
| il for | Il Fornaio (restaurant) Ill Forgotten Gains (movie) | May require entity name lookup. Notice multi-word completion. Show domain as a suggestion. |
| tom cruise | movies | May require entity name lookup. |
| romantic | movies restaurants | Based on ontology only |

Case: Name with Context

| User Input | System Response | Comment |
|---|---|---|
| Find restaurants il for | Il Fornaio (restaurant) | May require entity name lookup. Uses selection class and location context from current and past queries to constrain completion. Show domain as a suggestion. |
| tom cruise Find movies rom | movies romantic Roman Holiday (movie) | May require entity name lookup. Based on ontology only |
| g-rated | movies | |

Example: Choosing Values from a Set

Here, the user is responding to a system request to enter a value for a specific parameter, such as location, time, cuisine, or genre. The user may either select from a list or enter a value. As she types, matching items from the list are shown as options. Examples are shown below.

Case: Valueclass Selection

| User Input | System Response | Comment |
|---|---|---|
| Restaurants serving | burgers Ice cream Hot dogs | User may type anything else and doesn't have to pick from the menu. |
| Restaurants serving h | Hamburgers Hot dogs Hot sauce | |
| Movies playing | today tonight Friday night | |

Example: Reusing Previous Commands

Previous queries are also options to complete on in an autocomplete interface. They may be just matched as strings (when the input field is empty there are no known constraints) or they may be suggested as relevant when in certain situations.

Case: Completion on Previous Queries

| User Input | System Response | Comment |
|---|---|---|
| Ital | Italian restaurants (normal completion) Films starring Italian actors (recent query) | Using string matching to retrieve previous queries |
| Lunch | lunch places in marin (recent query) buy the book naked lunch | |

Example: Retrieving Personal Memory Items

Assistant 1002 may remember certain events and/or entities in personal memory associated with the user. Autocomplete can be performed based on such remembered items. Examples appear below.

Case: Completion on Events and Entities in Personal Memory

| User Input | System Response | Comment |
|---|---|---|
| Mary | lunch with Mary on Saturday (from My Events) films called "Something about Mary" | |
| Lunch | lunch with Mary on Saturday (from My Events) buy the book naked lunch (from My Todos) | |
| Hob | Hobee's Restaurant in Palo Alto (from My Restaurants) | |

Multimodal Active Input Elicitation

In at least one embodiment, active input elicitation component(s) 1094 may process input from a plurality of input modalities. At least one modality might be implemented with an active input elicitation procedure that takes advantages of the particular kinds of inputs and methods for selecting from suggested options. A described herein, they may be embodiments of procedures for active input elicitation for text input, speech input, GUI-based input, input in the context of a dialog, and/or input resulting from event triggers.

In at least one embodiment, for a single instance of intelligent automated assistant 1002, there may be support for one or more (or any combination of) typed input, speech input, GUI input, dialog input, and/or event input.

Figure 26:
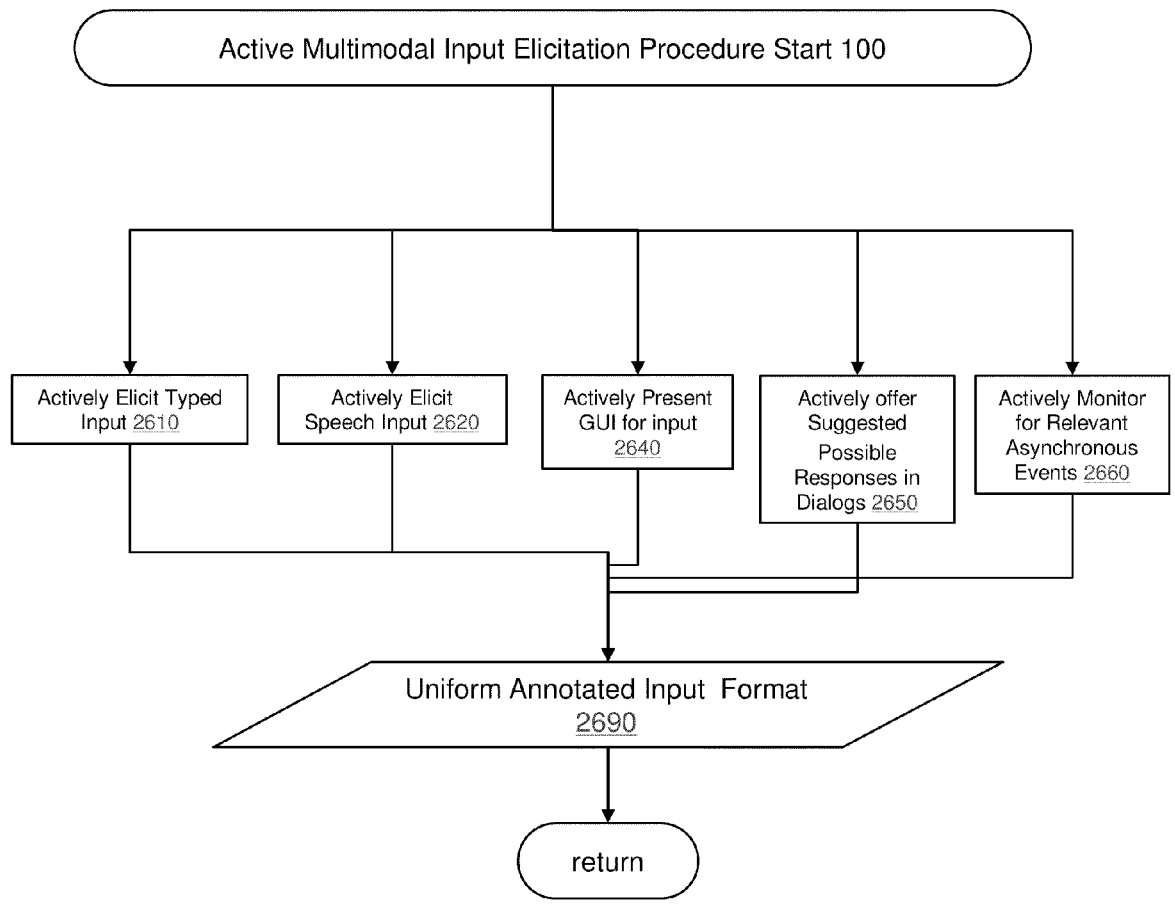
FIG. 26 is a flow diagram depicting a method for multimodal active input elicitation according to one embodiment.

Referring now to FIG. 26, there is shown a flow diagram depicting a method for multimodal active input elicitation according to one embodiment. The method begins 100. Inputs may be received concurrently from one or more or any combination of the input modalities, in any sequence. Thus, the method includes actively eliciting typed input 2610, speech input 2620, GUI-based input 2640, input in the context of a dialog 2650, and/or input resulting from event triggers 2660. Any or all of these input sources are unified into unified input format 2690 and returned. Unified input format 2690 enables the other components of intelligent automated assistant 1002 to be designed and to operate independently of the particular modality of the input.

Offering active guidance for multiple modalities and levels enables constraint and guidance on the input beyond those available to isolated modalities. For example, the kinds of suggestions offered to choose among speech, text, and dialog steps are independent, so their combination is a significant improvement over adding active elicitation techniques to individual modalities or levels.

Combining multiple sources of constraints as described herein (syntactic/linguistic, vocabulary, entity databases, domain models, task models, service models, and the like) and multiple places where these constraints may be actively applied (speech, text, GUI, dialog, and asynchronous events) provides a new level of functionality for human-machine interaction.

Domain Models Component(s) 1056

Domain models 1056 component(s) include representations of the concepts, entities, relations, properties, and instances of a domain. For example, dining out domain model 1622 might include the concept of a restaurant as a business with a name and an address and phone number, the concept of a meal event with a party size and date and time associated with the restaurant.

In at least one embodiment, domain models component(s) 1056 of assistant 1002 may be operable to perform and/or implement various types of functions, operations, actions, and/or other features such as, for example, one or more of the following (or combinations thereof):

Domain model component(s) 1056 may be used by automated assistant 1002 for several processes, including: eliciting input 100, interpreting natural language 200, dispatching to services 400, and generating output 600.

Domain model component(s) 1056 may provide lists of words that might match a domain concept or entity, such as names of restaurants, which may be used for active elicitation of input 100 and natural language processing 200.

Domain model component(s) 1056 may classify candidate words in processes, for instance, to determine that a word is the name of a restaurant.

Domain model component(s) 1056 may show the relationship between partial information for interpreting natural language, for example that cuisine may be associated with business entities (e.g., "local Mexican food" may be interpreted as "find restaurants with style=Mexican", this inference is possible because of the information in domain model 1056).

Domain model component(s) 1056 may organize information about services used in service orchestration 1082, for example, that a particular web service may provide reviews of restaurants.

Domain model component(s) 1056 may provide the information for generating natural language paraphrases and other output formatting, for example, by providing canonical ways of describing concepts, relations, properties and instances.

According to specific embodiments, multiple instances or threads of the domain models component(s) 1056 may be concurrently implemented and/or initiated via the use of one or more processors 63 and/or other combinations of hardware and/or hardware and software. For example, in at least some embodiments, various aspects, features, and/or functionalities of domain models component(s) 1056 may be performed, implemented and/or initiated by one or more of the following types of systems, components, systems, devices, procedures, processes, and the like (or combinations thereof):

Domain models component(s) 1056 may be implemented as data structures that represent concepts, relations, properties, and instances. These data structures may be stored in memory, files, or databases.

Access to domain model component(s) 1056 may be implemented through direct APIs, network APIs, database query interfaces, and/or the like.

Creation and maintenance of domain models component(s) 1056 may be achieved, for example, via direct editing of files, database transactions, and/or through the use of domain model editing tools.

Domain models component(s) 1056 may be implemented as part of or in association with active ontologies 1050, which combine models with instantiations of the models for servers and users.

According to various embodiments, one or more different threads or instances of domain models component(s) 1056 may be initiated in response to detection of one or more conditions or events satisfying one or more different types of minimum threshold criteria for triggering initiation of at least one instance of domain models component(s) 1056. For example, trigger initiation and/or implementation of one or more different threads or instances of domain models component(s) 1056 may be triggered when domain model information is required, including during input elicitation, input interpretation, task and domain identification, natural language processing, service orchestration, and/or formatting output for users.

In at least one embodiment, a given instance of domain models component(s) 1056 may access and/or utilize information from one or more associated databases. In at least one embodiment, at least a portion of the database information may be accessed via communication with one or more local and/or remote memory devices. For example, data from domain model component(s) 1056 may be associated with other model modeling components including vocabulary 1058, language pattern recognizers 1060, dialog flow models 1087, task flow models 1086, service capability models 1088, domain entity databases 1072, and the like. For example, businesses in domain entity databases 1072 that are classified as restaurants might be known by type identifiers which are maintained in the dining out domain model components.

Figure 27:
FIG. 27 is a set of screen shots illustrating an example of various types of functions, operations, actions, and/or other features which may be provided by domain models component(s) and services orchestration according to one embodiment.

Domain Models Component(s) Example:

Referring now to FIG. 27, there is shown a set of screen shots illustrating an example of various types of functions, operations, actions, and/or other features which may be provided by domain models component(s) 1056 according to one embodiment.

In at least one embodiment, domain models component(s) 1056 are the unifying data representation that enables the presentation of information shown in screens 103A and 103B about a restaurant, which combines data from several distinct data sources and services and which includes, for example: name, address, business categories, phone number, identifier for saving to long term personal memory, identifier for sharing over email, reviews from multiple sources, map coordinates, personal notes, and the like.

Language Interpreter Component(s) 1070

In at least one embodiment, language interpreter component(s) 1070 of assistant 1002 may be operable to perform and/or implement various types of functions, operations, actions, and/or other features such as, for example, one or more of the following (or combinations thereof):

Analyze user input and identify a set of parse results.
User input can include any information from the user and his/her device context that can contribute to understanding the user's intent, which can include, for example one or more of the following (or combinations thereof): sequences of words, the identity of gestures or GUI elements involved in eliciting the input, current context of the dialog, current device application and its current data objects, and/or any other personal dynamic data obtained about the user such as location, time, and the like. For example, user input is in the form of the uniform annotated input format 2690 resulting from active input elicitation 1094.

Parse results are associations of data in the user input with concepts, relationships, properties, instances, and/or other nodes and/or data structures in models, databases, and/or other representations of user intent and/or context. Parse result associations can be complex mappings from sets and sequences of words, signals, and other elements of user input to one or more associated concepts, relations, properties, instances, other nodes, and/or data structures described herein.

Analyze user input and identify a set of syntactic parse results, which are parse results that associate data in the user input with structures that represent syntactic parts of speech, clauses and phrases including multiword names, sentence structure, and/or other grammatical graph structures. Syntactic parse results are described in element 212 of natural language processing procedure described in connection with FIG. 28.

Analyze user input and identify a set of semantic parse results, which are parse results that associate data in the user input with structures that represent concepts, relationships, properties, entities, quantities, propositions, and/or other representations of meaning and user intent. In one embodiment, these representations of meaning and intent are represented by sets of and/or elements of and/or instances of models or databases and/or nodes in ontologies, as described in element 220 of natural language processing procedure described in connection with FIG. 28.

Disambiguate among alternative syntactic or semantic parse results as described in element 230 of natural language processing procedure described in connection with FIG. 28.

Determine whether a partially typed input is syntactically and/or semantically meaningful in an autocomplete procedure such as one described in connection with FIG. 11.

Help generate suggested completions 114 in an autocomplete procedure such as one described in connection with FIG. 11.

Determine whether interpretations of spoken input are syntactically and/or semantically meaningful in a speech input procedure such as one described in connection with FIG. 22.

According to specific embodiments, multiple instances or threads of language interpreter component(s) 1070 may be concurrently implemented and/or initiated via the use of one or more processors 63 and/or other combinations of hardware and/or hardware and software.

According to different embodiments, one or more different threads or instances of language interpreter component(s) 1070 may be initiated in response to detection of one or more conditions or events satisfying one or more different types of minimum threshold criteria for triggering initiation of at least one instance of language interpreter component(s) 1070. Various examples of conditions or events which may trigger initiation and/or implementation of one or more different threads or instances of language interpreter component(s) 1070 may include, but are not limited to, one or more of the following (or combinations thereof):

while eliciting input, including but not limited to
Suggesting possible completions of typed input 114 (FIG. 11);
Ranking interpretations of speech 126 (FIG. 22);
When offering ambiguities as suggested responses in dialog 152 (FIG. 24);

when the result of eliciting input is available, including when input is elicited by any mode of active multimodal input elicitation 100.

In at least one embodiment, a given instance of language interpreter component(s) 1070 may access and/or utilize information from one or more associated databases. In at least one embodiment, at least a portion of such database information may be accessed via communication with one or more local and/or remote memory devices. Examples of different types of data which may be accessed by the Language Interpreter component(s) may include, but are not limited to, one or more of the following (or combinations thereof):

Domain models 1056;
Vocabulary 1058;
Domain entity databases 1072;
Short term personal memory 1052;
Long term personal memory 1054;
Task flow models 1086;
Dialog flow models 1087;
Service capability models 1088.

Figure 29:
FIG. 29 is a screen shot illustrating natural language processing according to one embodiment.

Referring now also to FIG. 29, there is shown a screen shot illustrating natural language processing according to one embodiment. The user has entered (via voice or text) language input 2902 consisting of the phrase "who is playing this weekend at the fillmore". This phrase is echoed back to the user on screen 2901. Language interpreter component(s) 1070 component process input 2902 and generates a parse result. The parse result associates that input with a request to show the local events that are scheduled for any of the upcoming weekend days at any event venue whose name matches "fillmore". A paraphrase of the parse results is shown as 2903 on screen 2901.

Referring now also to FIG. 28, there is shown a flow diagram depicting an example of a method for natural language processing according to one embodiment.

The method begins 200. Language input 202 is received, such as the string "who is playing this weekend at the fillmore" in the example of FIG. 29. In one embodiment, the input is augmented by current context information, such as the current user location and local time. In word/phrase matching 210, language interpreter component(s) 1070 find associations between user input and concepts. In this example, associations are found between the string "playing" and the concept of listings at event venues; the string "this weekend" (along with the current local time of the user) and an instantiation of an approximate time period that represents the upcoming weekend; and the string "fillmore" with the name of a venue. Word/phrase matching 210 may use data from, for example, language pattern recognizers 1060, vocabulary database 1058, active ontology 1050, short term personal memory 1052, and long term personal memory 1054.

Language interpreter component(s) 1070 generate candidate syntactic parses 212 which include the chosen parse result but may also include other parse results. For example, other parse results may include those wherein "playing" is associated with other domains such as games or with a category of event such as sporting events.

Short- and/or long-term memory 1052, 1054 can also be used by language interpreter component(s) 1070 in generating candidate syntactic parses 212. Thus, input that was provided previously in the same session, and/or known information about the user, can be used, to improve performance, reduce ambiguity, and reinforce the conversational nature of the interaction. Data from active ontology 1050, domain models 1056, and task flow models 1086 can also be used, to implement evidential reasoning in determining valid candidate syntactic parses 212.

In semantic matching 220, language interpreter component(s) 1070 consider combinations of possible parse results according to how well they fit semantic models such as domain models and databases. In this case, the parse includes the associations (1) "playing" (a word in the user input) as "Local Event At Venue" (part of a domain model 1056 represented by a cluster of nodes in active ontology 1050) and (2) "fillmore" (another word in the input) as a match to an entity name in a domain entity database 1072 for Local Event Venues, which is represented by a domain model element and active ontology node (Venue Name).

Semantic matching 220 may use data from, for example, active ontology 1050, short term personal memory 1052, and long term personal memory 1054. For example, semantic matching 220 may use data from previous references to venues or local events in the dialog (from short term personal memory 1052) or personal favorite venues (from long term personal memory 1054).

A set of candidate, or potential, semantic parse results is generated 222.

In disambiguation step 230, language interpreter component(s) 1070 weigh the evidential strength of candidate semantic parse results 222. In this example, the combination of the parse of "playing" as "Local Event At Venue" and the match of "fillmore" as a Venue Name is a stronger match to a domain model than alternative combinations where, for instance, "playing" is associated with a domain model for sports but there is no association in the sports domain for "fillmore".

Disambiguation 230 may use data from, for example, the structure of active ontology 1050. In at least one embodiment, the connections between nodes in an active ontology provide evidential support for disambiguating among candidate semantic parse results 222. For example, in one embodiment, if three active ontology nodes are semantically matched and are all connected in active ontology 1050, this indicates higher evidential strength of the semantic parse than if these matching nodes were not connected or connected by longer paths of connections in active ontology 1050. For example, in one embodiment of semantic matching 220, the parse that matches both Local Event At Venue and Venue Name is given increased evidential support because the combined representations of these aspects of the user intent are connected by links and/or relations in active ontology 1050: in this instance, the Local Event node is connected to the Venue node which is connected to the Venue Name node which is connected to the entity name in the database of venue names.

In at least one embodiment, the connections between nodes in an active ontology that provide evidential support for disambiguating among candidate semantic parse results 222 are directed arcs, forming an inference lattice, in which matching nodes provide evidence for nodes to which they are connected by directed arcs.

In 232, language interpreter component(s) 1070 sort and select 232 the top semantic parses as the representation of user intent 290.

Domain Entity Database(s) 1072

In at least one embodiment, domain entity database(s) 1072 may be operable to perform and/or implement various types of functions, operations, actions, and/or other features such as, for example, one or more of the following (or combinations thereof):

Store data about domain entities. Domain entities are things in the world or computing environment that may be modeled in domain models. Examples may include, but are not limited to, one or more of the following (or combinations thereof):

Businesses of any kind;

Movies, videos, songs and/or other musical products, and/or any other named entertainment products;

Products of any kind;

Events;

Calendar entries;

Cities, states, countries, neighborhoods, and/or other geographic, geopolitical, and/or geospatial points or regions;

Named places such as landmarks, airports, and the like;

Provide database services on these databases, including but not limited to simple and complex queries, transactions, triggered events, and the like.

According to specific embodiments, multiple instances or threads of domain entity database(s) 1072 may be concurrently implemented and/or initiated via the use of one or more processors 63 and/or other combinations of hardware and/or hardware and software. For example, in at least some embodiments, various aspects, features, and/or functionalities of domain entity database(s) 1072 may be performed, implemented and/or initiated by database software and/or hardware residing on client(s) 1304 and/or on server(s) 1340.

One example of a domain entity database 1072 that can be used in connection with the present invention according to one embodiment is a database of one or more businesses storing, for example, their names and locations. The database might be used, for example, to look up words contained in an input request for matching businesses and/or to look up the location of a business whose name is known. One skilled in the art will recognize that many other arrangements and implementations are possible.

Vocabulary Component(s) 1058

In at least one embodiment, vocabulary component(s) 1058 may be operable to perform and/or implement various types of functions, operations, actions, and/or other features such as, for example, one or more of the following (or combinations thereof):

Provide databases associating words and strings with concepts, properties, relations, or instances of domain models or task models;

Vocabulary from vocabulary components may be used by automated assistant 1002 for several processes, including for example: eliciting input, interpreting natural language, and generating output.

According to specific embodiments, multiple instances or threads of vocabulary component(s) 1058 may be concurrently implemented and/or initiated via the use of one or more processors 63 and/or other combinations of hardware and/or hardware and software. For example, in at least some embodiments, various aspects, features, and/or functionalities of vocabulary component(s) 1058 may be implemented as data structures that associate strings with the names of concepts, relations, properties, and instances. These data structures may be stored in memory, files, or databases. Access to vocabulary component(s) 1058 may be implemented through direct APIs, network APIs, and/or database query interfaces. Creation and maintenance of vocabulary component(s) 1058 may be achieved via direct editing of files, database transactions, or through the use of domain model editing tools. Vocabulary component(s) 1058 may be implemented as part of or in association with active ontologies 1050. One skilled in the art will recognize that many other arrangements and implementations are possible.

According to different embodiments, one or more different threads or instances of vocabulary component(s) 1058 may be initiated in response to detection of one or more conditions or events satisfying one or more different types of minimum threshold criteria for triggering initiation of at least one instance of vocabulary component(s) 1058. In one embodiment, vocabulary component(s) 1058 are accessed whenever vocabulary information is required, including, for example, during input elicitation, input interpretation, and formatting output for users. One skilled in the art will recognize that other conditions or events may trigger initiation and/or implementation of one or more different threads or instances of vocabulary component(s) 1058.

In at least one embodiment, a given instance of vocabulary component(s) 1058 may access and/or utilize information from one or more associated databases. In at least one embodiment, at least a portion of the database information may be accessed via communication with one or more local and/or remote memory devices. In one embodiment, vocabulary component(s) 1058 may access data from external databases, for instance, from a data warehouse or dictionary.

Language Pattern Recognizer Component(s) 1060

In at least one embodiment, language pattern recognizer component(s) 1060 may be operable to perform and/or implement various types of functions, operations, actions, and/or other features such as, for example, looking for patterns in language or speech input that indicate grammatical, idiomatic, and/or other composites of input tokens. These patterns correspond to, for example, one or more of the following (or combinations thereof): words, names, phrases, data, parameters, commands, and/or signals of speech acts.

According to specific embodiments, multiple instances or threads of pattern recognizer component(s) 1060 may be concurrently implemented and/or initiated via the use of one or more processors 63 and/or other combinations of hardware and/or hardware and software. For example, in at least some embodiments, various aspects, features, and/or functionalities of language pattern recognizer component(s) 1060 may be performed, implemented and/or initiated by one or more files, databases, and/or programs containing expressions in a pattern matching language. In at least one embodiment, language pattern recognizer component(s) 1060 are represented declaratively, rather than as program code; this enables them to be created and maintained by editors and other tools other than programming tools. Examples of declarative representations may include, but are not limited to, one or more of the following (or combinations thereof): regular expressions, pattern matching rules, natural language grammars, parsers based on state machines and/or other parsing models.

One skilled in the art will recognize that other types of systems, components, systems, devices, procedures, processes, and the like (or combinations thereof) can be used for implementing language pattern recognizer component(s) 1060.

According to different embodiments, one or more different threads or instances of language pattern recognizer component(s) 1060 may be initiated in response to detection of one or more conditions or events satisfying one or more different types of minimum threshold criteria for triggering initiation of at least one instance of language pattern recognizer component(s) 1060. Various examples of conditions or events which may trigger initiation and/or implementation of one or more different threads or instances of language pattern recognizer component(s) 1060 may include, but are not limited to, one or more of the following (or combinations thereof):

during active elicitation of input, in which the structure of the language pattern recognizers may constrain and guide the input from the user;

during natural language processing, in which the language pattern recognizers help interpret input as language;

during the identification of tasks and dialogs, in which the language pattern recognizers may help identify tasks, dialogs, and/or steps therein.

In at least one embodiment, a given instance of language pattern recognizer component(s) 1060 may access and/or utilize information from one or more associated databases. In at least one embodiment, at least a portion of the database information may be accessed via communication with one or more local and/or remote memory devices. Examples of different types of data which may be accessed by language pattern recognizer component(s) 1060 may include, but are not limited to, data from any of the models various models and data sources that may be part of embodiments of assistant 1002, which may include, but are not limited to, one or more of the following (or combinations thereof):

Domain models 1056;
Vocabulary 1058;
Domain entity databases 1072;
Short term personal memory 1052;
Long term personal memory 1054;
Task flow models 1086;
Dialog flow models 1087;
Service capability models 1088.

In one embodiment, access of data from other parts of embodiments of assistant 1002 may be coordinated by active ontologies 1050.

Referring again to FIG. 14, there is shown an example of some of the various types of functions, operations, actions, and/or other features which may be provided by language pattern recognizer component(s) 1060. FIG. 14 illustrates language patterns that language pattern recognizer component(s) 1060 may recognize. For example, the idiom "what is happening" (in a city) may be associated with the task of event planning and the domain of local events.

Dialog Flow Processor Component(s) 1080

In at least one embodiment, dialog flow processor component(s) 1080 may be operable to perform and/or implement various types of functions, operations, actions, and/or other features such as, for example, one or more of the following (or combinations thereof):

Given a representation of the user intent 290 from language interpretation 200, identify the task a user wants performed and/or a problem the user wants solved. For example, a task might be to find a restaurant.

For a given problem or task, given a representation of user intent 290, identify parameters to the task or problem. For example, the user might be looking for a recommended restaurant that serves Italian food near the user's home. The constraints that a restaurant be recommended, serving Italian food, and near home are parameters to the task of finding a restaurant.

Given the task interpretation and current dialog with the user, such as that which may be represented in personal short term personal memory 1052, select an appropriate dialog flow model and determine a step in the flow model corresponding to the current state.

According to specific embodiments, multiple instances or threads of dialog flow processor component(s) 1080 may be concurrently implemented and/or initiated via the use of one or more processors 63 and/or other combinations of hardware and/or hardware and software.

In at least one embodiment, a given instance of dialog flow processor component(s) 1080 may access and/or utilize information from one or more associated databases. In at least one embodiment, at least a portion of the database information may be accessed via communication with one or more local and/or remote memory devices. Examples of different types of data which may be accessed by dialog flow processor component(s) 1080 may include, but are not limited to, one or more of the following (or combinations thereof):

task flow models 1086;
domain models 1056;
dialog flow models 1087.

Figure 30:
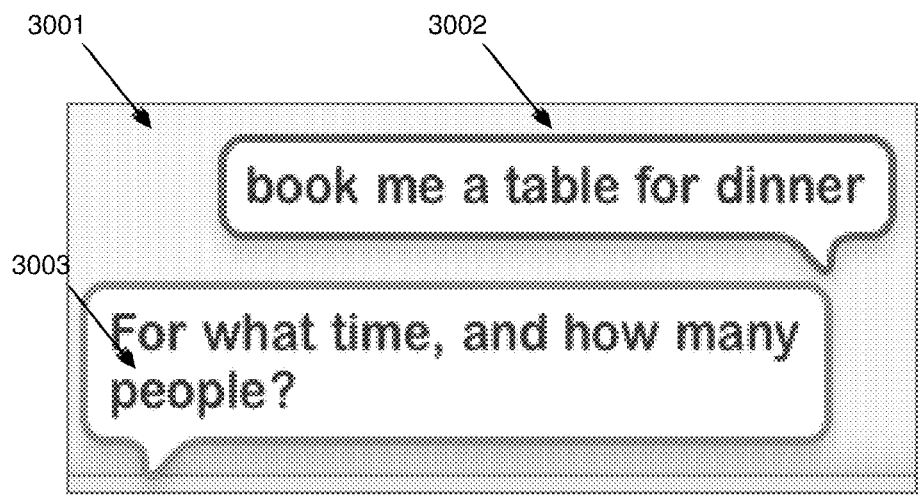
FIGS. 30 and 31 are screen shots illustrating an example of various types of functions, operations, actions, and/or other features which may be provided by dialog flow processor component(s) according to one embodiment.
Figure 31:
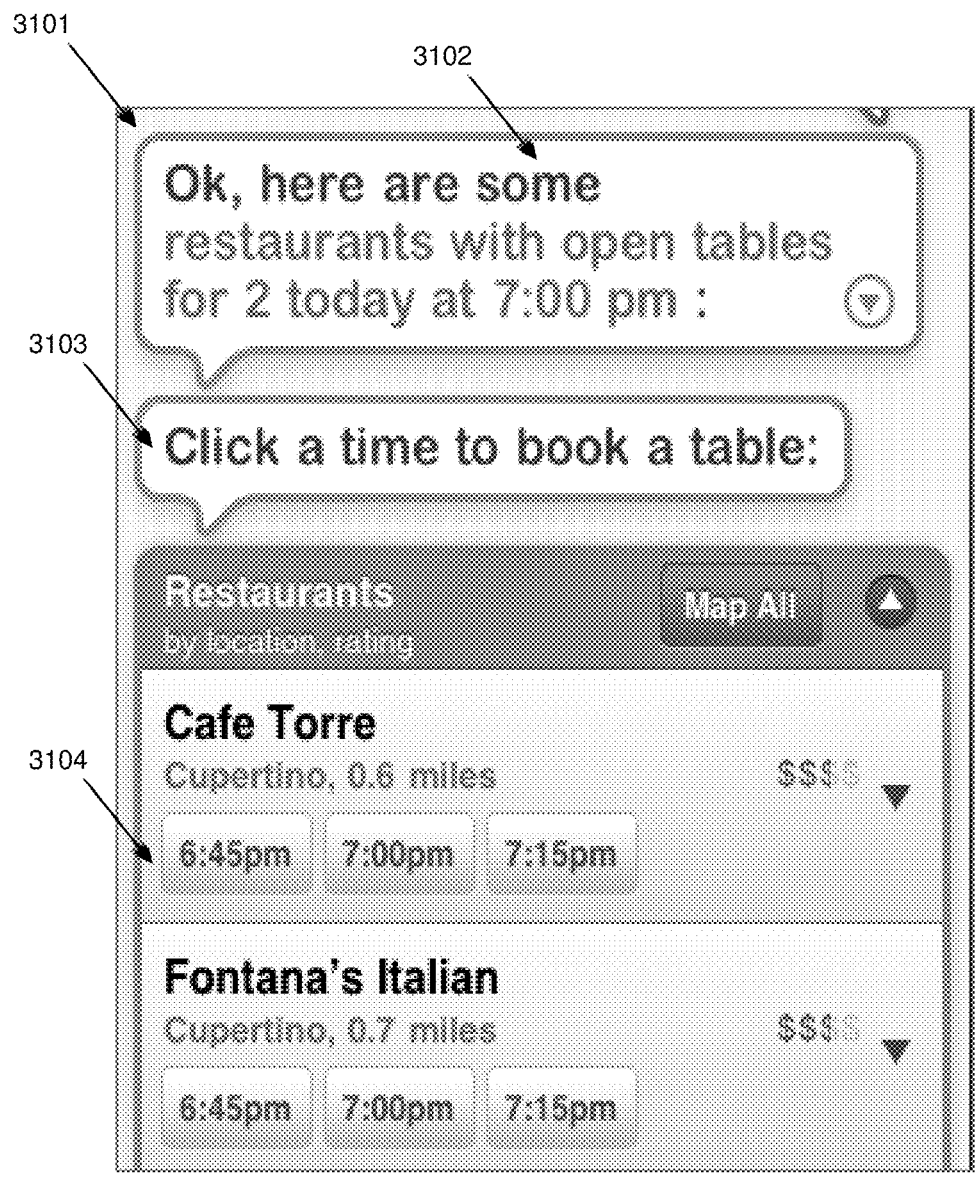

Referring now to FIGS. 30 and 31, there are shown screen shots illustrating an example of various types of functions, operations, actions, and/or other features which may be provided by dialog flow processor component(s) according to one embodiment.

As shown in screen 3001, user requests a dinner reservation by providing speech or text input 3002 "book me a table for dinner". Assistant 1002 generates a prompt 3003 asking the user to specify time and party size.

Once these parameters have been provided, screen 3101 is shown. Assistant 1002 outputs a dialog box 3102 indicating that results are being presented, and a prompt 3103 asking the user to click a time. Listings 3104 are also displayed.

In one embodiment, such a dialog is implemented as follows. Dialog flow processor component(s) 1080 are given a representation of user intent from language interpreter component 1070 and determine that the appropriate response is to ask the user for information required to perform the next step in a task flow. In this case, the domain is restaurants, the task is getting a reservation, and the dialog step is to ask the user for information required to accomplish the next step in the task flow. This dialog step is exemplified by prompt 3003 of screen 3001.

Figure 32:
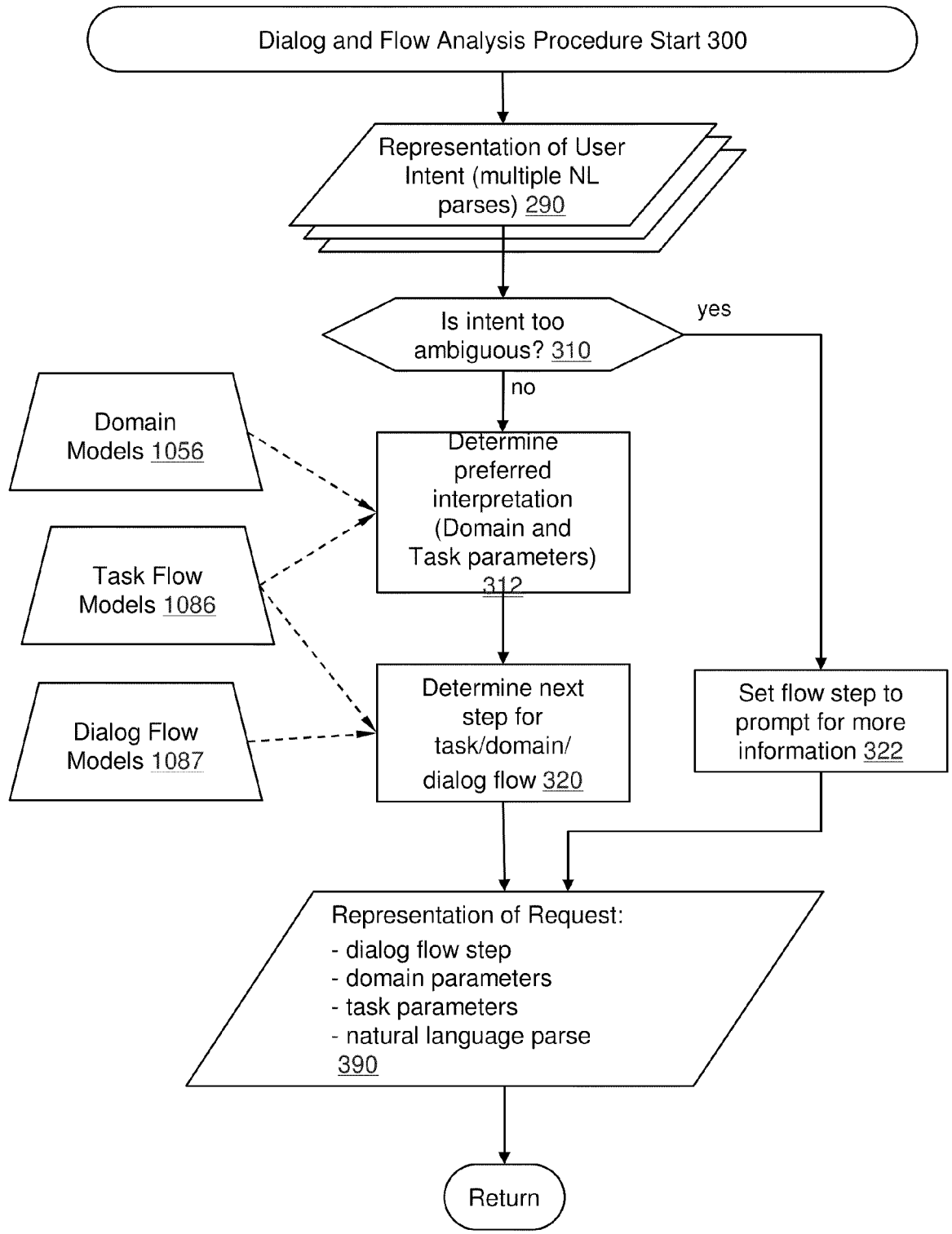
FIG. 32 is a flow diagram depicting a method of operation for dialog flow processor component(s) according to one embodiment.

Referring now also to FIG. 32, there is shown a flow diagram depicting a method of operation for dialog flow processor component(s) 1080 according to one embodiment. The flow diagram of FIG. 32 is described in connection with the example shown in FIGS. 30 and 31.

The method begins 300. Representation of user intent 290 is received. As described in connection with FIG. 28, in one embodiment, representation of user intent 290 is a set of semantic parses. For the example shown in FIGS. 30 and 31, the domain is restaurants, the verb is "book" associated with restaurant reservations, and the time parameter is the evening of the current day.

In 310, dialog flow processor component(s) 1080 determine whether this interpretation of user intent is supported strongly enough to proceed, and/or if it is better supported than alternative ambiguous parses. In the current example, the interpretation is strongly supported, with no competing ambiguous parses. If, on the other hand, there are competing ambiguities or sufficient uncertainty, then step 322 is performed, to set the dialog flow step so that the execution phase causes the dialog to output a prompt for more information from the user.

In 312, the dialog flow processor component(s) 1080 determine the preferred interpretation of the semantic parse with other information to determine the task to perform and its parameters. Information may be obtained, for example, from domain models 1056, task flow models 1086, and/or dialog flow models 1087, or any combination thereof. In the current example, the task is identified as getting a reservation, which involves both finding a place that is reservable and available, and effecting a transaction to reserve a table. Task parameters are the time constraint along with others that are inferred in step 312.

In 320, the task flow model is consulted to determine an appropriate next step. Information may be obtained, for example, from domain models 1056, task flow models 1086, and/or dialog flow models 1087, or any combination thereof. In the example, it is determined that in this task flow the next step is to elicit missing parameters to an availability search for restaurants, resulting in prompt 3003 illustrated in FIG. 30, requesting party size and time for a reservation.

As described above, FIG. 31 depicts screen 3101 is shown including dialog element 3102 that is presented after the user answers the request for the party size and reservation time. In one embodiment, screen 3101 is presented as the result of another iteration through an automated call and response procedure, as described in connection with FIG. 33, which leads to another call to the dialog and flow procedure depicted in FIG. 32. In this instantiation of the dialog and flow procedure, after receiving the user preferences, dialog flow processor component(s) 1080 determines a different task flow step in step 320: to do an availability search. When request 390 is constructed, it includes the task parameters sufficient for dialog flow processor component(s) 1080 and services orchestration component(s) 1082 to dispatch to a restaurant booking service.

Dialog Flow Models Component(s) 1087

In at least one embodiment, dialog flow models component(s) 1087 may be operable to provide dialog flow models, which represent the steps one takes in a particular kind of conversation between a user and intelligent automated assistant 1002. For example, the dialog flow for the generic task of performing a transaction includes steps for getting the necessary data for the transaction and confirming the transaction parameters before committing it.

Task Flow Models Component(s) 1086

In at least one embodiment, task flow models component(s) 1086 may be operable to provide task flow models, which represent the steps one takes to solve a problem or address a need. For example, the task flow for getting a dinner reservation involves finding a desirable restaurant, checking availability, and doing a transaction to get a reservation for a specific time with the restaurant.

According to specific embodiments, multiple instances or threads of task flow models component(s) 1086 may be concurrently implemented and/or initiated via the use of one or more processors 63 and/or other combinations of hardware and/or hardware and software. For example, in at least some embodiments, various aspects, features, and/or functionalities of task flow models component(s) 1086 may be may be implemented as programs, state machines, or other ways of identifying an appropriate step in a flow graph.

In at least one embodiment, task flow models component(s) 1086 may use a task modeling framework called generic tasks. Generic tasks are abstractions that model the steps in a task and their required inputs and generated outputs, without being specific to domains. For example, a generic task for transactions might include steps for gathering data required for the transaction, executing the transaction, and outputting results of the transaction—all without reference to any particular transaction domain or service for implementing it. It might be instantiated for a domain such as shopping, but it is independent of the shopping domain and might equally well apply to domains of reserving, scheduling, and the like.

At least a portion of the functions, operations, actions, and/or other features associated with task flow models component(s) 1086 and/or procedure(s) described herein may be implemented, at least in part, using concepts, features, components, processes, and/or other aspects disclosed herein in connection with generic task modeling framework.

Additionally, at least a portion of the functions, operations, actions, and/or other features associated with task flow models component(s) 1086 and/or procedure(s) described herein may be implemented, at least in part, using concepts, features, components, processes, and/or other aspects relating to constrained selection tasks, as described herein. For example, one embodiment of generic tasks may be implemented using a constrained selection task model.

In at least one embodiment, a given instance of task flow models component(s) 1086 may access and/or utilize information from one or more associated databases. In at least one embodiment, at least a portion of the database information may be accessed via communication with one or more local and/or remote memory devices. Examples of different types of data which may be accessed by task flow models component(s) 1086 may include, but are not limited to, one or more of the following (or combinations thereof):

Domain models 1056;
Vocabulary 1058;
Domain entity databases 1072;
Short term personal memory 1052;
Long term personal memory 1054;
Dialog flow models 1087;
Service capability models 1088.

Figure 34:
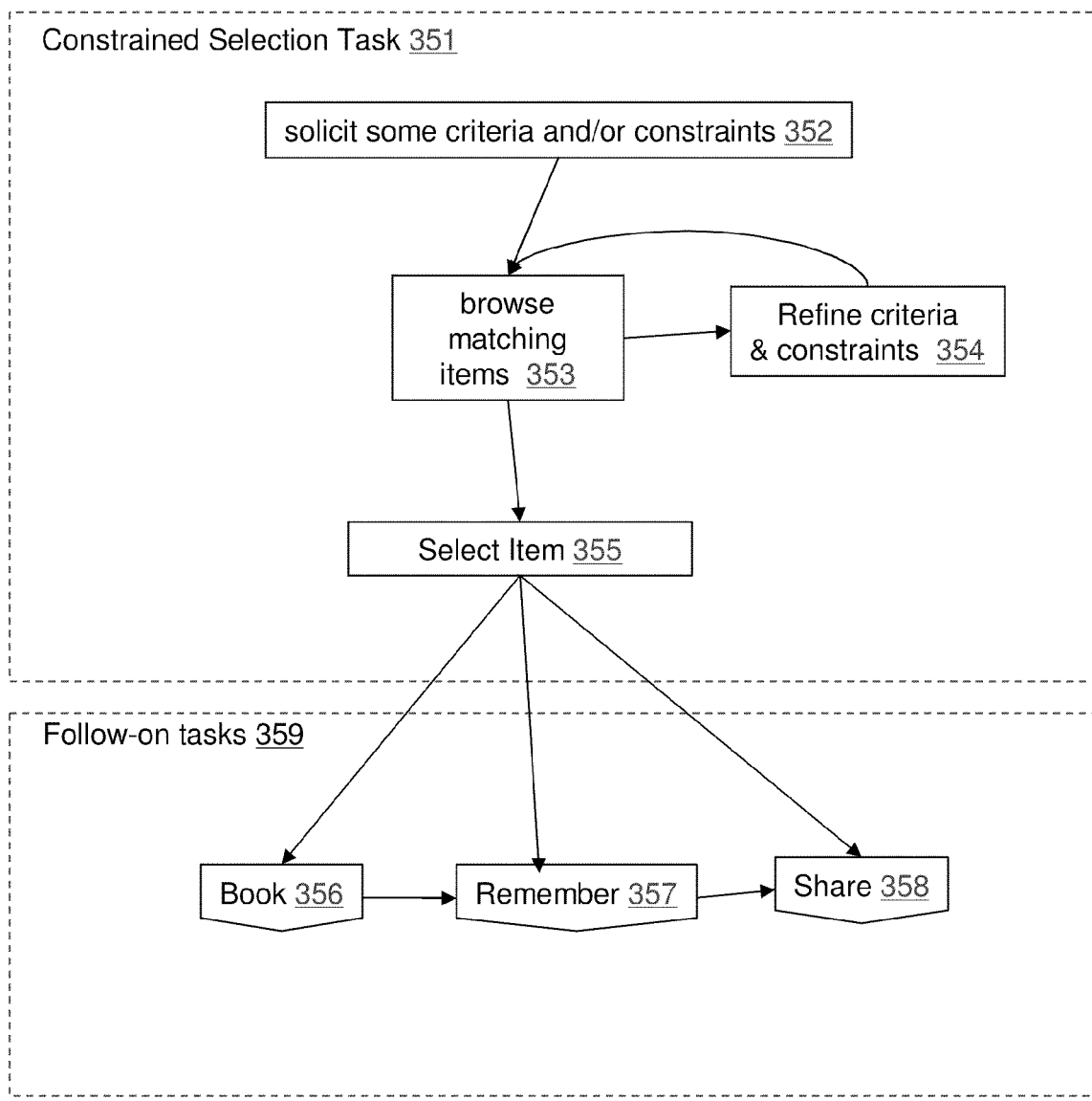
FIG. 34 is a flow diagram depicting an example of task flow for a constrained selection task according to one embodiment.

Referring now to FIG. 34, there is shown a flow diagram depicting an example of task flow for a constrained selection task 351 according to one embodiment.

Constrained selection is a kind of generic task in which the goal is to select some item from a set of items in the world based on a set of constraints. For example, a constrained selection task 351 may be instantiated for the domain of restaurants. Constrained selection task 351 starts by soliciting criteria and constraints from the user 352. For example, the user might be interested in Asian food and may want a place to eat near his or her office.

In step 353, assistant 1002 presents items that meet the stated criteria and constraints for the user to browse. In this example, it may be a list of restaurants and their properties which may be used to select among them.

In step 354, the user is given an opportunity to refine criteria and constraints. For example, the user might refine the request by saying "near my office". The system would then present a new set of results in step 353.

Figure 35:
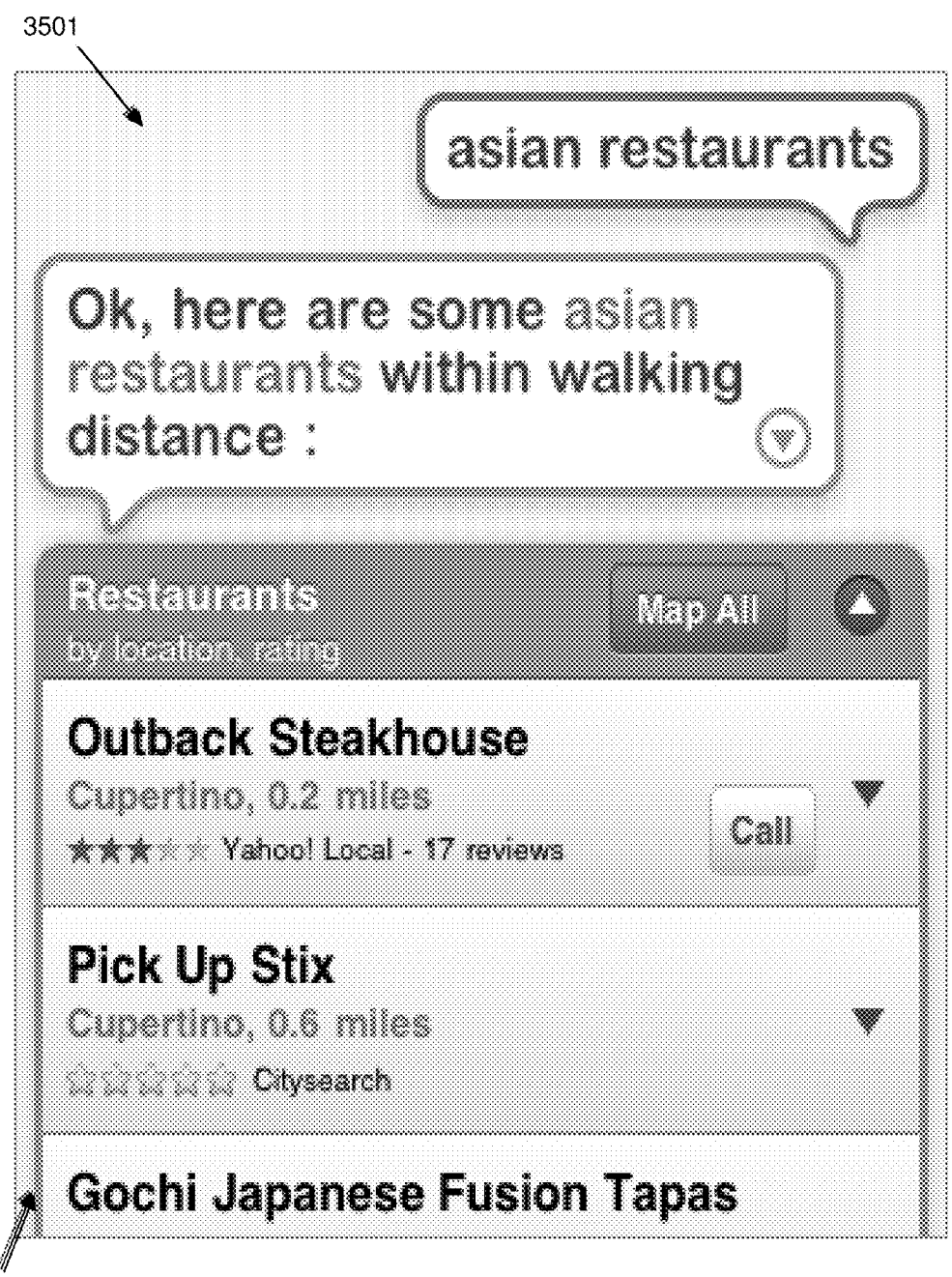
FIGS. 35 and 36 are screen shots illustrating an example of the operation of constrained selection task according to one embodiment.

Referring now also to FIG. 35, there is shown an example of screen 3501 including list 3502 of items presented by constrained selection task 351 according to one embodiment.

In step 355, the user can select among the matching items. Any of a number of follow-on tasks 359 may then be made available, such as for example book 356, remember 357, or share 358. In various embodiments, follow-on tasks 359 can involve interaction with web-enabled services, and/or with functionality local to the device (such as setting a calendar appointment, making a telephone call, sending an email or text message, setting an alarm, and the like).

Figure 36:
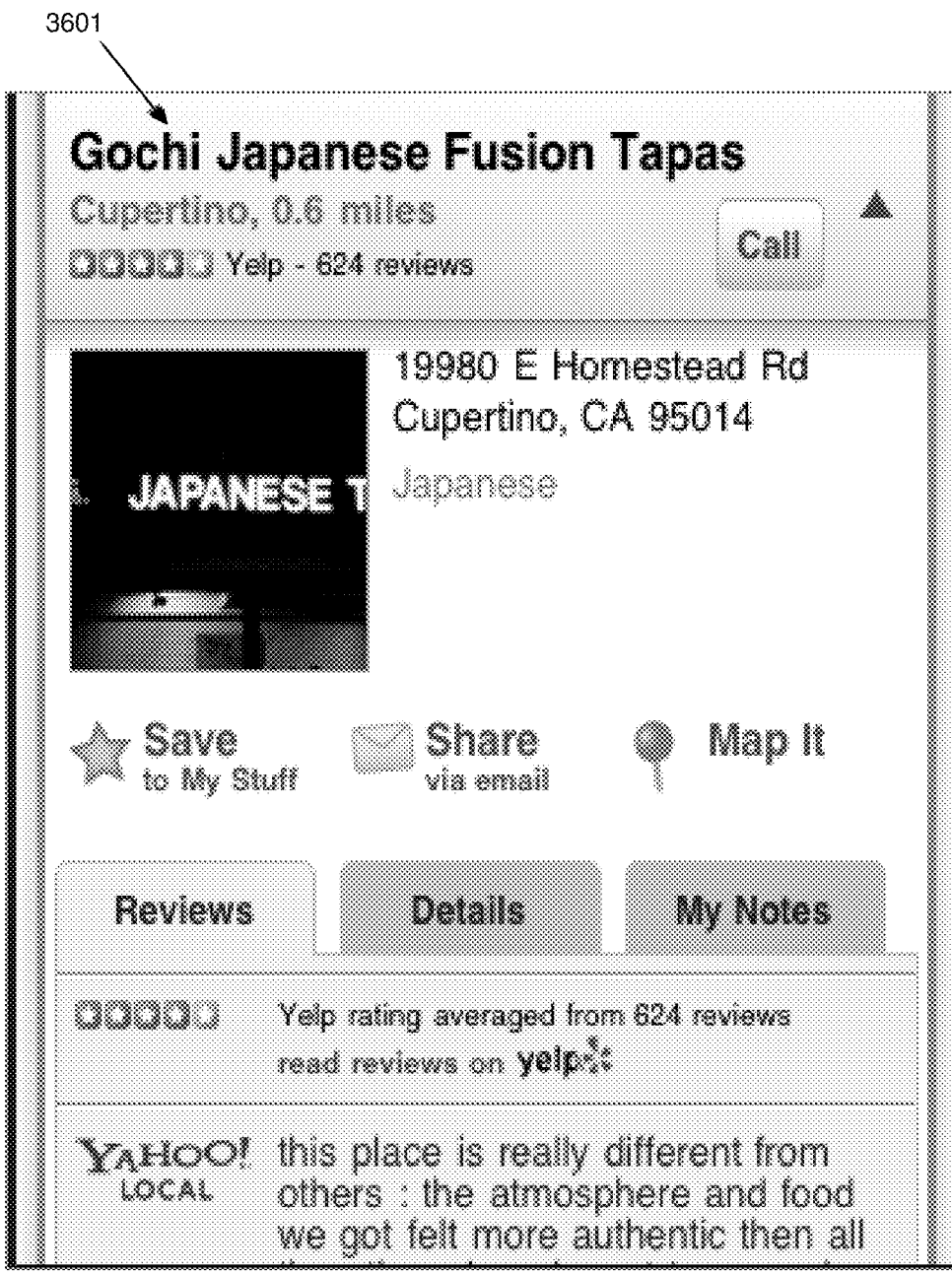

In the example of FIG. 35, the user can select an item within list 3502 to see more details and to perform additional actions. Referring now also to FIG. 36, there is shown an example of screen 3601 after the user has selected an item from list 3502. Additional information and options corresponding to follow-on tasks 359 concerning the selected item are displayed.

In various embodiments, the flow steps may be offered to the user in any of several input modalities, including but not limited to any combination of explicit dialog prompts and GUI links.

Services Component(s) 1084

Services component(s) 1084 represent the set of services that intelligent automated assistant 1002 might call on behalf of the user. Any service that can be called may be offered in a services component 1084.

In at least one embodiment, services component(s) 1084 may be operable to perform and/or implement various types of functions, operations, actions, and/or other features such as, for example, one or more of the following (or combinations thereof):

Provide the functions over an API that would normally be provided by a web-based user interface to a service. For example, a review website might provide a service API that would return reviews of a given entity automatically when called by a program. The API offers to intelligent automated assistant 1002 the services that a human would otherwise obtain by operating the user interface of the website.

Provide the functions over an API that would normally be provided by a user interface to an application. For example, a calendar application might provide a service API that would return calendar entries automatically when called by a program. The API offers to intelligent automated assistant 1002 the services that a human would otherwise obtain by operating the user interface of the application. In one embodiment, assistant 1002 is able to initiate and control any of a number of different functions available on the device. For example, if assistant 1002 is installed on a smartphone, personal digital assistant, tablet computer, or other device, assistant 1002 can perform functions such as: initiate applications, make calls, send emails and/or text messages, add calendar events, set alarms, and the like. In one embodiment, such functions are activated using services component(s) 1084.

Provide services that are not currently implemented in a user interface, but that are available through an API to assistant in larger tasks. For example, in one embodiment, an API to take a street address and return machine-readable geo-coordinates might be used by assistant 1002 as a service component 1084 even if it has no direct user interface on the web or a device.

According to specific embodiments, multiple instances or threads of services component(s) 1084 may be concurrently implemented and/or initiated via the use of one or more processors 63 and/or other combinations of hardware and/or hardware and software. For example, in at least some embodiments, various aspects, features, and/or functionalities of services component(s) 1084 may be performed, implemented and/or initiated by one or more of the following types of systems, components, systems, devices, procedures, processes, and the like (or combinations thereof):

implementation of an API exposed by a service, locally or remotely or any combination;

inclusion of a database within automated assistant 1002 or a database service available to assistant 1002.

For example, a website that offers users an interface for browsing movies might be used by an embodiment of intelligent automated assistant 1002 as a copy of the database used by the website. Services component(s) 1084 would then offer an internal API to the data, as if it were provided over a network API, even though the data is kept locally.

As another example, services component(s) 1084 for an intelligent automated assistant 1002 that helps with restaurant selection and meal planning might include any or all of the following set of services which are available from third parties over the network:

a set of restaurant listing services which lists restaurants matching name, location, or other constraints;

a set of restaurant rating services which return rankings for named restaurants;

a set of restaurant reviews services which returns written reviews for named restaurants;

a geocoding service to locate restaurants on a map;

a reservation service that enables programmatic reservation of tables at restaurants.

Services Orchestration Component(s) 1082

Services orchestration component(s) 1082 of intelligent automated assistant 1002 executes a service orchestration procedure.

In at least one embodiment, services orchestration component(s) 1082 may be operable to perform and/or implement various types of functions, operations, actions, and/or other features such as, for example, one or more of the following (or combinations thereof):

Dynamically and automatically determine which services may meet the user's request and/or specified domain(s) and task(s);

Dynamically and automatically call multiple services, in any combination of concurrent and sequential ordering;

Dynamically and automatically transform task parameters and constraints to meet input requirements of service APIs;

Dynamically and automatically monitor for and gather results from multiple services;

Dynamically and automatically merge service results data from various services into to a unified result model;

Orchestrate a plurality of services to meet the constraints of a request;

Orchestrate a plurality of services to annotate an existing result set with auxiliary information;

Output the result of calling a plurality of services in a uniform, service independent representation that unifies the results from the various services (for example, as a result of calling several restaurant services that return lists of restaurants, merge the data on at least one restaurant from the several services, removing redundancy).

For example, in some situations, there may be several ways to accomplish a particular task. For example, user input such as "remind me to leave for my meeting across town at 2 pm" specifies an action that can be accomplished in at least three ways: set alarm clock; create a calendar event; or call a to-do manager. In one embodiment, services orchestration component(s) 1082 makes the determination as to which way to best satisfy the request.

Services orchestration component(s) 1082 can also make determinations as to which combination of several services would be best to invoke in order to perform a given overall task. For example, to find and reserve a table for dinner, services orchestration component(s) 1082 would make determinations as to which services to call in order to perform such functions as looking up reviews, getting availability, and making a reservation. Determination of which services to use may depend on any of a number of different factors. For example, in at least one embodiment, information about reliability, ability of service to handle certain types of requests, user feedback, and the like, can be used as factors in determining which service(s) is/are appropriate to invoke.

According to specific embodiments, multiple instances or threads of services orchestration component(s) 1082 may be concurrently implemented and/or initiated via the use of one or more processors and/or other combinations of hardware and/or hardware and software.

In at least one embodiment, a given instance of services orchestration component(s) 1082 may use explicit service capability models 1088 to represent the capabilities and other properties of external services, and reason about these capabilities and properties while achieving the features of services orchestration component(s) 1082. This affords advantages over manually programming a set of services that may include, for example, one or more of the following (or combinations thereof):

Ease of development;
Robustness and reliability in execution;
The ability to dynamically add and remove services without disrupting code;
The ability to implement general distributed query optimization algorithms that are driven by the properties and capabilities rather than hard coded to specific services or APIs.

In at least one embodiment, a given instance of services orchestration component(s) 1082 may access and/or utilize information from one or more associated databases. In at least one embodiment, at least a portion of the database information may be accessed via communication with one or more local and/or remote memory devices. Examples of different types of data which may be accessed by services orchestration component(s) 1082 may include, but are not limited to, one or more of the following (or combinations thereof):

Instantiations of domain models;
Syntactic and semantic parses of natural language input;
Instantiations of task models (with values for parameters);
Dialog and task flow models and/or selected steps within them;
Service capability models 1088;
Any other information available in an active ontology 1050.

Figure 37:
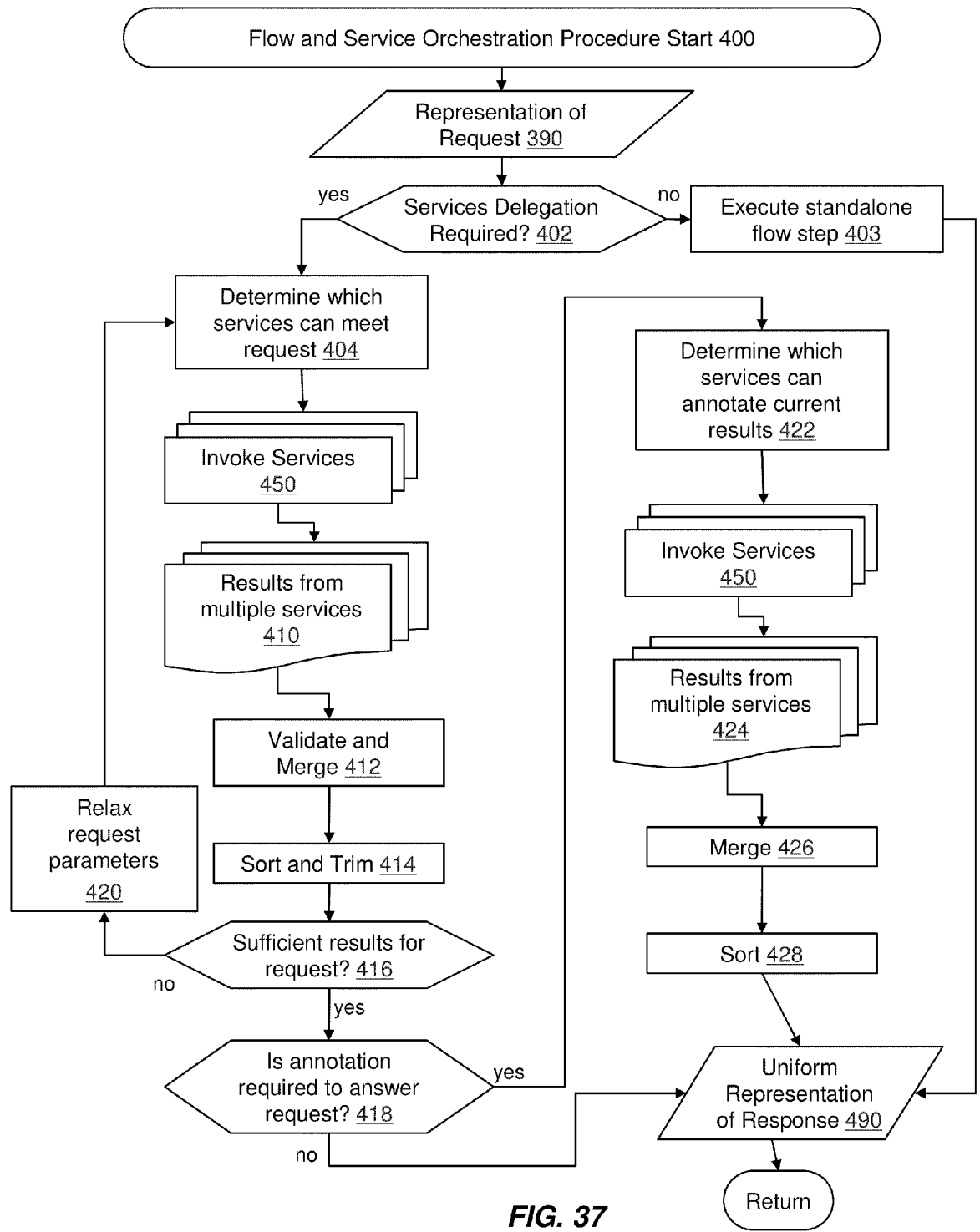
FIG. 37 is a flow diagram depicting an example of a procedure for executing a service orchestration procedure according to one embodiment.

Referring now to FIG. 37, there is shown an example of a procedure for executing a service orchestration procedure according to one embodiment.

In this particular example, it is assumed a single user is interesting in finding a good place for dinner at a restaurant, and is engaging intelligent automated assistant 1002 in a conversation to help provide this service.

Consider the task of finding restaurants that are of high quality, are well reviewed, near a particular location, available for reservation at a particular time, and serve a particular kind of food. These domain and task parameters are given as input 390.

The method begins 400. At 402, it is determined whether the given request may require any services. In some situations, services delegation may not be required, for example if assistant 1002 is able to perform the desired task itself. For example, in one embodiment, assistant 1002 may be able to answer a factual question without invoking services delegation. Accordingly, if the request does not require services, then standalone flow step is executed in 403 and its result 490 is returned. For example, if the task request was to ask for information about automated assistant 1002 itself, then the dialog response may be handled without invoking any external services.

If, in step 402, it is determined that services delegation is required, services orchestration component(s) 1082 proceed to step 404. In 404, services orchestration component(s) 1082 may match up the task requirements with declarative descriptions of the capabilities and properties of services in service capability models 1088. At least one service provider that might support the instantiated operation provides declarative, qualitative metadata detailing, for example, one or more of the following (or combinations thereof):

the data fields that are returned with results;
which classes of parameters the service provider is statically known to support;
policy functions for parameters the service provider might be able to support after dynamic inspection of the parameter values;
a performance rating defining how the service performs (e.g. relational DB, web service, triple store, full-text index, or some combination thereof);
property quality ratings statically defining the expected quality of property values returned with the result object;
an overall quality rating of the results the service may expect to return.

For example, reasoning about the classes of parameters that service may support, a service model may state that services 1, 2, 3, and 4 may provide restaurants that are near a particular location (a parameter), services 2 and 3 may filter or rank restaurants by quality (another parameter), services 3, 4, and 5 may return reviews for restaurants (a data field returned), service 6 may list the food types served by restaurants (a data field returned), and service 7 may check availability of restaurants for particular time ranges (a parameter). Services 8 through 99 offer capabilities that are not required for this particular domain and task.

Using this declarative, qualitative metadata, the task, the task parameters, and other information available from the runtime environment of the assistant, services orchestration component(s) 1082 determines 404 an optimal set of service providers to invoke. The optimal set of service providers may support one or more task parameters (returning results that satisfy one or more parameters) and also considers the performance rating of at least one service provider and the overall quality rating of at least one service provider.

The result of step 404 is a dynamically generated list of services to call for this particular user and request.

In at least one embodiment, services orchestration component(s) 1082 considers the reliability of services as well as their ability to answer specific information requests.

In at least one embodiment, services orchestration component(s) 1082 hedges against unreliability by calling overlapping or redundant services.

In at least one embodiment, services orchestration component(s) 1082 considers personal information about the user (from the short term personal memory component) to select services. For example, the user may prefer some rating services over others.

In step 450, services orchestration component(s) 1082 dynamically and automatically invokes multiple services on behalf of a user. In at least one embodiment, these are called dynamically while responding to a user's request. According to specific embodiments, multiple instances or threads of the services may be concurrently called. In at least one embodiment, these are called over a network using APIs, or over a network using web service APIs, or over the Internet using web service APIs, or any combination thereof.

In at least one embodiment, the rate at which services are called is programmatically limited and/or managed.

Figure 38:
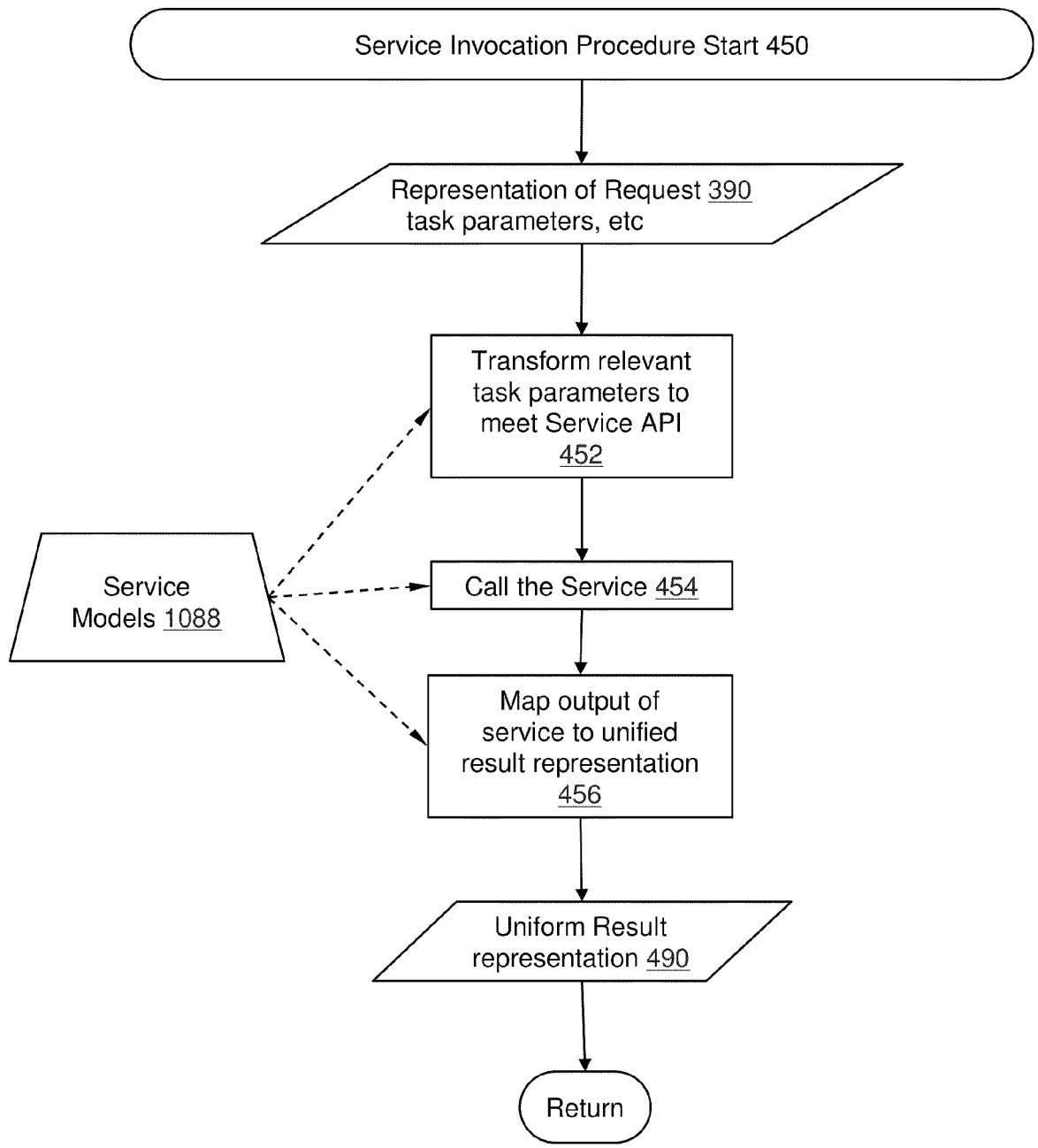
FIG. 38 is a flow diagram depicting an example of a service invocation procedure according to one embodiment.

Referring now also to FIG. 38, there is shown an example of a service invocation procedure 450 according to one embodiment. Service invocation is used, for example, to obtain additional information or to perform tasks by the use of external services. In one embodiment, request parameters are transformed as appropriate for the service's API. Once results are received from the service, the results are transformed to a results representation for presentation to the user within assistant 1002.

In at least one embodiment, services invoked by service invocation procedure 450 can be a web service, application running on the device, operating system function, or the like.

Representation of request 390 is provided, including for example task parameters and the like. For at least one service available from service capability models 1088, service invocation procedure 450 performs transformation 452, calling 454, and output-mapping 456 steps.

In transformation step 452, the current task parameters from request representation 390 are transformed into a form that may be used by at least one service. Parameters to services, which may be offered as APIs or databases, may differ from the data representation used in task requests, and also from at least one other. Accordingly, the objective of step 452 is to map at least one task parameter in the one or more corresponding formats and values in at least one service being called.

For example, the names of businesses such as restaurants may vary across services that deal with such businesses. Accordingly, step 452 would involve transforming any names into forms that are best suited for at least one service.

As another example, locations are known at various levels of precision and using various units and conventions across services. Service 1 might may require ZIP codes, service 2 GPS coordinates, and service 3 postal street addresses.

The service is called 454 over an API and its data gathered. In at least one embodiment, the results are cached. In at least one embodiment, the services that do not return within a specified level performance (e.g., as specified in Service Level Agreement or SLA) are dropped.

In output mapping step 456, the data returned by a service is mapped back onto unified result representation 490. This step may include dealing with different formats, units, and so forth.

In step 410, results from multiple services are obtained. In step 412, results from multiple services are validated and merged. In one embodiment, if validated results are collected, an equality policy function-defined on a per-domain basis— is then called pair-wise across one or more results to determine which results represent identical concepts in the real world. When a pair of equal results is discovered, a set of property policy functions—also defined on a per-domain basis—are used to merge property values into a merged result. The property policy function may use the property quality ratings from the service capability models, the task parameters, the domain context, and/or the long-term personal memory 1054 to decide the optimal merging strategy.

For example, lists of restaurants from different providers of restaurants might be merged and duplicates removed. In at least one embodiment, the criteria for identifying duplicates may include fuzzy name matching, fuzzy location matching, fuzzy matching against multiple properties of domain entities, such as name, location, phone number, and/or website address, and/or any combination thereof.

In step 414, the results are sorted and trimmed to return a result list of the desired length.

In at least one embodiment, a request relaxation loop is also applied. If, in step 416, services orchestration component(s) 1082 determines that the current result list is not sufficient (e.g., it has fewer than the desired number of matching items), then task parameters may be relaxed 420 to allow for more results. For example, if the number of restaurants of the desired sort found within N miles of the target location is too small, then relaxation would run the request again, looking in an area larger than N miles away, and/or relaxing some other parameter of the search.

In at least one embodiment, the service orchestration method is applied in a second pass to "annotate" results with auxiliary data that is useful to the task.

In step 418, services orchestration component(s) 1082 determines whether annotation is required. It may be required if, for example, if the task may require a plot of the results on a map, but the primary services did not return geo-coordinates required for mapping.

In 422, service capability models 1088 are consulted again to find services that may return the desired extra information. In one embodiment, the annotation process determines if additional or better data may be annotated to a merged result. It does this by delegating to a property policy function— defined on a per-domain basis—for at least one property of at least one merged result. The property policy function may use the merged property value and property quality rating, the property quality ratings of one or more other service providers, the domain context, and/or the user profile to decide if better data may be obtained. If it is determined that one or more service providers may annotate one or more properties for a merged result, a cost function is invoked to determine the optimal set of service providers to annotate.

At least one service provider in the optimal set of annotation service providers is then invoked 450 with the list of merged results, to obtain results 424. The changes made to at least one merged result by at least one service provider are tracked during this process, and the changes are then merged using the same property policy function process as was used in step 412. Their results are merged 426 into the existing result set.

The resulting data is sorted 428 and unified into a uniform representation 490.

It may be appreciated that one advantage of the methods and systems described above with respect to services orchestration component(s) 1082 is that they may be advantageously applied and/or utilized in various fields of technology other than those specifically relating to intelligent automated assistants. Examples of such other areas of technologies where aspects and/or features of service orchestration procedures include, for example, one or more of the following:

Dynamic "mash ups" on websites and web-based applications and services;

Distributed database query optimization;

Dynamic service oriented architecture configuration.

Service Capability Models Component(s) 1088

In at least one embodiment, service capability models component(s) 1088 may be operable to perform and/or implement various types of functions, operations, actions, and/or other features such as, for example, one or more of the following (or combinations thereof):

Provide machine readable information about the capabilities of services to perform certain classes of computation;

Provide machine readable information about the capabilities of services to answer certain classes of queries;

Provide machine readable information about which classes of transactions are provided by various services;

Provide machine readable information about the parameters to APIs exposed by various services;

Provide machine readable information about the parameters that may be used in database queries on databases provided by various services.

Output Processor Component(s) 1090

In at least one embodiment, output processor component(s) 1090 may be operable to perform and/or implement various types of functions, operations, actions, and/or other features such as, for example, one or more of the following (or combinations thereof):

Format output data that is represented in a uniform internal data structure into forms and layouts that render it appropriately on different modalities. Output data may include, for example, communication in natural language between the intelligent automated assistant and the user; data about domain entities, such as properties of restaurants, movies, products, and the like; domain specific data results from information services, such as weather reports, flight status checks, prices, and the like; and/or interactive links and buttons that enable the user to respond by directly interacting with the output presentation.

Render output data for modalities that may include, for example, any combination of: graphical user interfaces; text messages; email messages; sounds; animations; and/or speech output.

Dynamically render data for different graphical user interface display engines based on the request. For example, use different output processing layouts and formats depending on which web browser and/or device is being used.

Render output data in different speech voices dynamically.

Dynamically render to specified modalities based on user preferences.

Dynamically render output using user-specific "skins" that customize the look and feel.

Send a stream of output packages to a modality, showing intermediate status, feedback, or results throughout phases of interaction with assistant 1002.

According to specific embodiments, multiple instances or threads of output processor component(s) 1090 may be concurrently implemented and/or initiated via the use of one or more processor(s) 63 and/or other combinations of hardware and/or hardware and software. For example, in at least some embodiments, various aspects, features, and/or functionalities of output processor component(s) 1090 may be performed, implemented and/or initiated by one or more of the following types of systems, components, systems, devices, procedures, processes, and the like (or combinations thereof):

software modules within the client or server of an embodiment of an intelligent automated assistant;
remotely callable services;
using a mix of templates and procedural code.

Figure 39:
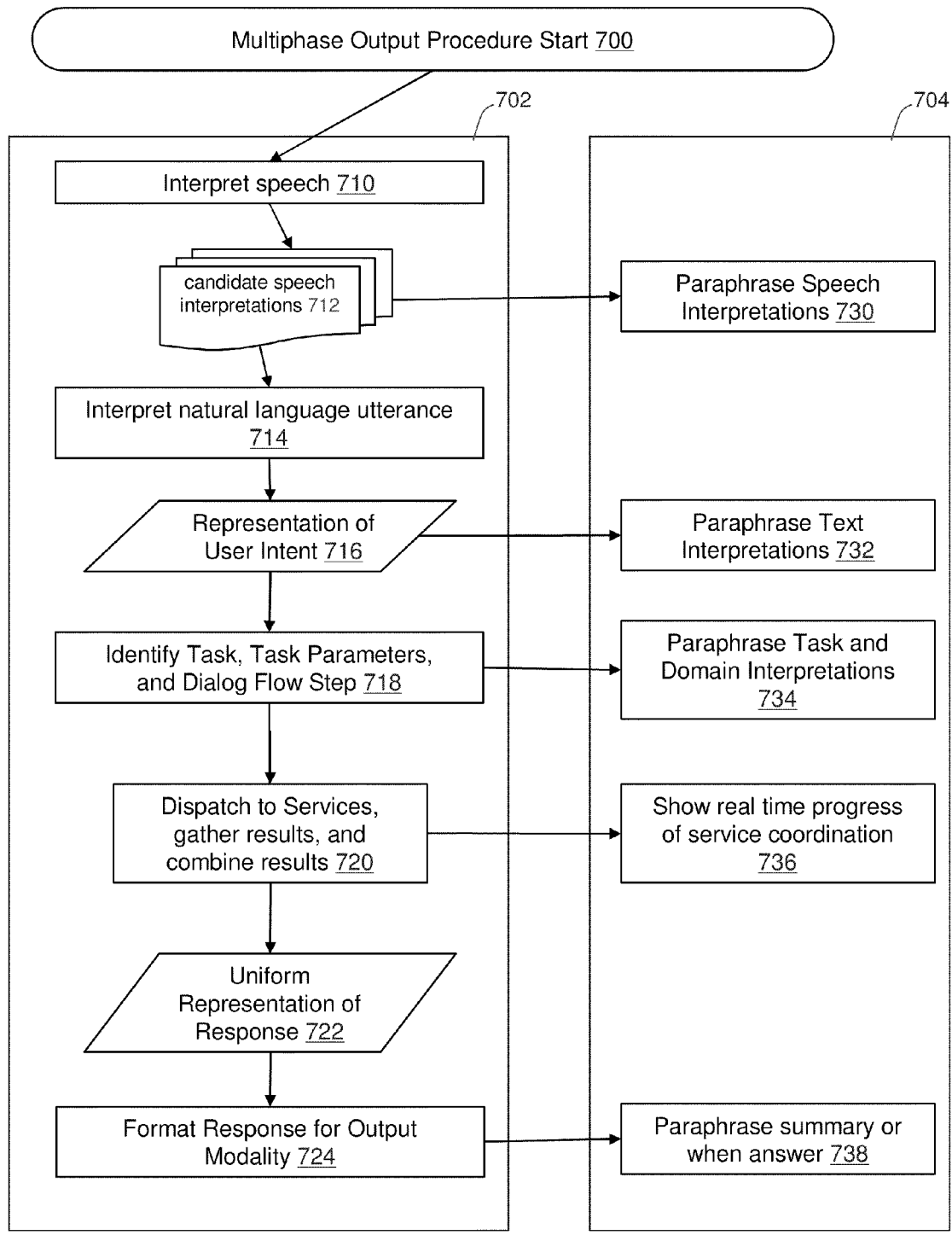
FIG. 39 is a flow diagram depicting an example of a multiphase output procedure according to one embodiment.

Referring now to FIG. 39, there is shown a flow diagram depicting an example of a multiphase output procedure according to one embodiment. The method begins 700. The multiphase output procedure includes automated assistant 1002 processing steps 702 and multiphase output steps 704

In step 710, a speech input utterance is obtained and a speech-to-text component (such as component described in connection with FIG. 22) interprets the speech to produce a set of candidate speech interpretations 712. In one embodiment, speech-to-text component is implemented using, for example, Nuance Recognizer, available from Nuance Communications, Inc. of Burlington, Mass. Candidate speech interpretations 712 may be shown to the user in 730, for example in paraphrased form. For example, the interface might show "did you say?" alternatives listing a few possible alternative textual interpretations of the same speech sound sample.

In at least one embodiment, a user interface is provided to enable the user to interrupt and choose among the candidate speech interpretations.

In step 714, the candidate speech interpretations 712 are sent to a language interpreter 1070, which may produce representations of user intent 716 for at least one candidate speech interpretation 712. In step 732, paraphrases of these representations of user intent 716 are generated and presented to the user. (See related step 132 of procedure 221 in FIG. 22).

In at least one embodiment, the user interface enables the user to interrupt and choose among the paraphrases of natural language interpretations 732.

In step 718, task and dialog analysis is performed. In step 734, task and domain interpretations are presented to the user using an intent paraphrasing algorithm.

Figure 40:
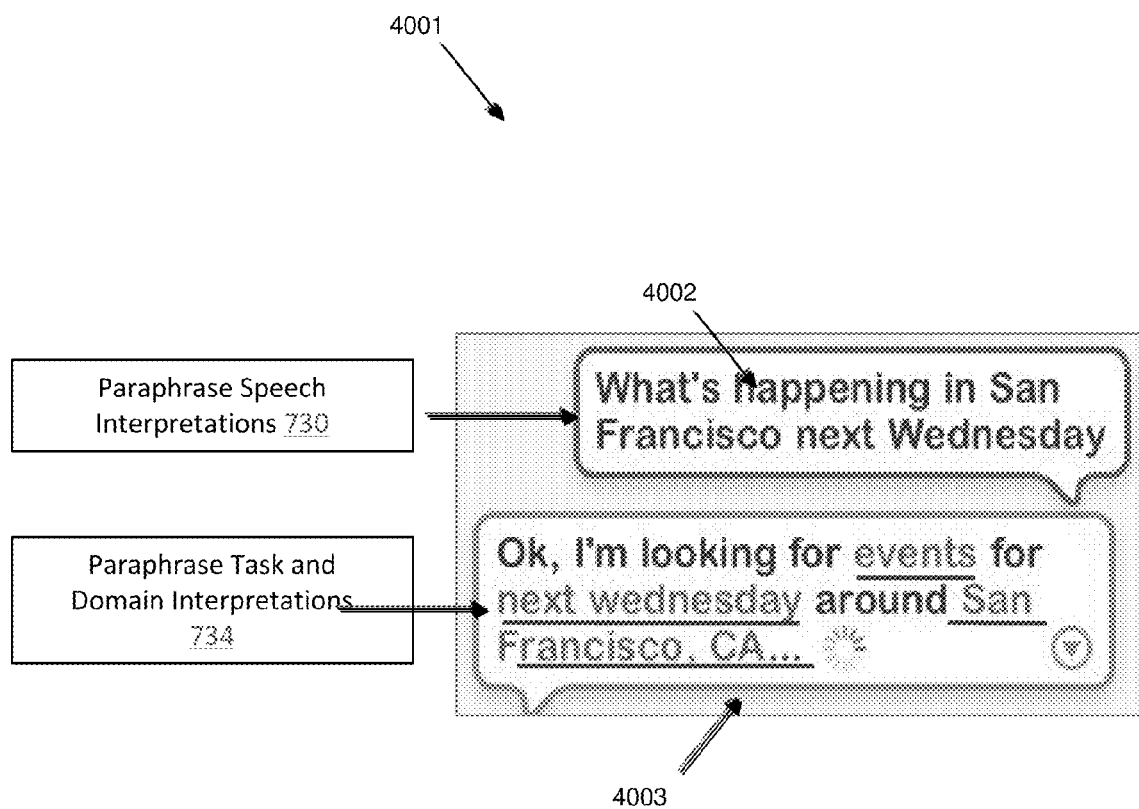
FIGS. 40 and 41 are screen shots depicting examples of output processing according to one embodiment.

Referring now also to FIG. 40, there is shown a screen shot depicting an example of output processing according to one embodiment. Screen 4001 includes echo 4002 of the user's speech input, generated by step 730. Screen 4001 further includes paraphrase 4003 of the user's intent, generated by step 734. In one embodiment, as depicted in the example of FIG. 40, special formatting/highlighting is used for key words such as "events", which may be used to facilitate training of the user for interaction with intelligent automated assistant 1002. For example, by visually observing the formatting of the displayed text, the user may readily identify and interpret back the intelligent automated assistant recognizes keywords such as "events", "next Wednesday", "San Francisco", and the like.

Returning to FIG. 39, as requests are dispatched 720 to services and results are dynamically gathered, intermediate results may be displayed in the form of real-time progress 736. For example, a list of restaurants may be returned and then their reviews may be populated dynamically as the results from the reviews services arrive. Services can include web-enabled services and/or services that access information stored locally on the device and/or from any other source.

A uniform representation of response 722 is generated and formatted 724 for the appropriate output modality. After the final output format is completed, a different kind of paraphrase may be offered in 738. In this phase, the entire result set may be analyzed and compared against the initial request. A summary of results or answer to a question may then be offered.

Figure 41:
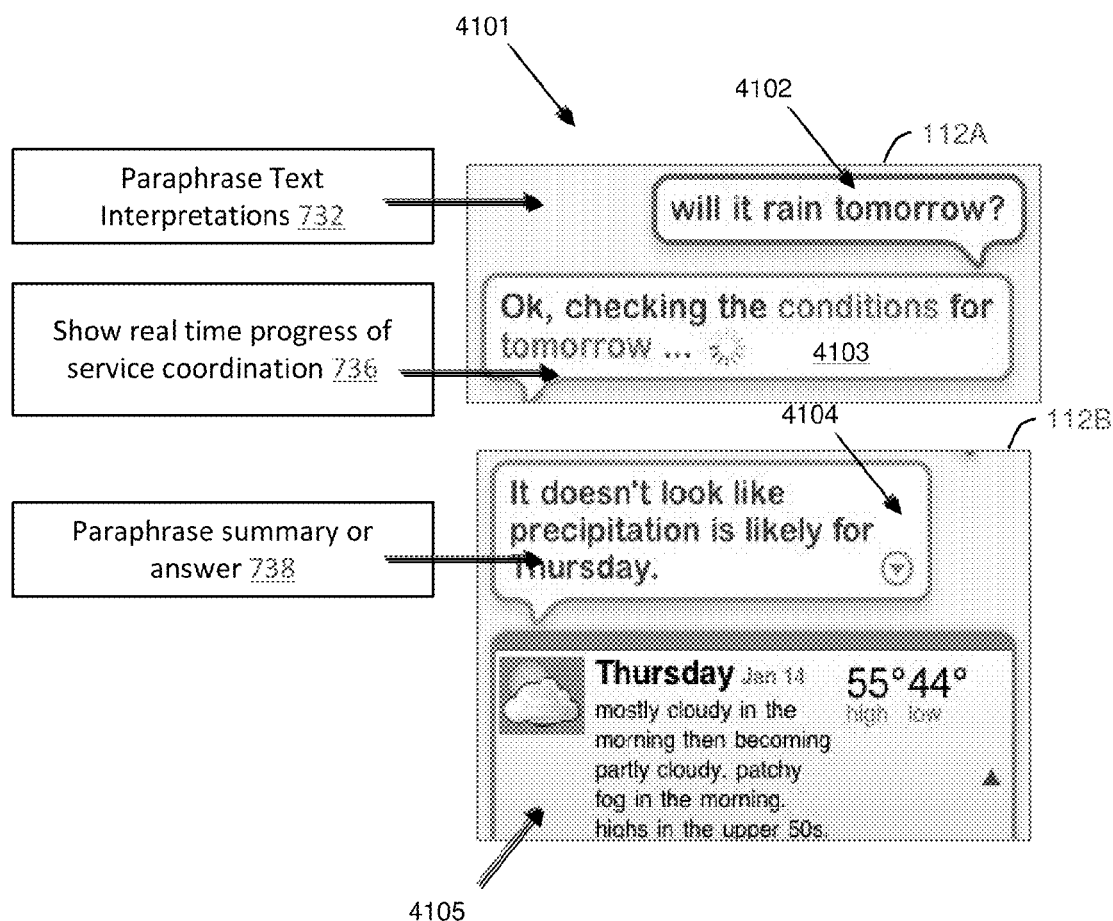

Referring also to FIG. 41, there is shown another example of output processing according to one embodiment. Screen 4101 depicts paraphrase 4102 of the text interpretation, generated by step 732, real-time progress 4103 generated by step 736, and paraphrased summary 4104 generated by step 738. Also included are detailed results 4105.

Figure 42:
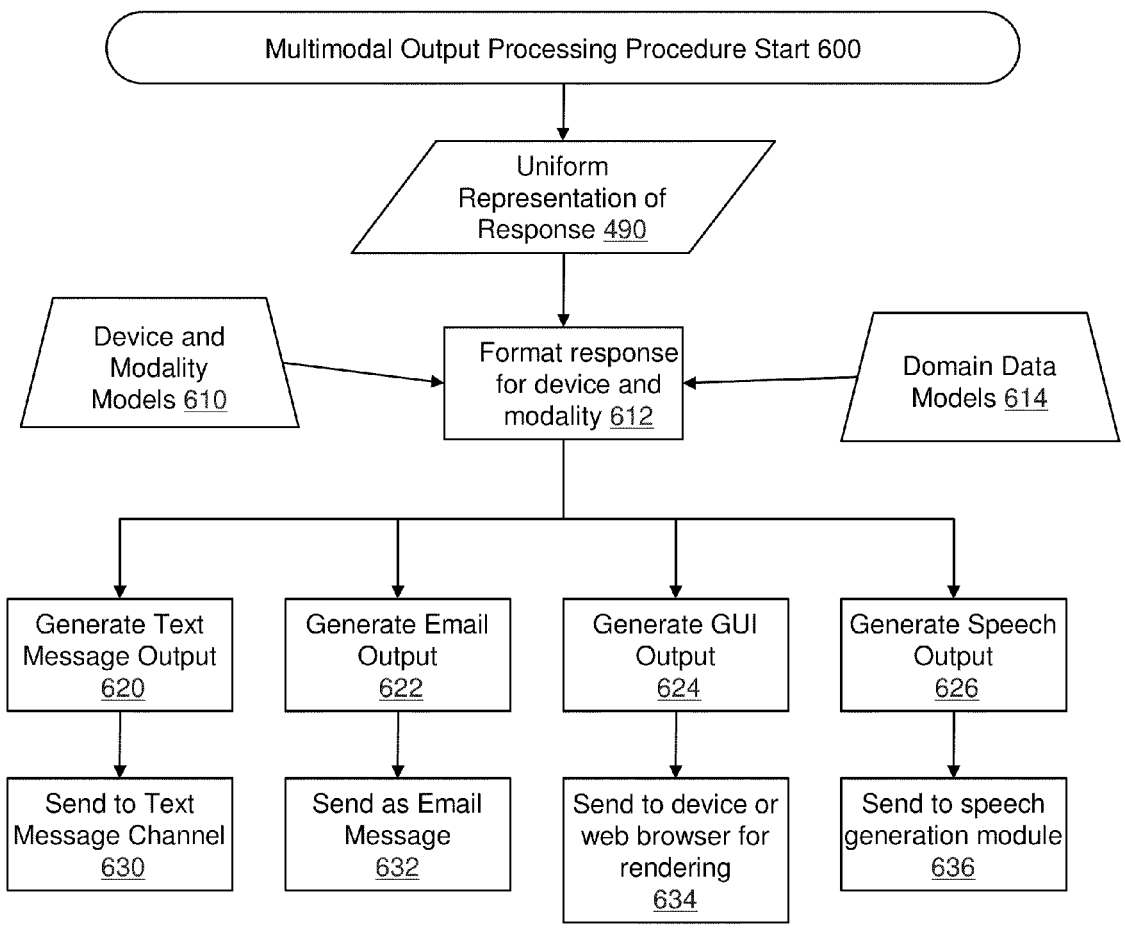
FIG. 42 is a flow diagram depicting an example of multi-modal output processing according to one embodiment.

In one embodiment, assistant 1002 is capable of generating output in multiple modes. Referring now to FIG. 42, there is shown a flow diagram depicting an example of multimodal output processing according to one embodiment.

The method begins 600. Output processor 1090 takes uniform representation of response 490 and formats 612 the response according to the device and modality that is appropriate and applicable. Step 612 may include information from device and modality models 610 and/or domain data models 614.

Once response 490 has been formatted 612, any of a number of different output mechanisms can be used, in any combination. Examples depicted in FIG. 42 include:

Generating 620 text message output, which is sent 630 to a text message channel;
Generating 622 email output, which is sent 632 as an email message;

Generating 624 GUI output, which is sent 634 to a device or web browser for rendering;

Generating 626 speech output, which is sent 636 to a speech generation module.

One skilled in the art will recognize that many other output mechanisms can be used.

In one embodiment, the content of output messages generated by multiphase output procedure 700 is tailored to the mode of multimodal output processing 600. For example, if the output modality is speech 626, the language of used to paraphrase user input 730, text interpretations 732, task and domain interpretations 734, progress 736, and/or result summaries 738 may be more or less verbose or use sentences that are easier to comprehend in audible form than in written form. In one embodiment, the language is tailored in the steps of the multiphase output procedure 700; in other embodiments, the multiphase output procedure 700 produces an intermediate result that is further refined into specific language by multimodal output processing 600.

Short Term Personal Memory Component(s) 1052

In at least one embodiment, short term personal memory component(s) 1052 may be operable to perform and/or implement various types of functions, operations, actions, and/or other features such as, for example, one or more of the following (or combinations thereof):

Keep a history of the recent dialog between the embodiment of the assistant and the user, including the history of user inputs and their interpretations;

Keep a history of recent selections by the user in the GUI, such as which items were opened or explored, which phone numbers were called, which items were mapped, which movie trailers where played, and the like;

Store the history of the dialog and user interactions in a database on the client, the server in a user-specific session, or in client session state such as web browser cookies or RAM used by the client;

Store the list of recent user requests;

Store the sequence of results of recent user requests;

Store the click-stream history of UI events, including button presses, taps, gestures, voice activated triggers, and/or any other user input.

Store device sensor data (such as location, time, positional orientation, motion, light level, sound level, and the like) which might be correlated with interactions with the assistant.

According to specific embodiments, multiple instances or threads of short term personal memory component(s) 1052 may be concurrently implemented and/or initiated via the use of one or more processors 63 and/or other combinations of hardware and/or hardware and software.

According to different embodiments, one or more different threads or instances of short term personal memory component(s) 1052 may be initiated in response to detection of one or more conditions or events satisfying one or more different types of minimum threshold criteria for triggering initiation of at least one instance of short term personal memory component(s) 1052. For example, short term personal memory component(s) 1052 may be invoked when there is a user session with the embodiment of assistant 1002, on at least one input form or action by the user or response by the system.

In at least one embodiment, a given instance of short term personal memory component(s) 1052 may access and/or utilize information from one or more associated databases. In at least one embodiment, at least a portion of the database information may be accessed via communication with one or more local and/or remote memory devices. For example, short term personal memory component(s) 1052 may access data from long-term personal memory components(s) 1054 (for example, to obtain user identity and personal preferences) and/or data from the local device about time and location, which may be included in short term memory entries.

Figure 43A:
FIGS. 43A and 43B are screen shots depicting an example of the use of short term personal memory component(s) to maintain dialog context while changing location, according to one embodiment.
Figure 43B:
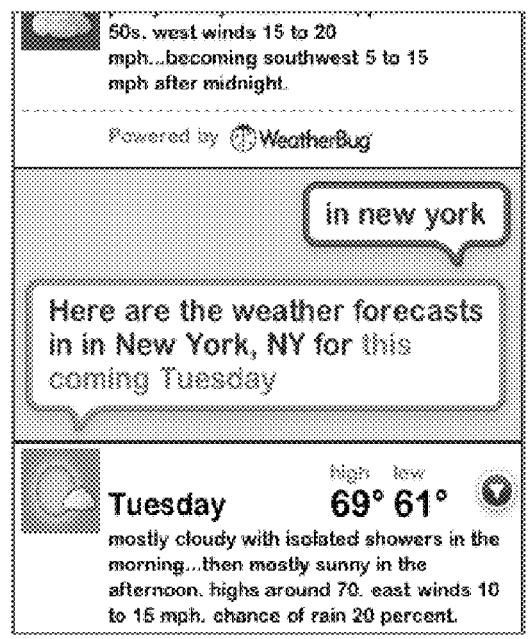

Referring now to FIGS. 43A and 43B, there are shown screen shots depicting an example of the use of short term personal memory component(s) 1052 to maintain dialog context while changing location, according to one embodiment. In this example, the user has asked about the local weather, then just says "in new york". Screen 4301 shows the initial response, including local weather. When the user says "in new york", assistant 1002 uses short term personal memory component(s) 1052 to access the dialog context and thereby determine that the current domain is weather forecasts. This enables assistant 1002 to interpret the new utterance "in new york" to mean "what is the weather forecast in New York this coming Tuesday?". Screen 4302 shows the appropriate response, including weather forecasts for New York.

In the example of FIGS. 43A and 43B, what was stored in short term memory was not only the words of the input "is it going to rain the day after tomorrow?" but the system's semantic interpretation of the input as the weather domain and the time parameter set to the day after tomorrow.

Long-Term Personal Memory Component(s) 1054

In at least one embodiment, long-term personal memory component(s) 1054 may be operable to perform and/or implement various types of functions, operations, actions, and/or other features such as, for example, one or more of the following (or combinations thereof):

To persistently store the personal information and data about a user, including for example his or her preferences, identities, authentication credentials, accounts, addresses, and the like;

To store information that the user has collected by using the embodiment of assistant 1002, such as the equivalent of bookmarks, favorites, clippings, and the like;

To persistently store saved lists of business entities including restaurants, hotels, stores, theaters and other venues. In one embodiment, long-term personal memory component(s) 1054 saves more than just the names or URLs, but also saves the information sufficient to bring up a full listing on the entities including phone numbers, locations on a map, photos, and the like;

To persistently store saved movies, videos, music, shows, and other items of entertainment;

To persistently store the user's personal calendar(s), to do list(s), reminders and alerts, contact databases, social network lists, and the like;

To persistently store shopping lists and wish lists for products and services, coupons and discount codes acquired, and the like;

To persistently store the history and receipts for transactions including reservations, purchases, tickets to events, and the like.

According to specific embodiments, multiple instances or threads of long-term personal memory component(s) 1054 may be concurrently implemented and/or initiated via the use of one or more processors 63 and/or other combinations of hardware and/or hardware and software. For example, in at least some embodiments, various aspects, features, and/or functionalities of long-term personal memory component(s) 1054 may be performed, implemented and/or initiated using one or more databases and/or files on (or associated with) clients 1304 and/or servers 1340, and/or residing on storage devices.

According to different embodiments, one or more different threads or instances of long-term personal memory component(s) 1054 may be initiated in response to detection of one or more conditions or events satisfying one or more different types of minimum threshold criteria for triggering initiation of at least one instance of long-term personal memory component(s) 1054. Various examples of conditions or events which may trigger initiation and/or implementation of one or more different threads or instances of long-term personal memory component(s) 1054 may include, but are not limited to, one or more of the following (or combinations thereof):

Long term personal memory entries may be acquired as a side effect of the user interacting with an embodiment of assistant 1002. Any kind of interaction with the assistant may produce additions to the long term personal memory, including browsing, searching, finding, shopping, scheduling, purchasing, reserving, communicating with other people via an assistant.

Long term personal memory may also be accumulated as a consequence of users signing up for an account or service, enabling assistant 1002 access to accounts on other services, using an assistant 1002 service on a client device with access to other personal information databases such as calendars, to-do lists, contact lists, and the like.

In at least one embodiment, a given instance of long-term personal memory component(s) 1054 may access and/or utilize information from one or more associated databases. In at least one embodiment, at least a portion of the database information may be accessed via communication with one or more local and/or remote memory devices, which may be located, for example, at client(s) 1304 and/or server(s) 1340. Examples of different types of data which may be accessed by long-term personal memory component(s) 1054 may include, but are not limited to data from other personal information databases such as contact or friend lists, calendars, to-do lists, other list managers, personal account and wallet managers provided by external services 1360, and the like.

Figures 44A, 44B, 44C:
FIGS. 44A through 44C are screen shots depicting an example of the use of long term personal memory component(s), according to one embodiment.

Referring now to FIGS. 44A through 44C, there are shown screen shots depicting an example of the use of long term personal memory component(s) 1054, according to one embodiment. In the example, a feature is provided (named "My Stuff"), which includes access to saved entities such as restaurants, movies, and businesses that are found via interactive sessions with an embodiment of assistant 1002. In screen 4401 of FIG. 44A, the user has found a restaurant. The user taps on Save to My Stuff 4402, which saves information about the restaurant in long-term personal memory component(s) 1054.

Screen 4403 of FIG. 44B depicts user access to My Stuff. In one embodiment, the user can select among categories to navigate to the desired item.

Screen 4404 of FIG. 44C depicts the My Restaurant category, including items previously stored in My Stuff.

Automated Call and Response Procedure

Referring now to FIG. 33, there is shown a flow diagram depicting an automatic call and response procedure, according to one embodiment. The procedure of FIG. 33 may be implemented in connection with one or more embodiments of intelligent automated assistant 1002. It may be appreciated that intelligent automated assistant 1002 as depicted in FIG. 1 is merely one example from a wide range of intelligent automated assistant system embodiments which may be implemented. Other embodiments of intelligent automated assistant systems (not shown) may include additional, fewer and/or different components/features than those illustrated, for example, in the example intelligent automated assistant 1002 depicted in FIG. 1.

In at least one embodiment, the automated call and response procedure of FIG. 33 may be operable to perform and/or implement various types of functions, operations, actions, and/or other features such as, for example, one or more of the following (or combinations thereof):

The automated call and response procedure of FIG. 33 may provide an interface control flow loop of a conversational interface between the user and intelligent automated assistant 1002. At least one iteration of the automated call and response procedure may serve as a ply in the conversation. A conversational interface is an interface in which the user and assistant 1002 communicate by making utterances back and forth in a conversational manner.

The automated call and response procedure of FIG. 33 may provide the executive control flow for intelligent automated assistant 1002. That is, the procedure controls the gathering of input, processing of input, generation of output, and presentation of output to the user.

The automated call and response procedure of FIG. 33 may coordinate communications among components of intelligent automated assistant 1002. That is, it may direct where the output of one component feeds into another, and where the overall input from the environment and action on the environment may occur.

In at least some embodiments, portions of the automated call and response procedure may also be implemented at other devices and/or systems of a computer network.

According to specific embodiments, multiple instances or threads of the automated call and response procedure may be concurrently implemented and/or initiated via the use of one or more processors 63 and/or other combinations of hardware and/or hardware and software. In at least one embodiment, one or more or selected portions of the automated call and response procedure may be implemented at one or more client(s) 1304, at one or more server(s) 1340, and/or combinations thereof.

For example, in at least some embodiments, various aspects, features, and/or functionalities of the automated call and response procedure may be performed, implemented and/or initiated by software components, network services, databases, and/or the like, or any combination thereof.

According to different embodiments, one or more different threads or instances of the automated call and response procedure may be initiated in response to detection of one or more conditions or events satisfying one or more different types of criteria (such as, for example, minimum threshold criteria) for triggering initiation of at least one instance of automated call and response procedure. Examples of various types of conditions or events which may trigger initiation and/or implementation of one or more different threads or instances of the automated call and response procedure may include, but are not limited to, one or more of the following (or combinations thereof):

a user session with an instance of intelligent automated assistant 1002, such as, for example, but not limited to, one or more of:

a mobile device application starting up, for instance, a mobile device application that is implementing an embodiment of intelligent automated assistant 1002;

a computer application starting up, for instance, an application that is implementing an embodiment of intelligent automated assistant 1002;

a dedicated button on a mobile device pressed, such as a "speech input button";

a button on a peripheral device attached to a computer or mobile device, such as a headset, telephone handset or base station, a GPS navigation system, consumer appliance, remote control, or any other device with a button that might be associated with invoking assistance;

a web session started from a web browser to a website implementing intelligent automated assistant 1002;

an interaction started from within an existing web browser session to a website implementing intelligent automated assistant 1002, in which, for example, intelligent automated assistant 1002 service is requested;

an email message sent to a modality server 1426 that is mediating communication with an embodiment of intelligent automated assistant 1002;

a text message is sent to a modality server 1426 that is mediating communication with an embodiment of intelligent automated assistant 1002;

a phone call is made to a modality server 1434 that is mediating communication with an embodiment of intelligent automated assistant 1002;

an event such as an alert or notification is sent to an application that is providing an embodiment of intelligent automated assistant 1002.

when a device that provides intelligent automated assistant 1002 is turned on and/or started.

According to different embodiments, one or more different threads or instances of the automated call and response procedure may be initiated and/or implemented manually, automatically, statically, dynamically, concurrently, and/or combinations thereof. Additionally, different instances and/or embodiments of the automated call and response procedure may be initiated at one or more different time intervals (e.g., during a specific time interval, at regular periodic intervals, at irregular periodic intervals, upon demand, and the like).

In at least one embodiment, a given instance of the automated call and response procedure may utilize and/or generate various different types of data and/or other types of information when performing specific tasks and/or operations. This may include, for example, input data/information and/or output data/information. For example, in at least one embodiment, at least one instance of the automated call and response procedure may access, process, and/or otherwise utilize information from one or more different types of sources, such as, for example, one or more databases. In at least one embodiment, at least a portion of the database information may be accessed via communication with one or more local and/or remote memory devices. Additionally, at least one instance of the automated call and response procedure may generate one or more different types of output data/information, which, for example, may be stored in local memory and/or remote memory devices.

In at least one embodiment, initial configuration of a given instance of the automated call and response procedure may be performed using one or more different types of initialization parameters. In at least one embodiment, at least a portion of the initialization parameters may be accessed via communication with one or more local and/or remote memory devices. In at least one embodiment, at least a portion of the initialization parameters provided to an instance of the automated call and response procedure may correspond to and/or may be derived from the input data/information.

In the particular example of FIG. 33, it is assumed that a single user is accessing an instance of intelligent automated assistant 1002 over a network from a client application with speech input capabilities. The user is interested in finding a good place for dinner at a restaurant, and is engaging intelligent automated assistant 1002 in a conversation to help provide this service.

The method begins 10. In step 100, the user is prompted to enter a request. The user interface of the client offers several modes of input, as described in connection with FIG. 26. These may include, for example:

an interface for typed input, which may invoke an active typed-input elicitation procedure as illustrated in FIG. 11;

an interface for speech input, which may invoke an active speech input elicitation procedure as illustrated in FIG. 22.

an interface for selecting inputs from a menu, which may invoke active GUI-based input elicitation as illustrated in FIG. 23.

One skilled in the art will recognize that other input modes may be provided.

In one embodiment, step 100 may include presenting options remaining from a previous conversation with assistant 1002, for example using the techniques described in the active dialog suggestion input elicitation procedure described in connection with FIG. 24.

For example, by one of the methods of active input elicitation in step 100, the user might say to assistant 1002, "where may I get some good Italian around here?" For example, the user might have spoken this into a speech input component. An embodiment of an active input elicitation component 1094 calls a speech-to-text service, asks the user for confirmation, and then represents the confirmed user input as a uniform annotated input format 2690.

An embodiment of language interpreter component 1070 is then called in step 200, as described in connection with FIG. 28. Language interpreter component 1070 parses the text input and generates a list of possible interpretations of the user's intent 290. In one parse, the word "italian" is associated with restaurants of style Italian; "good" is associated with the recommendation property of restaurants; and "around here" is associated with a location parameter describing a distance from a global sensor reading (for example, the user's location as given by GPS on a mobile device).

In step 300, the representation of the user's intent 290 is passed to dialog flow processor 1080, which implements an embodiment of a dialog and flow analysis procedure as described in connection with FIG. 32. Dialog flow processor 1080 determines which interpretation of intent is most likely, maps this interpretation to instances of domain models and parameters of a task model, and determines the next flow step in a dialog flow. In the current example, a restaurant domain model is instantiated with a constrained selection task to find a restaurant by constraints (the cuisine style, recommendation level, and proximity constraints). The dialog flow model indicates that the next step is to get some examples of restaurants meeting these constraints and present them to the user.

In step 400, an embodiment of the flow and service orchestration procedure 400 is invoked, via services orchestration component 1082 as described in connection with FIG. 37. It invokes a set of services 1084 on behalf of the user's request to find a restaurant. In one embodiment, these services 1084 contribute some data to a common result. Their data are merged and the resulting list of restaurants is represented in a uniform, service-independent form.

In step 500, output processor 1092 generates a dialog summary of the results, such as, "I found some recommended Italian restaurants near here." Output processor 1092 combines this summary with the output result data, and then sends the combination to a module that formats the output for the user's particular mobile device in step 600.

In step 700, this device-specific output package is sent to the mobile device, and the client software on the device renders it on the screen (or other output device) of the mobile device.

The user browses this presentation, and decides to explore different options. If the user is done 790, the method ends. If the user is not done 790, another iteration of the loop is initiated by returning to step 100.

The automatic call and response procedure may be applied, for example to a user's query "how about mexican food?". Such input may be elicited in step 100. In step 200, the input is interpreted as restaurants of style Mexican, and combined with the other state (held in short term personal memory 1052) to support the interpretation of the same intent as the last time, with one change in the restaurant style parameter. In step 300, this updated intent produces a refinement of the request, which is given to service orchestration component(s) 1082 in step 400.

In step 400 the updated request is dispatched to multiple services 1084, resulting in a new set of restaurants which are summarized in dialog in 500, formatted for the device in 600, and sent over the network to show new information on the user's mobile device in step 700.

In this case, the user finds a restaurant of his or her liking, shows it on a map, and sends directions to a friend.

One skilled in the art will recognize that different embodiments of the automated call and response procedure (not shown) may include additional features and/or operations than those illustrated in the specific embodiment of FIG. 33, and/or may omit at least a portion of the features and/or operations of automated call and response procedure illustrated in the specific embodiment of FIG. 33.

Constrained Selection

In one embodiment, intelligent automated assistant 1002 uses constrained selection in its interactions with the user, so as to more effectively identify and present items that are likely to be of interest to the user.

Constrained selection is a kind of generic task. Generic tasks are abstractions that characterize the kinds of domain objects, inputs, outputs, and control flow that are common among a class of tasks. A constrained selection task is performed by selecting items from a choice set of domain objects (such as restaurants) based on selection constraints (such as a desired cuisine or location). In one embodiment, assistant 1002 helps the user explore the space of possible choices, eliciting the user's constraints and preferences, presenting choices, and offering actions to perform on those choices such as to reserve, buy, remember, or share them. The task is complete when the user selects one or more items on which to perform the action.

Constrained selection is useful in many contexts: for example, picking a movie to see, a restaurant for dinner, a hotel for the night, a place to buy a book, or the like. In general, constrained selection is useful when one knows the category and needs to select an instance of the category with some desired properties.

One conventional approach to constrained selection is a directory service. The user picks a category and the system offers a list of choices. In a local directory, one may constrain the directory to a location, such as a city. For instance, in a "yellow pages" service, users select the book for a city and then look up the category, and the book shows one or more items for that category. The main problem with a directory service is that the number of possibly relevant choices is large (e.g., restaurants in a given city).

Another conventional approach is a database application, which provides a way to generate a choice set by eliciting a query from the user, retrieving matching items, and presenting the items in some way that highlights salient features. The user browses the rows and columns of the result set, possibly sorting the results or changing the query until he or she finds some suitable candidates. The problem with the database service is that it may require the user to operationalize their human need as a formal query and to use the abstract machinery of sort, filter, and browse to explore the resulting data. These are difficult for most people to do, even with graphical user interfaces.

A third conventional approach is open-ended search, such as "local search". Search is easy to do, but there are several problems with search services that make them difficult for people to accomplish the task of constrained selection. Specifically:

As with directory search, the user may not just enter a category and look at one or more possible choice, but must narrow down the list.

If the user can narrow the selection by constraints, it is not obvious what constraints may be used (e.g., may I search for places that are within walking distance or are open late?)

It is not clear how to state constraints (e.g., is it called cuisine or restaurant type, and what are the possible values?)

Multiple preferences conflict; there is usually no objectively "best" answer to a given situation (e.g., I want a place that is close by and cheap serving gourmet food with excellent service and which is open until midnight).

Preferences are relative, and they depend on what is available. For example, if the user may get a table at a highly rated restaurant, he or she might choose it even though it is expensive. In general, though, the user would prefer less expensive options.

In various embodiments, assistant 1002 of the present invention helps streamline the task of constrained selection. In various embodiments, assistant 1002 employs database and search services, as well as other functionality, to reduce the effort, on the part of the user, of stating what he or she is looking for, considering what is available, and deciding on a satisfactory solution.

In various embodiments, assistant 1002 helps to make constrained selection simpler for humans in any of a number of different ways.

For example, in one embodiment, assistant 1002 may operationalize properties into constraints. The user states what he or she wants in terms of properties of the desired outcome. Assistant 1002 operationalizes this input into formal constraints. For example, instead of saying "find one or more restaurants less than 2 miles from the center of Palo Alto whose cuisine includes Italian food" the user may just say "Italian restaurants in palo alto". Assistant 1002 may also operationalize qualities requested by the user that are not parameters to a database. For example, if the user requests romantic restaurants, the system may operationalize this as a text search or tag matching constraint. In this manner, assistant 1002 helps overcome some of the problems users may otherwise have with constrained selection. It is easier, for a user, to imagine and describe a satisfactory solution than to describe conditions that would distinguish suitable from unsuitable solutions.

In one embodiment, assistant 1002 may suggest useful selection criteria, and the user need only say which criteria are important at the moment. For example, assistant 1002 may ask "which of these matter: price (cheaper is better), location (closer is better), rating (higher rated is better)?" Assistant 1002 may also suggest criteria that may require specific values; for example, "you can say what kind of cuisine you would like or a food item you would like".

In one embodiment, assistant 1002 may help the user make a decision among choices that differ on a number of competing criteria (for example, price, quality, availability, and convenience).

By providing such guidance, assistant 1002 may help users in making multiparametric decisions in any of several ways:

One is to reduce the dimensionality of the space, combining raw data such as ratings from multiple sources into a composite "recommendation" score. The composite score may take into account domain knowledge about the sources of data (e.g., Zagat ratings may be more predictive of quality than Yelp).

Another approach is to focus on a subset of criteria, turning a problem of "what are all the possible criteria to consider and how to they combine?" into a selection of the most important criteria in a given situation (e.g., "which is more important, price or proximity?").

Another way to simply the decision making is to assume default values and preference orders (e.g., all things being equal, higher rated and closer and cheaper are better). The system may also remember users' previous responses that indicate their default values and preferences.

Fourth, the system may offer salient properties of items in the choice set that were not mentioned in the original request. For example, the user may have asked for local Italian food. The system may offer a choice set of restaurants, and with them, a list of popular tags used by reviewers or a tag line from a guide book (e.g., "a nice spot for a date" "great pasta"). This could let people pick out a specific item and complete the task. Research shows that most people make decisions by evaluating specific instances rather than deciding on criteria and rationally accepting the one that pops to the top. It also shows that people learn about features from concrete cases. For example, when choosing among cars, buyers may not care about navigation systems until they see that some of the cars have them (and then the navigation system may become an important criterion). Assistant 1002 may present salient properties of listed items that help people pick a winner or that suggest a dimension along which to optimize.

Conceptual Data Model

In one embodiment, assistant 1002 offers assistance with the constrained selection task by simplifying the conceptual data model. The conceptual data model is the abstraction presented to users in the interface of assistant 1002. To overcome the psychological problems described above, in one embodiment assistant 1002 provides a model that allows users to describe what they want in terms of a few easily recognized and recalled properties of suitable choices rather than constraint expressions. In this manner, properties can be made easy to compose in natural language requests (e.g., adjectives modifying keyword markers) and be recognizable in prompts ("you may also favor recommended restaurants . . . "). In one embodiment, a data model is used that allows assistant 1002 to determine the domain of interest (e.g., restaurants versus hotels) and a general approach to guidance that may be instantiated with domain-specific properties.

In one embodiment, the conceptual data model used by assistant 1002 includes a selection class. This is a representation of the space of things from which to choose. For example, in the find-a-restaurant application, the selection class is the class of restaurants. The selection class may be abstract and have subclasses, such as "things to do while in a destination". In one embodiment, the conceptual data model assumes that, in a given problem solving situation, the user is interested in choosing from a single selection class. This assumption simplifies the interaction and also allows assistant 1002 to declare its boundaries of competence ("I know about restaurants, hotels, and movies" as opposed to "I know about life in the city").

Given a selection class, in one embodiment the data model presented to the user for the constrained selection task includes, for example: items; item features; selection criteria; and constraints.

Items are instances of the selection class.

Item features are properties, attributes, or computed values that may be presented and/or associated with at least one item. For example, the name and phone number of a restaurant are item features. Features may be intrinsic (the name or cuisine of a restaurant) or relational (e.g., the distance from one's current location of interest). They may be static (e.g., restaurant name) or dynamic (rating). They may be composite values computed from other data (e.g., a "value for money" score). Item features are abstractions for the user made by the domain modeler; they do not need to correspond to underlying data from backend services.

Selection criteria are item features that may be used to compare the value or relevance of items. That is, they are ways to say which items are preferred. Selection criteria are modeled as features of the items themselves, whether they are intrinsic properties or computed. For example, proximity (defined as distance from the location of interest) is a selection criterion. Location in space-time is a property, not a selection criterion, and it is used along with the location of interest to compute the distance from the location of interest.

Selection criteria may have an inherent preference order. That is, the values of any particular criterion may be used to line up items in a best first order. For example, the proximity criterion has an inherent preference that closer is better. Location, on the other hand, has no inherent preference value. This restriction allows the system to make default assumptions and guide the selection if the user only mentions the criterion. For example, the user interface might offer to "sort by rating" and assume that higher rated is better.

One or more selection criteria are also item features; they are those features related to choosing among possible items. However, item features are not necessarily related to a preference (e.g., the names and phone numbers of restaurants are usually irrelevant to choosing among them).

In at least one embodiment, constraints are restrictions on the desired values of the selection criteria. Formally, constraints might be represented as set membership (e.g., cuisine type includes Italian), pattern matches (e.g., restaurant review text includes "romantic"), fuzzy inequalities (e.g., distance less than a few miles), qualitative thresholds (e.g., highly rated), or more complex functions (e.g., a good value for money). To make things simple enough for normal humans, this data model reduces at least one or more constraints to symbolic values that may be matched as words. Time and distance may be excluded from this reduction. In one embodiment, the operators and threshold values used for implementing constraints are hidden from the user. For example, a constraint on the selection criteria called "cuisine" may be represented as a symbolic value such as "Italian" or "Chinese". A constraint on rating is "recommended" (a binary choice). For time and distance, in one embodiment assistant 1002 uses proprietary representations that handle a range of inputs and constraint values. For example, distance might be "walking distance" and time might be "tonight"; in one embodiment, assistant 1002 uses special processing to match such input to more precise data.

In at least one embodiment, some constraints may be required constraints. This means that the task simply cannot be completed without this data. For example, it is hard to pick a restaurant without some notion of desired location, even if one knows the name.

To summarize, a domain is modeled as selection classes with item features that are important to users. Some of the features are used to select and order items offered to the user—these features are called selection criteria. Constraints are symbolic limits on the selection criteria that narrow the set of items to those that match.

Often, multiple criteria may compete and constraints may match partially. The data model reduces the selection problem from an optimization (finding the best solution) to a matching problem (finding items that do well on a set of specified criteria and match a set of symbolic constraints). The algorithms for selecting criteria and constraints and determining an ordering are described in the next section.

Methodology for Constrained Selection

In one embodiment, assistant 1002 performs constrained selection by taking as input an ordered list of criteria, with implicit or explicit constraints on at least one, and generating a set of candidate items with salient features. Computationally, the selection task may be characterized as a nested search: first, identify a selection class, then identify the important selection criteria, then specify constraints (the boundaries of acceptable solutions), and search through instances in order of best-fit to find acceptable items.

Figure 45:
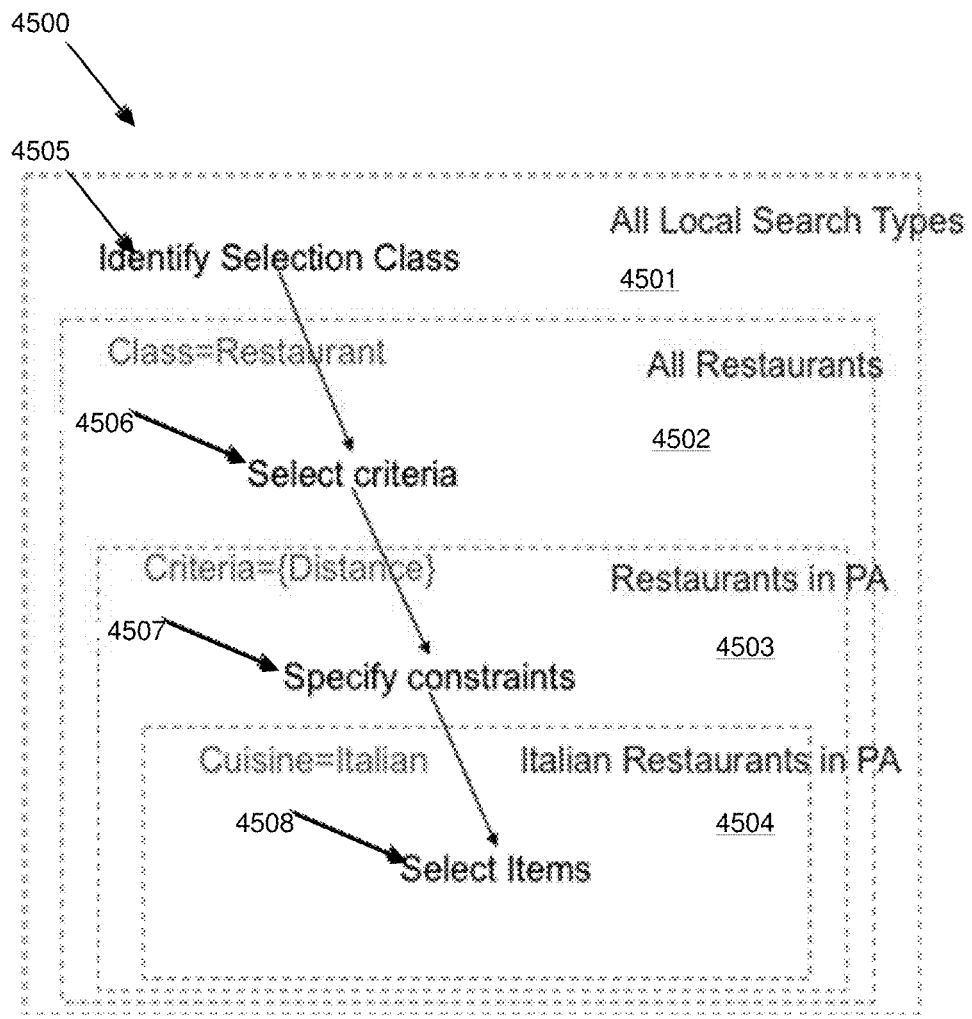
FIG. 45 depicts an example of an abstract model for a constrained selection task.

Referring now to FIG. 45, there is shown an example of an abstract model 4500 for a constrained selection task as a nested search. In the example assistant 1002 identifies 4505 a selection call among all local search types 4501. The identified class is restaurant. Within the set of all restaurants 4502, assistant 1002 selects 4506 criteria. In the example, the criterion is identified as distance. Within the set of restaurants in PA 4503, assistant 1002 specifies 4507 constraints for the search. In the example, the identified constraint is "Italian cuisine"). Within the set of Italian restaurants in PA 4504, assistant 4508 selects items for presentation to the user.

In one embodiment, such a nested search is what assistant 1002 does once it has the relevant input data, rather than the flow for eliciting the data and presenting results. In one embodiment, such control flow is governed via a dialog between assistant 1002 and the user which operates by other procedures, such as dialog and task flow models. Constrained selection offers a framework for building dialog and task flow models at this level of abstraction (that is, suitable for constrained selection tasks regardless of domain).

Figure 46:
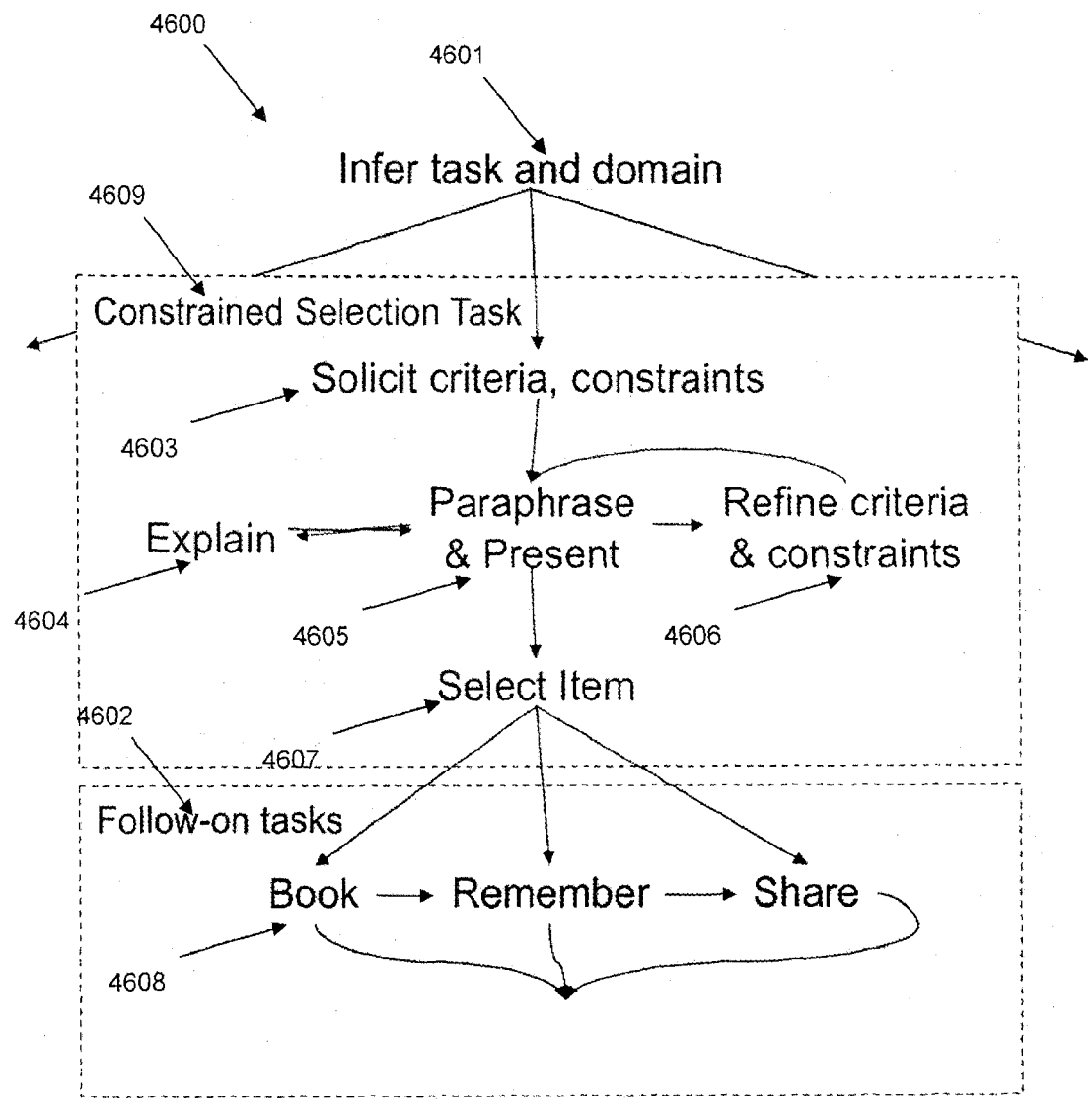
FIG. 46 depicts an example of a dialog flow model to help guide the user through a search process.

Referring now to FIG. 46, there is shown an example of a dialog 4600 to help guide the user through a search process, so that the relevant input data can be obtained.

In the example dialog 4600, the first step is for the user to state the kind of thing they are looking for, which is the selection class. For example, the user might do this by saying "dining in palo alto". This allows assistant 1002 to infer 4601 the task and domain.

Once assistant 1002 has understood the task and domain binding (selection class=restaurants), the next step is to understand which selection criteria are important to this user, for example by soliciting 4603 criteria and/or constraints. In the example above, "in palo alto" indicates a location of interest. In the context of restaurants, the system may interpret a location as a proximity constraint (technically, a constraint on the proximity criterion). Assistant 1002 explains 4604 what is needed, receives input. If there is enough information to constrain the choice set to a reasonable size, then assistant 1002 paraphrases the input and presents 4605 one or more restaurants that meet the proximity constraint, sorted in some useful order. The user can then select 4607 from this list, or refine 4606 the criteria and constraints. Assistant 1002 reasons about the constraints already stated, and uses domain-specific knowledge to suggest other criteria that might help, soliciting constraints on these criteria as well. For example, assistant 1002 may reason that, when recommending restaurants within walking distance of a hotel, the useful criteria to solicit would be cuisine and table availability.

The constrained selection task 4609 is complete when the user selects 4607 an instance of the selection class. In one embodiment, additional follow-on tasks 4602 are enabled by assistant 1002. Thus, assistant 1002 can offer services that indicate selection while providing some other value. Examples 4608 booking a restaurant, setting a reminder on a calendar, and/or sharing the selection with others by sending an invitation. For example, booking a restaurant certainly indicates that it was selected; other options might be to put the restaurant on a calendar or send in invitation with directions to friends.

Figure 47:
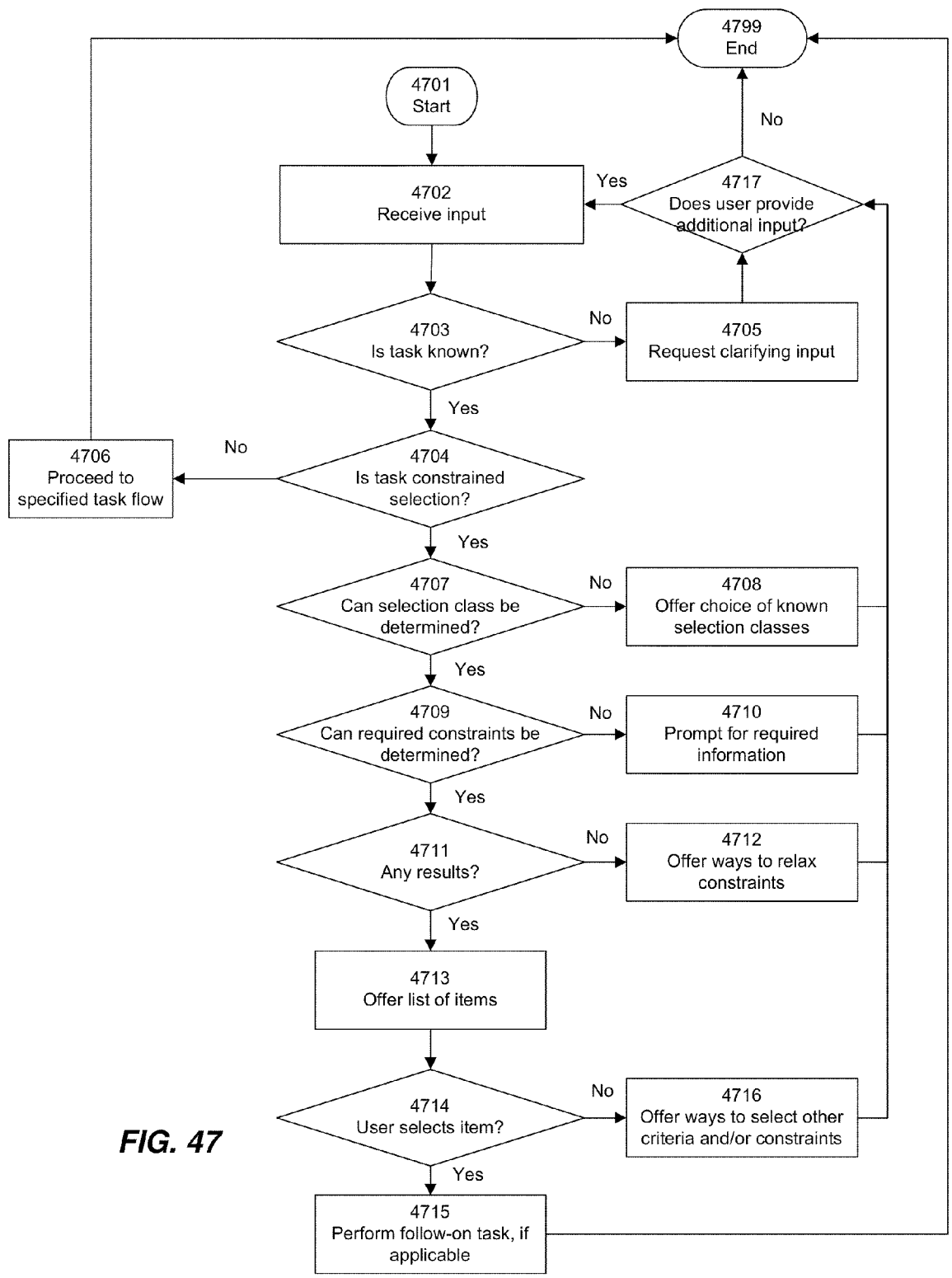
FIG. 47 is a flow diagram depicting a method of constrained selection according to one embodiment.

Referring now to FIG. 47, there is shown a flow diagram depicting a method of constrained selection according to one embodiment. In one embodiment, assistant 1002 operates in an opportunistic and mixed-initiative manner, permitting the user to jump to the inner loop, for instance, by stating task, domain, criteria, and constraints one or more at once in the input.

The method begins 4701. Input is received 4702 from the user, according to any of the modes described herein. If, based on the input, the task not known (step 4703, "No"), assistant 1002 requests 4705 clarifying input from the user.

In step 4717, assistant 1002 determines whether the user provides additional input. If so, assistant 1002 returns to step 4702. Otherwise the method ends 4799.

If, in step 4703, the task is known, assistant 1002 determines 4704 whether the task is constrained selection. If not, assistant 1002 proceeds 4706 to the specified task flow.

If, in step 4704, the task is constrained selection (step 4703, "Yes"), assistant 1002 determines 4707 whether the selection class can be determined. If not, assistant 1002 offers 4708 a choice of known selection classes, and returns to step 4717.

If, in step 4707, the selection class can be determined, assistant 1002 determines 4709 whether all required constraints can be determined. If not, assistant 1002 prompts 4710 for required information, and returns to step 4717.

If, in step 4709, all required constants can be determined, assistant 1002 determines 4711 whether any result items can be found, given the constraints. If there are no items that meet the constraints, assistant 1002 offers 4712 ways to relax the constraints. For example, assistant 1002 may relax the constraints from lowest to highest precedence, using a filter/sort algorithm. In one embodiment, if there are items that meet some of the constraints, then assistant 1002 may paraphrase the situation (outputting, for example, "I could not find Recommended Greek restaurants that deliver on Sundays in San Carlos. However, I found 3 Greek restaurants and 7 Recommend restaurants in San Carlos."). In one embodiment, if there are no items that match any constraints, then assistant 1002 may paraphrase this situation and prompt for different constraints (outputting, for example, "Sorry, I could not find any restaurants in Anytown, Tex. You may pick a different location."). Assistant 1002 returns to step 4717.

If, in step 4711, result items can be found, assistant 1002 offers 4713 a list of items. In one embodiment, assistant 1002 paraphrases the currently specified criteria and constraints (outputting, for example, "Here are some recommended Italian restaurants in San Jose." (recommended=yes, cuisine=Italian, proximity=<in San Jose>)). In one embodiment, assistant 1002 presents a sorted, paginated list of items that meet the known constraints. If an item only shows some of the constraints, such a condition can be shown as part of the item display. In one embodiment, assistant 1002 offers the user ways to select an item, for example by initiating another task on that item such as booking, remembering, scheduling, or sharing. In one embodiment, on any given item, assistant 1002 presents item features that are salient for picking instances of the selection class. In one embodiment, assistant 1002 shows how the item meets a constraint; for example, Zagat rating of 5 meets the Recommended=yes constraint, and "1 mile away" meets the "within walking distance of an address" constraint. In one embodiment, assistant 1002 allows the user to drill down for more detail on an item, which results in display of more item features.

Assistant 1002 determines 4714 whether the user has selected an item. If the user selects an item, the task is complete. Any follow-on task is performed 4715, if there is one, and the method ends 4799.

If, in step 4714, the user does not select an item, assistant 1002 offers 4716 the user ways to select other criteria and constraints and returns to step 4717. For example, given the currently specified criteria and constraints, assistant 1002 may offer criteria that are most likely to constrain the choice set to a desired size. If the user selects a constraint value, that constraint value is added to the previously determined constraints when steps 4703 to 4713 are repeated.

Since one or more criteria may have an inherent preference value, selecting the criteria may add information to the request. For example, allowing the user to indicate that positive reviews are valued allows assistant 1002 to sort by this criterion. Such information can be taken into account when steps 4703 to 4713 are repeated.

In one embodiment, assistant 1002 allows the user to raise the importance of a criterion that is already specified, so that it would be higher in the precedence order. For example, if the user asked for fast, cheap, highly recommended restaurants within one block of their location, assistant 1002 may request that the user chooses which of these criteria are more important. Such information can be taken into account when steps 4703 to 4713 are repeated.

In one embodiment, the user can provide additional input at any point while the method of FIG. 47 is being performed. In one embodiment, assistant 1002 checks periodically or continuously for such input, and, in response, loops back to step 4703 to process it.

In one embodiment, when outputting an item or list of items, assistant 1002 indicates, in the presentation of items, the features that were used to select and order them. For example, if the user asked for nearby Italian restaurants, such item features for distance and cuisine may be shown in the presentation of the item. This may include highlighting matches, as well as listing selection criteria that were involved in the presentation of an item.

Example Domains

Table 1 provides an example of constrained selection domains that may be handled by assistant 1002 according to various embodiments.

TABLE 1

| Select a | Based on these criteria | | | | | | | | |
|---|---|---|---|---|---|---|---|---|---|
| | Location | Price | Availability | Type | Quality | Name | Services | special search | general search |
| Restaurant | proximity | affordability | open tables | cuisine | rating by guide, review | restaurant name | delivery | menu items | keywords |
| Hotel | proximity | price range | available rooms | motel, hotel, B&B, ... | rating by guide, review | hotel name | amenities | | keywords |
| Movie | theatre proximity | | show times | genre | rating by review | movie title | | actors, etc | |
| Local Business | proximity | | | business category | rating by review | business name | | | keywords |
| Local event | venue proximity | | by date | | | event title | | | keywords |
| concert | venue proximity | | by tour schedule | music genre | | band name | | band members | keywords |
| CD, book, DVD to buy | | price range | online, in store, etc | download, physical | popularity | album or song name | | artist, title, etc. | keywords |

Filtering and Sorting Results

In one embodiment, when presenting items that meet currently specified criteria and constraints, a filter/sort methodology can be employed. In one embodiment selection constraints may serve as both filter and sort parameters to the underlying services. Thus, any selection criterion can be used to determine which items are in the list, and to compute the order in which to paginate and show them. Sort order for this task is akin to relevance rank in search. For example, proximity is a criterion with symbolic constraint values such as "within driving distance" and a general notion of sorting by distance. The "driving distance" constraint might be used to select a group of candidate items. Within that group, closer items might be sorted higher in the list.

In one embodiment, selection constraints and associated filtering and sorting are at discrete "levels", which are functions of both the underlying data and the input from the user. For example, proximity is grouped into levels such as "walking distance", "taxi distance", "driving distance". When sorting, one or more items within walking distance are treated as if they were the same distance. The input from the user may come into play in the way he or she specifies a constraint. If the user enters "in palo alto", for example, then one or more items within the Palo Alto city limits are perfect matches and are equivalent. If the user enters, "near the University Avenue train station" then the match would depend on a distance from that address, with the degree of match dependent on the selection class (e.g., near for restaurants is different than near for hotels). Even within a constraint that may be specified with a continuous value, a discretization may be applied. This may be important for sorting operations, so that multiple criteria may participate in determining the best-first ordering.

In one embodiment, the item list—those items that are considered "matching" or "good enough"—may be shorter or longer than the number of items shown on one "page" of the output. Generally, items in the first page are given the most attention, but conceptually there is a longer list, and pagination is simply a function of the form factor of the output medium. This means, for instance, that if the user is offered a way to sort or browse the items by some criterion, then it is the entire set of items (more than one page worth) that is sorted or browsed.

In one embodiment, there is a precedence ordering among selection criteria. That is, some criteria may matter more than others in the filter and sort. In one embodiment, those criteria selected by the user are given higher precedence than others, and there is a default ordering over one or more criteria. This allows for a general lexicographic sort. The assumption is that there is a meaningful a priori precedence. For example, unless the user states otherwise, it may be more important for a restaurant to be close than to be inexpensive. In one embodiment, the a priori precedence ordering is domain-specific. The model allows for user-specific preferences to override the domain defaults, if that is desired.

Since the values of constraints can represent several internal data types, there are different ways for constraints to match, and they may be specific to the constraint. For example, in one embodiment:

Binary constraints match one or more or none. For example, whether a restaurant is "Fast" might be either true or not.

Set membership constraints match one or more or none based on a property value. For example, cuisine=Greek means the set of cuisines for a restaurant includes Greek.

Enumeration constraints match at a threshold. For example, a rating criterion might have constraint values rated, highly-rated, or top-rated. Constraining to highly-rated would also match top-rated.

Numeric constraints match at a threshold that may be criterion specific. For example, "open late" might be a criterion, and the user might ask for places open after 10:00 pm. This kind of constraint may be slightly out of scope for the constrained selection task, since it is not a symbolic constraint value. However, in one embodiment, assistant 1002 recognizes some cases of numeric constraints like this, and maps them to threshold values with symbolic constraints (e.g., "restaurants in palo alto open now"→37 here are 2 restaurants in palo alto that are open late").

Location and time are handled specially. A constraint on proximity might be a location of interest specified at some level of granularity, and that determines the match. If the user specifies a city, then city-level matching is appropriate; a ZIP code may allow for a radius. Assistant 1002 may also understand locations that are "near" other locations of interest, also based on special processing. Time is relevant as a constraint value of criteria that have threshold value based on a service call, such as table availability or flights within a given time range.

In one embodiment, constraints can be modeled so that there is a single threshold value for selection and a small set of discrete values for sorting. For example, the affordability criterion might be modeled as a roughly binary constraint, where affordable restaurants are any under some threshold price range. When the data justify multiple discrete levels for selection, constraints can be modeled using a gradient of matching. In one embodiment two levels of matching (such as strong and weak matching) may be provided; however, one skilled in the art will recognize that in other embodiments, any number of levels of matching can be provided. For example, proximity may be matched with a fuzzy boundary, so that things that are near the location of interest may match weakly. The operational consequence of a strong or weak match is in the filter/sort algorithm as described below.

For at least one criterion, an approach to matching and default thresholds can be established, if relevant. The user may be able to say just the name of the constraint, a symbolic constraint value, or a precise constraint expression if it is handled specially (such as time and location).

An ideal situation for constrained selection occurs when the user states constraints that result in a short list of candidates, one or more of which meet the constraints. The user then chooses among winners based on item features. In many cases, however, the problem is over- or under-constrained. When it is over-constrained, there are few or no items that meet the constraints. When it is under-constrained, there are so many candidates that examining the list is not expedient. In one embodiment, the general constrained selection model of the present invention is able to handle multiple constraints with robust matching and usually produce something to choose from. Then the user may elect to refine their criteria and constraints or just complete the task with a "good enough" solution.

Method

In one embodiment, the following method is used for filtering and sorting results:

1. Given an ordered list of selection criteria selected by the user, determine constraints on at least one.
   a. If the user specified a constraint value, use it. For example, if the user said "greek food" the constraint is cuisine=Greek. If the user said "san Francisco" the constraint is In the City of San Francisco. If the user said "south of market" then the constraint is In the Neighborhood of SoMa.
   b. Otherwise use a domain- and criteria-specific default. For example, if the user said "a table at some that place" he or she is indicating that the availability criterion is relevant, but he or she did not specify a constraint value. The default constraint values for availability might be some range of date times such as tonight and a default party size of 2.
2. Select a minimum of N results by specified constraints.
   a. Try to get N results at strong match.
   b. If that fails, try to relax constraints, in reverse precedence order. That is, match at strong level for one or more of the criteria except the last, which may match at a weak level. If there is no weak match for that constraint, then try weak matches up the line from lowest to highest precedence.
   c. Then repeat the loop allowing failure to match on constraints, from lowest to highest precedence.
3. After getting a minimum choice set, sort lexicographically over one or more criteria (which may include user-specified criteria as well as other criteria) in precedence order.
   a. Consider the set of user-specified criteria as highest precedence, then one or more remaining criteria in their a priori precedence. For example, if the a priori precedence is (availability, cuisine, proximity, rating), and the user gives constraints on proximity and cuisine, then the sort precedence is (cuisine, proximity, availability, rating).

b. Sort on criteria using discrete match levels (strong, weak, none), using the same approach as in relaxing constraints, this time applied the full criteria list.

i. If a choice set was obtained without relaxing constraints, then one or more of the choice set may "tie" in the sort because they one or more match at strong levels. Then, the next criteria in the precedence list may kick in to sort them. For example, if the user says cuisine=Italian, proximity=In San Francisco, and the sort precedence is (cuisine, proximity, availability, rating), then one or more the places on the list have equal match values for cuisine and proximity. So the list would be sorted on availability (places with tables available bubble to the top). Within the available places, the highest rated ones would be at the top.

ii. If the choice set was obtained by relaxing constraints, then one or more of the fully matching items are at the top of the list, then the partially matching items. Within the matching group, they are sorted by the remaining criteria, and the same for the partially matching group. For example, if there were only two Italian restaurants in San Francisco, then the available one would be shown first, then the unavailable one. Then the rest of the restaurants in San Francisco would be shown, sorted by availability and rating.

Precedence Ordering

The techniques described herein allow assistant 1002 to be extremely robust in the face of partially specified constraints and incomplete data. In one embodiment, assistant 1002 uses these techniques to generate a user list of items in best-first order, i.e. according to relevance.

In one embodiment, such relevance sorting is based on an a priori precedence ordering. That is, of the things that matter about a domain, a set of criteria is chosen and placed in order of importance. One or more things being equal, criteria higher in the precedence order may be more relevant to a constrained selection among items than those lower in the order. Assistant 1002 may operate on any number of criteria. In addition, criteria may be modified over time without breaking existing behaviors.

In one embodiment, the precedence order among criteria may be tuned with domain-specific parameters, since the way criteria interact may depend on the selection class. For example, when selecting among hotels, availability and price may be dominant constraints, whereas for restaurants, cuisine and proximity may be more important.

In one embodiment, the user may override the default criteria ordering in the dialog. This allows the system to guide the user when searches are over-constrained, by using the ordering to determine which constraints should be relaxed. For example, if the user gave constraints on cuisine, proximity, recommendation, and food item, and there were no fully matching items, the user could say that food item was more important than recommendation level and change the mix so the desired food item matches were sorted to the top.

In one embodiment, when precedence order is determined, user-specified constraints take precedence over others. For example, in one embodiment, proximity is a required constraint and so is always specified, and further has precedence over other unselected constraints. Therefore it does not have to be the highest precedence constraint in order to be fairly dominant. Also, many criteria may not match at one or more unless a constraint is given by the user, and so the precedence of these criteria only matters within user-selected criteria. For example, when the user specifies a cuisine it is important to them, and otherwise is not relevant to sorting items.

For example, the following is a candidate precedence sorting paradigm for the restaurant domain:

1. cuisine* (not sortable unless a constraint value is given)
2. availability* (sortable using a default constraint value, e.g., time)
3. recommended
4. proximity* (a constraint value is always given)
5. affordability
6. may deliver
7. food item (not sortable unless a constraint value, e.g., a keyword, is given)
8. keywords (not sortable unless a constraint value, e.g., a keyword, is given)
9. restaurant name The following is an example of a design rationale for the above sorting paradigm:

If a user specifies a cuisine, he or she wants it to stick.

One or more things being equal, sort by rating level (it is the highest precedence among criteria than may be used to sort without a constraint).

In at least one embodiment, proximity may be more important than most things. However, since it matches at discrete levels (in a city, within a radius for walking and the like), and it is always specified, then most of the time most matching items may "tie" on proximity.

Availability (as determined by a search on a website such as opentable.com, for instance) is a valuable sort criterion, and may be based on a default value for sorting when not specified. If the user indicates a time for booking, then only available places may be in the list and the sort may be based on recommendation.

If the user says they want highly recommended places, then it may sort above proximity and availability, and these criteria may be relaxed before recommendation. The assumption is that if someone is looking for nice place, they may be willing to drive a bit farther and it is more important than a default table availability. If a specific time for availability is specified, and the user requests recommended places, then places that are both recommended and available may come first, and recommendation may relax to a weak match before availability fails to match at one or more.

The remaining constraints except for name are one or more based on incomplete data or matching. So they are weak sort heuristics by default, and when they are specified the match one or more-or-none.

Name may be used as a constraint to handle the case where someone mentions the restaurant by name, e.g., find one or more Hobee's restaurants near Palo Alto. In this case, one or more items may match the name, and may be sorted by proximity (the other specified constraint in this example).

Domain Modeling: Mapping Selection Criteria to Underlying Data

It may be desirable to distinguish between the data that are available for computation by assistant 1002 and the data used for making selections. In one embodiment, assistant 1002 uses a data model that reduces the complexity for the user by folding one or more kinds of data used to distinguish among items into a simple selection criteria model. Internally, these data may take several forms. Instances of the selection class can have intrinsic properties and attributes (such as cuisine of a restaurant), may be compared along dimensions (such as the distance from some location), and may be discovered by some query (such as whether it matches a text pattern or is available at a given time). They may also be computed from other data which are not exposed to the user as selection criteria (e.g., weighted combinations of ratings from multiple sources). These data are one or more relevant to the task, but the distinctions among these three kinds of data are not relevant to the user. Since the user thinks in terms of features of the desired choice rather than in properties and dimensions, assistant 1002 operationalizes these various criteria into features of the items. Assistant 1002 provides a user-facing domain data model and maps it to data found in web services.

One type of mapping is an isomorphism from underlying data to user-facing criteria. For example, the availability of tables for reservations as seen by the user could be exactly what an online reservation website, such as opentable.com, offers, using the same granularity for time and party size.

Another type of mapping is a normalization of data from one or more services to a common value set, possibly with a unification of equivalent values. For example, cuisines of one or more restaurants may be represented as a single ontology in assistant 1002, and mapped to various vocabularies used in different services. That ontology might be hierarchical, and have leaf nodes pointing to specific values from at least one service. For example, one service might have a cuisine value for "Chinese", another for "Szechuan", and a third for "Asian". The ontology used by assistant 1002 would cause references to "Chinese food" or "Szechuan" to semantically match one or more of these nodes, with confidence levels reflecting the degree of match.

Normalization might also be involved when resolving differences in precision. For example, the location of a restaurant may be given to the street level in one service but only to city in another. In one embodiment, assistant 1002 uses a deep structural representation of locations and times that may be mapped to different surface data values.

In one embodiment, assistant 1002 uses a special kind of mapping for open-ended qualifiers (e.g., romantic, quiet) which may be mapped to matches in full text search, tags, or other open-textured features. The name of the selection constraint in this case would be something like "is described as".

In at least one embodiment, constraints may be mapped to operational preference orderings. That is, given the name of a selection criterion and its constraint value, assistant 1002 is able to interpret the criterion as an ordering over possible items. There are several technical issues to address in such a mapping. For example:

Preference orderings may conflict. The ordering given by one constraint may be inconsistent or even inversely correlated with the ordering given by another. For example, price and quality tend to be in opposition. In one embodiment, assistant 1002 interprets constraints chosen by the user in a weighted or otherwise combined ordering that reflects the user's desires but is true to the data. For example, the user may ask for "cheap fast food French restaurants within walking distance rated highly". In many locations, there may not be any such restaurant. However, in one embodiment, assistant 1002 may show a list of items that tries to optimize for at least one constraint, and explain why at least one is listed. For example, item one might be "highly rated French cuisine" and another "cheap fast food within walking distance".

Data may be used as either hard or soft constraints. For example, the price range of a restaurant may be important to choosing one, but it may be difficult to state a threshold value for price up-front. Even seemingly hard constraints like cuisine may be, in practice, soft constraints because of partial matching. Since, in one embodiment, assistant 1002 using a data modeling strategy that seeks to flatten one or more criteria into symbolic values (such as "cheap" or "close"), these constraints may be mapped into a function that gets the criteria and order right, without being strict about matching specific threshold values. For symbolic criteria with clear objective truth values, assistant 1002 may weight the objective criteria higher than other criteria, and make it clear in the explanation that it knows that some of the items do not strictly match the requested criteria.

Items may match some but not one or more constraints, and the "best fitting" items may be shown.

In general, assistant 1002 determines which item features are salient for a domain, and which may serve as selection criteria, and for at least one criteria, possible constraint values. Such information can be provided, for example, via operational data and API calls.

Paraphrase and Prompt Text

As described above, in one embodiment assistant 1002 provides feedback to show it understands the user's intent and is working toward the user's goal by producing paraphrases of its current understanding. In the conversational dialog model of the present invention, the paraphrase is what assistant 1002 outputs after the user's input, as a preface (for example, paraphrase 4003 in FIG. 40) or summary of the results to follow (for example, list 3502 in FIG. 35). The prompt is a suggestion to the user about what else they can do to refine their request or explore the selection space along some dimensions.

In one embodiment, the purposes of paraphrase and prompt text include, for example:

to show that assistant 1002 understands the concepts in the user's input, not just the text;

to indicate the boundaries of assistant's 1002 understanding;

to guide the user to enter text that is required for the assumed task;

to help the user explore the space of possibilities in constrained selection;

to explain the current results obtained from services in terms of the user's stated criteria and assistant's 1002 assumptions (for example, to explain the results of under- and over-constrained requests).

For example, the following paraphrase and prompt illustrates several of these goals:

User input: indonesian food in menlo park
System Interpretation:
Task=constrainedSelection
SelectionClass=restaurant
Constraints:
Location=Menlo Park, Calif.
Cuisine=Indonesian (known in ontology)
Results from Services: no strong matches
Paraphrase: Sorry, I can't find any <u>Indonesian</u> restaurants near <u>Menlo</u> Park.
Prompt: You could try other <u>cuisines</u> or <u>locations</u>.
Prompt Under Hypertext Links:
<u>Indonesian</u>: You can try other food categories such as Chinese, or a favorite food item such as steak.
<u>MenloPark</u>: Enter a location such as a city, neighborhood, street address, or "near" followed by a landmark.
<u>Cuisines</u>: Enter a food category such as Chinese or Pizza.
<u>Locations</u>: Enter a location: a city, zip code, or "near" followed by the name of a place.

In one embodiment, assistant 1002 responds to user input relatively quickly with the paraphrase. The paraphrase is then updated after results are known. For example, an initial response may be "Looking for Indonesian restaurants near MenloPark . . . " Once results are obtained, assistant 1002 would update the text to read, "Sorry, I can't find any Indonesian restaurants near MenloPark. You could try other cuisines or locations." Note that certain items are highlighted (indicated here by underline), indicating that those items represent constraints that can be relaxed or changed.

In one embodiment, special formatting/highlighting is used for key words in the paraphrase. This can be helpful to facilitate training of the user for interaction with intelligent automated assistant 1002, by indicating to the user which words are most important to, and more likely to be recognized by, assistant 1002. User may then be more likely to use such words in the future.

In one embodiment, paraphrase and prompt are generated using any relevant context data. For example, any of the following data items can be used, alone or in combination:

- The parse—a tree of ontology nodes bound to their matching input tokens, with annotations and exceptions. For each node in the parse, this may include the node's metadata and/or any tokens in the input that provide evidence for the node's value.
- The task, if known
- The selection class.
- The location constraint, independent of selection class.
- Which required parameters are unknown for the given selection class (e.g., location is a required constraint on restaurants).
- The name of a named entity in the parse that is an instance of the selection class, if there is one (e.g., a specific restaurant or movie name.)
- Is this a follow-up refinement or the beginning of a conversation? (Reset starts a new conversation.)
- Which constraints in the parse are bound to values in the input that changed their values? In other words, which constraints were just changed by the latest input?
- Is the selection class inferred or directly stated?
- Sorted by quality, relevance, or proximity?
- For each constraint specified, how well was it matched?
- Was refinement entered as text or clicking?

In one embodiment, the paraphrase algorithm accounts for the query, domain model 1056, and the service results. Domain model 1056 contains classes features including metadata that is used to decide how to generate text. Examples of such metadata for paraphrase generation include IsConstraint={true|false}
    IsMultiValued={true|false}
    ConstraintType={EntityName, Location, Time, CategoryConstraint, AvailabilityConstraint, BinaryConstraint, SearchQualifier, GuessedQualifier}
    DisplayName=string
    DisplayTemplateSingular=string
    DisplayTemplatePlural=string
    GrammaticalRole={AdjectiveBeforeNoun,Noun,ThatClauseModifer}

For example, a parse might contain these elements:
Class: Restaurant
IsConstraint=false
DisplayTemplateSingular="restaurant"
DisplayTemplatePlural="restaurants"
GrammaticalRole=Noun
Feature: RestaurantName (example: "Il Fornaio")
IsConstraint=true
IsMultiValued=false
ConstraintType=EntityName
DisplayTemplateSingular="named $1"
DisplayTemplatePlural="named $1"
GrammaticalRole=Noun
Feature: RestaurantCuisine (example: "Chinese")
IsConstraint=true
IsMultiValued=false
    ConstraintType=CategoryConstraint
GrammaticalRole=AdjectiveBeforeNoun
Feature: RestaurantSubtype (example: "café")
IsConstraint=true
IsMultiValued=false
ConstraintType=CategoryConstraint
DisplayTemplateSingular="$1"
DisplayTemplatePlural="$1s"
GrammaticalRole=Noun
Feature: RestaurantQualifiers (example: "romantic")
IsConstraint=true
IsMultiValued=true
ConstraintType=SearchQualifier
DisplayTemplateSingular="is described as $1"
DisplayTemplatePlural="are described as $1"
DisplayTemplateCompact="matching $1"
GrammaticalRole=Noun
Feature: FoodType (example: "burritos")
IsConstraint=true
IsMultiValued=false
ConstraintType=SearchQualifier
DisplayTemplateSingular="serves $1"
DisplayTemplatePlural="serve $1"
DisplayTemplateCompact="serving $1"
GrammaticalRole=ThatClauseModifer
Feature: IsRecommended (example: true)
IsConstraint=true
IsMultiValued=false
ConstraintType=BinaryConstraint
DisplayTemplateSingular="recommended"
DisplayTemplatePlural="recommended"
GrammaticalRole=AdjectiveBeforeNoun
Feature: RestaurantGuessedQualifiers (example: "spectacular")
IsConstraint=true
IsMultiValued=false
ConstraintType=GuessedQualifier
DisplayTemplateSingular="matches $1 in reviews"
DisplayTemplatePlural="match $1 in reviews"
DisplayTemplateCompact="matching $1"
GrammaticalRole=ThatClauseModifer In one embodiment, assistant 1002 is able to handle unmatched input. To handle such input, domain model 1056 can provide for nodes of type GuessedQualifier for each selection class, and rules that match otherwise unmatched words if they are in the right grammatical context. That is, GuessedQualifiers are treated as miscellaneous nodes in the parse which match when there are words that are not found in the ontology but which are in the right context to indicate that that are probably qualifiers of the selection class. The difference between GuessedQualifiers and SearchQualifiers is that the latter are matched to vocabulary in the ontology. This distinction allows us to paraphrase that assistant 1002 identified the intent solidly on the SearchQualifiers and can be more hesitant when echoing back the GuessedQualifiers.

In one embodiment, assistant 1002 performs the following steps when generating paraphrase text:
1. If the task is unknown, explain what assistant 1002 can do and prompt for more input.

2. If the task is a constrained selection task and the location is known, then explain the domains that assistant 1002 knows and prompt for the selection class.
3. If the selection class is known but a required constraint is missing, then prompt for that constraint. (for example, location is required for constrained selection on restaurants)
4. If the input contains an EntityName of the selection class, then output "looking up"<name> in <location>.
5. If this is the initial request in a conversation, then output "looking for" followed by the complex noun phrase that describes the constraints.
6. If this is a follow-up refinement step in the dialog,
   a. If the user just completed a required input, then output "thanks" and then paraphrase normally. (This happens when there is a required constraint that is mapped to the user input.)
   b. If the user is changing a constraint, acknowledge this and then paraphrase normally.
   c. If the user typed in the proper name of an instance of the selection class, handle this specially.
   d. If the user just added an unrecognized phrase, then indicate how it will be folded in as search. If appropriate, the input may be dispatched to a search service.
   e. If the user is just adding a normal constraint, then output "OK", and paraphrase normally.
7. To explain results, use the same approach for paraphrase. However, when the results are surprising or unexpected, then explain the results using knowledge about the data and service. Also, when the query is over- or underconstrained, prompt for more input.

Grammar for Constructing Complex Noun Phrases

In one embodiment, when paraphrasing 734 a constrained selection task query, the foundation is a complex noun phrase around the selection class that refers to the current constraints. Each constraint has a grammatical position, based on its type. For example, in one embodiment, assistant 1002 may construct a paraphrase such as:

recommended romantic Italian restaurants near MenloPark with opentablesfor2 that serve ossobuco and are described as "quiet"

A grammar to construct this is

<paraphraseNounClause> :== <binaryConstraint> <searchQualifier>
  <categoryConstraint> <itemNoun> <locationConstraint>
  <availabiltyConstraint> <adjectivalClauses>

<binaryConstraint>:==single adjective that indicates the presence or absence of a BinaryConstraint (e.g., recommended (best), affordable (cheap))
  It is possible to list more than one in the same query.
<searchQualifier>:==a word or words that match the ontology for a qualifier of the selection class, which would be passed into a search engine service. (e.g., romantic restaurants, funny movies).
  Use when ConstraintType=Search Qualifier.
<categoryConstraint>:==an adjective that identifies the genre, cuisine, or category of the selection class (e.g., Chinese restaurant or R-rated file). It is the last prefix adjective because it is the most intrinsic. Use for features of type CategoryConstraint and GrammaticalRole=AdjectiveBeforeNoun.

<itemNoun> :== <namedEntityPhrase> | <selectionClass> |
  <selectionClassSubType> find the most specific way to display the noun. NamedEntity<SubType<Class

<selectionClass>:==a noun that is the generic name for the selection class (e.g., restaurant, movie, place)
<selectionClassSubType>:==a noun phrase that is the subtype of the selection class if it is known (e.g., diner, museum, store, bar for the selection class local business). Use for features in which ConstraintType=CategoryConstraint and GrammaticalRole=AdjectiveBeforeNoun.

<namedEntityPhrase> :== <entityName> |
  "the" (<selectionClass> | <selectionClassSubType>)

<entityName>:==the proper name of an instance of the selection class (e.g., "Il Formaio" "Animal House" "Harry's Bar")
<locationConstraint>:
  ==<locationPreposition><locationName>
<locationPreposition>:=="in", "near", "at", and the like
<locationName>:==city, street address, landmark, or something for GPS like "your current location"
<availabilityConstraint>:==the availability constraint expressed as a prepositional phrase that comes after the noun (e.g., "with open tables", "with seats available", "available online"). It comes right after the noun to give it salience.

<adjectivalClauses> :== <modiferVerbPhrase> | "that"
  <modiferVerbPhrase> "and" <modiferVerbPhrase>

<modiferVerbPhrase>:==a verb phrase that expresses a search-keyword style constraint on the selection class (e.g., restaurants that "are described as quiet", "serve meat after 11", "match 'tragically hip' in reviews"; movies that "contain violence", "star Billy Bob Thornton"). Include all constraints in the parse whose GrammaticalRole=ThatClauseModifer, using the "that . . . and" variant if there are more than one. Use the Display-TemplatePlural to generate the "that" clauses, putting the GuessedQualifier last. If there is only one such constraint, use the DisplayTemplateCompact variant.

Table 2 provides some examples of paraphrases that may be provided in response to the first input for a task, according to one embodiment.

TABLE 2

| Paraphrases in response to first input | |
| --- | --- |
| Input | Initial Paraphrase |
| tie house | Sorry, I don't understand "tie house". I know about restaurants, hotels, and other local businesses, flights, weather, and buying things online. What are you looking for, and where? |

TABLE 2-continued

Paraphrases in response to first input

| Input | Initial Paraphrase |
|---|---|
| palo alto | I can help you find restaurants, businesses, events, and things to do in Palo Alto. What are you looking for? |
| food | Looking for a place to eat? Where? (examples) |
| Italian food | I can tell you about Italian restaurants in your area. Where would you like to eat? |
| burrito | I can help you find places that serve burritos in your area. Where would you like to eat? |
| best mexican food | I can help you find good Mexican restaurants in your area. Where are you? |
| restaurants palo alto | Looking for restaurants near Palo Alto. |
| Italian palo alto | Looking for Italian restaurants near Palo Alto. |
| thai food in menlo park | Looking for Thai restaurants near Menlo Park |
| indonesian food in menlo park | Looking for Indonesian restaurants near Menlo Park |
| best mexican food in Palo Alto | Looking for recommended Mexican restaurants near Palo Alto. |
| fast food menlo park | Looking for fast food restaurants near Menlo Park |
| healthy food in menlo park | Looking for places near Menlo Park that serve healthy food. |
| dive bar in menlo park | Looking for dive bars near Menlo Park. |
| pool room in menlo park | Looking for pool rooms near Menlo Park. |
| hookah room in menlo park | Looking for places near Menlo Park described as "hookah room". |
| spicy food in sf | Looking for places near Menlo Park that serve spicy food. |
| burgers in Menlo park | Looking for places near Menlo Park that serve burgers. |
| belly dancing place in sf | Looking for places near San Francisco described as "belly dancing". |
| belly dancing place in menlo park | Looking for places near Menlo Park described as "belly dancing". |
| juke joint in sf | Looking for joints near San Francisco described as "juke". |
| tie house Menlo park | Looking for places near Menlo Park described as "tie house". |
| thai house palo alto | Looking up Thai House in Palo Alto |
| il fornaio menlo park | Looking up Il Fornaio in Palo Alto |
| il fornao in Menlo park | Looking for places near Palo Alto described as "il fornao". |
| cliff house in Menlo park | Looking up Cliff House in Palo Alto |
| romantic restaurant in palo alto | Looking for romantic restaurants in Palo Alto |
| romantic restaurant in palo alto | Looking for romantic restaurants in Palo Alto |
| quiet romantic restaurant in palo alto | Looking for romantic restaurants in Palo Alto described as "quiet" |
| quiet romantic restaurant in palo alto | Looking for romantic restaurants in Palo Alto described as "quiet" |
| tragically hip restaurant in palo alto | Looking for restaurants in Palo Alto described as "tragically hip" |
| tragically hip restaurant in palo alto | Looking for restaurants in Palo Alto described as "tragically hip" |
| table for two tonight in palo alto | Checking availability for tonight at restaurants near Palo Alto. |
| table for two italian food tonight in palo alto | Checking availability for tonight at Italian restaurants near Palo Alto. |
| il fornaio palo alto 6pm for 2 | Checking availability for tables tonight at Il Fornaio in Palo Alto. |
| table for 2 at thai house in PA | Checking availability for tables tonight at Thai House in Palo Alto. |
| pizza delivery in menlo park | |
| I want the best quiet romantic italian restaurant for osso buco in or near menlo park | OK, looking for recommended romantic italian restaurants near Menlo Park that serve osso buco and are described as "quiet". |
| Book me a table for 2 at the best quiet romantic italian restaurant for osso buco in or near menlo park | OK, looking for recommended romantic italian restaurants near Menlo Park with open tables for 2 that serve osso buco and are described as "quiet". |

Refining a Query about Places to Eat

Table 3 provides some examples of paraphrases in response to a situation where user's intent to find a place to eat is known, but they have not selected a particular place to eat. They are facing a list of restaurants, and they provide refinements.

TABLE 3

Paraphrases in response to refinements

| Refinements | |
|---|---|
| menlo park (was unknown) | Thanks, now looking for restaurants in Menlo Park. |
| cheapest | OK, looking for affordable restaurants near Menlo Park. |
| chinese (was italian) | OK, changing cuisine to Chinese. Looking for Chinese restaurants near Menlo Park. |
| pizza (adding food item) | OK, looking for Italian restaurants near Menlo Park that serve pizza. |
| san francisco (was menlo park) | OK, changing location to San Francisco. Looking for Italian restaurants near San Francisco that serve pizza. |
| tragically hip | OK, I'll search reviews for "tragically hip". |
| quiet romantic | OK, looking for romantic restaurants in Palo Alto described as "quiet" |
| cliff house | Cliff House sounds familiar. I'll look it up in Palo Alto. |

Table 4 provides some examples of results summaries that are provided once results are obtained.

TABLE 4

Results Summaries

| Input | # Results | Results Summary |
|---|---|---|
| tie house | N/A | N/A (no call to services) |
| palo alto | N/A | N/A (no call to services) |
| food | N/A | N/A (no call to services) |
| Italian food | N/A | N/A (no call to services) |
| burrito | N/A | N/A (no call to services) |
| best mexican food | N/A | N/A (no call to services) |
| restaurants palo alto | many | Here are some recommended restaurants near Palo Alto. Do you prefer any particular food type? Would you like a reservation? |
| Italian palo alto | some | Here are some Italian restaurants near Palo Alto. To reserve a table, click on available times. |
| thai food in menlo park | some | Here are some Thai restaurants near Menlo Park. To reserve a table, click on available times. |
| indonesian food in menlo park | 0 | Sorry, I can't find any Indonesian restaurants near Menlo Park. You could try other cuisines or locations. |
| best mexican food in Palo Alto | some | Here are some recommended Mexican restaurants near Palo Alto. |
| fast food menlo park | some | OK, here are some fast food restaurants near Menlo Park. |
| healthy food in menlo park | some | Here are some places near Menlo Park that might serve healthy food, based on reviews. |
| dive bar in menlo park | some | Here are some bars near Menlo Park. I don't see anything specific to "dive bar". Are there other ways of saying it? |
| pool room in menlo park | some | Here are some places in Menlo Park that are described as pool rooms. You can add other words to describe what you want. |
| hookah room in menlo park | 0 | I can't find places Menlo Park matching "hookah room". Interested in restaurants, hotels, or local businesses? |
| spicy food in sf | weak match | Here are some places to eat in San Francisco. I don't know which serve spicy food. Could it go by another name? |
| burgers in Menlo park | some | You might find burgers at these places to eat near Menlo Park. |
| belly dancing place in sf | some | Here are some places in Menlo Park that are described as "belly dancing". You can add other words to describe what you want. |
| belly dancing place in menlo park | 0 | I can help you find restaurants, businesses, events, and things to do in San Francisco. What are some other words for "belly dancing place"? |
| juke joint in sf | 0 | I can help you find restaurants, businesses, events, and things to do in San Francisco. What are some other words for "juke joint"? |
| tie house Menlo park | 0 | Sorry, I don't know about "tie house" in Menlo Park. Any other names for it? |
| thai house palo alto | 1 | Got it: Thai House restaurant in Palo Alto, CA. Want to reserve a table? When and for how many? |
| il fornaio menlo park | weak match | There is a Il Fornaio restaurant in Palo Alto, which is near Menlo Park. |
| il fornao in Menlo park | spell match | Did you mean Il Fornaio in Palo Alto? If not, try different words. |
| cliff house in Menlo park | 0 | I couldn't find Cliff House in Palo Alto. Could it go by a different name or be in a different city? |
| romantic restaurant in palo alto | some | Here are some restaurants near Palo Alto that are described in reviews as romantic. |

TABLE 4-continued

Results Summaries

| | # Results | Results Summary |
|---|---|---|
| romantic restaurant in palo alto | 0 | Here are restaurants near Palo Alto. Searching reviews did not find any described as romantic. Any other preferences? |
| quiet romantic restaurant in palo alto | some | Here are some restaurants near Palo Alto that match "quiet romantic" in reviews. |
| quiet romantic restaurant in palo alto | 0 | Here are some restaurants near Palo Alto. Searching reviews did not find any matching "quiet romantic". Any other preferences? |
| tragically hip restaurant in palo alto | some | Here are some restaurants near Palo Alto that match "tragically hip" in reviews. |
| tragically hip restaurant in palo alto | 0 | Here are some restaurants near Palo Alto. Searching reviews did not find any matching "tragically hip". Any other preferences? |
| table for two tonight in palo alto | some | Here are restaurants with open tables from 6pm to 8pm tonight for a party of two in Palo Alto, CA. |
| table for two italian food tonight in palo alto | some | Here are restaurants with open tables from 6pm to 8pm tonight for a party of two in Palo Alto, CA. |
| il fornaio palo alto 6pm for 2 | 1 | Here are table options at Il Fornaio restaurant in Palo Alto, CA at 6pm today for a party of 2. |
| table for 2 at thai house in PA | 1 | Here is the information for Thai House in Palo Alto, CA. You can call them at the phone number listed. |
| pizza delivery in menlo park | | Here are places that serve pizza in menlo park. I do not have delivery options at this time. Click on restaurant phone numbers to call for delivery. |
| I want the best quiet romantic italian restaurant for osso buco in or near menlo park | weak match, sorted by availability | Here are the best matches for recommended romantic italian restaurants near Menlo Park that serve osso buco and are described as "quiet". Click on available times to reserve a table. |
| Book me a table for 2 at the best quiet romantic italian restaurant for osso buco in or near menlo park | weak match, sorted by availability | Here are the best matches for recommended romantic italian restaurants near Menlo Park with open tables for 2 that serve osso buco and are described as "quiet". Click on available times to reserve a table. |
| refinements | | |
| menlo park (was unknown) | some | Here are some recommended restaurants near Menlo Park. Do you prefer any particular food type? |
| cheapest | some | I found 4 affordable restaurants near Menlo Park. |
| chinese (was italian) | some | I found 4 Chinese restaurants near Menlo Park. |
| pizza (adding food item) | some | I found 4 Italian restaurants near Menlo Park that serve pizza. |
| san francisco (was menlo park) | some | I found 4 Italian restaurants near San Francisco. |
| tragically hip | some | I found 4 restaurants near Palo Alto that match "tragically hip" in reviews. |
| quiet romantic | some | Here are some restaurants near Palo Alto that match "quiet romantic" in reviews. |
| cliff house | 0 | I couldn't find Cliff House in Palo Alto. Could it go by a different name or be in a different city? |

Table 5 provides some examples of prompts that are provided when users click on active links.
Prompts when Users Click on Active Links

TABLE 5

Prompts when users click on active links

| Anchor Text | Prompt Text | Notes |
|---|---|---|
| Location, where | Enter a location: a city, zip code, or "near" followed by the name of a place. | This prompt might be used when the user has not specified a location yet. |
| Palo Alto | Enter a location such as a city, neighborhood, street address, or "near" followed by a landmark. | This prompt might be used when the user is changing locations. |
| food type | Enter a food category such as Chinese or Pizza. | Merge food type and cuisine can be merged |
| Italian | You can try other food categories such as Chinese, or a favorite food item such as steak. | User already said Italian. Assistant 1002 is helping the user explore alternatives. If it is a food item, it dominates over cuisine. |
| reservation | Enter the day and time to reserve a table, such as "tomorrow at 8". | Prompting for a reservation |
| healthy food | You can also enter menu items or cuisines | Known food type |
| spicy food | You can also enter menu items or cuisines | Unknown food type |

TABLE 5-continued

Prompts when users click on active links

| Anchor Text | Prompt Text | Notes |
| --- | --- | --- |
| restaurants | What kind of restaurant? (e.g., Chinese, Pizza) | Clicking on the restaurants link should insert the word "restaurant" on the end of the text input. |
| businesses | You can find local florists, ATMs, doctors, drug stores, and the like What kind of business are you looking for? | Clicking on the businesses link should add to the machine readable tag that this is a local search |
| events | You can discover upcoming converts, shows, and the like What interests you? | |
| things to do | Music, art, theater, sports, and the like What kind of thing would you like to do in this area? | |
| hotels | I can help you find an available hotel room. Any preferences for amenities or location? | |
| weather | Enter a city, and I'll tell you what the weather is like there. | If location is known, just show the weather data |
| buying things | I can help you find music, movies, books, electronics, toys, and more -- and buy it from Amazon. What are you looking for? | |

Suggesting Possible Responses in a Dialog

In one embodiment, assistant 1002 provides contextual suggestions. Suggestions are a way for assistant 1002 to offer the user options to move forward from his or her current situation in the dialog. The set of suggestions offered by assistant 1002 depends on context, and the number of suggestions offered may depend on the medium and form factor. For example, in one embodiment, the most salient suggestions may be offered in line in the dialog, an extended list of suggestions ("more") may be offered in a scrollable menu, and even more suggestions are reachable by typing a few characters and picking from autocomplete options. One skilled in the art will recognize that other mechanisms may be used for providing suggestions.

In various embodiments, different types of suggestions may be provided. Examples of suggestion types include:
  options to refine a query, including adding or removing or changing constraint values;
  options to repair or recover from bad situations, such as "not what I mean" or "start over" or "search the web";
  options to disambiguate among;
  interpretations of speech;
  interpretations of text, including spell correction and semantic ambiguity;
  context-specific commands, such as "show these on a map" or "send directions to my date" or "explain these results";
  suggested cross-selling offers, such as next steps in meal or event planning scenarios;
  options to reuse previous commands, or parts of them.

In various embodiments, the context that determines the most relevant suggestions may be derived from, for example:
  dialog state
  user state, including, for example:
    static properties (name, home address, etc)
    dynamic properties (location, time, network speed)
  interaction history, including, for example:
    query history
    results history
    the text that has been entered so far into autocomplete.

In various embodiments, suggestions may be generated by any mechanism, such as for example:
  paraphrasing a domain, task, or constraint based on the ontology model;
  prompting in autocomplete based on the current domain and constraints;
  paraphrasing ambiguous alternative interpretations;
  alternative interpretations of speech-to-text;
  hand authoring, based on special dialog conditions.

According to one embodiment, suggestions are generated as operations on commands in some state of completion. Commands are explicit, canonical representations of requests, including assumptions and inferences, based on attempted interpretations on user input. In situations where the user input is incomplete or ambiguous, suggestions are an attempt to help the user adjust the input to clarify the command.

In one embodiment, each command is an imperative sentence having some combination of a
  command verb (imperative such as "find" or "where is");
  domain (selection class such as "restaurants");
  constraint(s) such as location=Palo Alto and cuisine=Italian.

These parts of a command (verb, domain, constraints) correspond to nodes in the ontology.

A suggestion, then, may be thought of as operations on a command, such as setting it, changing it, or declaring that it is relevant or not relevant. Examples include:
  setting a command verb or domain ("find restaurants")
  changing a command verb ("book it", "map it", "save it")
  changing a domain ("looking for a restaurant, not a local business")
  stating that a constraint is relevant ("try refining by cuisine")
  choosing a value for a constraint ("Italian", "French", and the like)
  choosing a constraint and value together ("near here", "tables for 2")
  stating that a constraint value is wrong ("not that Boston")
  stating that a constraint is not relevant ("ignore the expense")
  stating the intent to change a constraint value ("try a different location")

changing a constraint value ("Italian, not Chinese")
adding to a constraint value ("and with a pool, too")
snapping a value to grid ("Los Angeles, not los angelos")
initiating a new command, reusing context ([after movies] "find nearby restaurants", "send directions to my friend")
initiating a command that is "meta" to context ("explain these results")
initiating a new command, resetting or ignoring context ("start over", "help with speech")

A suggestion may also involve some combination of the above. For example:

"the movie Milk not [restaurants serving] the food item milk"
"restaurants serving pizza, not just pizza joints"
"The place called Costco in Mountain View, I don't care whether you think it is a restaurant or local business"
"Chinese in mountain view" [a recent query]

In one embodiment, assistant 1002 includes a general mechanism to maintain a list of suggestions, ordered by relevance. The format in which a suggestion is offered may differ depending on current context, mode, and form factor of the device.

In one embodiment, assistant 1002 determines which constraints to modify by considering any or all of the following factors:

Consider whether the constraint has a value;
Consider whether the constraint was inferred or explicitly stated;
Consider its salience (suggestionIndex).

In one embodiment, assistant 1002 determines an output format for the suggestion. Examples of output formats include:

change domain:
  if autocomplete option "find restaurants", then "try something different"
  else [was inferred] "not looking for restaurants"
change name constraint:
  if name was inferred, offer alternative ambiguous interpretation"
  stuff into autocomplete the entity names from current results
  different name
  consider that it wasn't a name lookup (remove constraint)—maybe offer category in place of it
"not named"
"not in Berkeley"
"some other day"
not that sense of (use ambiguity alternatives)
inferred date: "any day, I don't need a reservation"

In one embodiment, assistant 1002 attempts to resolve ambiguities via suggestions. For example, if the set of current interpretations of user intent is too ambiguous 310, then suggestions are one way to prompt for more information 322. In one embodiment, for constrained selection tasks, assistant 1002 factors out common constraints among ambiguous interpretations of intent 290 and presents the differences among them to the user. For example, if the user input includes the word "café" and this word could match the name of a restaurant or the type of restaurant, then assistant 1002 can ask "did you mean restaurants named 'café ' or 'café restaurants'?"

In one embodiment, assistant 1002 infers constraints under certain situations. That is, for constrained selection tasks, not all constraints need be mentioned explicitly in the user input; some can be inferred from other information available in active ontology 1050, short term personal memory 1052, and/or other sources of information available to assistant 1002. For example:

Inferring domain or location
Default assumption, like location
Weakly matched constraint (fuzzy, low salience location, etc)
Ambiguous criteria (match to constraint value without prefix (name vs. category, often ambiguous)

In cases where the assistant 1002 infers constraint values, it may also offer these assumptions as suggestions for the user to overrule. For example, it might tell the user "I assumed you meant around here. Would you like to look at a different location?"

The present invention has been described in particular detail with respect to possible embodiments. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements, or entirely in software elements. Also, the particular division of functionality between the various system components described herein is merely exemplary, and not mandatory; functions performed by a single system component may instead be performed by multiple components, and functions performed by multiple components may instead be performed by a single component.

In various embodiments, the present invention can be implemented as a system or a method for performing the above-described techniques, either singly or in any combination. In another embodiment, the present invention can be implemented as a computer program product comprising a nontransitory computer-readable storage medium and computer program code, encoded on the medium, for causing a processor in a computing device or other electronic device to perform the above-described techniques.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the above are presented in terms of algorithms and symbolic representations of operations on data bits within a memory of a computing device. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention can be embodied in software, firmware and/or hardware, and when embodied in software, can be downloaded to reside on and be operated from different platforms used by a variety of operating systems.

The present invention also relates to an apparatus for performing the operations herein. This apparatus may be specially constructed for the required purposes, or it may comprise a general-purpose computing device selectively activated or reconfigured by a computer program stored in the computing device. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Further, the computing devices referred to herein may include a single processor or may be architectures employing multiple processor designs for increased computing capability.

The algorithms and displays presented herein are not inherently related to any particular computing device, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description provided herein. In addition, the present invention is not described with reference to any particular programming language. It will be appreciated that a variety of programming languages may be used to implement the teachings of the present invention as described herein, and any references above to specific languages are provided for disclosure of enablement and best mode of the present invention.

Accordingly, in various embodiments, the present invention can be implemented as software, hardware, and/or other elements for controlling a computer system, computing device, or other electronic device, or any combination or plurality thereof. Such an electronic device can include, for example, a processor, an input device (such as a keyboard, mouse, touchpad, trackpad, joystick, trackball, microphone, and/or any combination thereof), an output device (such as a screen, speaker, and/or the like), memory, long-term storage (such as magnetic storage, optical storage, and/or the like), and/or network connectivity, according to techniques that are well known in the art. Such an electronic device may be portable or nonportable. Examples of electronic devices that may be used for implementing the invention include: a mobile phone, personal digital assistant, smartphone, kiosk, desktop computer, laptop computer, tablet computer, consumer electronic device, consumer entertainment device; music player; camera; television; set-top box; electronic gaming unit; or the like. An electronic device for implementing the present invention may use any operating system such as, for example, iOS or MacOS, available from Apple Inc. of Cupertino, Calif., or any other operating system that is adapted for use on the device.

While the invention has been described with respect to a limited number of embodiments, those skilled in the art, having benefit of the above description, will appreciate that other embodiments may be devised which do not depart from the scope of the present invention as described herein. In addition, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

What is claimed is:

1. An automated assistant operating on one or more computing devices, the automated assistant comprising:
   an input device, for receiving user input;
   a language interpreter component, for interpreting the received user input to derive a representation of user intent;
   a dialog flow processor component, for identifying at least one task based at least in part on the derived representation of user intent;
   a services orchestration component, for calling at least one service for performing the identified task; and
   an output processor component, for causing a first output to be displayed prior to receiving the user input, and for causing a second output to be displayed based on data received from the at least one called service;
   wherein the first output comprises a plurality of core competencies of the automated assistant and an example of a natural language input for invoking each of the plurality of core competencies.

2. A method for implementing an automated assistant on one or more computing devices having one or more processors and memory, the method comprising:
   at the one or more computing devices:
      invoking the automated assistant;
      causing a first output to be displayed, wherein the first output comprises a plurality of core competencies of the automated assistant and an example of a natural language input for invoking each of the plurality of core competencies;
      at an input device, receiving user input;
      interpreting the received user input to derive a representation of user intent;
      identifying at least one task based at least in part on the derived representation of user intent;
      calling at least one service for performing the identified task; and
      causing a second output to be displayed based on data received from the at least one called service;
      wherein the first output is displayed prior to receiving the user input.

3. A non-transitory computer-readable medium for implementing an automated assistant on one or more computing devices, the computer-readable medium having instructions stored thereon, the instructions, when executed by one or more processors, cause the processors to perform operations comprising:

invoking the automated assistant;

causing a first output to be displayed in a conversation interface of the automated assistant, wherein the first output comprises a plurality of core competencies of the automated assistant and an example of a natural language input for invoking each of the plurality of core competencies;

at an input device, receiving user input;

interpreting the received user input to derive a representation of user intent;

identifying at least one task based at least in part on the derived representation of user intent;

calling at least one service for performing the identified task; and causing a second output to be displayed based on data received from the at least one called service;

wherein the first output is displayed prior to receiving the user input.

4. The automated assistant of claim 1, wherein one of the plurality of core competencies is setting a reminder.

5. The automated assistant of claim 1, wherein one of the plurality of core competencies is getting directions.

6. The automated assistant of claim 1, wherein one of the plurality of core competencies is searching for a restaurant.

7. The automated assistant of claim 1, wherein one of the plurality of core competencies is searching for an entertainment event.

8. The automated assistant of claim 1, wherein one of the plurality of core competencies is getting a weather forecast.

9. The automated assistant of claim 1, wherein one of the plurality of core competencies is booking a taxi.

10. The automated assistant of claim 1, wherein the first output further comprises a graphical icon for each of the core competencies.

11. The automated assistant of claim 1, wherein:
the first output further comprises a user interface element for exploring a core competency; and
in response to a selection of the user interface element, the output processor component causes a third output to be displayed comprising one or more additional examples of natural language input for invoking the core competency.

12. The automated assistant of claim 1, wherein:
the input device receives a natural language user input from a user; and
in response to the natural language user input, the output processor component causes a third output to be displayed comprising the natural language user input and at least one of the plurality of core competencies.

13. The automated assistant of claim 12, wherein:
the output processor component causes a fourth output to be displayed comprising a natural language response to the natural language user input and the at least one of the plurality of core competencies.

14. The automated assistant of claim 1, wherein:
the input device receives a natural language user input from a user, the natural language user input requests a search for an event; and
the output processor component causes a third output to be displayed comprising an echo of the natural language user input, a paraphrase of the natural language user input, and at least one search result.

15. The automated assistant of claim 1, wherein:
the input device receives a natural language user input from a user, the natural language user input specifying parameters for making a restaurant reservation;
in response to the natural language input, the output processor component causes a third output to be displayed comprising a summary of the parameters and a plurality of restaurants meeting the specified parameters; and
for at least one of the plurality of restaurants, the third output comprises displays a reservation option meeting the specified parameters and at least one additional reservation option different from the specified parameters.

16. The automated assistant of claim 15, wherein the reservation option meeting the specified parameters includes a reservation for a specified time in the natural language input, and the additional reservation option different from the specified parameters includes a reservation option for a different time from the specified time.

17. The automated assistant of claim 1, wherein:
the input device receives a natural language question from a user; and
the output processor component causes a third output to be displayed comprising an echo of the natural language question, a natural language answer to the natural language question, and an excerpt retrieved from an information source based on which the natural language answer is produced.

18. The automated assistant of claim 17, wherein the natural language question is related to weather, the natural language answer describes the weather in a natural language format, and the excerpt is a weather forecast excerpt.

19. The method of claim 2, wherein one of the plurality of core competencies is setting a reminder.

20. The method of claim 2, wherein one of the plurality of core competencies is getting directions.

21. The method of claim 2, wherein one of the plurality of core competencies is searching for a restaurant.

22. The method of claim 2, wherein one of the plurality of core competencies is searching for an entertainment event.

23. The method of claim 2, wherein one of the plurality of core competencies is getting a weather forecast.

24. The method of claim 2, wherein one of the plurality of core competencies is booking a taxi.

25. The method of claim 2, wherein the first output further comprises a graphical icon for each of the core competencies.

26. The method of claim 2, wherein the first output further comprises a
user interface element for exploring a core competency; and
in response to a selection of the user interface element, causing to be displayed one or more additional examples of natural language input for invoking the core competency.

27. The method of claim 2, further comprising:
at the input device, receiving a natural language user input from a user; and
in response to the natural language user input, presenting the natural language user input concurrently with at least one of the plurality of core competencies.

28. The method of claim 27, further comprising:
presenting a natural language response to the natural language user input concurrently with the at least one of the plurality of core competencies.

29. The method of claim 2, further comprising:
at the input device, receiving a natural language user input from a user, the natural language user input requests a search for an event; and
concurrently presenting an echo of the natural language user input, a paraphrase of the natural language user input, and at least one search result.

30. The method of claim 2, further comprising:
at the input device, receiving a natural language user input from a user, the natural language user input specifying parameters for making a restaurant reservation;
in response to the natural language input, concurrently presenting a summary of the parameters, and a plurality of restaurants meeting the specified parameters; and
for at least one of the plurality of restaurants, displaying a reservation option meeting the specified parameters, and at least one additional reservation option different from the specified parameters.

31. The method of claim 30, wherein the reservation option meeting the specified parameters includes a reservation for a specified time in the natural language input, and the additional reservation option different from the specified parameters includes a reservation option for a different time from the specified time.

32. The method of claim 2, further comprising:
at the input device, receiving a natural language question from a user; and
concurrently displaying an echo of the natural language question, a natural language answer to the natural language question, and an excerpt retrieved from an information source based on which the natural language answer is produced.

33. The method of claim 32, wherein the natural language question is related to weather, the natural language answer describes the weather in a natural language format, and the excerpt is a weather forecast excerpt.

34. The computer-readable medium of claim 3, wherein one of the plurality of core competencies is setting a reminder.

35. The computer-readable medium of claim 3, wherein one of the plurality of core competencies is getting directions.

36. The computer-readable medium of claim 3, wherein one of the plurality of core competencies is searching for a restaurant.

37. The computer-readable medium of claim 3, wherein one of the plurality of core competencies is searching for an entertainment event.

38. The computer-readable medium of claim 3, wherein one of the plurality of core competencies is getting a weather forecast.

39. The computer-readable medium of claim 3, wherein one of the plurality of core competencies is booking a taxi.

40. The computer-readable medium of claim 3, wherein the first output further comprises a graphical icon for each of the respective core competencies.

41. The computer-readable medium of claim 3, wherein the first output further comprises a
user interface element for exploring a core competency; and
wherein the operations further comprise:
in response to a selection of the user interface element, causing to be displayed one or more additional examples of natural language input for invoking the core competency.

42. The computer-readable medium of claim 3, wherein the operations further comprise:
receiving a natural language user input from a user; and
in response to the natural language user input, presenting the natural language user input concurrently with at least one of the plurality of core competences.

43. The computer-readable medium of claim 42, wherein the operations further comprise:
presenting a natural language response to the natural language user input concurrently with the at least one of the plurality of core competencies.

44. The computer-readable medium of claim 3, wherein the operations further comprise:
receiving a natural language user input from a user, the natural language user input requests a search for an event; and
concurrently presenting an echo of the natural language user input, a paraphrase of the natural language user input, and at least one search result.

45. The computer-readable medium of claim 3, wherein the operations further comprise:
receiving a natural language user input from a user, the natural language user input specifying parameters for making a restaurant reservation;
in response to the natural language input, concurrently presenting a summary of the parameters, and a plurality of restaurants meeting the specified parameters; and
for at least one of the plurality of restaurants, displaying a reservation option meeting the specified parameters, and at least one additional reservation option different from the specified parameters.

46. The computer-readable medium of claim 45, wherein the reservation option meeting the specified parameters includes a reservation for a specified time in the natural language input, and the additional reservation option different from the specified parameters includes a reservation option for a different time from the specified time.

47. The computer-readable medium of claim 3, wherein the operations further comprise:
receiving a natural language question from a user; and
concurrently displaying an echo of the natural language question, a natural language answer to the natural language question, and an excerpt retrieved from an information source based on which the natural language answer is produced.

48. The computer-readable medium of claim 47, wherein the natural language question is related to weather, the natural language answer describes the weather in a natural language format, and the excerpt is a weather forecast excerpt.

* * * * *